US008266173B1

(12) United States Patent
Reztlaff, II et al.

(10) Patent No.: US 8,266,173 B1
(45) Date of Patent: Sep. 11, 2012

(54) SEARCH RESULTS GENERATION AND SORTING

(75) Inventors: James R. Reztlaff, II, San Jose, CA (US); Thomas A. Ryan, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 406 days.

(21) Appl. No.: 11/763,363

(22) Filed: Jun. 14, 2007

Related U.S. Application Data

(60) Provisional application No. 60/939,357, filed on May 21, 2007.

(51) Int. Cl.
*G06F 17/30* (2006.01)
(52) U.S. Cl. .................................. 707/780; 707/736
(58) Field of Classification Search .................. None
See application file for complete search history.

(56) References Cited

U.S. PATENT DOCUMENTS

| | | | |
|---|---|---|---|
| 4,622,627 A | 11/1986 | Rodriguez et al. |
| 5,544,305 A | 8/1996 | Ohmaye et al. |
| 5,566,098 A | 10/1996 | Lucente et al. |
| 5,623,260 A | 4/1997 | Jones |
| 5,659,742 A | 8/1997 | Beattie et al. |
| 5,663,748 A | 9/1997 | Huffman et al. |
| 5,710,922 A | 1/1998 | Alley et al. |
| 5,742,905 A | 4/1998 | Pepe et al. |
| 5,761,485 A | 6/1998 | Munyan |
| 5,765,168 A | 6/1998 | Burrows |
| 5,813,017 A | 9/1998 | Morris |
| 5,845,278 A | 12/1998 | Kirsch et al. |
| 5,847,698 A | 12/1998 | Reavey et al. |
| 5,892,900 A | 4/1999 | Ginter et al. |
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,047,189 A | 4/2000 | Yun et al. |
| 6,049,796 A | 4/2000 | Siitonen et al. |
| 6,064,980 A | 5/2000 | Jacobi et al. |
| 6,073,148 A | 6/2000 | Rowe et al. |
| 6,148,340 A | 11/2000 | Bittinger et al. |

(Continued)

FOREIGN PATENT DOCUMENTS

CN 101120358 2/2008

(Continued)

OTHER PUBLICATIONS

Beigbeder et al. "An Information Retrieval Model Using the Fuzzy Proximity Degree of Term Occurences". ACM Symposium on Applied Computing, 2005.*

(Continued)

*Primary Examiner* — Yuk Ting Choi
(74) *Attorney, Agent, or Firm* — Lee & Hayes, PLLC

(57) ABSTRACT

Searching electronic items stored in memory may include receiving search query terms, compiling a list of electronic items containing at least one instance of each query term, and sorting the list of electronic items based on one or more criteria. From the sorted list, search results may be determined and displayed.

22 Claims, 91 Drawing Sheets

U.S. PATENT DOCUMENTS

| | | | |
|---|---|---|---|
| 6,154,757 A | 11/2000 | Krause et al. | |
| 6,233,318 B1 | 5/2001 | Picard et al. | |
| 6,300,947 B1 | 10/2001 | Kanevsky | |
| 6,313,828 B1 | 11/2001 | Chombo | |
| 6,331,867 B1 | 12/2001 | Eberhard et al. | |
| 6,335,678 B1 | 1/2002 | Heutschi | |
| 6,351,750 B1 | 2/2002 | Duga et al. | |
| 6,385,596 B1 | 5/2002 | Wiser et al. | |
| 6,401,086 B1 | 6/2002 | Bruckner | |
| 6,401,239 B1 | 6/2002 | Miron | |
| 6,442,651 B2 | 8/2002 | Crow et al. | |
| 6,449,627 B1 | 9/2002 | Baer et al. | |
| 6,457,030 B1 | 9/2002 | Adams et al. | |
| 6,466,951 B1 | 10/2002 | Birkler et al. | |
| 6,493,734 B1 | 12/2002 | Sachs et al. | |
| 6,496,803 B1 | 12/2002 | Seet et al. | |
| 6,529,920 B1 | 3/2003 | Arons et al. | |
| 6,542,874 B1 | 4/2003 | Walker et al. | |
| 6,560,699 B1 | 5/2003 | Konkle | |
| 6,642,947 B2 | 11/2003 | Feierbach | |
| 6,658,623 B1 | 12/2003 | Schilit et al. | |
| 6,685,482 B2 | 2/2004 | Hopp et al. | |
| 6,687,878 B1 | 2/2004 | Eintracht et al. | |
| 6,704,733 B2 | 3/2004 | Clark et al. | |
| 6,721,869 B1 | 4/2004 | Senthil | |
| 6,724,403 B1 | 4/2004 | Santoro et al. | |
| 6,725,227 B1 | 4/2004 | Li | |
| 6,735,583 B1 | 5/2004 | Bjarnestam et al. | |
| 6,744,891 B1 | 6/2004 | Allen | |
| 6,847,966 B1 * | 1/2005 | Sommer et al. | 707/5 |
| 6,904,449 B1 | 6/2005 | Quinones | |
| 6,912,398 B1 | 6/2005 | Domnitz | |
| 6,933,928 B1 | 8/2005 | Lilienthal | |
| 6,938,076 B2 | 8/2005 | Meyer et al. | |
| 6,985,932 B1 | 1/2006 | Glaser et al. | |
| 6,999,565 B1 | 2/2006 | Delaney et al. | |
| 7,007,015 B1 | 2/2006 | Nayak | |
| 7,009,596 B2 | 3/2006 | Seet et al. | |
| 7,010,500 B2 | 3/2006 | Aarnio | |
| 7,020,654 B1 | 3/2006 | Najmi | |
| 7,057,591 B1 | 6/2006 | Hautanen et al. | |
| 7,062,707 B1 | 6/2006 | Knauft et al. | |
| 7,092,116 B2 | 8/2006 | Calaway | |
| 7,103,848 B2 | 9/2006 | Barsness et al. | |
| 7,107,533 B2 | 9/2006 | Duncan et al. | |
| 7,130,841 B1 | 10/2006 | Goel et al. | |
| 7,133,506 B1 | 11/2006 | Smith | |
| 7,135,932 B2 | 11/2006 | Quadir et al. | |
| 7,149,776 B1 | 12/2006 | Roy et al. | |
| 7,165,217 B1 | 1/2007 | Kondo | |
| 7,188,085 B2 | 3/2007 | Pelletier | |
| 7,209,888 B2 | 4/2007 | Frid-Nielsen et al. | |
| 7,237,123 B2 | 6/2007 | LeVine et al. | |
| 7,246,118 B2 | 7/2007 | Chastain et al. | |
| 7,249,060 B2 | 7/2007 | Ling | |
| 7,249,324 B2 | 7/2007 | Nakamura et al. | |
| 7,257,577 B2 | 8/2007 | Fagin et al. | |
| 7,287,068 B1 | 10/2007 | Eriksson et al. | |
| 7,290,285 B2 | 10/2007 | McCurdy et al. | |
| 7,298,851 B1 | 11/2007 | Hendricks et al. | |
| 7,304,635 B2 | 12/2007 | Seet et al. | |
| 7,310,629 B1 | 12/2007 | Mendelson et al. | |
| 7,313,759 B2 | 12/2007 | Sinisi | |
| 7,350,704 B2 | 4/2008 | Barsness et al. | |
| 7,355,591 B2 | 4/2008 | Sugimoto | |
| 7,386,480 B2 | 6/2008 | Sarig | |
| 7,398,244 B1 | 7/2008 | Keith | |
| 7,401,286 B1 | 7/2008 | Hendricks et al. | |
| 7,454,238 B2 | 11/2008 | Vinayak et al. | |
| 7,509,270 B1 | 3/2009 | Hendricks et al. | |
| 7,533,152 B2 | 5/2009 | Stark et al. | |
| 7,539,478 B2 | 5/2009 | Herley et al. | |
| 7,562,032 B2 | 7/2009 | Abbosh et al. | |
| 7,574,653 B2 | 8/2009 | Croney et al. | |
| 7,631,013 B2 | 12/2009 | Parsons et al. | |
| 7,634,429 B2 | 12/2009 | Narin et al. | |
| 7,656,127 B1 | 2/2010 | Shutt et al. | |
| 7,657,459 B2 | 2/2010 | Anderson et al. | |
| 7,680,849 B2 | 3/2010 | Heller et al. | |
| 7,788,369 B2 | 8/2010 | McAllen et al. | |
| 7,835,989 B1 | 11/2010 | Hendricks et al. | |
| 7,865,405 B2 | 1/2011 | Hendricks et al. | |
| 7,865,567 B1 | 1/2011 | Hendricks et al. | |
| 7,908,628 B2 | 3/2011 | Swart et al. | |
| 2001/0007980 A1 | 7/2001 | Ishibashi et al. | |
| 2001/0025302 A1 | 9/2001 | Suzuki et al. | |
| 2001/0027478 A1 | 10/2001 | Meier et al. | |
| 2001/0037328 A1 | 11/2001 | Pustejovsky et al. | |
| 2001/0049623 A1 | 12/2001 | Aggarwal et al. | |
| 2001/0053975 A1 | 12/2001 | Kurihara | |
| 2002/0002540 A1 | 1/2002 | DeMello et al. | |
| 2002/0010707 A1 | 1/2002 | Chang et al. | |
| 2002/0010759 A1 | 1/2002 | Hitson et al. | |
| 2002/0012134 A1 | 1/2002 | Calaway | |
| 2002/0035697 A1 | 3/2002 | McCurdy et al. | |
| 2002/0054059 A1 | 5/2002 | Schneiderman | |
| 2002/0059415 A1 | 5/2002 | Chang et al. | |
| 2002/0069222 A1 | 6/2002 | McNeely | |
| 2002/0069312 A1 | 6/2002 | Jones | |
| 2002/0090934 A1 | 7/2002 | Mitchelmore | |
| 2002/0092031 A1 | 7/2002 | Dudkiewicz et al. | |
| 2002/0101447 A1 | 8/2002 | Carro | |
| 2002/0103809 A1 * | 8/2002 | Starzl et al. | 707/102 |
| 2002/0120635 A1 | 8/2002 | Joao | |
| 2002/0123336 A1 | 9/2002 | Kamada | |
| 2002/0129012 A1 * | 9/2002 | Green | 707/3 |
| 2002/0138291 A1 | 9/2002 | Vaidyanathan et al. | |
| 2002/0143822 A1 | 10/2002 | Brid et al. | |
| 2002/0147724 A1 | 10/2002 | Fries et al. | |
| 2002/0184319 A1 | 12/2002 | Willner et al. | |
| 2002/0194474 A1 | 12/2002 | Natsuno et al. | |
| 2003/0009459 A1 | 1/2003 | Chastain et al. | |
| 2003/0018720 A1 | 1/2003 | Chang et al. | |
| 2003/0025731 A1 | 2/2003 | Chastain et al. | |
| 2003/0028395 A1 | 2/2003 | Rodgers et al. | |
| 2003/0040970 A1 | 2/2003 | Miller | |
| 2003/0046233 A1 | 3/2003 | Ara et al. | |
| 2003/0052928 A1 | 3/2003 | Williams | |
| 2003/0058265 A1 | 3/2003 | Robinson et al. | |
| 2003/0065642 A1 | 4/2003 | Zee | |
| 2003/0069812 A1 | 4/2003 | Yuen et al. | |
| 2003/0093312 A1 | 5/2003 | Ukita et al. | |
| 2003/0093382 A1 | 5/2003 | Himeno et al. | |
| 2003/0097354 A1 | 5/2003 | Finlay et al. | |
| 2003/0105679 A1 | 6/2003 | Krishnan et al. | |
| 2003/0110503 A1 | 6/2003 | Perkes | |
| 2003/0129963 A1 | 7/2003 | Nurcahya | |
| 2003/0135495 A1 | 7/2003 | Vagnozzi | |
| 2003/0152894 A1 | 8/2003 | Townshend | |
| 2003/0163399 A1 | 8/2003 | Harper et al. | |
| 2003/0164844 A1 | 9/2003 | Kravitz et al. | |
| 2003/0182551 A1 | 9/2003 | Frantz et al. | |
| 2003/0190145 A1 | 10/2003 | Copperman et al. | |
| 2003/0191737 A1 | 10/2003 | Steele et al. | |
| 2003/0204496 A1 * | 10/2003 | Ray et al. | 707/3 |
| 2003/0212613 A1 | 11/2003 | Sarig | |
| 2004/0002943 A1 | 1/2004 | Merrill et al. | |
| 2004/0003398 A1 | 1/2004 | Donian et al. | |
| 2004/0015467 A1 | 1/2004 | Fano | |
| 2004/0030686 A1 | 2/2004 | Cardno et al. | |
| 2004/0044723 A1 | 3/2004 | Bell et al. | |
| 2004/0054499 A1 * | 3/2004 | Starzyk et al. | 702/182 |
| 2004/0098350 A1 | 5/2004 | Labrou et al. | |
| 2004/0117189 A1 | 6/2004 | Bennett | |
| 2004/0139400 A1 | 7/2004 | Allam et al. | |
| 2004/0167822 A1 | 8/2004 | Chasen et al. | |
| 2004/0201633 A1 | 10/2004 | Barsness et al. | |
| 2004/0205457 A1 * | 10/2004 | Bent et al. | 715/500 |
| 2004/0212941 A1 | 10/2004 | Haas et al. | |
| 2004/0237033 A1 | 11/2004 | Woolf et al. | |
| 2004/0267552 A1 | 12/2004 | Gilliam et al. | |
| 2004/0268253 A1 | 12/2004 | DeMello et al. | |
| 2005/0021464 A1 | 1/2005 | Lindauer et al. | |
| 2005/0022113 A1 | 1/2005 | Hanlon | |
| 2005/0044148 A1 | 2/2005 | Son et al. | |
| 2005/0044224 A1 | 2/2005 | Jun et al. | |
| 2005/0066219 A1 | 3/2005 | Hoffman et al. | |

| | | |
|---|---|---|
| 2005/0069225 A1 | 3/2005 | Schneider et al. |
| 2005/0088410 A1 | 4/2005 | Chaudhri |
| 2005/0102618 A1 | 5/2005 | Naito |
| 2005/0125222 A1 | 6/2005 | Brown et al. |
| 2005/0138007 A1 | 6/2005 | Amitay |
| 2005/0138428 A1 | 6/2005 | McAllen et al. |
| 2005/0144895 A1 | 7/2005 | Grimes et al. |
| 2005/0176438 A1 | 8/2005 | Li |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0250439 A1 | 11/2005 | Leslie |
| 2005/0256822 A1 | 11/2005 | Hollingsworth |
| 2006/0004840 A1 | 1/2006 | Senda |
| 2006/0020469 A1 | 1/2006 | Rast |
| 2006/0031316 A1 | 2/2006 | Forstadius |
| 2006/0048184 A1 | 3/2006 | Poslinski et al. |
| 2006/0057960 A1 | 3/2006 | Tran |
| 2006/0061595 A1 | 3/2006 | Goede et al. |
| 2006/0071754 A1 | 4/2006 | Tofts et al. |
| 2006/0075205 A1 | 4/2006 | Martin et al. |
| 2006/0098900 A1 | 5/2006 | King et al. |
| 2006/0123053 A1 | 6/2006 | Scannell, Jr. |
| 2006/0129618 A1 | 6/2006 | Maier |
| 2006/0143558 A1 | 6/2006 | Albornoz et al. |
| 2006/0156222 A1 | 7/2006 | Chi et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0236240 A1 | 10/2006 | Lebow |
| 2006/0253441 A1 | 11/2006 | Nelson |
| 2006/0253461 A1 | 11/2006 | De Bonet |
| 2006/0256083 A1 | 11/2006 | Rosenberg |
| 2006/0265518 A1 | 11/2006 | Owens et al. |
| 2006/0281058 A1 | 12/2006 | Mangoaela |
| 2007/0014404 A1 | 1/2007 | Cha |
| 2007/0039023 A1 | 2/2007 | Kataoka |
| 2007/0050346 A1 | 3/2007 | Goel et al. |
| 2007/0061335 A1 | 3/2007 | Ramer et al. |
| 2007/0073596 A1 | 3/2007 | Alexander et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0136660 A1 | 6/2007 | Gurcan et al. |
| 2007/0136679 A1 | 6/2007 | Yang |
| 2007/0150456 A1* | 6/2007 | Lian et al. .................. 707/3 |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1* | 10/2007 | Lisa et al. ................. 707/10 |
| 2007/0234209 A1 | 10/2007 | Williams |
| 2007/0240187 A1 | 10/2007 | Beach et al. |
| 2007/0282809 A1* | 12/2007 | Hoeber et al. ............... 707/3 |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005664 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0082518 A1* | 4/2008 | Loftesness .................. 707/5 |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0120280 A1 | 5/2008 | Iijima et al. |
| 2008/0133479 A1* | 6/2008 | Zelevinsky et al. ........... 707/3 |
| 2008/0163039 A1 | 7/2008 | Ryan et al. |
| 2008/0164304 A1 | 7/2008 | Narasimhan et al. |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0243788 A1 | 10/2008 | Reztlaff, II et al. |
| 2008/0243828 A1 | 10/2008 | Reztlaff, II et al. |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2009/0094528 A1 | 4/2009 | Gray et al. |
| 2009/0094540 A1 | 4/2009 | Gray et al. |
| 2009/0228774 A1 | 9/2009 | Matheny et al. |
| 2010/0023259 A1 | 1/2010 | Krumm et al. |
| 2010/0081120 A1 | 4/2010 | Nanjiani et al. |
| 2010/0188327 A1 | 7/2010 | Frid et al. |

FOREIGN PATENT DOCUMENTS

| | | |
|---|---|---|
| CN | 101120358 A | 2/2008 |
| EP | 1842150 A2 | 10/2007 |
| JP | 2002099739 A | 4/2002 |
| WO | WO9720274 | 6/1997 |
| WO | WO0045588 | 8/2000 |
| WO | WO0056055 A2 | 9/2000 |
| WO | WO0075840 A2 | 12/2000 |
| WO | WO0239206 | 5/2002 |
| WO | WO2004055647 A2 | 7/2004 |
| WO | WO2006078728 A2 | 7/2006 |

OTHER PUBLICATIONS

Mercier et al. "Sphere of Influence Model in Information Retrieval". IEEE Internatinal Conference, 2005.*

U.S. Appl. No. 11/537,484, filed Sep. 29, 2006, Thomas Ryan, "Expedited Acquisition of a Digital Item Following a Sample Presentation of the Item."

U.S. Appl. No. 11/537,518, filed Sep. 29, 2006, John Lattyak, "Acquisition of an Item based on a Catalog Presentation of Items."

U.S. Appl. No. 11/693,685, filed Mar. 29, 2007, John Lattyak; John Kim; Steven Moy; Laurent An Minh Nguyen, "Relative Progress and Event Indicators."

U.S. Appl. No. 11/763,314, filed Jun. 14, 2007, John Lattyak; Craig Griffin; Steven Weiss, "Display Dependent Markup Language."

U.S. Appl. No. 11/763,339, filed Jun. 14, 2007, David Isbister; Marshall Willilams; Nicholas Vaccaro, "Power Management Techniques for a User Device."

U.S. Appl. No. 11/763,357, filed Jun. 14, 2007, James Reztlaff II; John Lattyak, "Obtaining and Verifying Search Indices."

U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."

U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."

U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."

U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."

U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System."

U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin, "Providing User-Supplied Items to a User Device."

U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ."

U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin, "Incremental Updates of Items ."

U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System ."

U.S. Appl. No. 11/963,618, filed Dec. 21, 2007, Michael Rykov; Laurent An Minh Nguyen; Steven Moy, "Dissemination of Periodical Samples."

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."

U.S. Appl. No. 12/351,629, filed Jan. 9, 2009, John Johnston; Weiping Dou; Steven Chase, "Antenna Placement on Portable Device ."

U.S. Appl. No. 12/351,663, filed Jan. 9, 2009, Chris Li; Steven Chase, "Surface Mount Clip for Routing and Grounding Cables."

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Means, et al., "Evaluating Compliance with FCC Guidelines for Human Exposure to Radiofrequency Electromagnetic Fields", OET Bulletin 65 Edition 97-01, Jun. 2001, 57 pages.

OQO "A Full PC That Fits in Your Pocket" Retrieved on Sep. 22, 2008 at <<http://www.oqo.com/support/documentation.html>>.

PCT Search Report for International Application No. PCT/US 08/57848, mailed Jul. 7, 2008 (9 pages).

PCT Search Report for International Application No. PCT/US08/64387, mailed Sep. 9, 2008 (2 pages).

U.S. Appl. No. 12/360,089, filed Jan. 26, 2009, Thomas Dimson, Janna Hamaker, Eugene Kalenkovich, Tom Killalea, "Aggregation of Highlights."

U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."

U.S. Appl. No. 12/366,941, filed Feb. 6, 2009, Scott Dixon; Eriel Thomas, "Bundled Digital Content."

U.S. Appl. No. 12/414,914, filed Mar. 31, 2009, Amit Agarwal; Zaur Kambarov; Tom Killalea, "Questions on Highlighted Passages."

U.S. Appl. No. 29/331,528, filed Jan. 27, 2009, Chris Green, "User Interface Cluster."

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.

U.S. Appl. No. 11/277,894, filed Mar. 29, 2006, Jateen P. Parekh, Gregg E. Zehr, and Subram Narasimhan, "Reader Device Content Indexing".

Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.

Cavanaugh "EBooks and Accommodations", Teaching Expectional Children vol. 35 No. 2 p. 56-61 Copyright 2002.

Chi et al. "eBooks with Indexes that Reorganize Conceptually", CHI2004, Apr. 24-29, 2004, Vienna, Austria ACM 1-58113-703-6/04/0004.

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.

Elspass, et al., "Portable Haptic Interface with Active Functional Design", In Proceedings SPIE Conference on Smart Structures and Integrated Systems, Newport Beach, California, vol. 3668, Mar. 1999, 926-932.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Nakatani, et al., "3D Form Display with Shape Memory Alloy", In Proceedings of 13th International Conference on Artificial Reality and Teleexistence (ICAT), 2003, pp. 179-184.

"Shape Memory Polymer", retrieved on May 7, 2009 at <<http://en.wikipedia.org/wiki/Shape_Memory_Polymer>>, Wikipedia, 8 pgs.

Sohn et al. "Development of a Standard Format for eBooks", SAC2002, Madrid, Spain, 2002 ACM 1-58113-445-2/02/0.

Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.

"A Universally Unique IDentifier (UUID) URN Namespace", Jul. 2005, IETF, all pages. Retrieved on Apr. 21, 2010 at http://tools.ietf.org/pdf/rfc4122.pdf.

Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.

Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010).

Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.

Desmoulins et al., "Pattern-Based Annotations on E-books: From Personal to Shared Didactic Content", Proceedings of the IEEE International Workshop on Wireless adn Mobile Techniques in Education, 2002, 4 pages.

Gladney, H. M.: "Access Control for Large Collections", NY, vol. 15, No. 2, Apr. 1, 1997, pp. 154-194.

Henke, H. "Survey on Electronic Book Features", Open eBook Forum, online, Mar. 20, 2002, pp. 1-14, retrieved from the Internet: <http://www.openebook.org/doc_library/surveys/IDPF_eBook_Features_2002.pdf> retrieved Nov. 8, 2010.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

Navarro, et al., "Modern Information Retrieval, Chapter 8: Indexing and Searching", Jan. 1, 1999, Modern Information Retrieval, ACM Press, New York, pp. 191-228.

PCT Search Report for PCT Application No. PCT/US10/22060, mailed Mar. 8, 2010 (7 pages).

"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.

"Web Services Architecture: W3C Working Group Note Feb. 11, 2004", W3C, all pages. Retrieved on Apr. 21, 2010 via Wayback Machine at http://web.archive.org/web/2004040205185/http://www.w3.org/TR/ws-arch/.
Ziviani, N ED, Baeza-Yates R. et at: "Modern Information Retrieval, Text Operations", Jan. 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.
"Annotation Engine," Berkman Center for Internet & Society at Harvard Law School <http://cyber.law .harvard. edulproj ectsl annotate.html> [Retrieved Jan. 30, 2004].
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].
"Annotator Wishlist," Berkman Center for Internet & Society at Harvard Law School r <http://cyber.law.harvard.edulcite/annotate.cgi ?action=print&markup ;center=; view=http%3A%2F%2Fcy...> [Retrieved Jan. 30, 2004].
Roscheisen, M., et al., "Beyond Browsing: Shared Comments, SOAPs, Trails, and On-Line Communities," Computer Networks and ISDN Systems 27:739-749, 1995.
Canadian Office Action mailed Apr. 14, 2009 for Canadian Patent Application No. 2594573, a counterpart foreign application of U.S. Appl. No. 11/039,645.
Translated Chinese Office Action mailed May 9, 2008 for Chinese Patent Application No. 200680002606.2, a counterpart foreign application of U.S. Appl. No. 11/039,645.
Translated Chinese Second Office Action mailed Jun. 5, 2009 for Chinese Patent Application No. 200680002606.2, a counterpart foreign application of U.S. Appl. No. 11/039,645.
Translated Chinese Third Office Action mailed Nov. 27, 2009 for Chinese Patent Application No. 200680002606.2, a counterpart foreign application of U.S. Appl. No. 11/039,645.
Carter, S., et al., "Digital Graffiti: Public Annotation of Multimedia Content," Proceedings o/the CHI2004, Vienna, Austria, Apr. 24-29, 2004, pp. 1207-1210.
Extended European Search Report mailed Dec. 22, 2009, issued in corresponding European Patent Application No. EP 06 71 8773.2, filed Jan. 18, 2006.
The European Office Action mailed Dec. 12, 2009 for European Patent Application No. 06718773.2, a counterpart foreign application of U.S. Appl. No. 11/039,645.
The European Search report mailed Dec. 22, 2009 for European Patent Application No. 06718773.2, a counterpart foreign application of U.S. Appl. No. 11/039,645.
Translated Japanese Office Action mailed Jan. 25, 2011 for Japanese Patent Application No. 2007-552235, a counterpart foreign application of U.S. Appl. No. 11/039,645.
Non-Final Office Action for U.S. Appl. No. 11/537,518, mailed on Apr. 28, 2011, John Lattyak, "Acquisition of an Item Based on a Catalog Presentation of Items".
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
PCT International Search Report and the Written Opinion for Application No. PCT/US08/64389, mailed on Jan. 28, 2009, 7 pgs.
PCT International Search Report and the Written Opinion for Application No. PCT/US2006/001752, mailed on Jul. 27, 2006, 8 pgs.
"Say No to Third Voice," Worldzone.net, 1999-2004, <http://worldzone.netiinternetipixelsnttv/index.html> [retrieved Jan. 30, 2004].
"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].

Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004].
The European Office Action mailed Mar. 26, 2010 for European Patent Application No. 06718773.2, a counterpart foreign application of U.S. Appl. No. 11/039,645.
Office action for U.S. Appl. No. 11/763,357, mailed on May 26, 2011, Reztlaff, "Obtaining and Verifying Search Indices".
Final Office Action for U.S. Appl. No. 11/763,314, mailed on Jun. 13, 2011, Craig S. Griffin, "Display Dependent Markup Language".
Non-Final Office Action for U.S. Appl. No. 11/693,682, mailed on Jun. 9, 2011, Hilliard B. Siegel, "Providing Annotations of a Digital Work".
Office action for U.S. Appl. No. 12/333,215, mailed on Jul. 18, 2011, Zagorie et al., "Device-Specific Presentation Control for Electronic Book Reader Devices", 22 pages.
Non-Final Office Action for U.S. Appl. No. 11/693,685, John Lattyak, "Relative Progress and Event Indicators" mailed on Jul. 6, 2011.
BarnesandNoble.com, "Barnes and Noble Homepage", retrieved on Aug. 2, 2011 http://web.archive.org/web/19981202183957/http://www.barnesandnoble.com/, Dec. 2, 1998.
Cavanaugh, "EBooks and Accommodations", Teaching Exceptional Children, vol. 35, No. 2, Copyright 2002 CEC, 6 pages.
Translated Chinese Office Action mailed Oct. 10, 2011 for Chinese patent application No. 200880017259.X, a counterpart foreign application of U.S. Appl. No. 11/693,682, 7 pages.
Translated Chinese Office Action mailed Jul. 14, 2011 for Japanese patent application No. 20078004873.9, a counterpart foreign application of US patent No. 7,865,817, 6 pages.
Translated Chinese Office Action mailed Aug. 25, 2011 for Chinese patent application No. 200880024964.2, a counterpart foreign application of 11/763,358, 6 pages.
Translated Chinese Office Action mailed Sep. 26, 2011 for Chinese patent application No. 200880017589.9, a counterpart foreign application of U.S. Appl. No. 11/763,369, 9 pages.
Translated Chinese Office Action mailed Sep. 30, 2011 for Chinese patent application No. 200880025056.5, a counterpart foreign application of U.S. Appl. No. 11/763,374, 9 pages.
Office action for U.S. Appl. No. 12/360,089, mailed on Oct. 5, 2011, Killalea et al., "Aggregation of Highlights", 75 pages.
Final Office Action for U.S. Appl. No. 11/763,392, mailed on Oct. 14, 2011, Thomas Ryan, "Administrative Tasks in a Media Consumption System ", 38 pages.
Office action for U.S. Appl. No. 11/763,390, mailed on Oct. 24, 2011, Bajaj et al., "Providing User-Supplied Items to a User Device ", 11 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System ", 10 pages, mailed on Nov. 11, 2011.
Office action for U.S. Appl. No. 12/414,914, mailed on Aug. 4, 2011, Agarwal et al., "Questions on Highlighted Passages", 39 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.

* cited by examiner

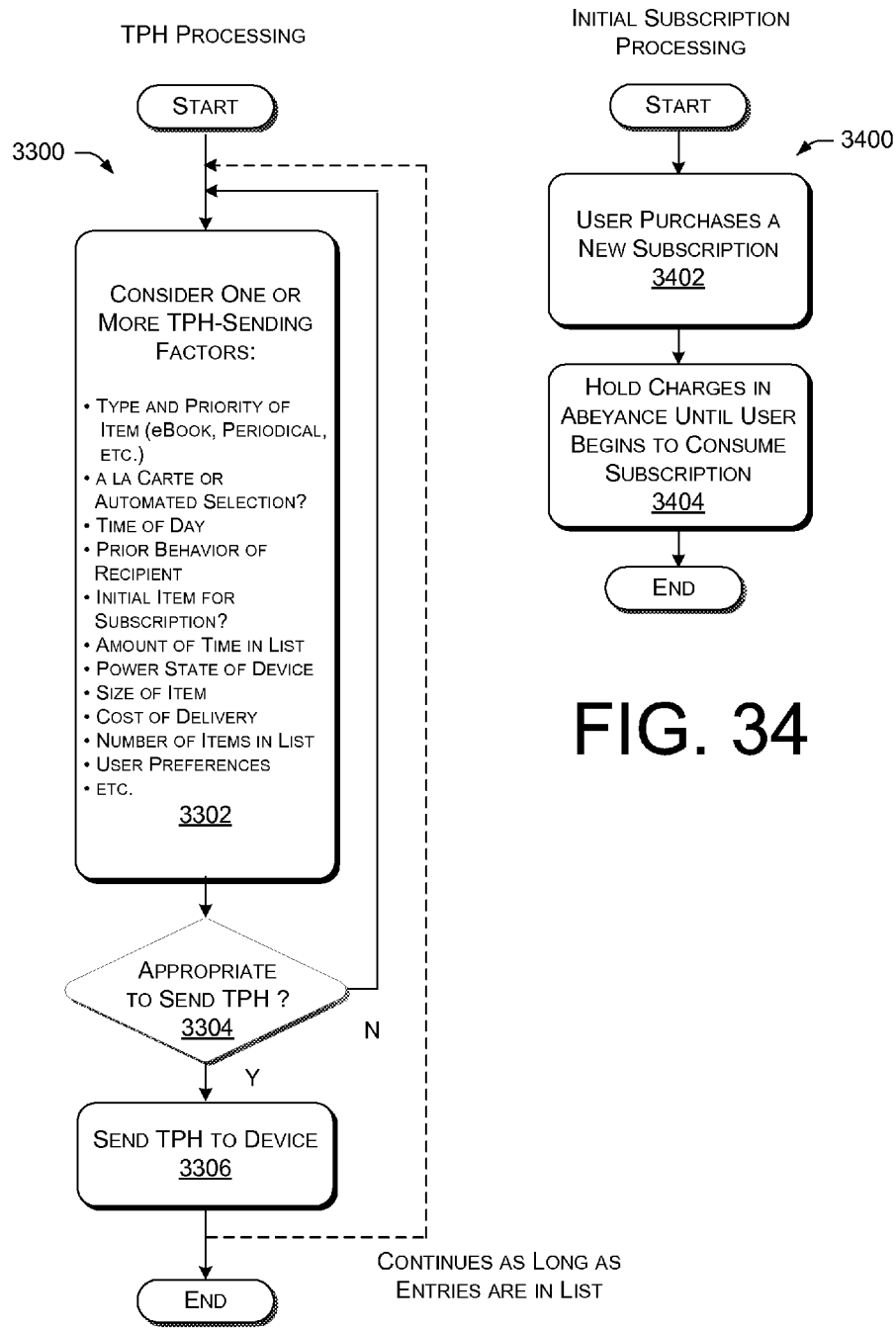

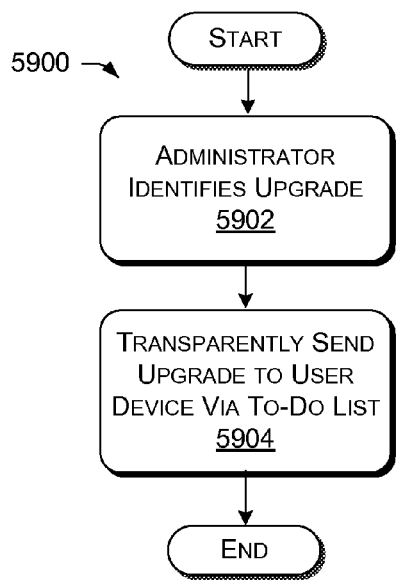
FIG. 59
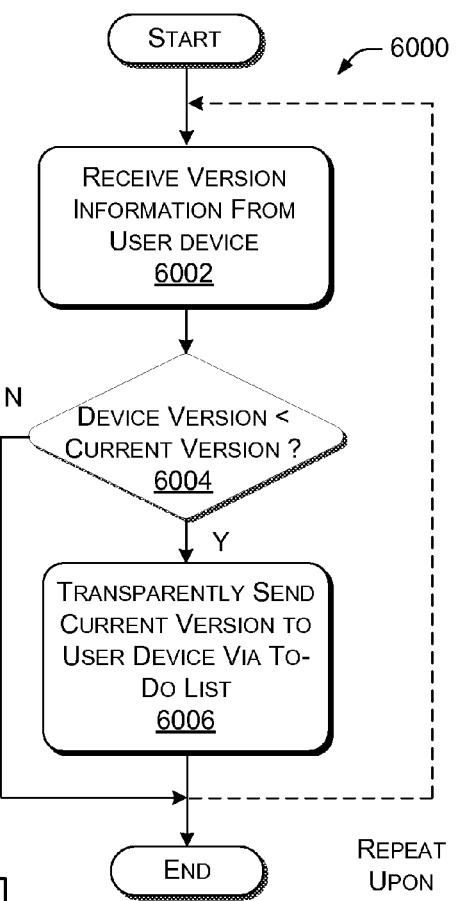
FIG. 60
FIG. 61

SEARCH: ALL INSTANCES OF "POLITICS"    CLOSE ■

In The New York Times

205   exchange was set off by a Democratic inquiry into whether the White house let *politics* interfere with law enforcement by dismissing eight of the nation's 93 United States...

546   Reason," billed in promotional copy as "a visionary analysis of how the *politics* of fear, secrecy, cronyism and blind faith ahs combined with the degradation of the public...

560   recalled that Mr. Gore expressed his disdain for the "tomfoolery of *politics*" -- the endless fund-raising, the repetitive glad-handling, the sniping among operatives...

561   sniping among operatives. "It's hard to imagine that returning to *politics* would make them happier than they are now," Mr. Nemazee said. Friends say Mr. Gore often...

734   time and my energy for the next nine months on the people's work, not on *politics*. After much though and prayer, I have decided that I will not seek re-election as...

1026   down the list of requests, known as earmarks in the shorthand of backroom *politics*. (This one, she learned, was for a home that the local historical society describes...

1 of 5      MENU ▶

SEARCH POLITICS      GO ▶

FIG. 72

SEARCH RESULTS GENERATION AND SORTING

This application claims the benefit of U.S. Provisional Application No. 60/939,357 filed on May 21, 2007, which is incorporated by reference herein in its entirety.

BACKGROUND

Users have traditionally consumed media items (such as books, magazines, newspapers, etc.) in hard-copy form. For instance, a user may obtain a physical book from a bookstore or a library. The user may read the book by manually flipping through its pages in conventional fashion.

A user may now also receive and consume some media items in electronic form. In one case, a user may use a personal computer to connect to a network-accessible source of media items via a conventional telephone or cable modem. The user may download a document from this source. The user may consume the document by printing it out and reading it in conventional fashion. Alternatively, the user may read the document in electronic form, that is, by reading the book as presented on a computer monitor.

A provider of electronic media items faces various challenges. For instance, many users continue to prefer consuming media items in traditional hard-copy form, even though these media items are available in electronic form. The provider confronts the task of capturing the interest of such users, while providing a viable solution from a technical standpoint and a business-related standpoint.

BRIEF DESCRIPTION OF THE DRAWINGS

FIG. 33 is a flowchart which depicts an illustrative manner of operation of TelePhone Home (TPH) processing functionality identified in FIG. 30.

FIG. 34 is a flowchart which depicts one illustrative manner of operation of subscription-initiation functionality of FIG. 30.

FIG. 59 is a flowchart which depicts one illustrative manner of operation of upgrade-related functionality of FIG. 57, corresponding to a manual mode of upgrading.

FIG. 60 is a flowchart which depicts one illustrative manner of operation of the upgrade-related functionality of FIG. 57, corresponding to an automated mode of upgrading.

FIG. 61 shows an illustrative format used to forward upgrades to the user device of FIG. 3.

FIG. 72 is a schematic diagram of an illustrative interface that may be used to present instances of search results on a user device.

Figure 1:
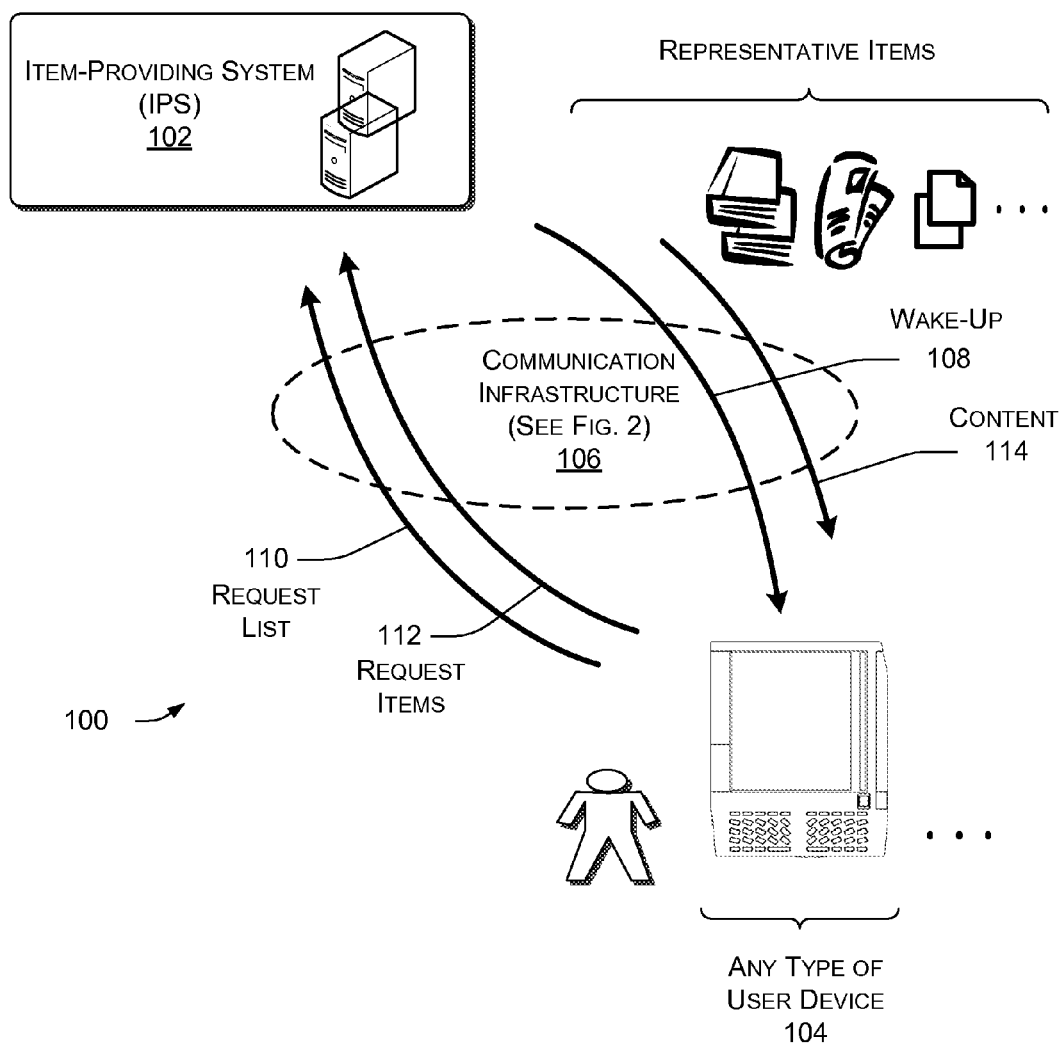
FIG. 1 shows an overview of an illustrative system for downloading items to a user device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

According to one illustrative implementation, this disclosure sets forth functionality for downloading items to a user device. The functionality may be manifested in various systems, modules, computer readable media, data structures, methods, and other forms.

The "item" referenced above may correspond to any type of content. In one case, the item corresponds to a digital media item. The media item may include, without limitation, text content, image content, audio content, video content, hypertext protocol content, and so on, or any combination of these kinds of content. In addition, or alternatively, the item may include instruction-bearing content, such as machine-readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

The term "entry" corresponds to information which refers to an item. For example, a list of entries may include reference information which identifies respective media items.

Certain drawings illustrate the features by showing various logic, modules, components, functionality, and so forth. The terms "logic," "module," "component," "functionality" and the like generally represent hardware, software, firmware, or any combination of these elements, or yet some other kind of implementation. For instance, in the case of a software implementation, the terms "logic," "module," "component," or "functionality" may represent instruction-bearing content to perform specified tasks when executed on a processing unit or units (e.g., a CPU or CPUs). The instruction-bearing content may be stored in one or more machine-readable media.

The term "machine-readable media" or the like refers to any kind of media for retaining information in any form, including various kinds of storage devices (magnetic, optical, static, etc.). The term "machine-readable media" also encompasses transitory forms of representing information, including various hardwired and/or wireless links for transmitting the information from one point to another.

Other figures illustrate features in signal diagram form and/or flowchart form. In this mode of explanation, certain operations are described as constituting distinct tasks performed in a certain order. Such implementations are illustrative and non-limiting. Separate operations described in these figures may be grouped together and performed in a single operation, while certain single operations may be performed in multiple parts. Certain operations may be performed in an order different from the order illustrated in the figures. Certain operations may be performed by different agents than is identified in the figures. The operations shown in the figures may be implemented by software, firmware, hardware, manual processing, or other form, or by any combination of these forms.

In general, the various features described in the implementations may be regarded as optional features, meaning that these features may be omitted or replaced with other features. Further, the various implementations described herein may be supplemented by adding additional features.

This disclosure includes the following main sections.

Section A provides an overview of the system and its manner of operation.

Section B provides additional information regarding various components which may be used in the system of Section A.

Section C describes various administrative functions the system may perform.

Section D describes various provisioning functions the system may perform.

Section E describes various indexing and search-related features provided by the system.

Section F provides various power management features provided by the system.

A. Overview of System and Manner of Operation

A.1. Illustrative Overview of System

FIG. 1 shows an illustrative system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items:

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on.

An item may also correspond to a bundle of information generated in response to a query made by the user.

An item may also correspond to instruction-bearing content, such as a software update.

An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

An item may correspond to a draft of an item, meaning an item in a state that its author does not regard as necessarily final.

The term "item" may encompass yet other forms of content; the above types of items are representative.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity which provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term a "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book, electronically turn the pages of the book, and so on. Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows four exchanges which describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102). The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

In one case, the notification message 108 may correspond to a certain type of notification message used to commence voice mode interaction, such as a telephone ring. In this case, the notification message 108 is also referred to as a Terrestrial Phone Home or a TelePhone Home (TPH) signal. (It will be appreciated that the identifiers Terrestrial Phone Home, TelePhone Home, TPH, etc. are arbitrary labels of convenience to facilitate explanation herein.) The other messages may take the form of data mode messages. In one case, the user device 104 may be configured to receive and act on the TPH signal without actually formally answering the TPH signal. In other words, the user device 104 receives the TPH signal and does not make a voice connection, but rather initiates steps to download items from the IPS 102. In some environments, a wireless provider system may charge a fee when a call is answered, but not if a user device is called and does not answer. Thus, the strategy of ringing the user device 104 without an answer may allow the IPS 102 to communicate instructions to the user device 104 without incurring a fee for the user device 104 or the IPS 102.

A.2. Illustrative Wireless Implementation of the System

Figure 2:
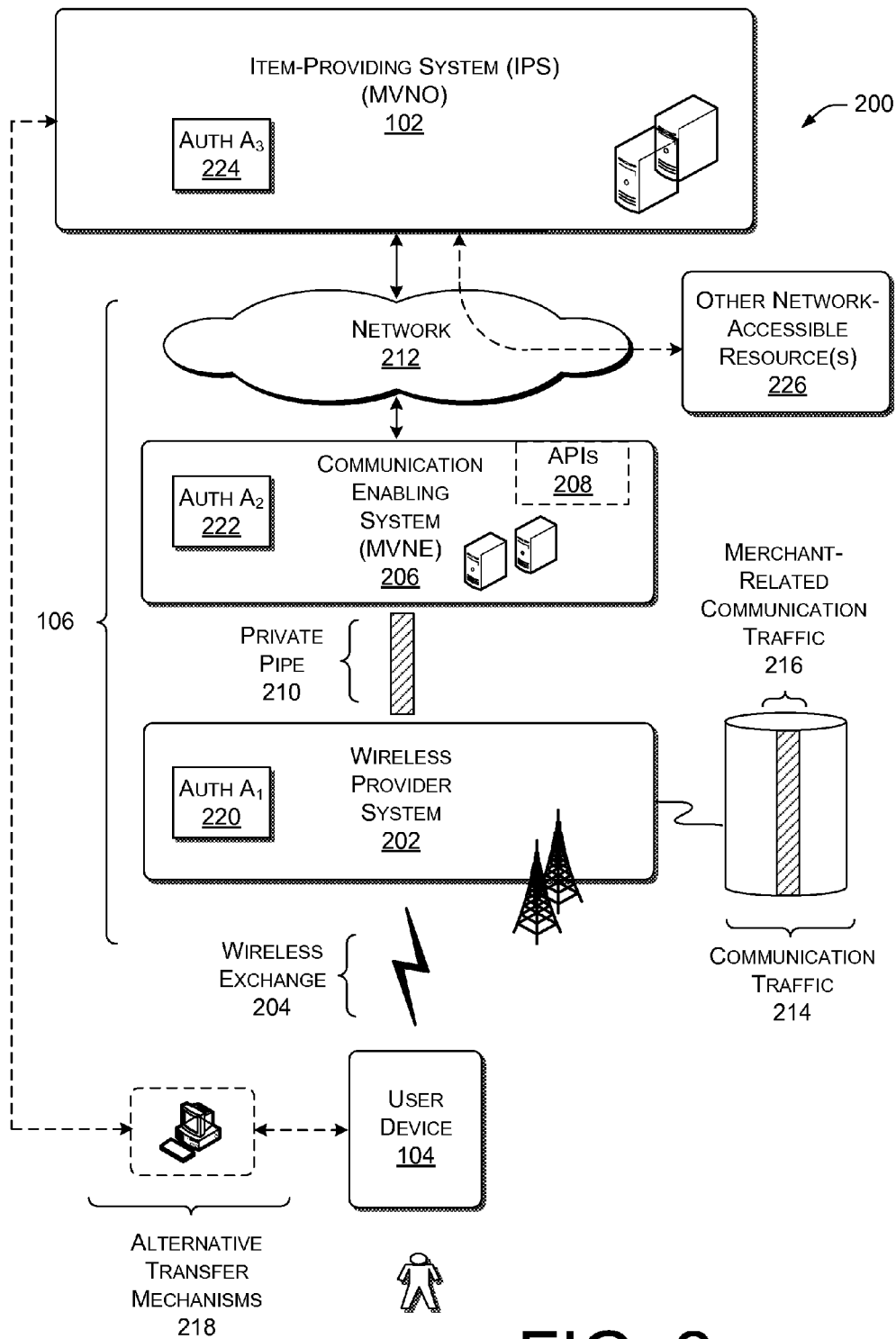
FIG. 2 shows one illustrative implementation of the system of FIG. 1 employing wireless communication.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 includes multiple components. A first component is a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown). Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 also includes a communication-enabling system 206. One purpose of the communication-enabling system 206 is to serve as an intermediary in passing information between the IPS 102 and the wireless provider system 202. The communication-enabling system 210 may be implemented in any manner, such as, without limitation, by one or more server-type computers, data stores, and/or other data processing equipment. The communication enabling system may expose one or more Application Programming Interfaces (APIs) 208. The IPS 102 may call on the APIs 208 to perform various respective functions.

The communication-enabling system 206 communicates with the wireless provider system 202 via a dedicated channel 210, also referred to as a dedicated communication pipe or private pipe. The channel 210 is dedicated in the sense it is exclusively used to the transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet.

The communication enabling system 206 may serve as an adaptor. For instance, assume that, in one particular implementation, the IPS 102 acts as a data center which is set up to receive information via a wide area public network. Assume further the wireless provider system 202 is set up to interact with clients via a private pipe. The communication-enabling system 206 interacts with the IPS 102 via the wide area network 212 and the wireless provider system 202 via the private pipe 210, thus accommodating the processing preferences of the IPS 102 and the wireless provider system 202. By virtue of this intermediary role, the communication-enabling system 206 may be referred to as a Mobile Virtual Network Enabler (MVNE), while the IPS 102 may be referred to as a Mobile Virtual Network Operator (MVNO).

In terms of a business paradigm, the IPS 102 may interact with the wireless provider system 202 using a wholesale account. On this basis, the IPS 102 may pay the wireless provider system 202 a fee based on the aggregate use of the wireless provider system 202 by all of the user devices. The IPS 102 may recoup these costs through fees charged to the end-users. In this illustrative business scenario, the wireless provider system 202 does not send bills directly to the users who operate the user devices.

More specifically, the wireless provider system 102 handles an entire amount of communication traffic 214 associated with all uses of its services. A subset of the entire amount of communication traffic 214 represents IPS-related communication traffic 216, also referred to as merchant-related communication traffic. The IPS-related traffic 216 represents the exchange of information occurring between the IPS 102 and all of the user devices which interact with the IPS 102. The wireless provider system 202 discriminates the IPS-related traffic 216 from other traffic based on unique key information associated with the IPS-related traffic 216. The wireless provider system 202 may prepare a bill based on the total amount of IPS-related traffic 216. As noted above, the wireless provider system 202 may seek payment for its services from the IPS 102, not the individual users of the devices.

The examples set forth above are representative; other strategies may be used to exchange information between the IPS 102 and the user device 104. In alternative cases, for instance, the system 200 may be configured such that the wireless provider system 202 does indeed recoup costs directly from individual users. Or the system 200 may be configured such that the wireless provider system 202 submits bills to either the IPS 102 (in aggregate) or to the individual users, at the option of the individual respective users.

The users may access the IPS 102 through alternative communication routes which bypass the use the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

The system 200 of FIG. 2 also provides various security-related features. According to one feature, the system 200 applies multiple layers of authentication. Namely, the wireless provider system 202 includes authentication functionality $A_1$ 220 to perform a first level of authentication. The communication-enabling system 206 provides authentication functionality $A_2$ 222 to perform a second level of authentication. The IPS 102 provides authentication functionality $A_3$ 224 to perform a third layer of authentication. Each layer of authentication performs checking to ensure the user device currently attempting to interact with the IPS 102 is duly authorized to access the IPS 102. The distributed nature of the authentication helps ensure someone who has obtained a user device through improper means cannot gain access to the services provided by the IPS 102.

According to another security-related feature, the system 200 may provide various constraints which restrict the manner in which a user may use the device 104. For example, the communication-enabling system 206 may be configured such that it will allow user devices to access only one or more predetermined addresses associated with the IPS 102. This means that, in one case, a user cannot use the user device 104 to directly access a network-accessible site without being first routed through the IPS 102. This prevents the user from using the user device 104 as an unrestricted broadband interface to network-accessible resources.

More specifically, the IPS 102 may include a web browsing proxy (to be discussed below in greater detail). When the user attempts to access a network-accessible resource 226, the communication enabling system 206 first directs the user to the browsing proxy module. The browsing proxy module may then either deny the request or accept the request by allowing the user to access the network-accessible resource 226. The browsing proxy module may apply various rules (to be discussed) in determining whether to deny or accept the request to access the network-accessible resource 226. In this manner, the communication-enabling system 206 and the IPS 102 do not permit the user to directly access the network accessible resources.

In another case, the system 200 may allow the user to directly interact with network-accessible resources, that is, without being routed through the IPS 102.

A.3. Illustrative Item-Providing System (IPS) and User Device

Figure 3:
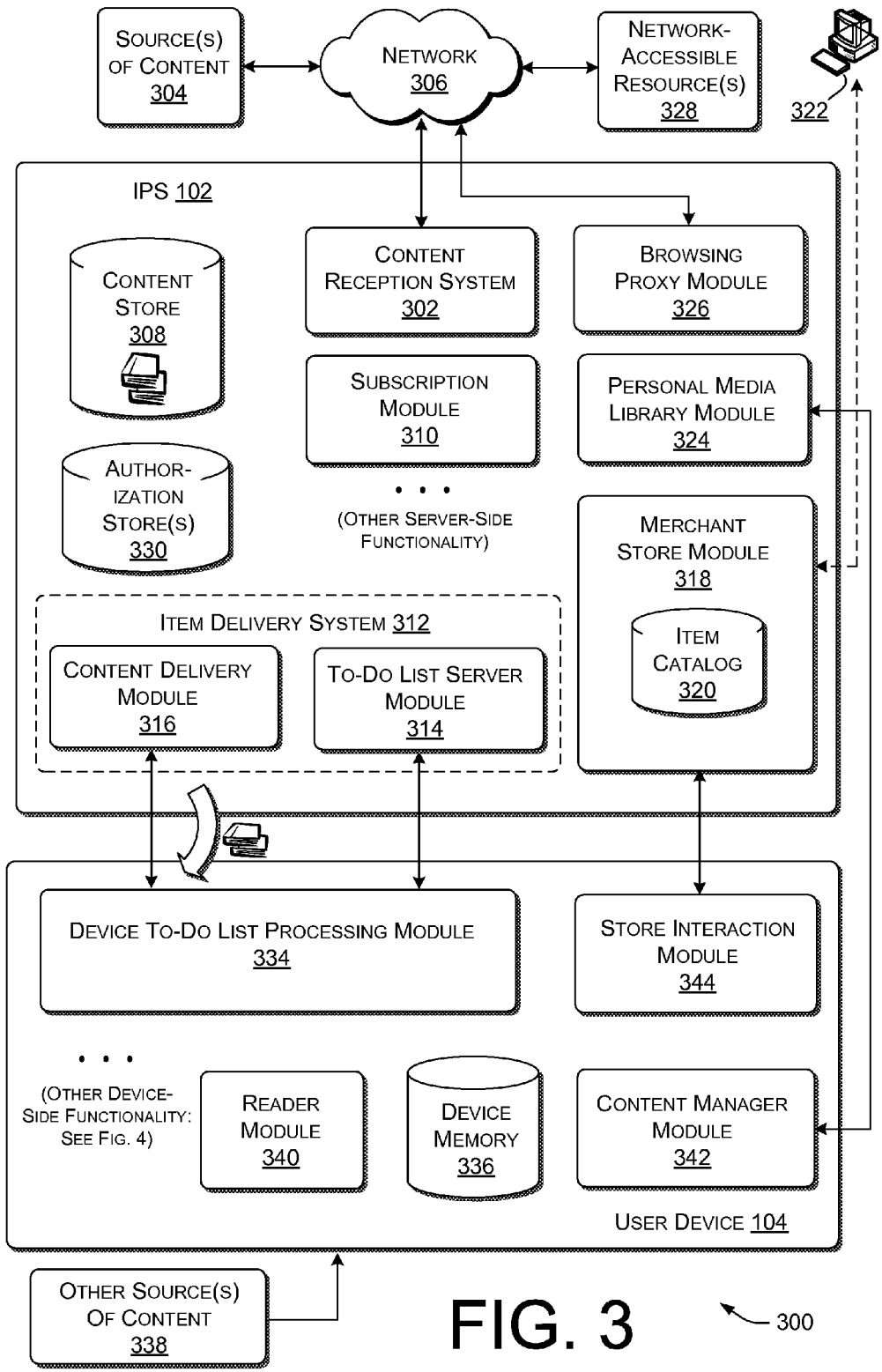
FIG. 3 shows an illustrative Item Providing System (IPS) and an illustrative user device for use in the system of FIG. 2.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2. In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content creation system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth. In another case, the IPS 102 may obtain content via a peer-to-peer (P2P) network of sources 304. More generally, the content reception system 302 may proactively request the content in and on-demand manner (based on a pull method of information transfer). Or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .mobi format).

The content reception system 302 stores the items received (and optionally converts them to another format) in a content store 308. The content store 308 includes one or more storage systems for retaining items in electronic form, located at a single site or distributed over plural sites, administered by one or more entities.

Section B (below) provides additional information regarding the operation of the content reception system 302. By way of preview, the content reception system 302 includes separate modules for handling pre-generated items (such as eBooks), subscription-related items (such as newspapers), and personal items (such as user-supplied word-processing documents, etc.).

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee). Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314; and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. As described above, in one illustrative implementation, the to-do list server module 314 may send the notification message as a telephone ring. The user device 104 responds to the notification message by waking up (if "asleep"), which may involve switching from a first power state to a second power state (where the second power state consumes more power than the first power state). The user device 104 may optionally respond to the notification message without formally answering the signal, which avoids or reduces a fee associated with the wireless message. The user device 104 then contacts the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location, e.g., by specifying an appropriate network address (e.g., a URL) and appropriate arguments. In the first phase, the user device 104 generally retrieves n such entries, wherein n is an integer. In one scenario, the number n may be a subset of a total number of items in the to-do queue associated with the user device 104. In a second phase of the downloading procedure, the user device 104 contacts the content delivery module 316 to retrieve one or more items identified in the GET-related entries.

In general, after receiving the notification message (which may be implemented as a telephone ring), the item delivery system 312 interacts with the user device 104 in a data mode, e.g., using the Hypertext Transfer Protocol (HTTP), or some other protocol or combination of protocols. The downloading procedure is described in additional detail below (for instance, in the context of the explanation of FIG. 8).

The IPS 102 also includes a merchant store module 318. The merchant store module 318 provides access to an item catalog 320, which, in turn, provides information regarding a plurality of items (such as eBooks, audio books, subscription-related items, and so on). As will be described in greater detail below, the merchant store module 318 includes functionality allowing a user to search and browse though the item catalog 320. The merchant store module 318 may also include functionality allowing a user to purchase items (or, more generally, acquire items based on any terms). In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 also includes a personal media library module 324. The personal media library module 324 stores, for each user, a list of the user's prior purchases. More specifically, in one case, the personal media library module 324 provides metadata information regarding eBook items and other on-demand selections (e.g., "a la carte" selections, such as subscription issues, etc.) which a user already owns. The personal media library module 324 also provides links to the items in the content store 308. As will be described in greater detail below, to download an eBook item (or the like) which the user has already purchased, the user device 104 contacts the content delivery module 316. The content delivery module 316 interacts with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 also includes a browsing proxy module 326. The browsing proxy module 326 allows the user to access one or more network-accessible resources 328 via a browser module (to be discussed below) resident on the user device 104. As explained in the context of FIG. 2, when the user requests access to a particular network-accessible resource, the system 300 first directs the user to the browsing proxy module 326. The browsing proxy module 326 may then apply various environment-specific business rules to determine whether or not to grant such access, and if granted, under what terms to grant such access. Through this mechanism, in one implementation, the user is precluded from directly accessing the network-accessible resources 328 using the user device 104.

The IPS 102 also includes various security-related features, such as one or more authorization stores 330. The authorization stores 330 provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 includes a device to-do list processing module 334. The purpose of the device to-do list processing module 334 is to interact with the item delivery system 312 to download items from the item delivery system 312. Namely, in a first phase of the downloading procedure, the device to-do list processing module 334 first receives a notification message from the to-do list server module 314, which prompts it to wake up (if "asleep") and contact the to-do list server module 314 to retrieve a set of n entries. Each entry includes an instruction which directs the device to-do list processing module 334 to perform an action. In a second phase, for a GET-type entry, the device to-do list processing module 334 contacts the content delivery module 316 to request and retrieve an item identified by the GET-type entry. As will be described in greater detail below, the user device 104 signals a successful completion of the download process or a failure in the download process.

Upon downloading an item, the user device 104 stores the item in a device-side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash-type memory module, a magnetic memory module, an optical memory module, and so on.

The user device 104 also includes a reader module 340. The illustrative purpose of the reader module 340 is to present media items for consumption by the user using the user device 104. For example, the reader module 340 may be used to display an eBook to the user to provide a user experience which simulates the reading of a paper-based physical book.

The user device 104 also includes a content manager module 342. The purpose of the content manager module 342 is to allow the user to manage items available for consumption using the user device 104. For example, the content manager module 342 allows the user to view a list of items available for consumption. The content manager module 342 also identifies the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 allows the user to filter and sort the items in various ways. For example, the user may selectively view items which originate from the device store 336.

The user device 104 also includes a store interaction module 344. The store interaction module 344 allows the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
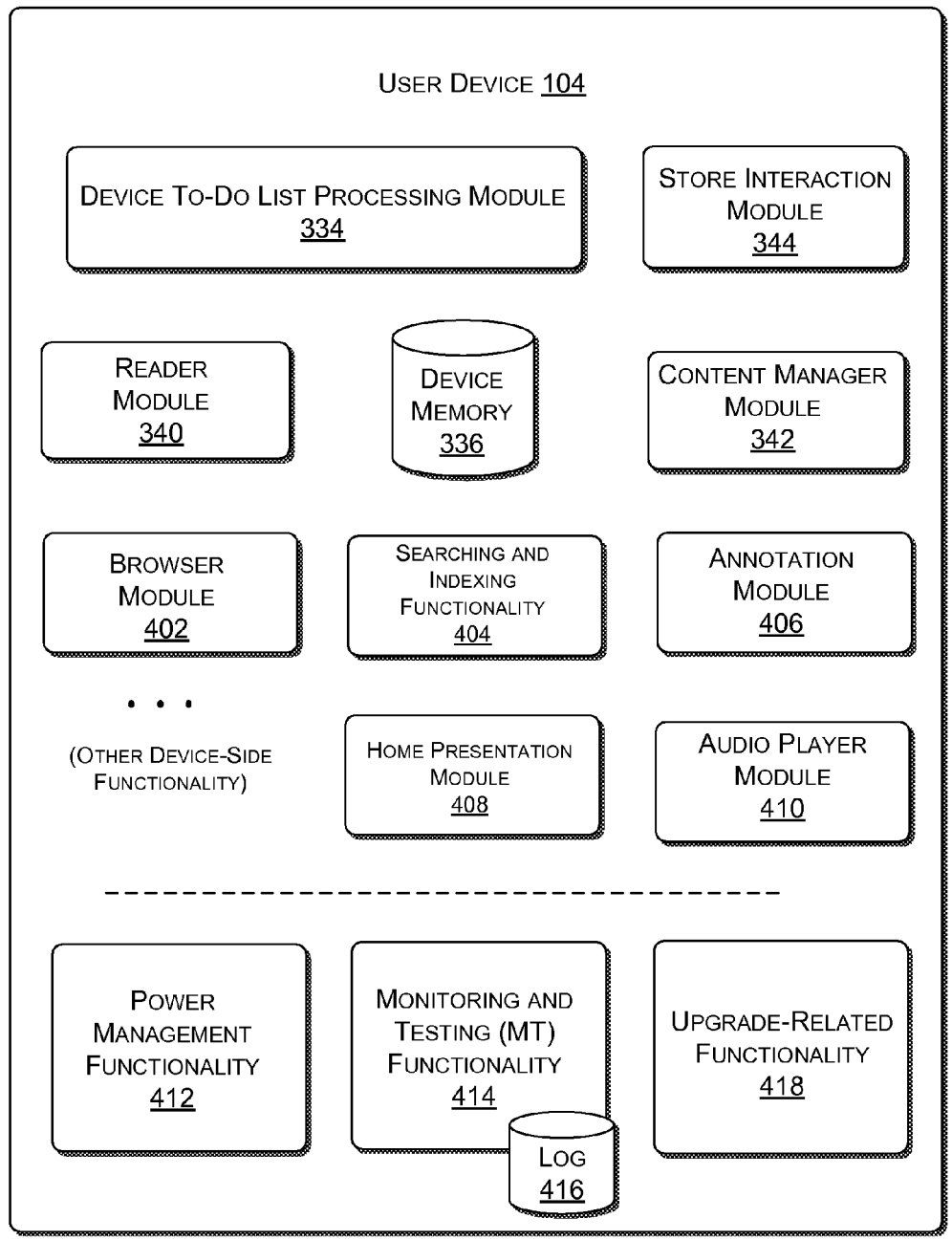
FIG. 4 shows a more detailed depiction of the illustrative user device of FIG. 3.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows the user device 104 also includes a browser module 402. The browsing module 402 allows the user device 104 to access one or more network-accessible resources 328 via the browsing proxy module 326 provided by the IPS 102. As explained above, the browsing proxy module 326 permits or denies access to the network-accessible resources 328 based on a set of environment-specific rules. If permitted access, the device-side browser module 402 includes functionality for interpreting the content received from a network-accessible source and presenting such content to the user.

The user device 104 may also include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect. Section E provides additional information regarding the operations performed by the searching and indexing functionality 404.

The user device 104 also may include an annotation module 406. The annotation module 406 allows a user to create annotations to supplement a particular item. For instance, the user may create one type of annotation to mark a page, thus acting in the manner of a bookmark. The user may create another type of annotation highlighting a portion of the item, such as a word, phrase, sentence, etc. in an eBook. The user may create another type of annotation by adding one or more notes to an item. Generally, the annotation module 406 may store annotation information which identifies the types of annotations created, the locations within the item associated with the annotations, the content of the annotations (e.g., in the case of note-type annotations), and so on.

More specifically, the user device 104 may locally store the annotations. Further, the IPS 102 may optionally store the annotations in a backup store; this allows the user to download the annotations in the event they are deleted from a device-side store. Wherever stored, the user device 104 may restore the annotations upon presentation of the corresponding item which is the "target" or subject of the annotations. For example, when a user accesses an eBook which has been annotated on one or more prior occasions, the annotation module 406 may access the annotation information and display the user's annotations within the text. The annotation module 406 may also perform a related function allowing a user to identify and extract (e.g., "clip") one or more portions of an item and store such portions in a clipping file. In one illustrative case, clippings are stored as unencrypted text files. In one case, the annotations can be associated with a particular entity, such as a user. Alternatively, or in addition, the annotations can be associated with a copy of the annotated item, such as an eBook.

The user device 104 also includes a home presentation module 408. The home presentation module 408 provides a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 also includes an audio play module 410. The audio player module 410 provides an interface which allows the user to play back and interact with audio items, such as music, audio books and the like.

The above-described features of the user device 104 pertains to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication. Section F provides additional information regarding the operation of the power management module 412.

The user device 104 also includes performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102, in a manner described in further detail below in Section C.

The user device 104 also includes an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

In one implementation, the upgrade-related functionality 418 may forward version information to the IPS 102. The version information identifies the version of the instruction-bearing content being used by the user device 104. The IPS 102 may determine whether this version information is out-of-date (by reference to current version information). If out-of-date, the IPS 102 may react appropriately, e.g., by downloading an instruction-bearing item to the user device 104. Section C provides additional information regarding the operations performed by the upgrade-related functionality 418.

To repeat, the above-enumerated list of modules is representative and is not exhaustive of the types of functions performed by the user device 104. As indicated by the label "Other Device-Side Functionality," the user device 104 may include additional functions.

A.4. Illustrative User Interface Features

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
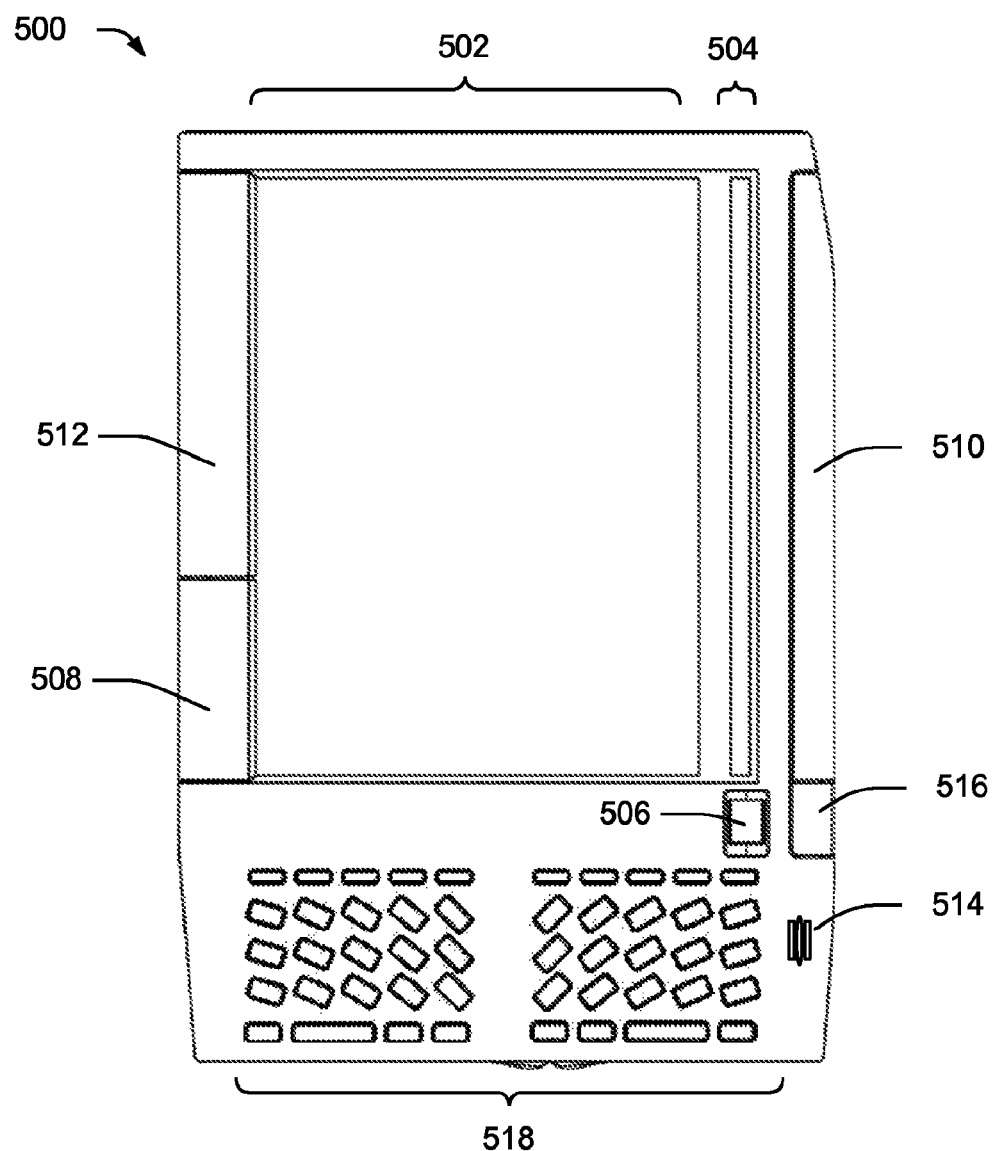
FIG. 5 shows an illustrative design of the user device of FIGS. 3 and 4.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, the browser module 402, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module 402. Although not shown, the user device 500 may include a switch for turning power on and off, a switch for enabling and disabling a wireless interface, and so on.

The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The keyboard 518 may also include various special-function keys.

Figure 6:
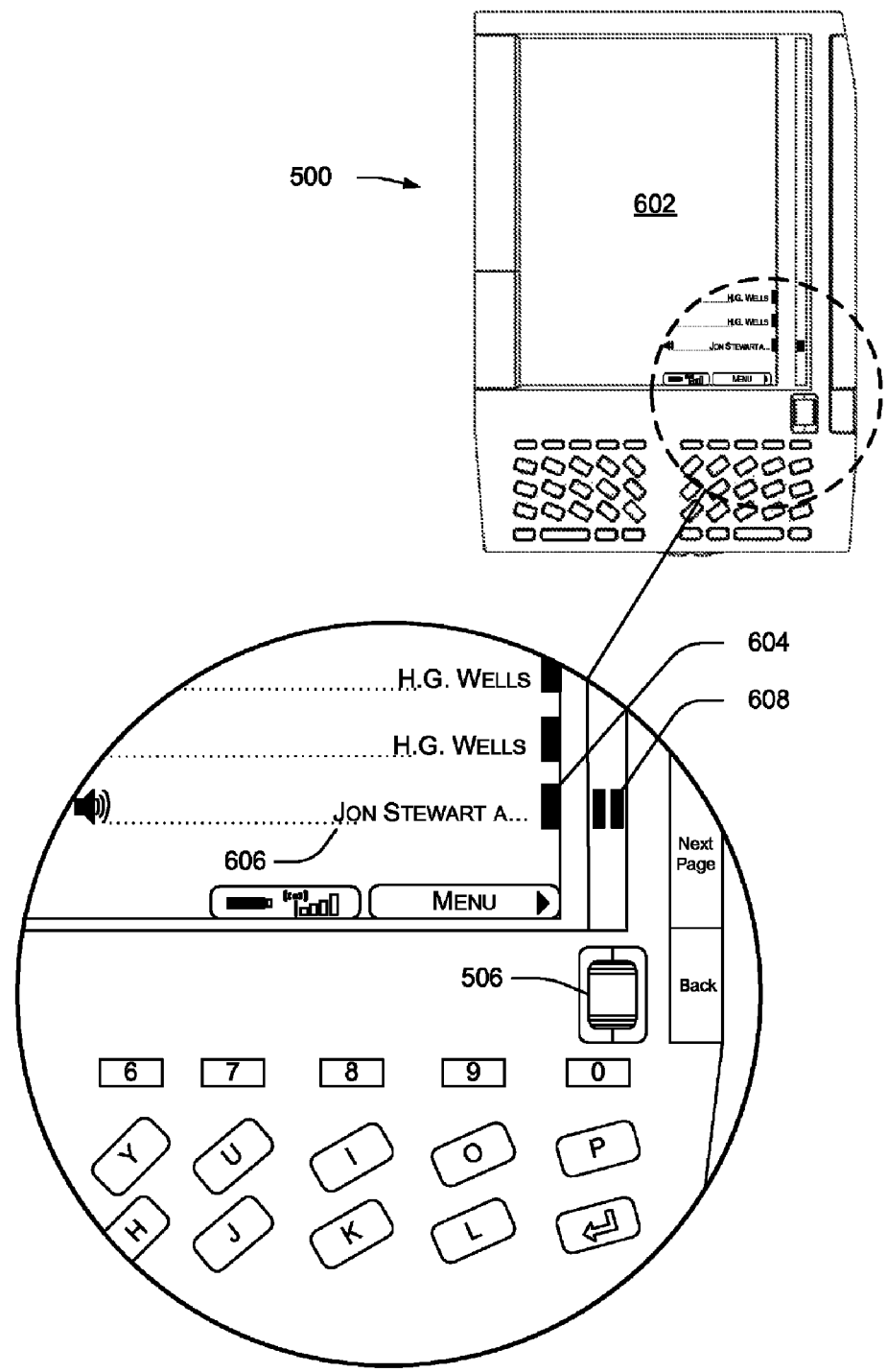
FIG. 6 shows an illustrative user interface mechanism for interacting with the user device of FIG. 5.

FIG. 6 illustrates one way in which a user may use the user device 500 of FIG. 5 to select content on the main display part 502. Namely, assume the main display part 502 displays a page of content 602. The content 602 may include various selection points arrayed along its right-most vertical edge. The selection points laterally correspond to associated parts of the content 602. For example, a representative selection point 604 corresponds to a selectable item 606 in the page of content 602. The supplemental display part 504 presents a cursor 608. A user may move the cursor up and down within the supplemental display part 504 by rotating the cursor-movement mechanism 506.

In operation, the user may operate the cursor-movement mechanism 506 so that the cursor 608 is laterally aligned with a desired selection point, such as selection point 604 as shown in FIG. 6. In the case in which the cursor-movement mechanism 506 is a cursor wheel, the user may rotate the wheel to move the cursor 608 to a desired location along the vertical extent of the supplemental display part 504. In this implementation, the user may then press down on the cursor wheel to formally select the item 606 corresponding to the selection point 604. Additional information regarding one representative type of book-reader type device may be found in the following family of applications:

U.S. Ser. No. 11/246,293, filed on Mar. 29, 2006, entitled "Electronic Media Reader Display," naming the inventors of Whitehorn, et al.;

U.S. Ser. No. 11/246,294, filed on Mar. 29, 2006, entitled "Electronic Media Reader Keypad," naming the inventors of Thomas J. Hobbs, et al.;

U.S. Ser. No. 11/246,295, filed on Mar. 29, 2006, entitled "Wedge-Shaped Electronic Media Reader," naming the inventors of Whitehorn et al.;

U.S. Ser. No. 11/277,898, filed on Mar. 29, 2006, entitled "Page Turner For Handheld Electronic Book Reader Device," naming the inventors of Gregg E. Zehr, et al.;

U.S. Ser. No. 11/277,893, filed on Mar. 29, 2006, entitled "Handheld Electronic Book Reader Device Having Dual Displays," naming the inventors of Gregg E. Zehr, et al.;

U.S. Ser. No. 11/277,873, filed on Mar. 29, 2006, entitled "Handheld Electronic Book Reader Device Having Asymmetrical Shape," naming the inventors of Gregg E. Zehr, et al.; and U.S. Ser. No. 11/277,879, filed on Mar. 29, 2006, entitled "Keyboard Layout for Handheld Electronic Book Reader Device," naming the inventors of Gregg E. Zehr, et al.

To repeat, the user interface design shown in FIGS. 5 and 6 is representative. Other types of user devices having different types of user interface mechanisms may be used to interact with the IPS 102.

A.5. Illustrative Data Processing Device

Figure 7:
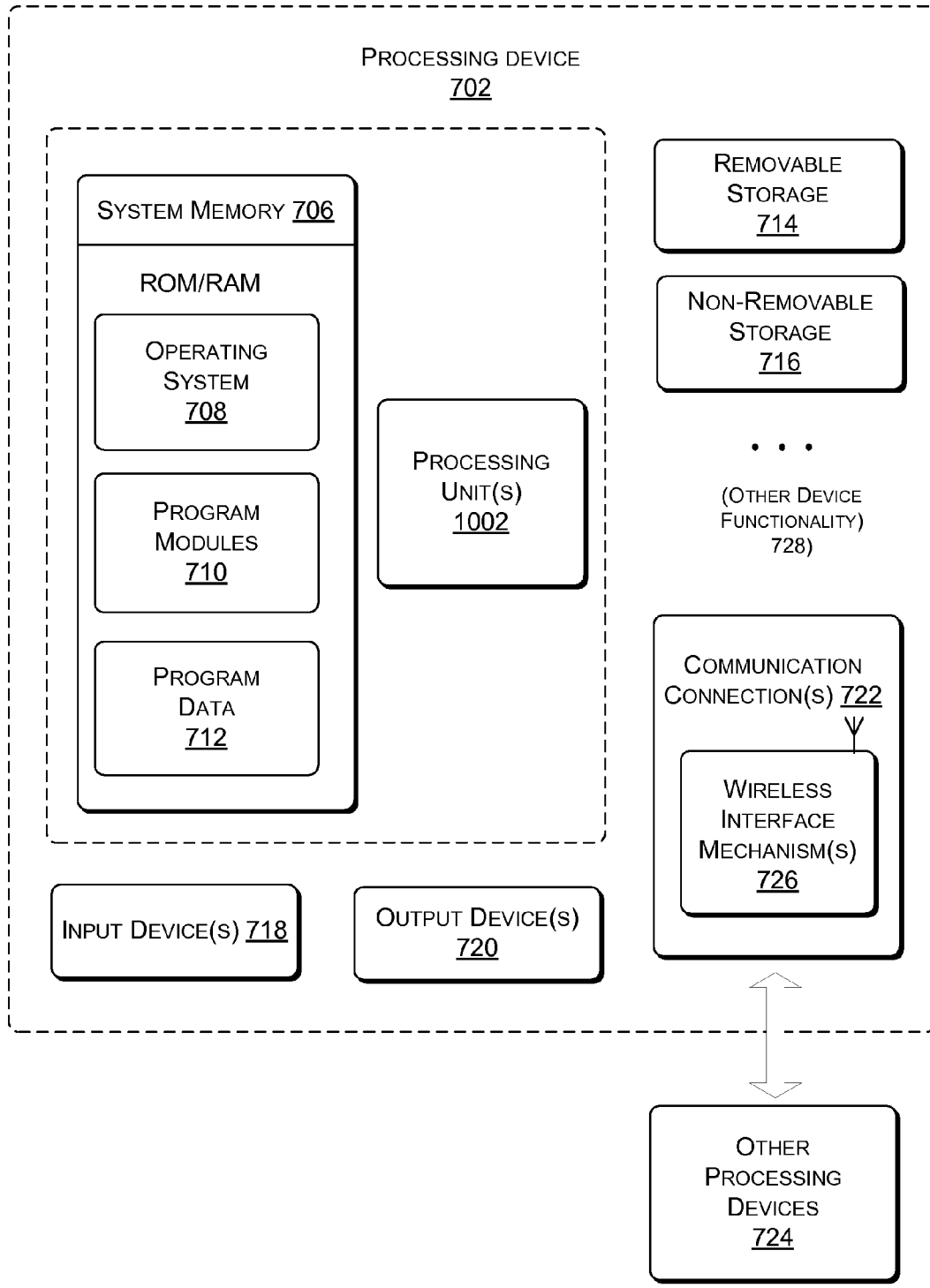
FIG. 7 shows a generic processing device which may be used to implement any aspect of the systems shown in FIGS. 2 and 3.

Various aspects of the systems shown in FIGS. 1, 2, and 3 may be implemented by one or more data processing devices. For example, various components of the IPS 102 may be implemented by respective server-type computers and associated data processing equipment (e.g., routers, data storage devices, etc.). The user device 104 may also correspond to a data processing device. FIG. 7 shows an overview of a generic data processing device 702 which may be used to implement any aspect of the above-referenced systems, including any server-side features and/or any device-side features.

The processing device 702 includes one or more processing units 704, such as one or more CPUs. The processing device 702 also includes system memory 706, which may correspond to any combination of volatile and/or non-volatile storage mechanisms. The system memory 706 may store information which provides an operating system component 708, various program modules 710, program data 712, and/or other components. The processing device 702 performs functions by using the processing unit(s) 704 to execute instructions provided by the system memory 706. The processing device 702 may also include one or more types of removable storage 714 and one or more types of non-removal storage 716.

The processing device 702 may also include one or more input devices 718 (keyboard, mouse device, specialized selection keys, etc.) and one or more output devices 720 (displays, printers, audio output mechanisms, etc.).

The processing device 702 may also include one or more communication interface mechanisms 722. These communication interface mechanisms 722 allow the processing device 702 to interact with other processing devices 724, such as remote computers, book reader devices, and so forth. The communication interface mechanisms 722 may include one or more wireless interface mechanisms 726. In the case where the processing device 702 represents the user device 104, the wireless interface mechanisms 726 may allow the user device 726 to receive a telephone ring and also communicate with the IPS 102 in a data mode.

The above-enumerated list of modules is representative and is not exhaustive of the types of functions performed by the processing device 702. As indicated by the label "Other Device Functionality" 728, the processing device 702 may include additional functions.

A.6. Illustrative Manner of Downloading Items

Figure 8:
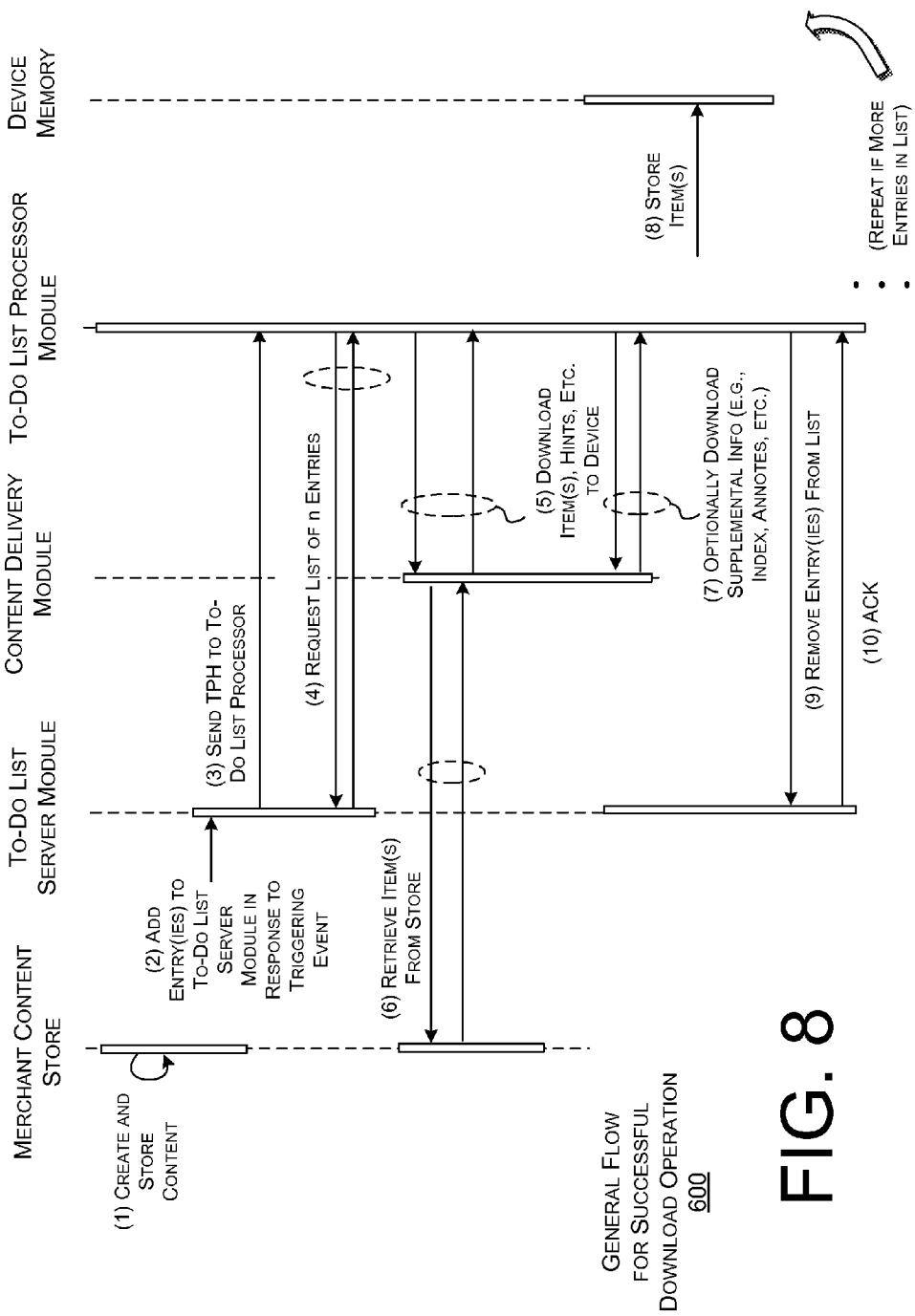
FIG. 8 is a signal diagram which depicts one illustrative manner of operation of the systems of FIGS. 2 and 3.
Figure 9:
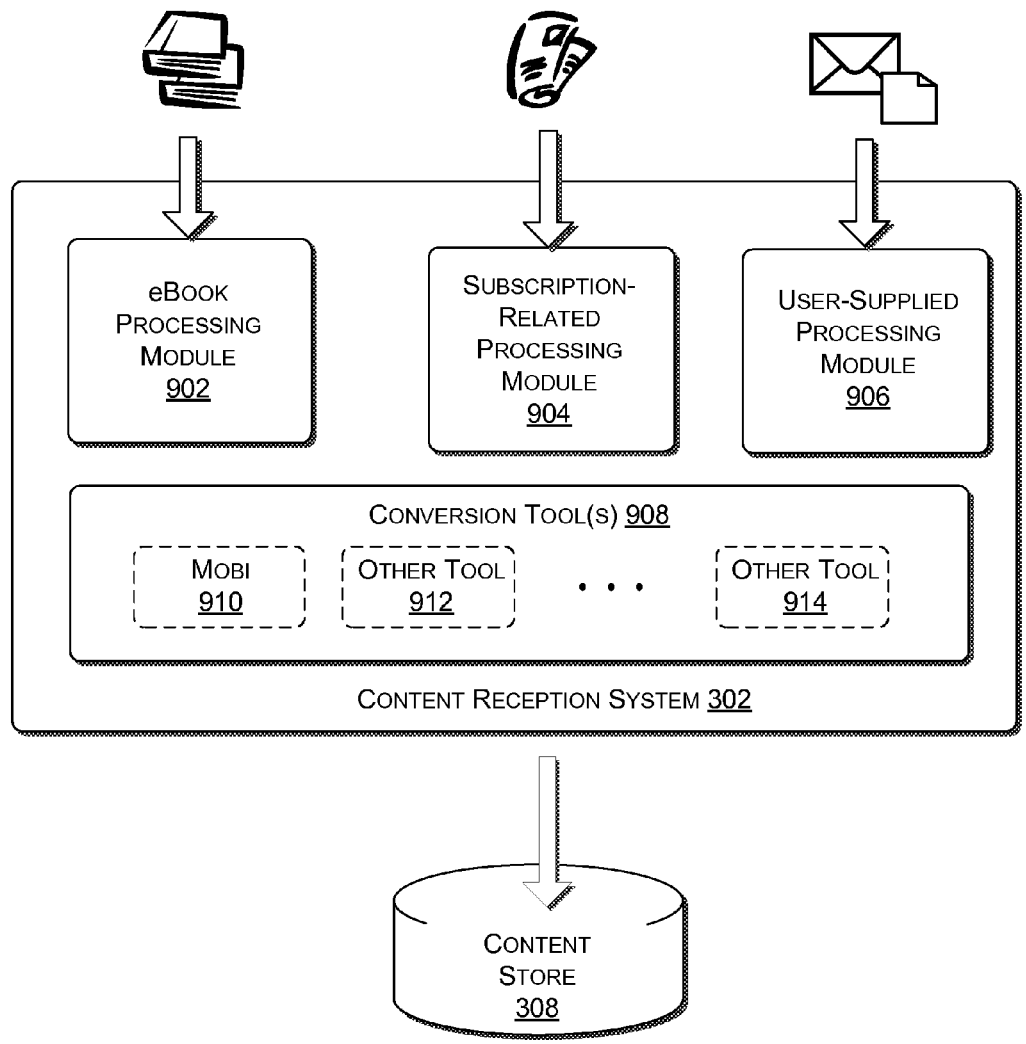
FIG. 9 shows an overview of a content reception system for use in the IPS of FIG. 3.

As explained in the above sections, the item delivery system 312 of the IPS 102 interacts with the device-side to-do list processing module 334 to download items from the content store 308 of the IPS 102. The item delivery system 312, in turn, includes two components: a to-do list server module 314; and a content delivery module 316. The to-do list processing module 334 interacts with the to-do list server module 314 to download entries, where the entries identify items to be retrieved from the IPS 102. The to-do list processing module 334 interacts with the content delivery module 316 to retrieve the actual items identified by the entries. FIG. 8 provides additional information regarding one protocol 800 for downloading items from the IPS 102 to the user device 104. The protocol is illustrative; it may be varied in various ways to suit different environments.

In operation (1), the IPS's content reception system 302 receives and stores content in the content store 308. The content reception system 302 may perform this operation in response to receiving a new eBook or other pre-generated item. Or the content reception system 302 may perform this operation in response to receiving a new subscription-related item. Or the content reception system 302 may perform this operation in response to receiving a personal document forwarded by the user. Still other scenarios are possible.

In operation (2), an entry is added to an appropriate queue of the to-do list server module 314. In the case of the selection (e.g., purchase) of an eBook, the merchant store module 318 adds an entry to the to-do list server module 314, corresponding to an instruction to acquire the selected eBook. In this case, operation (2) occurs asynchronously with respect to operation (1), meaning that these two operations are not part of a linked integral transaction. Although not shown in this overview figure, the user's purchase of an eBook (or other a la carte selection, such as a subscription issue, etc.) also prompts the IPS 102 to store information regarding the user's purchase in the media library module 324. In the case of the receipt of a subscription-related item, the item reception system 302, in conjunction with the subscription module 310, add an entry to the to-do list server module 314. In this case, operation (2) occurs in response to operation (1), and thus these operations may be viewed as part of a single transaction. For the receipt of a new issue of a subscription, the subscription module 310 represents the user's ownership of the issue by virtue of the user's prior purchase of the subscription, in the manner to be described in greater detail below. In the case of a personal item, the functionality dedicated to receiving, converting, and storing the user's personal item may optionally add an entry to the to-do list server module 314 (if, in fact, the user has opted to receive the document via a wireless communication route, instead of an alternative non-wireless mode of delivery).

In operation (3), the to-do list server module 314 sends a notification message to the device's to-do list processing module 334. In one illustrative case, the notification message may be implemented as a telephone ring, also referred to herein as a TelePhone Home (TPH) signal. All subsequent communication between the item delivery system 312 and the to-do list processing module 334 operates in a data mode, e.g., using the HTTP protocol or some other protocol or combination of protocols.

In operation (4), the device's to-do list processing module 334 will wake up (if it happens to be asleep at the time) and respond to the TPH signal. The notification process may involve switching from a first power state to a second power state, where the second power state consumes more power than the fist power state. Upon waking up, the to-do list processing module 334 sends a message to the to-do list server module 314, which requests the to-do list server module 314 to forward a list of n entries, such as, without limitation, 10 entries. The n entries may represent a subset of entries in the list maintained by the to-do list server module 314 for the user device 104. The to-do list server module 314 responds to this request by forwarding the list of up to n entries.

As described above, each entry provides an envelope which conveys an instruction. One such type of instruction commands the user device 104 to retrieve an item from the IPS 102. There are other types of instructions, which will be described in Section B. In operation (5), assuming that one or more entries of the n entries retrieved from the to-do list server module 314 correspond to GET instructions, the to-do list processing module 334 sends a request to the content delivery module 316, asking this module 316 to download the items identified in the GET instructions.

In operation (6), the content delivery module 316 responds to the request for the items by attempting to retrieve the items from the content store 308. If the content delivery module 316 is successful, it forwards the requested items to the user device 104 (which may be considered as part of operation (5), as illustrated in FIG. 8). In some circumstances, such as in the case of feeds, the content delivery module 316 may attempt to retrieve and download a delta file which expresses the difference between a current version of requested content and a prior version of the content, where the user device already locally possesses the prior version. So as not to unduly complicate this introductory discussion, the details of the incremental updating operation will be provided in a later part of this description.

Operation (6) may also involve various permission-checking steps. For example, for the case of eBooks and other a la carte selections, the content delivery module 316 may consult the personal media library module 324 to determine whether the user has authorization to receive the item. In the case of subscription-related items, the content delivery module 316 may consult the subscription module 310 to determine whether the user has authorization to receive the item (e.g., by determining whether the user is generally authorized to receive issues of a particular subscription). So as not to unduly complicate FIG. 8, the signal flow associated with permission-checking is omitted, although this detail will be provided in later figures and accompanying description.

In operation (5), the content delivery module 316 may also download various hints to the user device 104. One such hint informs the user device 104 whether the IPS 102 stores an index corresponding to the requested item. For instance, the IPS 102 may have generated this index when it initially received the item or at some other juncture. Another hint informs the user device 104 of whether the IPS 102 stores annotations for the requested item. These annotations may correspond to information created by the user and backed up by the IPS 102 on one or more prior occasions. The user device 104 uses the hints to determine whether it is worthwhile to even request the IPS 102 to deliver the search index and/or annotations for the requested item. Namely, if the content delivery module 316 informs the user device 104 that it does not have a search index, then it is not a useful exercise to request the index. The use of hints eliminates the need for the user device 104 to conduct a potentially over-the-air sluggish question-and-response procedure to determine whether the IPS 102 stores index information and/or annotation information.

Assume the user device 104 is informed by the hints that the IPS 102 does indeed have either (or both) a search index and backup annotations. In operation (7) the to-do list processing module 334 requests and receives this type of supplemental information.

In operation (8), the to-do list processing module 334 stores the item (and optionally the supplemental information) in the device memory 336.

In operation (9), the to-do list processing module 334 sends a remove message to the to-do list server module 314. This message informs the to-do list server module 314 that the user device 104 has successfully retrieved a subset of identified items from the IPS 102 and that the to-do list server module 314 may consequently remove these items from the appropriate queue. In operation (10), the to-do list server module 314 may acknowledge receipt of the remove message sent to it by the user device 104.

The retrieved n entries may correspond to only a subset of a more encompassing list of items maintained by the to-do list server module 314. If this is the case, the to-do list processing module 334 repeats the above-described operations by retrieving up to another n entries and receiving the items identifies by these entries from the content delivery module 316.

Although not shown, upon the occurrence of an error in the download process, the user device 104 can convey error information to the IPS 102 and/or vice versa.

B. Illustrative Components in System

Having set forth an overview of the system in Section A, this section explains various components of the system in greater detail. While the components may be used in the context of the overall system described above, the components may also be used in other types of systems.

B.1. Illustrative Content Reception Functionality

B.1.a. Overview of Content Reception System

As described above, the content reception system 302 receives items from one or more sources 304 and, if appropriate, converts the items into a device-readable format. Such conversion is also referred to as "content creation" herein in a liberal sense because the conversion process does not produce the content ex nihilo. The content reception system 302 may include separate modules for handling pre-generated items (such as eBooks), subscription-related items, and personal items. Namely, the content reception system 302 includes an eBook processing module 902, a subscription-related processing module 904, and a user-supplied processing module 906.

The eBook processing module 902 receives, processes, and stores items users typically select in an on-demand manner. In one scenario, for example, the eBook processing module 902 may receive a new eBook from a publisher source or other type of source, convert this item into a desired format, and store this item in the content store 308. The processing performed by this module 902 may also involve creating a search index for the newly received item, creating a detail page for this item, and so on. Users may then, some time after the eBook item is stored, purchase this item, thus initiating the downloading of the item to the user. The eBook reception process is decoupled from the downloading process, meaning that these two operations occur asynchronously.

The subscription-related processing module 904 receives, processes, and stores items on a subscription-related basis. In one representative case, a user may purchase a subscription which entitles the user to receive future issues, editions, installments, etc. of a subscription-related item, such as future issues of a magazine, journal, newsletter, newspaper, blog, feed, and so forth. The reception process in this case is linked to the downloading process, meaning that the receipt of a new subscription-related item triggers the downloading of this item to users who have registered to receive this item.

In a variant of the subscription-related reception operation, the subscription-related content processing module 904 may automatically establish user subscriptions and deliver items in accordance with these subscriptions, potentially without the involvement and/or approval of the users. This feature may be useful to provide advertisements to users, to notify the users of various alerts and other events, and so on. As another example, the user may expressly purchase one or more types of subscriptions, and, in response, the subscription-related content processing module 904 authorizes the dissemination of the expressly-purchased subscriptions as well as one or more other subscriptions (which the user did not expressly purchase). In still another case, a user may subscribe to a single publication of an item, such as when the user pre-purchases an item which has yet to be published; when the item is published, the subscription-related processing module 904 will be invoked to deliver the item to the users who have pre-purchased this item.

The user-supplied processing module 906 creates items originally supplied by a user. In other words, in a first phase, the user-supplied processing module 906 receives an item from a user. The item may correspond to any kind of personal document, such as a word processing document, a PDF document, and so on. In a second phase, the user-supplied processing module 906 converts this item into a device-readable format and then forwards the converted item back to the user. The user may consume the converted item using his or her user device 104.

Any of the content processing modules (902, 904, 906) may rely on one more conversion tools 908. Each conversion tool provides functionality for converting content from an original format into a defined target format. For instance, a .mobi conversion tool 910 converts content from an original format into a .mobi format. Other tools (912, . . . 914) convert an item from an original format into other respective types of device-readable formats. In one case, the conversion tools 908 accept items in a predefined number of acceptable original formats. Without limitation, in one illustrative implementation, the acceptable original formats may include Adobe PDF format, TXT format, HTML format, rich text format (RTF), Microsoft Word document format (DOC), and so on. Acceptable formats for images may include, without limitation, JPEG format, GIF format, PNG format, BMP format, and so on.

B.1.b. Illustrative Subscription Module

Figure 10:
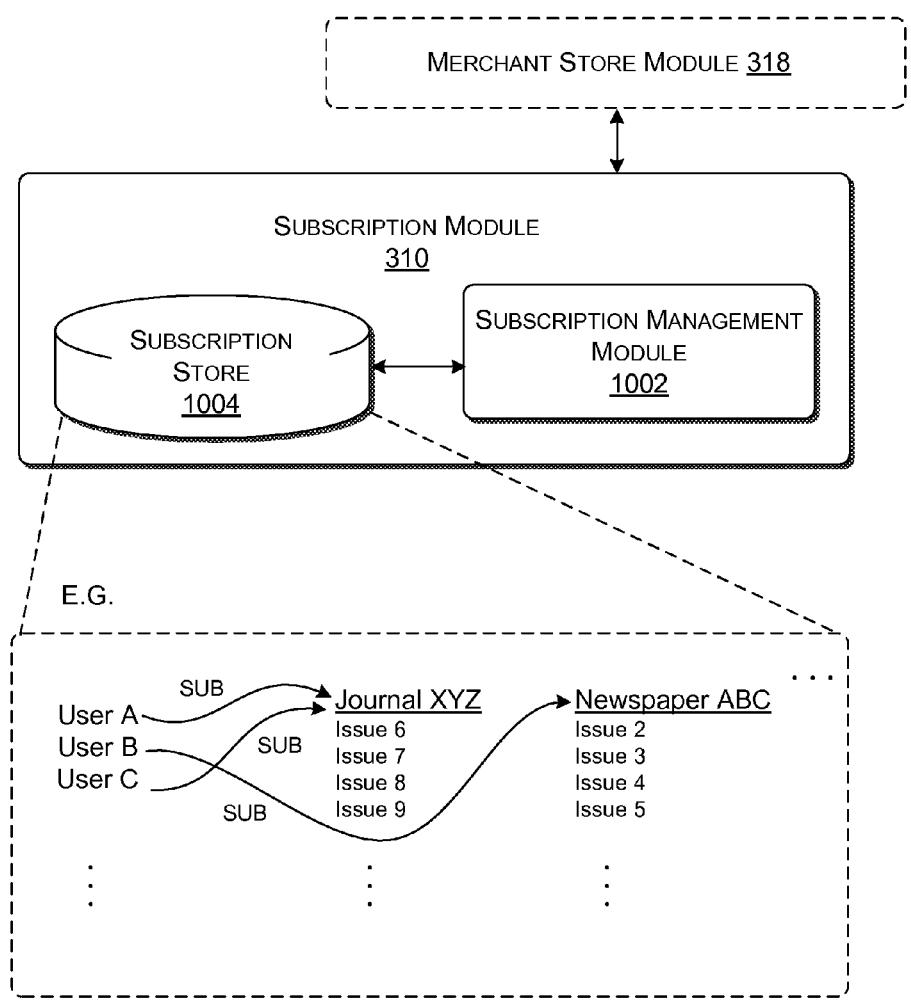
FIG. 10 shows an illustrative subscription module for use in the IPS of FIG. 3.

FIG. 10 illustrates additional information regarding the subscription module 310, which was introduced in the context of FIG. 3. The subscription module 310 includes a subscription management module 1002. The subscription management module 1002 administers the creation and termination of subscriptions, as well as other aspects of subscriptions. In one case, the merchant store module 318 may receive a user's purchase of a subscription (or more generally, a user's acquisition of a subscription). The merchant store module 318 may communicate the user's selection to the subscription management module 1002. The subscription management module 1002, in turn, may interact with a subscription store 1004, e.g., by adding new entries to the store 1004, deleting entries in the store 1004, modifying entries in the store 1004, and so on.

More specifically, the subscription module 310 identifies subscriptions available as respective parent-type nodes. When a particular issue of a subscription is received and processed, the subscription module 310 associates this issue as a child node of a corresponding parent subscription. Assume a user purchases a particular subscription; at that time, the user is associated with a particular parent node, corresponding to the subscription. In additional, or alternatively, a subscription can be associated with a device or other entity. Further, in one implementation, the subscription module 310 manages each user's ownership of issues of this subscription by relating the user to the parent subscription, rather than individual issues of the subscription.

The subscription management module 1002 also interacts with the content delivery module 316 to inform the content delivery module 316 whether a user has appropriate authorization to download a subscription-related item (for the case of an item received as per the terms of a subscription, rather than an a la carte selection of a subscription item). In one case, such permission-checking takes place on a per-subscription basis, not on a per-issue basis (unlike, in one particular implementation, the case of eBooks and other a la carte selections, in which permission-checking takes place on a per-item basis).

Figure 11:
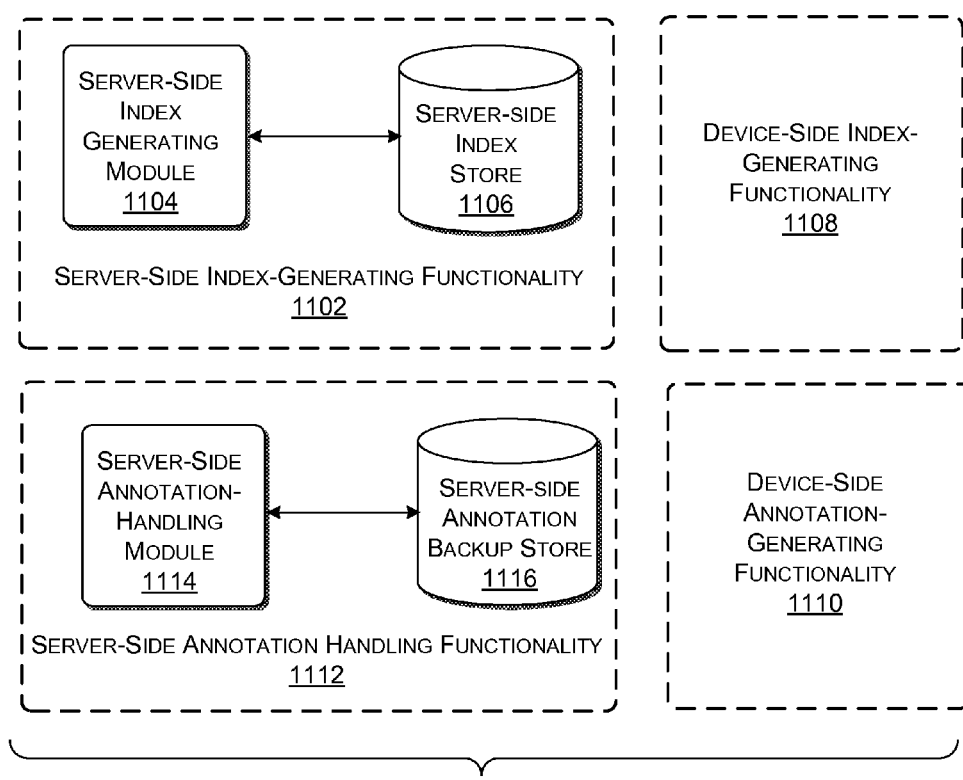
FIG. 11 shows illustrative index-generating functionality and annotation-handling functionality for use in the IPS of FIG. 3.

B.1.c. Illustrative Index-Generating Functionality and Annotation-Handling Functionality In addition to content produced by the content reception process, supplemental information may be associated with items. One such type of supplemental information is index information. Another type of supplemental information is annotation information. FIG. 11 provides an overview of functionality for producing such supplemental information.

As to the creation of device indexes, the IPS 102 may provide server-side index generating functionality 1102. The server-side index-generating functionality 1102 may include a server-side index-generating module 1104 for generating an index. The server-side index-generating module 1104 stores the index generated in a server-side index store 1106. The user device 104 may include a device-side index generating functionality 1108 for generating an index. Thus, both the IPS 102 and the user device 104 have the ability to generate an index for an item.

Various rules may be used to determine whether an index will be provided by the server-side index-generating functionality 1102 or the device-side index-generating functionality 1108. According to one consideration, the user device 104 will attempt to generate the index using the device-side index-generating functionality 1008, but if this process proves to be too slow, the user device 104 may request the server-side index-generating functionality to generate the index. Section E provides details regarding additional considerations which may impact the manner in which the system 300 generates an index for an item.

As to the creation and handling of annotations, the user uses a device-side annotation generating functionality 1110 to create annotations for a particular item. (The device-side annotation generating functionality 1110 may be considered synonymous with the annotation module 406, introduced in FIG. 4.) The user may create bookmark-type annotations, highlight-type annotations, note-type annotations, clipping-type content selections, and so on. The user device 104 may also create a "last-page-read" position. This type of annotation identifies the last position at which an item was opened. The device-side annotation-generating functionality 1110 may store the annotations in any device-side store. The user device 104 may retrieve and recreate these annotations when it displays the corresponding item. For instance, when the device reopens the item, the user device 104 may show the same page the user was viewing when the device 104 was closed.

The system 300 may also rely on server-side annotation-handling functionality 1112 for storing a backup of the annotations created by the user at the user device 104. The server-side annotation-handling functionality 1112 may include a module 1114 of the same name for receiving annotations from the user device 104 at various times. In one case, the user device 104 may forward annotations to the IPS 102 as part of a cycle of operations it performs when various events occur. Such events may include any opportunity the device 104 has to interact with the IPS 102 (e.g., in response to the receipt of a TPH signal, etc.). The server-side annotation handling module 1114 may store the annotations it receives from the user device 104 in a server-side annotation backup store 1116.

If the IPS 102 stores backup annotations, it may notify the user device 104 of this fact by providing hint information to the user device 104. The hint information accompanies an item forwarded from the content delivery module 316 to the user device. If the hint indicates that backup annotations are available, the user device 104 may choose to download the annotations. The user device 104 may want to receive these annotations in the event that the local store of these annotations has been deleted, and so forth.

B.1.d. Illustrative Approach to Receiving and Processing Pre-Generated Items

The remainder of Section B.1 provides more information regarding the processes for receiving and processing eBooks and other pre-generated items, subscription-related items, and personal items.

Figure 12:
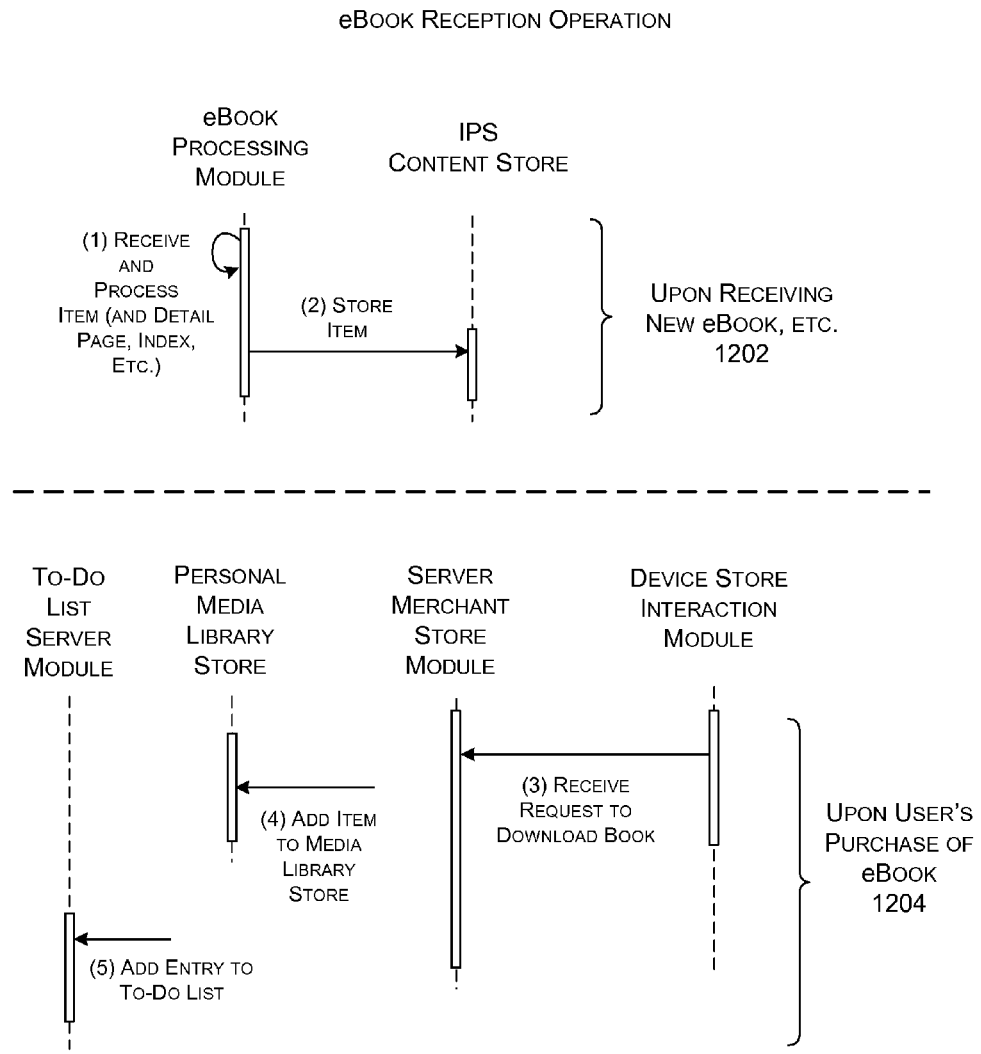
FIG. 12 is a signal diagram which depicts one illustrative way to receive and process eBooks and other pre-generated items using the content reception system of FIG. 9.

Starting with FIG. 12, this figure is a signal flow diagram illustrating one way to receive and process eBook items and other pre-generated items. In operation (1), the eBook processing module 902 receives an eBook or the like from a publisher or other source. The eBook processing module 902 may optionally convert the eBook item to a device-readable format, create an index for this item, and/or create a detail page which represents this item in the merchant store module 318.

In operation (2), the eBook processing module 904 stores the item and its supplemental parts in the content store 308.

In operation (3), the user may operate the device-side store interaction module 344 to purchase or otherwise acquire the eBook from the merchant content store 318.

In operation (4), the eBook processing module 902 may store salient information in the media library module 324 which indicates the user has purchased the eBook or other a la carte item. As will be described in greater detail below, the content delivery module 316 may consult the media library module 324 at the time of delivery of the item to determine whether the user is authorized to receive the item (e.g., to determine whether the user has actually purchased the item).

In response, in operation (5), the merchant store module 318 may add an entry corresponding to the purchased item in the user's to-do list. This action prompts the to-do list server module 314 to immediately (or some time after) send a TPH signal to the user device 104, notifying the user device 104 that an instruction is outstanding to acquire an item.

The top half of the signal diagram corresponds to a creation phase 1202 of the operation, in which a new eBook is received and processed. The bottom half of the signal diagram corresponds to a delivery phase 1204 of the operation, in which a user purchases and receives a previously stored item. The creation phase 1202 precedes the delivery phase 1204 but these two phases (1202, 1204) are not otherwise linked together.

Figure 15:
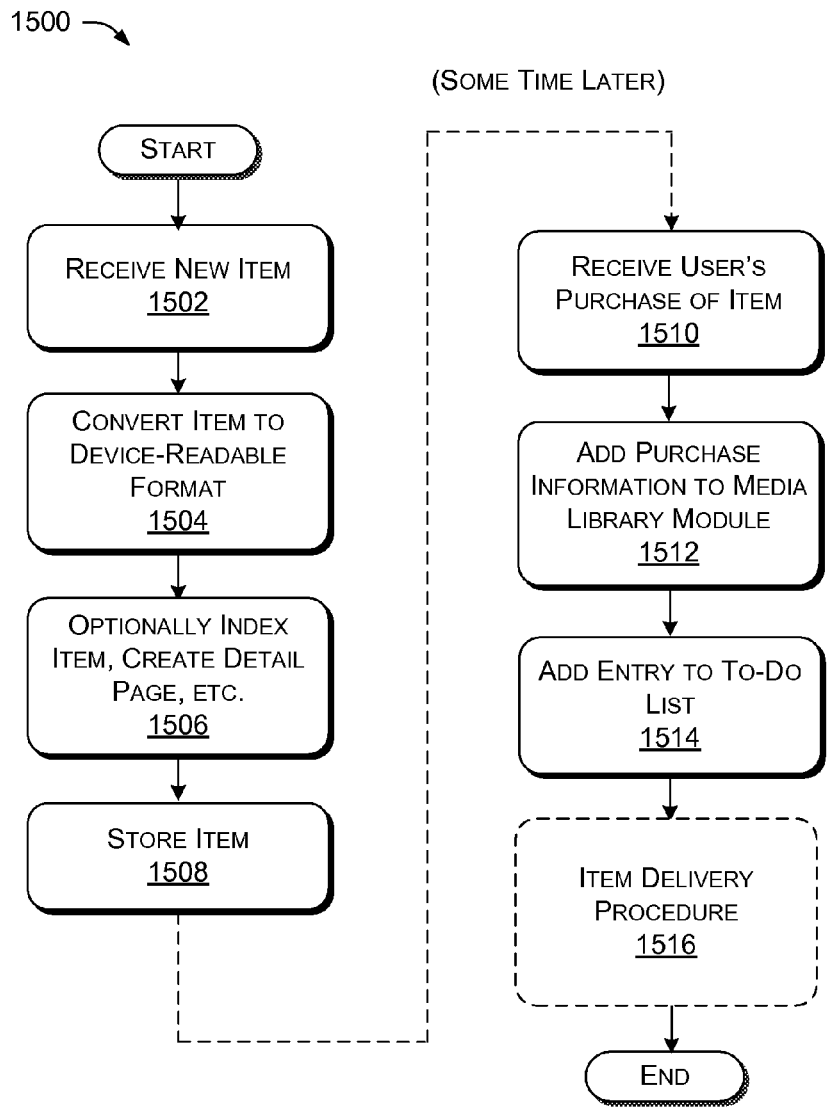
FIG. 15 is a flowchart which depicts one illustrative way to receive and process eBooks and other pre-generated items using the content reception system of FIG. 9.

FIG. 15 shows a procedure 1500 which describes the eBook processing operation in flowchart form.

In block 1502, the eBook processing module 902 receives a new item, e.g., from a publisher of items or some other source.

In block 1504, the eBook processing module 902 optionally converts the new item into a device-readable format—that is, assuming the item is not already expressed in a device-readable format.

In block 1506, the eBook processing module 902 optionally creates an index for the item, an item detail page, and/or other supplemental information associated with the item.

In block 1508, the eBook processing module 902 stores the converted item and any supplemental information associated with the item.

In block 1510, at any time later, the merchant store module 318 receives the user's purchase of the item.

In block 1512, the eBook processing module 902 stores purchase information in the media library module 324. This information identifies the user has purchased a particular eBook or the like.

In block 1514, the merchant store module 318 or some other server-side module adds an entry to the device's to-do queue in the to-do list server module 314. This entry contains an instruction which instructs the user device 104 to retrieve the purchased item.

Block 1516 generally references an item delivery procedure, which is invoked to download the item. Later figures describe this operation in greater detail.

Figure 13:
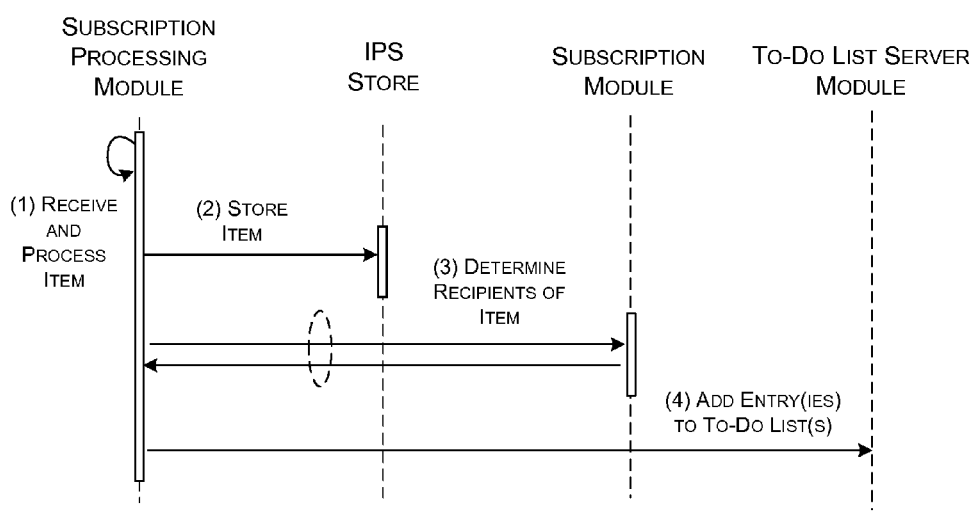
FIG. 13 is a signal diagram which depicts one illustrative way to receive and process subscription-related items using the content reception system of FIG. 9.

B.1.e. Illustrative Approach to Receiving and Processing Subscription-Related Items FIG. 13 is a signal flow diagram illustrating one way to receive and process subscription-related items. In operation (1), the subscription-related processing module 904 receives and processes a subscription-related item. This processing may involve converting the item into a device-readable format, indexing the item, and so forth.

In operation (2), the subscription-related processing module 904 stores the received subscription-related item in the IPS content store 308. Although not shown in FIG. 15, in the subscription module 310, the new issue is identified as a child node of a corresponding parent subscription. As explained above, in one case, permission-checking at the time of delivery proceeds on a general subscription-level basis, rather than on a per-item (e.g., per-issue) basis. However, if the user has made a separate selection of a subscription-related item (e.g., an a la carte selection), then the above-described eBook permission-checking is used to govern access to the item.

In operation (3), the subscription-related processing module 904 consults the subscription module 310 to determine the users who should receive the newly received subscription-related item.

In operation (4), the subscription-related processing module 904 may store an entry in each of the to-do queues of the identified subscribing users.

Figure 16:
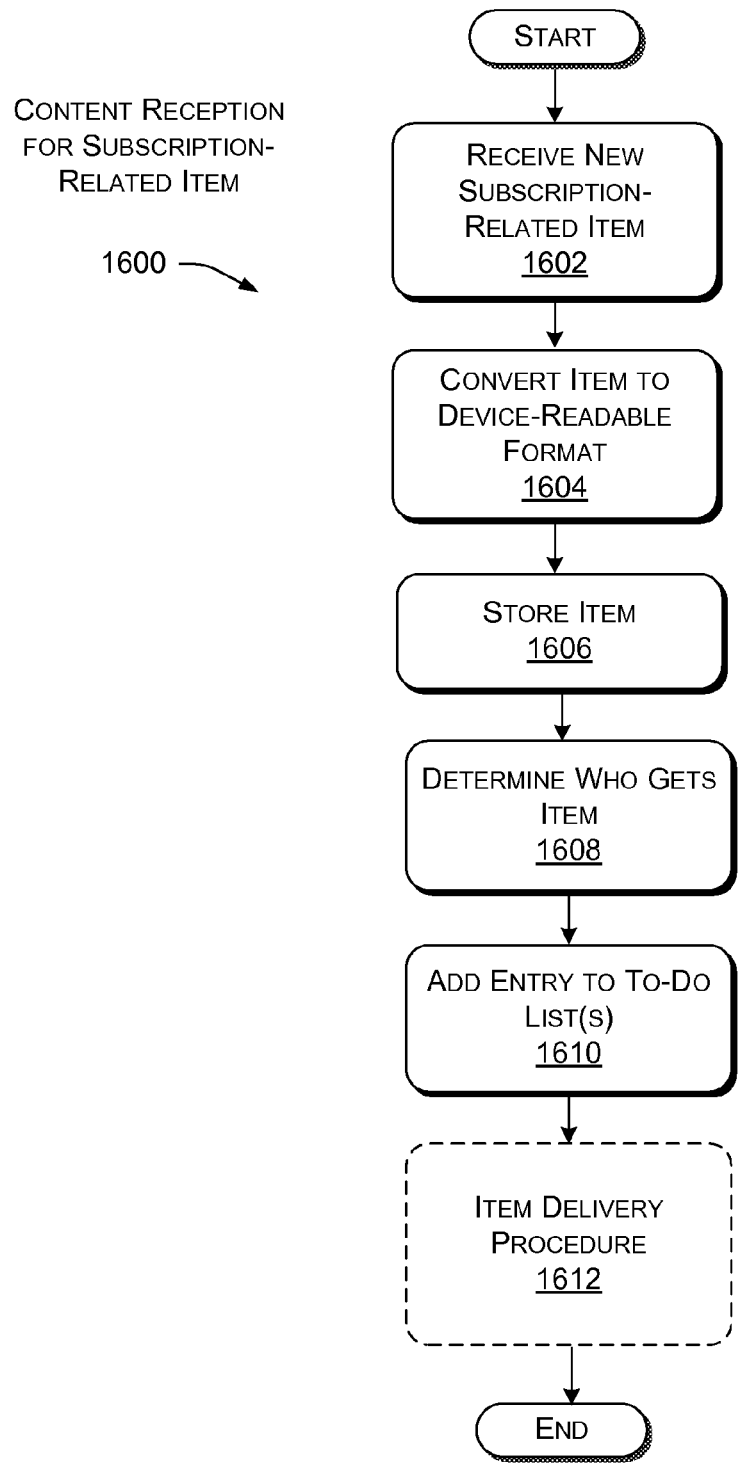
FIG. 16 is a flowchart which depicts one illustrative way to receive and process subscription-related items using the content reception system of FIG. 9.

FIG. 16 shows a procedure 1600 which describes the subscription-related processing operation in flowchart form.

In block 1602, the subscription-related processing module 904 receives a new subscription-related item, such as a magazine issue, a newspaper edition, a feed item, and so on.

In block 1604, the subscription-related processing module 904 converts the received item into a device-readable format if appropriate, and optionally produces supplemental information, such as a device index.

In block 1606, the subscription-related processing module 904 stores the received (and potentially converted) subscription-related item in the content store 308.

In block 1608, the subscription-related processing module 904 consults the subscription module 310 to determine the users who should receive the subscription-related item.

In block 1610, the subscription-related processing module 904 provides an entry in each of the to-do queues of the users who will be receiving the subscription-related item.

Block 1612 generally references an item delivery procedure, which is invoked to download the item. Later figures describe this operation in greater detail.

B.1.f. Illustrative Approach to Receiving and Processing Personal Documents

Figure 14:
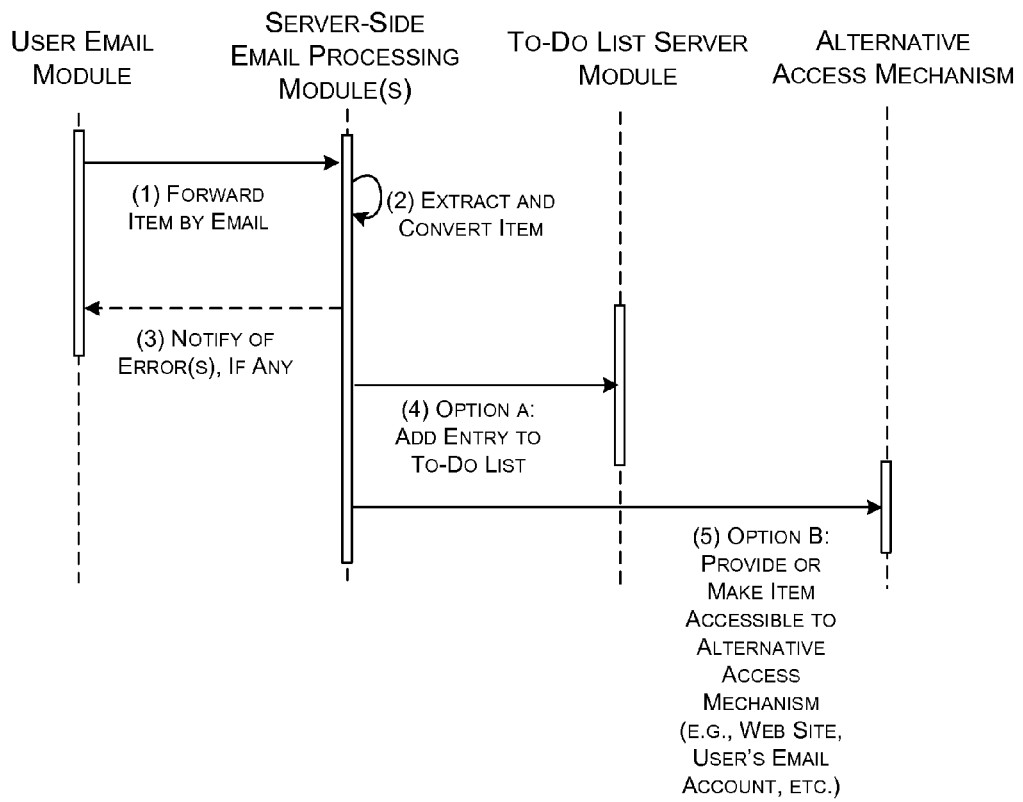
FIG. 14 is a signal diagram which depicts one illustrative way to receive and process personal items using the content reception system of FIG. 9.

FIG. 14 is a signal flow diagram illustrating one way to receive and process personal items (such as a personal document). In operation (1), the user uses Email functionality or other message-generating functionality to forward a personal item to the user-supplied processing module 906. For instance, the user may include the personal item as an attachment to an Email message. In one case, the user may forward a single personal item with the Email message. In another case, the user may forward multiple personal items with the Email message, e.g., as multiple attachments to the Email message. The user-supplied processing module 906 allows the user to bundle together one or more attachments, e.g., in a ZIP file or the other form of package.

In one implementation, the user-supplied processing module 906 is configured such that it will only accept an Email message from the user from one or more pre-authorized Email addresses. In one case, the user is allowed to select the Email address(es) in a configuration procedure (e.g., via one or more configuration user interface pages), thereby establishing a permitted list of Email addresses. The user-supplied processing module 906 may initially provide a default Email address which may be used by the user; the user may later change or supplement this default Email address. Placing restrictions on the permissible Email addresses is potentially useful to eliminate or reduce the amount of unwanted items forwarded to the user. Unwanted items may be particularly pernicious in the case in which the user is charged an over-the-air delivery fee to receive these items. However, in another implementation, the user-supplied processing module 906 may not place any restrictions on the Email addresses that may be used to forward personal items to the user-supplied processing module 906.

In operation (2), the user-supplied processing module 906 may receive and process the received message (in the event that the message originates from an address identified on the permitted address list). Such processing may involve interpreting the message to identify the source of the message, the target destination that the converted item(s) will be sent to, and/or other salient information regarding the message. The processing also involves extracting the personal item(s) from the message and converting the item to a device-readable format. In the case that one or more personal items are packaged in a ZIP file or the like, the extracting operation may involve removing one or more personal items from this package file.

The above-described processing operation may wholly succeed, wholly fail, or partially succeed (and partially fail). A partial failure may occur when the Email message contains multiple personal items as attachments, and the user-supplied processing module 906 is successful in converting some of these items but not others. For instance, the unsuccessfully converted items may be expressed in an unsupported original format. In operation (3), the user-supplied processing module 906 may notify the Email sender of any type of failure (either total failure or partial failure). In the case of a partial failure, the user-supplied processing module 906 may continue processing the successfully-processed item(s), e.g., by delivering these items to the User.

The user may select at least two delivery options to receive the converted personal item(s). In a first option, the user may request that the converted personal item(s) be forward to the user in wireless form. If this is the case, in operation (4), the user-supplied processing module 906 adds an entry to the user's to-do queue in the to-do list server module 314. In a second option, the user may request that the converted personal item(s) be made available to the user via a non-wireless route. For example, the user may request that the converted item(s) be sent to the user in an Email form. The user may extract the converted personal item(s) from the Email message and then transfer the converted personal item(s) to the user device 104 via hardwired link, such as via USB connection. Or the user may request that the converted item(s) be posted to a network-accessible site. The user may access this site using a personal computer or like mechanism, download the converted item(s) (over non-wireless infrastructure), and then transfer the converted item(s) to the user device via USB connection or other mechanism. Operation (5) generally represents the delivery of one or more personal items via a non-wireless route. A user may generally prefer to the use the non-wireless route to avoid the possible expense of downloading content over the air.

Figure 17:
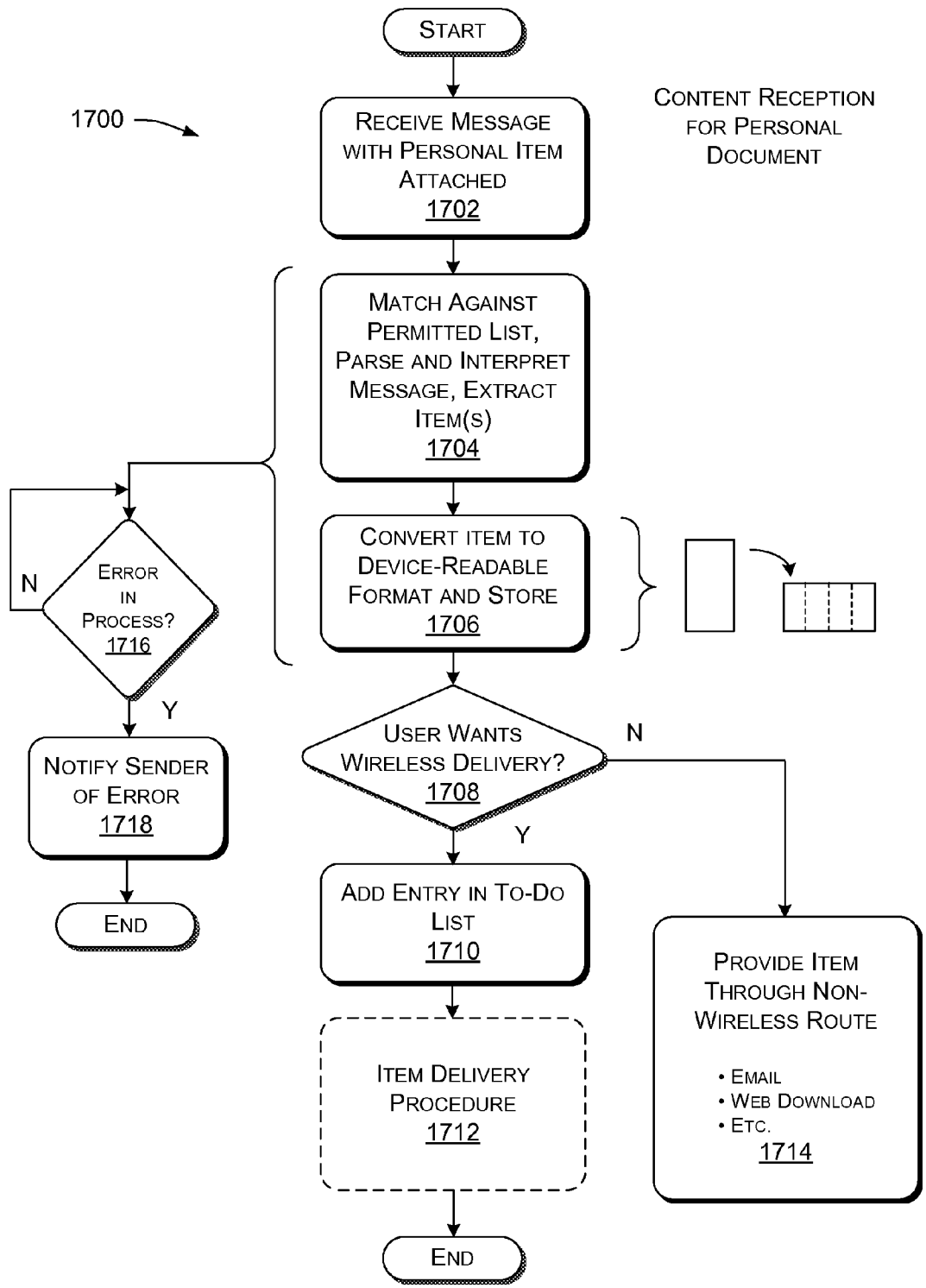
FIG. 17 is a flowchart which depicts one illustrative way to receive and process personal items using the content reception system of FIG. 9.

FIG. 17 shows a procedure 1700 which describes the personal item processing operation in flowchart form.

In block 1702, the user-supplied processing module 906 receives a message from the user, such as an Email message, which includes an attached user-supplied item (or plural items).

In block 1704, the user-supplied processing module 906 determines whether the message originates from a permissible address by consulting the permitted address list. If so permitted, the user-supplied processing module 906 parses and interprets the message, as well as extracts the personal item(s) attached thereto. Extracting the items may involve removing the items from a package file of any kind.

In block 1706, the user-supplied processing module 906 converts the personal item(s) to a device-readable format, if, in fact, the personal item(s) is (are) not currently in such a format. The user-supplied processing module 906 can rely on a single mechanism to perform this conversion; alternatively, the user-supplied processing module 906 can rely on any one or more of multiple available conversion mechanisms. For instance, the user-supplied processing module 906 can select a conversion mechanism that it deems to be the most suitable for converting a particular type of item; in addition, or alternatively, a user may forward instructions that identify one or more mechanisms to be applied to a particular item. In one case, if the user-supplied processing module 906 is not successful in processing the item using one type of conversion mechanism, it can try another conversion mechanism, and so on.

In addition, or alternatively, conversion may optionally involve resizing the personal item into a form that better accommodates presentation of the converted item by a user device. That is, this provision may make the converted item more readable when presented on the device.

In addition, or alternatively, conversion may involve rotating the personal item, e.g., by 90 degrees, to again better accommodate presentation of the converted item by the user device.

In addition, or alternatively, conversion may involve breaking up the personal item into multiple parts for presentation on the user device in multiple pages. For example, as shown to the rights of block 1706, the user-supplied processing module 906 may rotate the personal item by 90 degrees and then break it up into multiple parts. This operation may be appropriate for certain personal items that have large images (for example, PDF documents with scanned page images). Again, this provision may make the converted item more readable when presented on the device.

In block 1708, the user-supplied processing module 906 determines what route the user wishes to use to receive the converted personal item(s). In one case, the determination performed in block 1708 may be implied. For instance, the user-supplied processing module 906 may provide a first Email address for receiving items that are to be sent over a wireless route once converted. The user-supplied processing module 906 may provide a second Email address for receiving items that are to be sent over a non-wireless route. If the user sends the personal item(s) to the first Email address, then it is understood that the user wishes to receive the converted item via a wireless route. If the user sends the personal item(s) to the second Email address, then it is understood that the user wishes to receive the converted item(s) via a non-wireless route. In another case, the user-supplied processing module 906 may provide a single Email address for receiving personal items. The user-supplied processing module 906 may discriminate the selected delivery route by interpreting instructions provided in the message itself, and so on.

Assume that the user has selected a wireless delivery route. In this case, in block 1710, the user-supplied processing module 906 adds an entry to the user's to-do queue in the to-do list server module 314.

Block 1712 generally references an item delivery procedure, which is invoked to download the item(s). Later figures describe this operation in greater detail.

Next assume that the user has selected a non-wireless delivery route. In block 1714, the user-supplied processing module 906 makes the converted item(s) available to the user through an alternative transfer mechanism, such as Emailing the converted item(s) back to the user, posting the converted item to a network-accessible site, and so on.

As indicated in block 1716, the user-supplied processing module 906 may ascertain whether there are any failures in the processing of the item(s). If so, in block 1718, the user-supplied processing module 906 sends an error notification message to the sender. If there is only a partial failure, then processing proceeds with respect to the item(s) that may be successfully processed.

B.2. Illustrative To-Do Server Module

This section provides additional information regarding an illustrative composition and operation of the to-do list server module 314. Recall that the to-do list server module 314 operates by sending instructions to the user device 104, thereby instructing the user device 104 to retrieve items and perform other actions.

The to-do server module 314 includes a to-do list receiving module 1802. The to-do list receiving module 1802 receive entries from various sources, such as the various processing modules (902, 904, 906) described in the previous section. For instance, the to-do list entry receiving module 1802 may receive an entry when a user purchases an eBook or like content, when a subscription-related item is received, when the user sends a personal document to the IPS 102, and so on. All of these events cause the generation of a GET-type entry, which serves as an instruction for the user device 104 to download the item corresponding to the GET-type entry. Other IPS-side modules may add a GET-type entry to a queue to notify the user device 104 that it should download an item that provides an instruction-bearing upgrade.

Other types of entries may convey different types of instructions. In one case, an entity within the IPS 102 may generate a delete (DEL) instruction which instructs the user device 104 to delete an item that it may have previously received and stored in its device memory 336. In one circumstance, the user may have purchased an item, which prompted the generation of a GET-type entry. But later it may be determined that the user's credit standing is deficient, precluding the purchase of the item. In this case, an appropriate entity in the IPS 102 (such as the merchant store module 318) may add a DEL-type entry to the user's to-do queue.

In another case, an appropriate entity in the IPS 102 (such as monitoring and/or testing functionality) may add a command (e.g., a PUT instruction) to a user's to-do queue to request the user device 104 to forward performance logs and/or other information to the monitoring and/or testing functionality.

In another case, an appropriate entity in the IPS 102 may add information to the to-do queue which prompts the user device 104, upon receipt of this entry, to display information to the user, e.g., in a pop-up form or other type of alert-related form.

The IPS 102 may add yet additional types of instructions to the users' to-do queues to suit different applications and environments.

Figure 18:
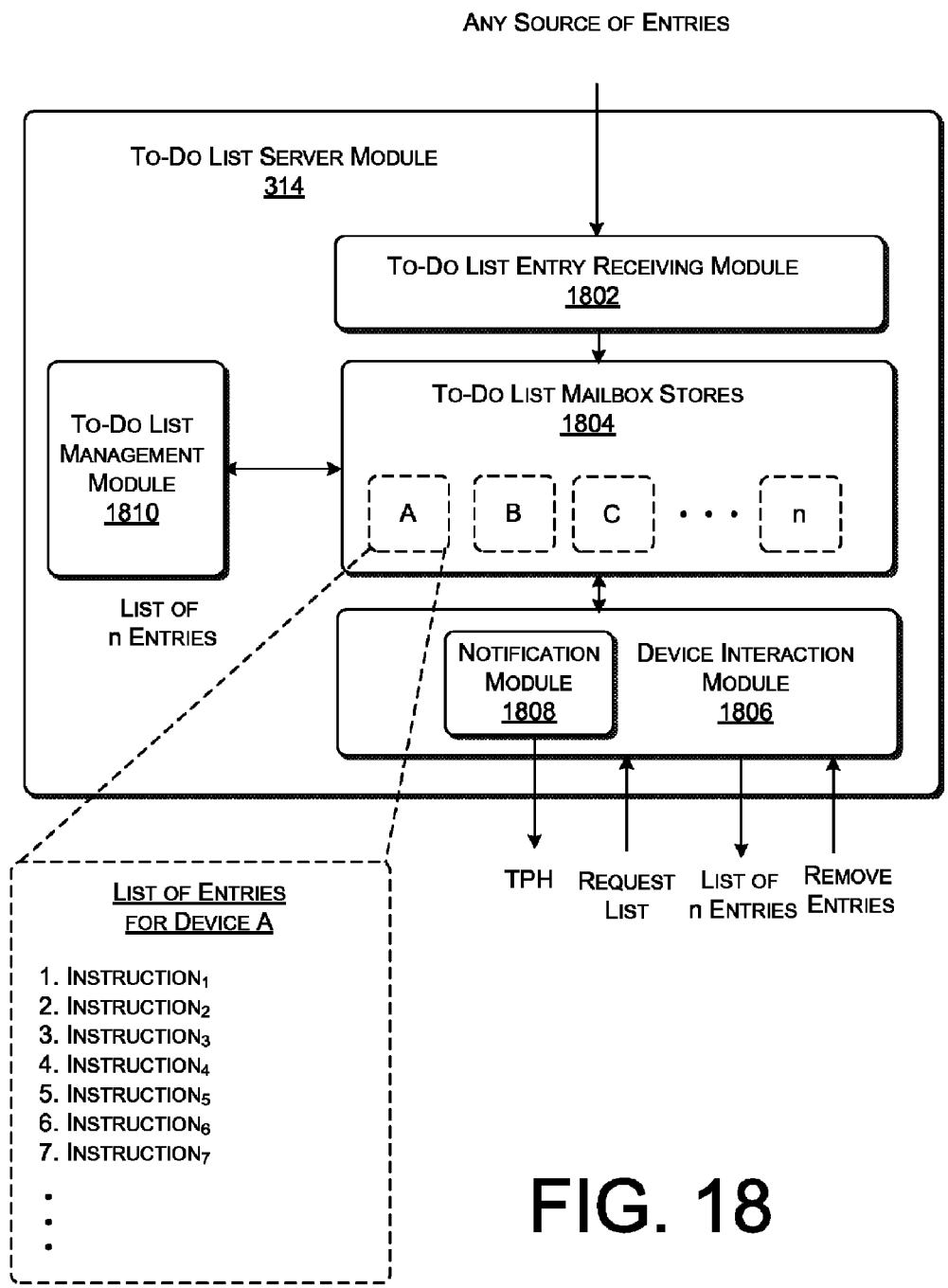
FIG. 18 shows an illustrative a to-do list server module for use in the IPS of FIG. 3.

The to-do list server module 314 may include to-do list stores 1804 for maintaining a plurality of to-do lists, also referred to as to-do queues. More specifically, the to-do list server module 314 may maintain different queues for respective user devices, such as a to-do list A for user device A, a to-do B for user device B, and so on. A user device interacts with its own respective to-do list, as represented by the dashed-line box in FIG. 18, which indicates that the entries in mailbox store A are designated for user device A.

The to-do server module 314 also includes a device interaction module 1806. The purpose of the device interaction module 1806 is to allow the to-do server module 314 to interact with the device-side to-do list processing module 334. The device interaction module 1806 includes a notification module 1808. The notification module 1808 forwards a notification message to user device 108, e.g., in the form of a ring-type TPH signal. The device interaction module 1806 thereafter interacts with the user device 104 in a data mode. Namely, the device interaction module 1806 receives the user device's request for a list of n entries in the user's to-do queue, upon which the device interaction module 1806 provides this list. The device interaction module 1806 may later receive the user device's instruction to remove one or more entries from the list, indicating that the user device successfully downloaded the items associated with the those entries.

The to-do list server module 314 includes a to-do list management module 1810. The to-do list management module 1810 manages entries posted to a user's to-do queue. In one case, an entity may post a GET-type entry to a user's queue, and then the same entity or another entity may post a DEL-type entry, instructing the user device 104 to delete the same item that the device was previously asked it to get. In this circumstance, in one case, the to-do list management module 1810 may delete the GET-type entry, but not the DEL-type entry. This action may be appropriate in a scenario in which the user device 104 has already received the GET-type entry and may be in the process of downloading the corresponding item.

In another case, the to-do list management module 1810 determines that a user's to-do queue contains several editions of a newspaper or other periodical. The to-do list management module 1810 may remove all but the most current edition of the periodical, under the premise that a user will not want to read an old newspaper. The user may be given the option of making set-up selections which override this behavior. In another case, the user may access older editions of a newspaper via the content manager module 342, in a manner to be discussed below.

In general, the to-do list management module 1810 helps ensure that the to-do list queue does not contain inconsistent or redundant entries, or some other undesirable entry-type content.

Figure 19:
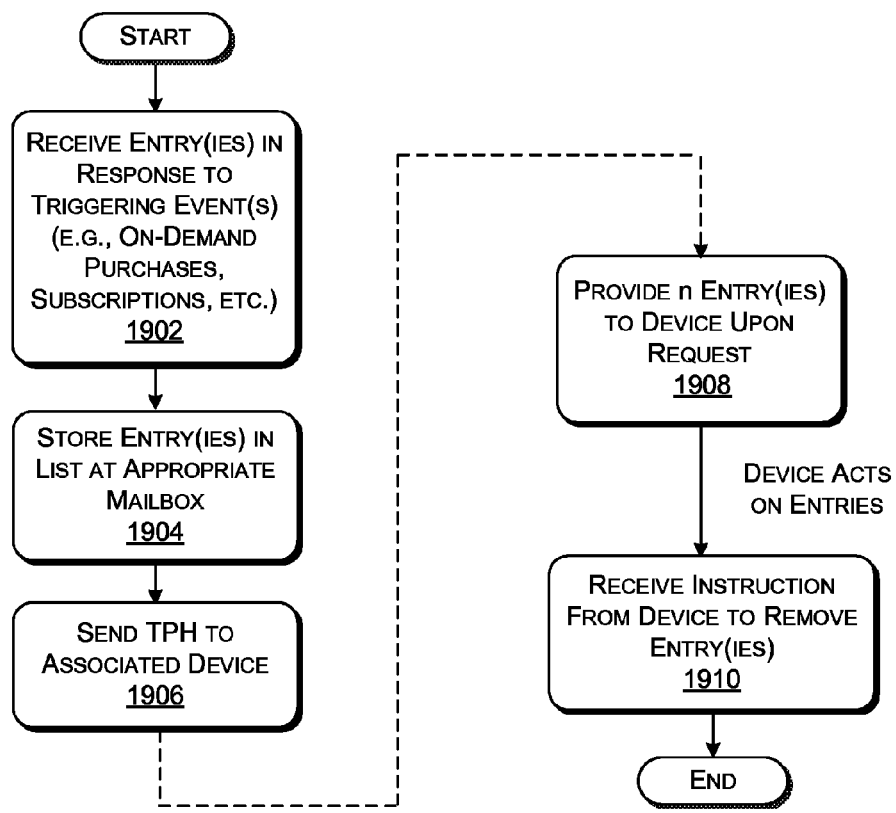
FIG. 19 is a flowchart which depicts one illustrative manner of operation of the to-do list server module of FIG. 18.

FIG. 19 shows a procedure 1900 which illustrates one manner of operation of the to-do server module 314 in flowchart form. The procedure 1900 is explained with reference to the delivery of items to a particular user device; the to-do server module 314 uses the same procedure to forward items to other user devices.

In block 1902, the to-do server module 314 receives one or more to-do entries. This action may be triggered by the purchase of new eBooks and the like, the receipt of new subscription-related items, and do on.

In block 1904, the to-do server module 314 stores the entries in an appropriate mailbox (where such a mailbox is associated with the user device that will eventually receive the items).

In block 1906, the to-do server module 314 sends a TPH signal to the user device to alert the user device to the presence of one or more entries that it may download. More specifically, in one implementation, TPH scheduling functionality may receive TPH events. Based on one or more considerations, the TPH scheduling functionality may decide whether to immediately send a TPH signal or to delay sending the TPH signal (e.g., by possibly coalescing plural TPH events and sending a single TPH signal). Additional details regarding the TPH scheduling functionality are provided in below. The TPH scheduling functionality may be implemented as a feature of the notification module 1808.

In block 1908, the to-do server module 314 provides n entries to the user device, in response to the user device requesting these items.

In block 1910, after the user device has successfully performed the actions identified by the entries (such as downloaded one or more items, deleted one or more items, and so on), then the user device 104 sends a remove instruction to the to-do server module 314. In operation 1910, the to-do server module 314 responds to this request by removing the entries of the to-do queue.

Figure 20:
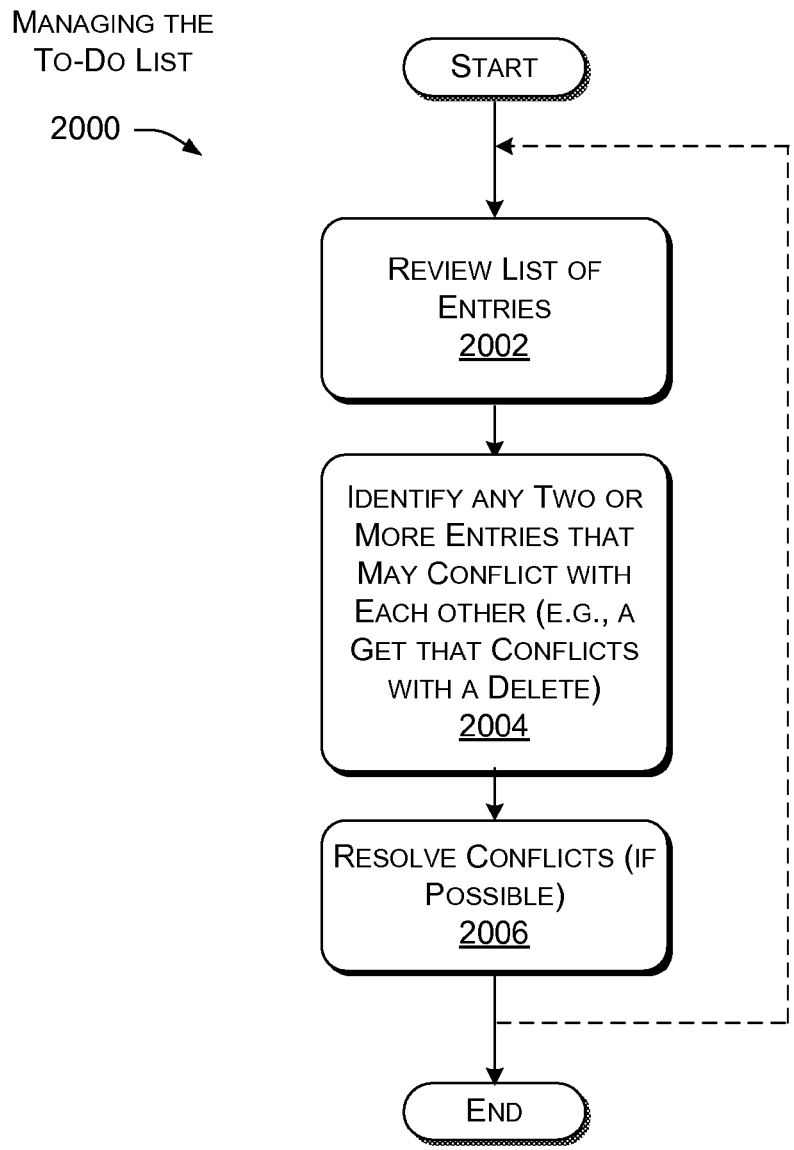
FIG. 20 is a flowchart which depicts one illustrative manner of managing the to-do list server module of FIG. 18.

FIG. 20 shows a procedure 2000 which illustrates one manner of operation of the to-do list management module ("management module") 1810 of the to-do list server module 314. In one implementation, the procedure of 2000 is performed when a new entry is added to a to-do queue, e.g., between operations 1902 and 1904 of FIG. 19.

In block 2002, the management module 1810 analyzes the entries in the to-do queue (along with the candidate entry that is to be added to the to-do queue). More specifically, the management module 1810 may specifically examine entries currently stored in the queue waiting to be sent to the user device. The management module 1810 may also consider entries that have already been forwarded to the user device 104.

In block 2004, the management module 1810 identifies any two or more entries that may conflict with each other for any reason, or which may cause any other concern. One example of a conflict is the case in which a GET-type entry contradicts a DEL-type entry for the same item. Another example of an actionable issue is where a to-do queue contains several editions for a same newspaper or other periodical. Another example of an actionable issue is where a to-do queue contains exact duplicate entries, and so on.

In block 2006, the management module 1810 takes steps to resolve or mitigate any problems caused by conflicting entries, if possible. Operation 2004 may entail making modifications to the queue, such as deleting one or more entries to the queue, adding one or more entries to the queue, and so on. Operation 2004 may additionally, or in the alternative, involve sending corrective commands to the user device.

B.3. Illustrative To-Do List Processing Module

Figure 21:
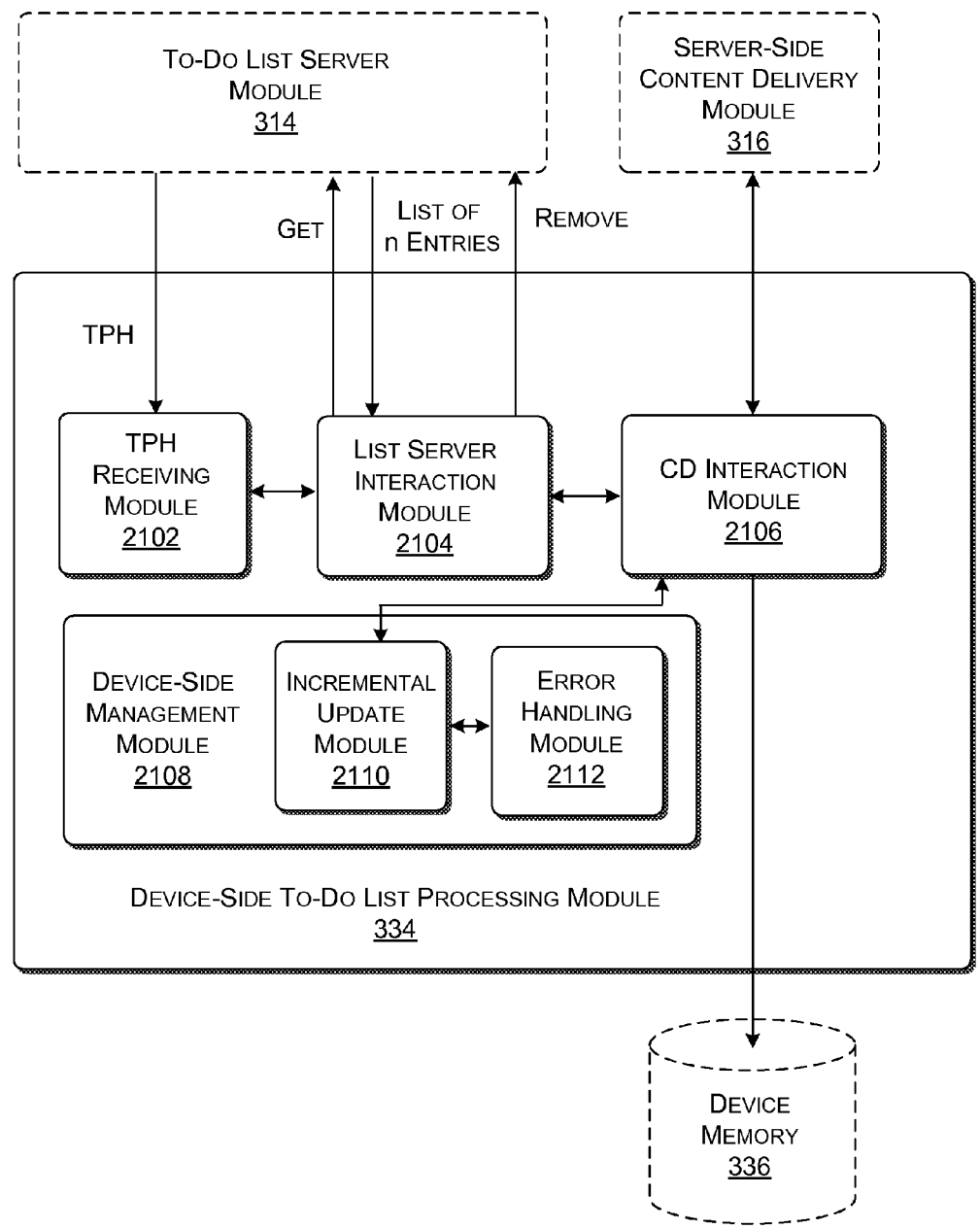
FIG. 21 shows an illustrative to-do list processor for use in the user device of FIG. 3.

FIG. 21 shows details of the device-side to-do list processing module 334. The modules shown in FIG. 21 complement many of the modules shown in FIG. 18 for the to-do list server module 314.

The to-do list processing module 334 includes a TPH-receiving module 2102 for receiving a notification message from the IPS 102, e.g., in the form of a telephone ring. The TPH receiving module 2102 may act on the TPH signal without formally answering this signal, after which the to-do list processing module 334 exchanges information with the IPS 102 using a data mode. Upon receiving the TPH signal, the user device 104 may transition from a first power state to a second power state, where the second power state consumes more power than the second power state. This is assuming that the user device is not already in the second power state.

The to-do list processing module 334 includes a list server interaction module 2104 for use in handling all interaction with the to-do list server module 314 (except the TPH aspects of this interaction). Namely, the list server interaction module 2104 may send a request to receive a list of n entries from the to-do list server module 314, and then receive such list if the retrieval operation is successful. After the user device obtains the items referenced by the entries in the list (and/or performs other actions identified by the entries), the list server interaction module 2104 may send a remove instruction to the to-do list-server module 314, instructing the to-do list server module 314 to remove corresponding items from its to-do queue.

The to-do list processing module 334 includes a content delivery (CD) interaction module 2106. The purpose of the CD interaction module 2106 is to interact with the server-side content delivery module 316 to request and obtain items that are identified in the list of n entries. The CD interaction module 2106 may also receive various hints from the content delivery module 316, as well as supplemental information (e.g., index information, backup annotations, etc.). The CD interaction module 2106 may store items and other information that it receives in the device memory 336 or in some other storage medium (or media).

The to-do list processing module 314 may also include a device-side management module 2108. This device management module 2108 coordinates the operation of the to-do list processing module 334. The device management module 2108, in turn, may include a device-side incremental update module 2110 and a device-side error handling module 2112. The incremental update module 2110 and error handing module 2112 work in cooperation to govern the retrieval operations performed by the CD interaction module 2106. The incremental update operation is described in detail in a later section.

By way of preview, if appropriate for a particular type of item being requested (having a prescribed content), the incremental update module 2110 may instruct the CD interaction module 2106 to obtain an identified item by first requesting a delta file. The delta file expresses the difference between a device-side version of the desired content and a current version of the content. If this operation is not successful for any reason (as assessed by the error handling module 2112), the incremental update module 2110 may instruct the CD interaction module 2106 to request a full version of the identified item. As will be described, the content delivery module 316 of the IPS 102 includes a server-side incremental update module which handles the incremental update operation in an independent but complementary manner to the device-side incremental update module 2110.

Figure 22:
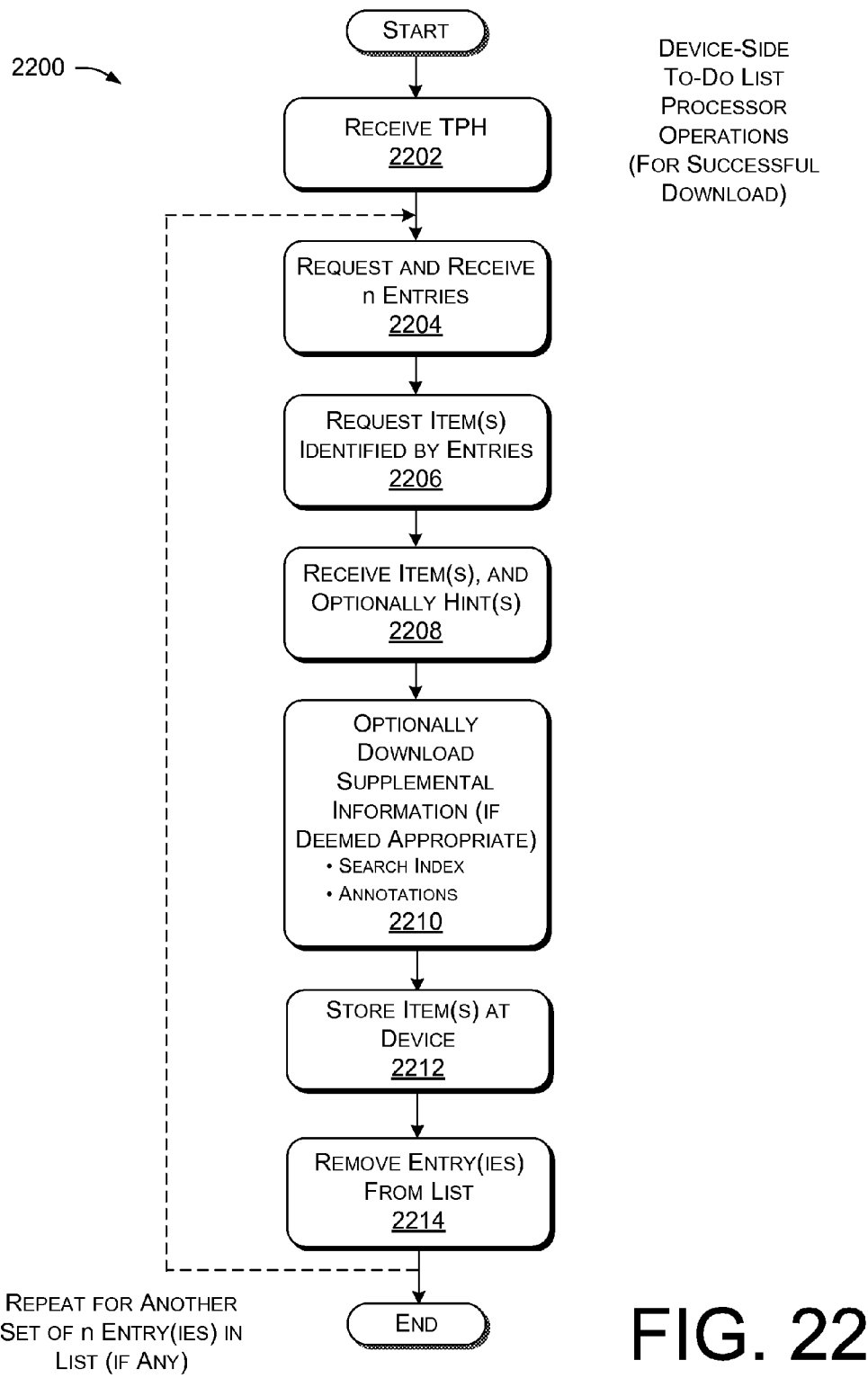
FIG. 22 is a flowchart which depicts one illustrative manner of operation of the to-do list processing module of FIG. 21.

FIG. 22 shows a procedure 2200 which describes the operation of the device to-do list processing module 334 in flowchart form.

In block 2202, TPH receiving module 2102 receives a notification message from the to-do list server module 314, optionally in the form of a telephone ring. The download process may also be initiated by other events. For example, the process may be initiated in response to the activation of a "Check New Items" command (e.g., made available via one or more device menus). The process may also be initiated by turning on the user device 104 radio (from an off state). The process may also be initiated when the user device 104 enters a geographical location where wireless service is available from a location where it was not available, and so on.

In block 2204, in response to the notification message, the user device transitions to an appropriate power state (if not already in the appropriate state). The list server interaction module 2104 then requests and receives n entries from the to-do queue maintained by the to-do list server module 314.

In block 2206, the CD interaction module 2106 requests items identified by the n entries.

In block 2208, the CD interaction module 2106 receives the items (if the download is successful), together with hints. A first hint notifies the user device 104 an index for an item is available at the IPS 102. A second hint notifies the user device 104 backup annotations are available at the IPS 102. The first and second hints may also be used to indicate an index and/or backup annotation are respectively not available.

In block 2210, the CD interaction module 2106 optionally downloads supplemental information (if deemed appropriate). Such additional information comprises search index information and annotation information.

In block 2212, the CD interaction module 2106 stores the retrieved item(s) and supplemental information in the device memory 336 and/or in some other storage location(s).

In block 2214, the list server interaction module 2104 notifies the to-do list server module 314 that it has successfully downloaded the items, allowing the to-do list server module 314 to remove the corresponding entries from the to-do queue.

FIG. 22 shows that operations 2206-2214 may be performed in en bloc fashion, e.g., by effectively downloading multiple items and performing other actions as an integral process. In another implementation, after receiving the list of n entries in block 2204, the user device 104 may perform operations 2206-2214 for the first entry in the list, followed by performing operations 2206-2214 for the second entry in the list, and so on, until the user device 104 processes all of the n entries.

B.4. Illustrative Content Delivery Module

B.4.a. Overview of the Content Delivery Module

Figure 23:
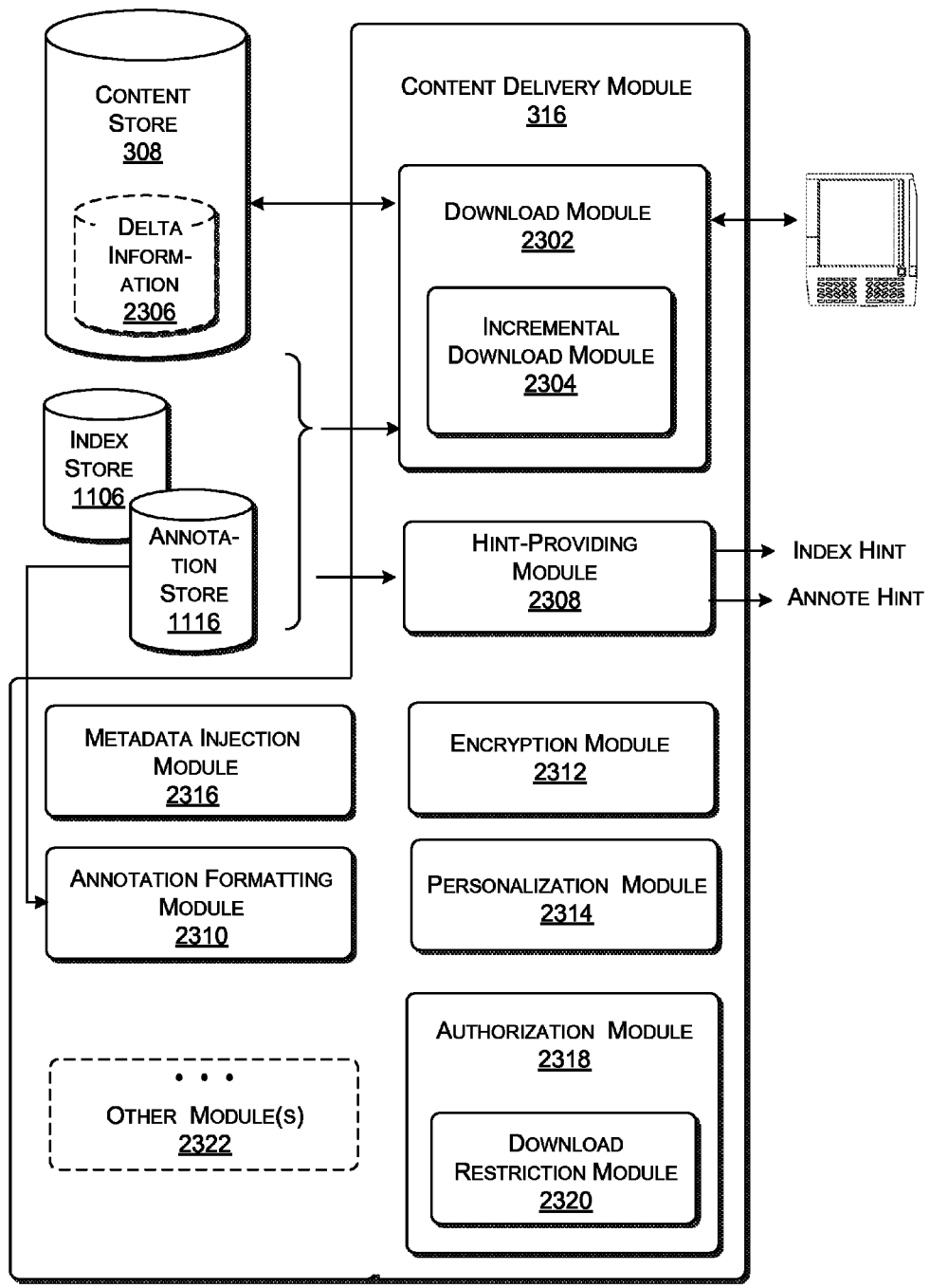
FIG. 23 shows an illustrative content delivery module for use in the IPS of FIG. 3.

FIG. 23 provides additional details regarding the server-side content delivery module 316. The server-side content delivery module 316 performs a host of functions relating, in part, to the delivery of items to the user device 104 upon its request.

To begin with, the content delivery module 316 includes a download module 2302. The download module 2302 coordinates with the CD interaction module 2106, receiving requests for items from this module 2106, and, if possible, delivering the requested items to the CD interaction module 2106. The download module 2302 retrieves the requested items from the content store 308. The download module 2302 also may retrieve supplemental information from the index store 1106 and the annotation store 1116. The index store 1106 stores an index (if available) for an item being requested. The annotation store 1116 stores backup annotations (if available) for an item being requested.

The download module 2302 may include an incremental download module 2304, which retrieves delta information from a delta information store 2306. The purpose of the download module 2302 is to download, if possible, a delta version of requested content, rather than the full version of the requested content. A delta version of requested content corresponds to the difference between a device-side version of the requested content and a current version of the requested content. More specifically, the delta information store 2306 provides various delta files, each file corresponding to a difference between a potential device-side version of requested content and the current version of the requested content (where what is regarded as the current version changes with the reception of each new version). In general, the download module 2302 attempts to forward a delta version of the requested content (selected from a collection of delta files in the delta information store 2306), rather than the entire content, to reduce the amount of information that is transmitted from the IPS 102 to the user device 104. So as not to unduly complicate the discussion of FIG. 23, the details of the incremental update process will be provided at a later portion of explanation.

A number of modules of the content delivery module 316 support the download module 2302 in various respective capacities. For example, the content delivery module 316 includes a hint-providing module 2308. The hint-providing module 2308 prepares and forwards a hint which identifies whether an index exists in the index store 1106 for a particular requested item. The hint-providing module 2308 also prepares and forwards a hint which identifies whether backup annotations exist in the annotations store 1116 for a particular request item. Each hint may be expressed as a Boolean Yes-No type of field, or in some other format. The hint-providing module 2308 may send the hints along with the items provided by the download module 2302.

The content delivery module 316 also includes an annotation formatting module 2310. The annotation store 116 may store the backup annotations in a generic form in annotation store 1116. Assuming that backup annotations are available and the user device 104 requests these annotations, the annotation formatting module 2310 may convert the backup annotations from its generic form to a form which is compatible with the format of the corresponding item itself, such as the format of the eBook item itself. The download module 2302 may then forward the annotations to the user device in a desired format.

In one implementation, the annotation store 116 fully describes all types of annotations identified above. In another illustrative implementation, the annotation store 1116 only stores the locations of the annotations and the content of user notes. In this case, the annotation store 1116 may not store actual excerpts associated with highlight-type and clipping-type annotations. In one implementation, the annotation formatting module 2310 may contact the content store 308 to request excerpts based on the stored locations of the annotations. This allows the system to reconstruct highlight-type and clipping-type annotations.

The content delivery module 316 also includes an encryption module 2312. The encryption module 2312 may optionally encrypt an item to be delivered to the user device 104 for a particular user. This may comprise receiving an item from the content store 308 and applying Digital Rights Management (DRM) and/or other protection-related processing to a header of the item. The encryption module 2312 need not store an entire copy of the item in memory before applying encryption-related processing to the item. In other words, the encryption module 2312 may stream out the item to the user device 104, applying encryption to parts of the item as appropriate. In one case, the encryption module 2312 applies encryption to all items that it delivers. In another case, the encryption module 2312 applies encryption to some items (such as eBooks, subscription-related items, etc.) but not other items (such as personal items and IPS-generated messages, etc.).

The content delivery module 316 also includes a personalization module 2314. The personalization module 2314 may insert personalized information into an item prior to its being delivered to a user. For example, the item may include one or more placeholder fields. The personalization module 2314 may populate the placeholder fields with personalized information, such as the name of the user, and so forth.

The content delivery module 316 also includes a metadata injection module 2316. As the name suggests, the metadata injection module 2316 inserts metadata into the item before it is delivered to the user. The metadata may include the names of the authors of the item. As will be discussed, the content manager module 342 may display this name information to the user in one or more user interface pages. The metadata may also include information that specifies the location where the text of the item starts. This location information enables a "go to the beginning" feature that may be invoked via one or more menus provided by the user device 104. The metadata may also include a custom title for the item. This metadata allows the content delivery module 316 to present an item with a personalized message, such as "Thank You, John," in one or more pages, and so on. The last-mentioned feature overlaps with the role of the personalization module 2314 described above.

The metadata injected into the item may also include item identification information, such as a unique ID number used by the merchant store module 318 to identify the item. More specifically, in one illustrative implementation, when the content reception system 302 receives and processes content, it does not couple an ID number with the item itself in the content store 308. The content reception system 302 stores ID information elsewhere in the IPS 102. At time of delivery of a particular item, the metadata injection module 2316 may associate the item with its ID number and send out this combination of information as a package. For instance, the metadata injection module 2316 may insert ID information in the header of the item prior to delivery.

In one case, the encryption module 2312 and the metadata injection module 2316 (and/or other modules) may operate in series as discrete operations. In another case, the encryption module 2312 and the metadata injection module 2316 (and/or other modules) may operate generally as a single integrated operation. The content delivery module 316 also includes an authorization module 2318. The authorization module 2318 determines whether the user is entitled to receive the item(s) being requested. The authorization module 2318 may make reference to one more fields of authorization information to makes its decision, such as information which indicates whether a user has suitably paid for the content being requested. As explained above, for an eBook item and other a la carte selections, the authorization module 2318 may interact with the media library module 324 to determine whether the user has purchased (or is otherwise duly entitled to receive) the item. For a subscription-related item that is provided as per a subscription, the authorization module 2318 may interact with the subscription module 310 to determine whether the user is generally authorized to receive issues of a particular subscription (e.g., without making a per-item authorization inquiry).

The content delivery module 316 also includes a download restriction module 2320. The download restriction module 2320 may be implemented as part of the authorization module 2318 or a separate module. The download restriction model 2320 may optionally restrict the downloading of an item to a maximum number of devices, such as, in one illustrative case, five devices.

The above-enumerated list of modules is representative and is not exhaustive of the types of functions performed by the content delivery module 316. As indicated by the label "Other Modules" 2322, the content delivery module 316 may perform additional operations. Further, in some implementations, the content delivery module 316 may omit one or more of the modules identified in FIG. 23.

Figure 24:
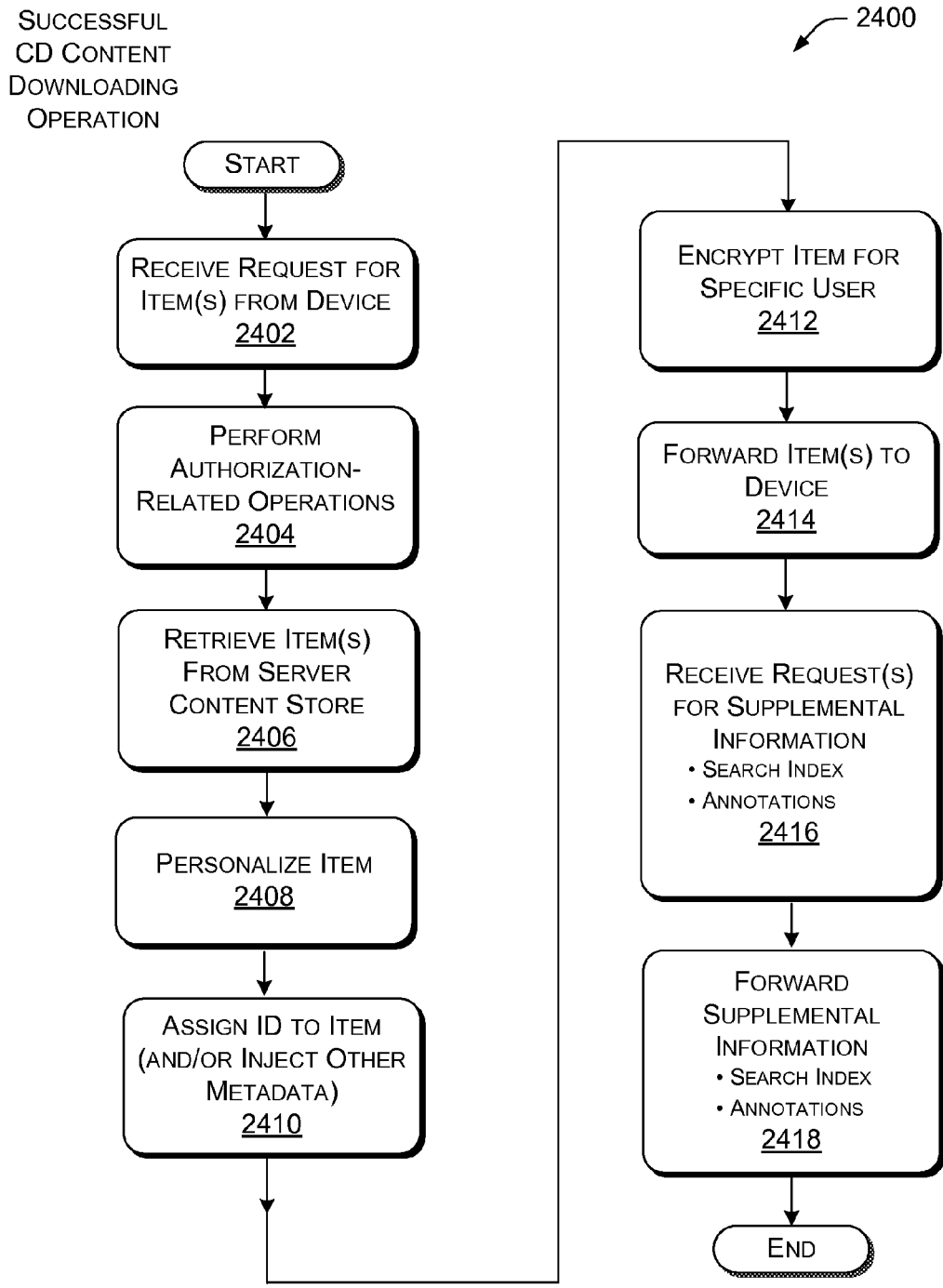
FIG. 24 is a flowchart which depicts one illustrative manner of operation of the content delivery module of FIG. 23.

FIG. 24 shows a procedure 2400 which explains one illustrative manner of operation of the content delivery module 316 in flowchart form. The order of operations illustrated in FIG. 24 may be modified in various ways. Further, one or more blocks shown in FIG. 24 may be omitted. Further, one or more operations may be performed at the same time; in this case, FIG. 24 illustrates these functions as distinct operations to facilitate explanation of these functions.

In block 2402, the content delivery module 316 receives a request from the to-do list processing module 334 for one or more items. To facilitate discussion, the flowchart will assume that the user device 104 has requested a single item.

In block 2404, the content delivery module 316 performs various authorization-related operations, e.g., as described above with respect to the authorization module 2318 and the download restriction module 2320.

In block 2406, the content delivery module 316 retrieves the identified item from the server content store 308.

In block 2408, the content delivery module 316 may optionally personalize the item, such as by inserting the user's name in a placeholder field in the item.

In block 2410, the content delivery module 316 may assign an identification number to the item and/or inject other metadata into the item.

In block 2412, the content delivery module 316 may optionally encrypt the header of each item that it delivers for a particular user. As explained above, the content delivery module 316 may apply encryption to an item without requiring that the entire item be stored in memory.

In block 2414, the content delivery module 316 may forward the prepared item to the user device 104. The items may be accompanied by hints which respectively describe whether the IPS 102 maintains an index for the item and backup annotations for the item.

In block 2416, the content delivery module 316 may receive a request for supplemental information, such as a request for a server-side index and/or a request for backup annotations.

In block 2418, the content delivery module 316 may forward the requested supplemental information to the user device 104.

In block 2410 the process assigns an identifier to the item, and may inject other metadata.

Figure 25:
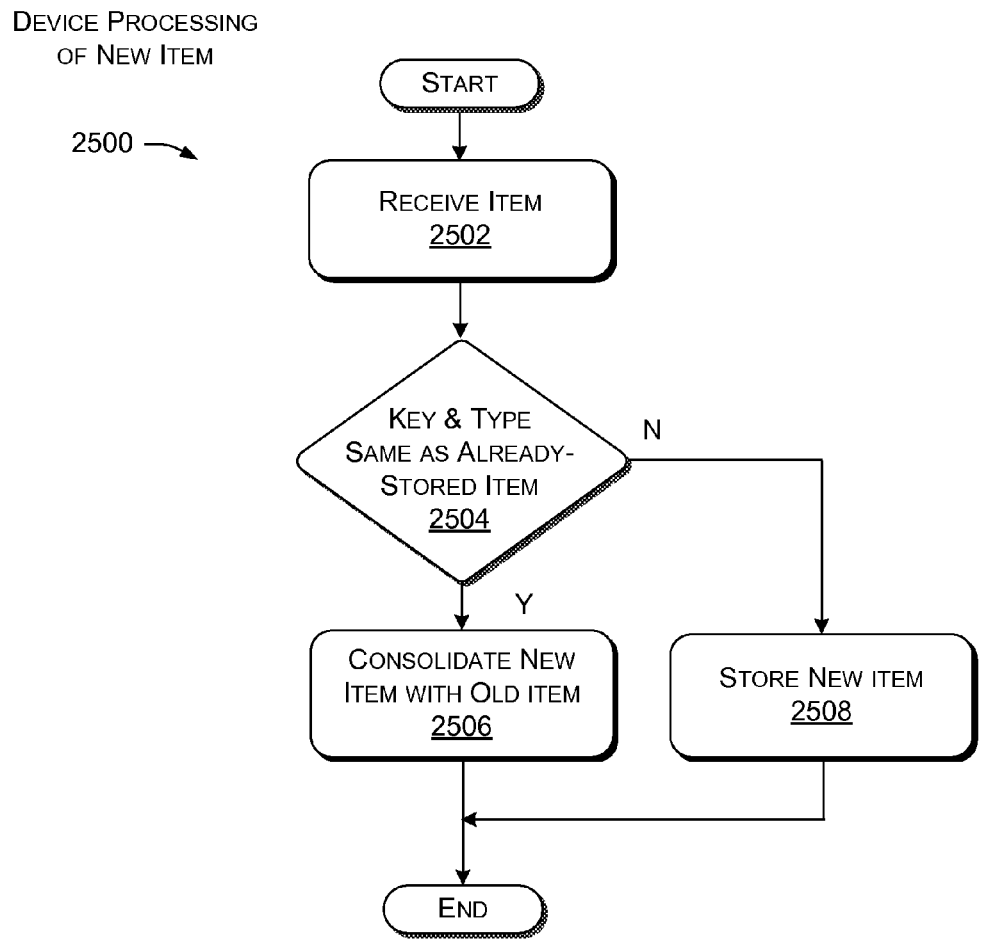
FIG. 25 is a flowchart which depicts one illustrative manner for processing items upon receipt by the user device.

FIG. 25 shows an illustrative procedure 2500 which explains one manner in which the user device 104 may process an item upon receipt.

In block 2502, the user device 104 receives a requested item. The item corresponds to a specific type of content, which may be an eBook item, a subscription-related item, a bundle of answers to a user's query, and so on. The item may also be represented by one or more identification numbers, also known as keys. In one case, each edition or issue of a subscription-related item is assigned a unique identification number.

In block 2504, the user device 104 determines whether the type and key (e.g. the identification number) of the item are the same as an item that is currently stored by the user device 104. If so, for eBook items and subscription-related items, this means that the user device is now receiving a completely redundant copy of an item which it already possesses. In the case of feeds, this may mean that the user device 104 is receiving at least a new version of the feed, which may add and/or omit one or more parts with respect to a previous version of the feed. A version identifier may be used to identify the version of a received feed.

In block 2506, if the item is deemed redundant, the user device 104 may consolidate the newly received item with the previously stored item having the same type and key, thereby only creating a single record for this entry.

In block 2508, if the item is not deemed to be redundant, the user device may store the newly received item as a distinct new item. In one implementation, at this juncture, the user device 104 may also check the received hints and download the appropriate supplemental information (annotation backup information, and/or index information, etc.).

B.4.b. Illustrative Approach to Incremental Updating

FIGS. 26-29 describe a procedure for performing incremental updating. The general purpose of this procedure is to provide the user device with a delta version of requested item, rather than the full version of the requested item, if possible. A delta version of a requested item expresses the difference between a version of the content that is already possessed by the device (e.g., a "device version") and a current version of the content. Upon receipt of the delta version, the device constructs the full version of the requested item by integrating (e.g., patching) the delta version of the item into the existing prior (device) version. The procedure attempts to provide a delta version of the requested item to the user device 104 to help reduce the amount of information being transmitted from the IPS 102 to the user device 104, and the cost associated therewith (particularly with regard to wireless communication costs).

Figure 27:
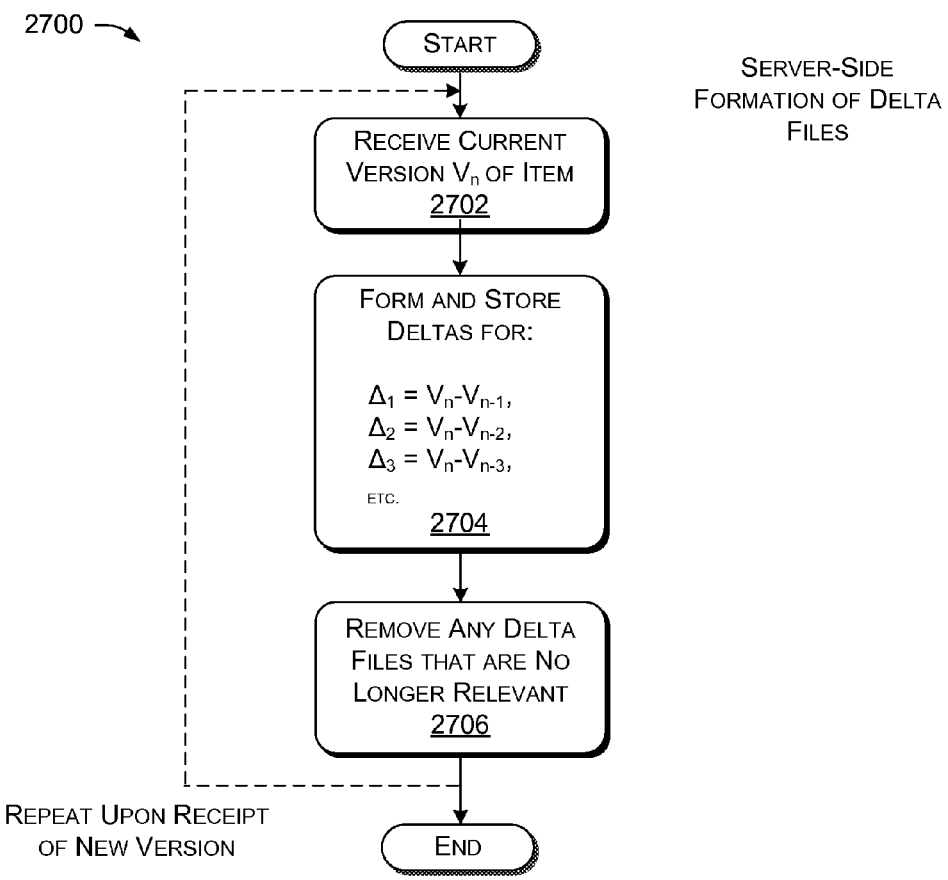
FIG. 27 is a flowchart which depicts an illustrative delta-forming operation performed by the content delivery module of FIG. 23 for forming a plurality of delta files.
Figure 28:
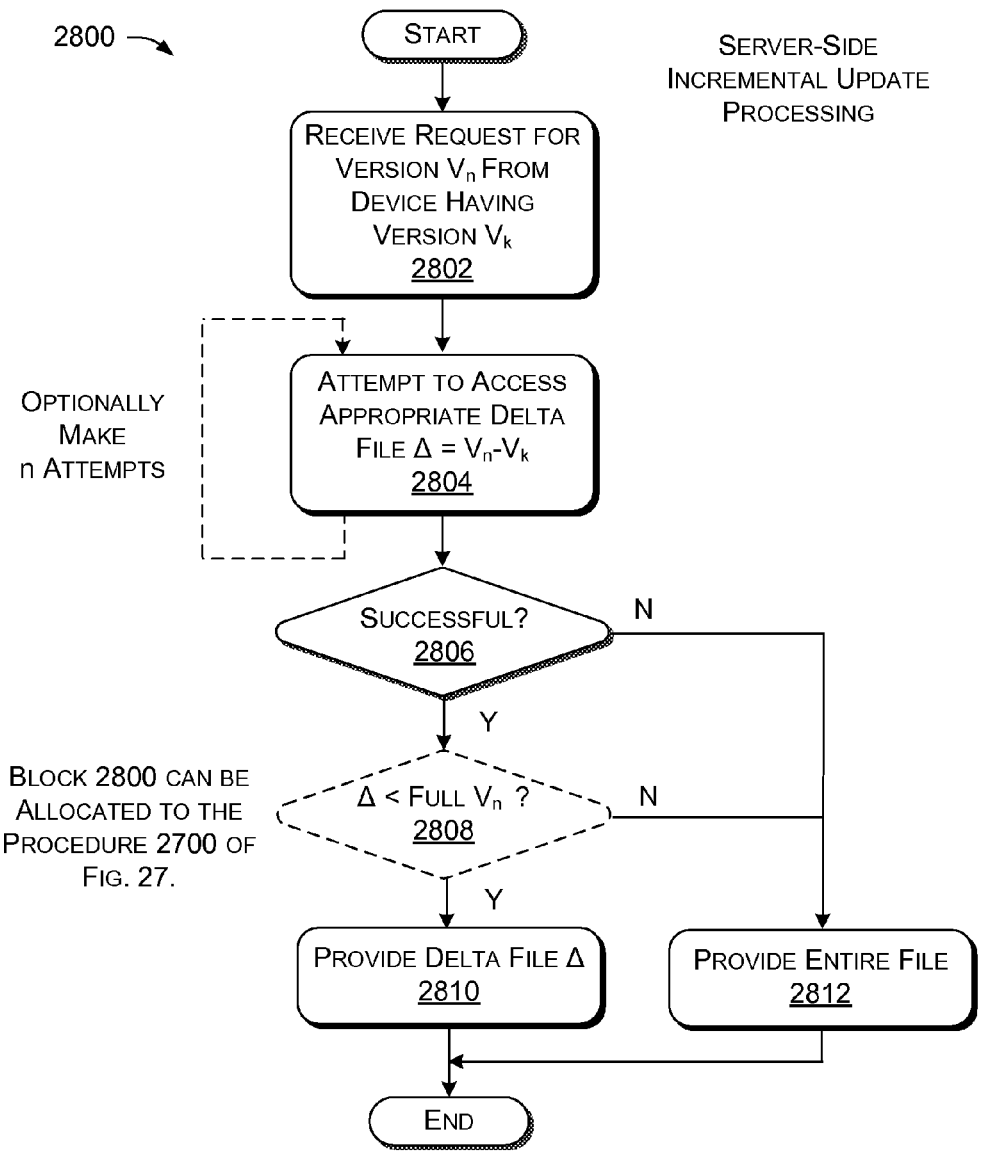
FIG. 28 is a flowchart which depicts an illustrative server-side incremental update operation performed by the content delivery module of FIG. 23, utilizing the delta files generated by the procedure of FIG. 27.

The incremental update operation takes place on both the IPS 102 and the user device 104. These two operations occur independently of each other, but these operations also complement each other. FIGS. 27 and 28 describe the incremental update procedure from the standpoint of the IPS 102, while FIG. 29 describes the incremental update operation from the standpoint of the user device 104.

Figure 26:
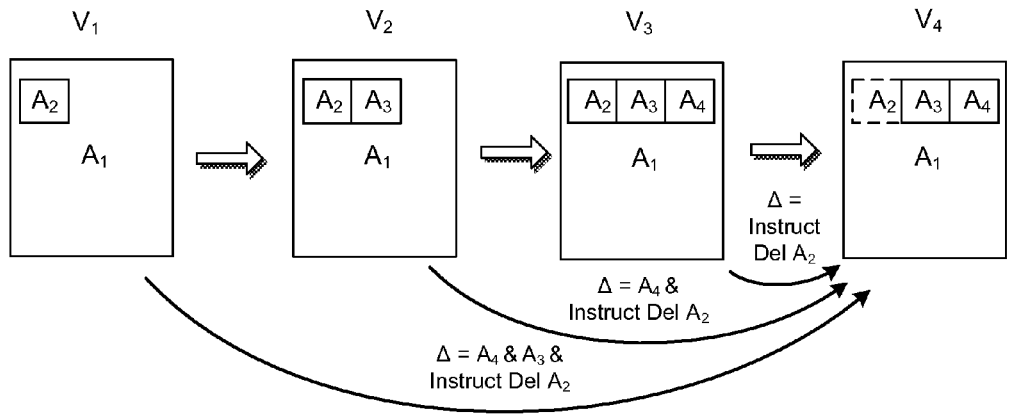
FIG. 26 depicts a succession of versions, with each version differing from its preceding version in one or more respects.

Starting with FIG. 26, this figure shows an overview of one scenario in which it may be appropriate to perform an incremental update. In this case, the user has subscribed to receive a feed. A feed corresponds to a collection of informational parts which are supplied to the user at predetermined times (e.g., hourly) or in response to other triggering events. Consider, for example, the case of a feed which provides headline news stories. Such a feed may forward a list of the top ten news stories every hour. If a collection at time n has prescribed reference content, then a collection at time n+1 may be viewed as a later "version" of the content at time n.

One version of a feed may contain one or more parts that are shared in common with an immediately prior version of the feed. In the case of a news feed, the top ten news stories at 2:00 PM on a particular day may include many of the same news stories identified at 1:00 PM. And perhaps all of the news stories may be the same. In this circumstance, it is desirable to download only the delta version of 2:00 PM news feed. The delta version of the news feed identifies only those parts of the 2:00 PM news feed which are different than the 1:00 PM news feed. A current version of content may differ from a prior version of the content in at least two respects. First, a current version of the content may add one or more parts that are not present in a prior version of the content. Second, a current version of the content may, in addition or alternatively, remove one or more parts that are present in a prior version of the content.

FIG. 26 represents an evolution in a sequence of content, from version $V_1$ to version $V_4$. Version $V_4$ represents a current version of the content at a most current point in time. In version $V_1$, the content includes base part $A_1$ and supplemental part $A_2$. In version $V_2$, the content includes base part $A_1$ and supplemental parts $A_2$ and $A_3$. In version $V_3$, the content includes base part $A_1$ and supplemental parts $A_2$, $A_3$, and $A_4$. Finally, in version $V_4$, the content includes base part $A_1$ and supplemental part $A_3$ and $A_4$, yet now omits part $A_2$ which was present in version $V_3$.

The illustrative strategy adopted by one implementation of the incremental update procedure is to compile, in advance, delta files which express the difference between the current version (e.g., $V_4$) and each prior version. For instance a first delta file expresses the difference between version $V_4$ and version $V_3$. This delta file consists of simply an indication that part $A_2$ has been removed. A second delta file expresses the difference between version $V_4$ and version $V_2$. This delta file consists of an instruction that part $A_2$ has been removed, together with the information contained in part $A_4$ (which has been added, relative to version $V_2$). A third delta file expresses the difference between version $V_4$ and $V_1$. This delta file consists of an instruction that part $A_2$ has been removed, together with the information corresponding to parts $A_3$ and $A_4$ (which were added, relative to version $V_1$). In the delta files, the parts that have been omitted need not be reproduced; a reference to the omitted parts will suffice.

In an application phase of the incremental update procedure, the content delivery module 316 determines the identity of the item that the user is requesting and determines whether the user has a prior version of the requested content, such as version $V_3$, version $V_2$, version $V_1$, etc. Without limitation, in one case, the user device 104 may inform the content delivery module 316 of the version of the content that it possesses (if any) in header information included in the requests that it sends to the IPS 102. The content delivery module 316 first makes an attempt to access the delta file which expresses the difference between the current version of the requested content and the device version of the requested content. If this delta file may be obtained, and if it is determined that it is more efficient to send the delta file as opposed to the whole file, then the content delivery module 316 sends the delta file, rather than the entire requested item. Else, the content delivery module 316 sends the entire requested item. As mentioned, the user device 104 performs a parallel analysis, first requesting a delta file. If the user device 104 does not receive and successfully process the delta file in due course, it may ask for a full version of the requested item.

Figure 29:
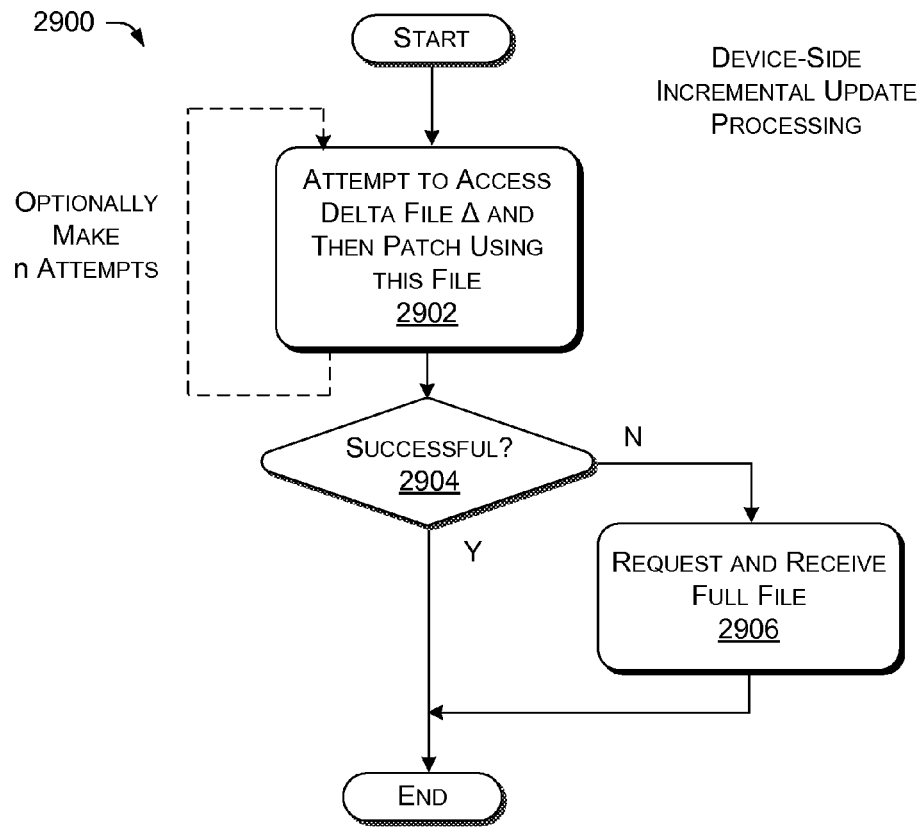
FIG. 29 is a flowchart which depicts an illustrative device-side incremental update operation which complements the server-side procedure of FIG. 28.

FIGS. 27-29 formalize the above explanation in flowchart form. Starting with FIG. 27, this figure illustrates a procedure 2700 for forming delta files. This operation may be performed by the IPS's content delivery module 316 as a background process, and, in particular, by the incremental update module 2304 shown in FIG. 23.

In block 2702, the content delivery module 316 makes note of the receipt of a new version of content, such as a new edition of a feed, a new edition of a newspaper item, and so on.

In block 2704, the content delivery module 316 forms a series of delta files, expressing the difference between the current version $V_n$ and a series of prior versions, $V_{n-1}$, $V_{n-2}$, $V_{n-3}$, and so forth. The content delivery module 316 may apply various rules to determine how many delta files it should compute. In one case, the delivery module 316 may cap the number of delta files at a predetermined number. Recall that the objective is to download a requested item to the user in the most efficient manner. As such, in another case, the delivery module 316 may stop forming delta files when it determines that the delta file becomes so large and/or complex that it may be more efficient to download the entire item rather than a delta file. The content delivery module 316 may store the delta files in a delta file store 2306 (shown in FIG. 23). The delta files may be stored with their corresponding full items or otherwise linked to their corresponding full items by reference information. In block 2706, the content delivery module 316 may remove any delta files from a previous iteration that are no longer relevant. For instance, in a previous iteration of the procedure, the version $V_{n-1}$ was the most current version of the item, and all of the delta files were compiled with reference to this version. In one implementation, the content delivery module 316 may delete all of these stale delta files, based on the presumption that the user will want the most current version of the requested item.

FIG. 28 shows a procedure 2800 which represents the application phase of the incremental update procedure, in which a user device makes a specific request for an item, corresponding to requested content. The incremental update module 2394 of the content delivery module 316 may be used to perform the procedure 2800.

In block 2802, the content delivery module 316 receives a request for an item. The content delivery module 316 may determine whether the user device 104 has a prior version $V_k$ of the requested content through various mechanisms, such as by reading the version information from a header of the user device's HTTP requests.

In block 2804, the content delivery module 316 attempts to access a delta file corresponding to the difference between the current version $V_n$ and the device's version $V_k$. In one case, the content delivery module 316 may make n attempts to access this delta file, such as, without limitation, 3 attempts.

If the content delivery module 316 is successful in accessing the delta file (as determined in block 2806), it may provide the delta file in lieu of the full version. Namely, in block 2810, the content delivery module 316 sends the delta file as opposed to the full item. Otherwise, in block 2812, the content delivery module 316 sends the entire item.

The above-described manner of operation is based on the assumption that the delta-forming procedure 2700 of FIG. 27 is operative to store delta files for only those cases in which it deems it more efficient to transmit a delta file, rather than the entire version. In this case, if procedure 2800 does not find a corresponding delta file, it proceeds by immediately accessing and downloading the full version. In other cases, the determination of whether it is more efficient to send the delta file as opposed to the entire version may be performed as part of the download process of FIG. 28, e.g., as indicated by the optional decision block 2808. Regardless of what juncture the delta-vs-full decision is made, this decision may be based on a number of factors:

First, the size of the delta file relative to the entire item is relevant. If the delta file is larger than the entire item, then it makes no sense to transmit the delta file in lieu of the entire item. In this case, the content delivery module 316 will decide to transmit the entire file.

Second, the decision process may take into consideration the fact that the entire item may be better compressed (and/or encrypted) compared to the delta file. Thus, in determining relative size, the decision process may examine the compressed size of the delta file relative to the compressed size of the entire item.

Third, there is a finite amount of item required to patch the delta file into a pre-existing version at the user device, and to perform other operations that are uniquely associated with processing the delta file (as opposed to the entire item). The decision process may choose to take these time lag considerations into account when deciding whether it is more efficient to transmit the delta file as opposed to the entire item.

FIG. 29 shows a procedure 2900 which sets forth a complementary incremental update operation performed by the user device 104. The incremental update module 2110 and error handling module 2112 of FIG. 21 may be used to perform this procedure 2900.

In block 2902, the user device 104, as a default rule, attempts to access a delta file version of a requested item. If successful, the user device 104 attempts to patch the delta file into the version of the content that it currently possesses. The user device 104 may optional make a predetermined number n of attempts to perform this operation.

In block 2904, the user device 104 determines whether or not it is successful in obtaining the requested item as a delta file patch. If it is successful, the process ends. If it is not successful, in block 2906, the user device 104 may request the entire item. The user device 106 may apply other considerations (rather than, or in addition to, success/failure-type considerations) in determining whether to download a delta file or a full item.

To repeat, the server-side content delivery module 316 may perform its incremental updating operation (as per procedure 2800) in parallel with the user device 104, which performs its own incremental updating operation (as per procedure 2900). Either the IPS 102 or the user device 104 may decide to abandon its attempts to retrieve the delta file version of the requested item.

B.5. Delivery Management Functionality

B.5.a. Overview of the Delivery Management Functionality

In the examples developed above, the IPS 102 operates by receiving an item, adding an entry to an appropriate to-do queue (in the case of a subscription-related item), and then sending out a TPH signal to notify the user device to access the entry and subsequently download the corresponding item. This section describes various management functions designed to make this general process more efficient and/or to achieve other goals.

Figure 30:
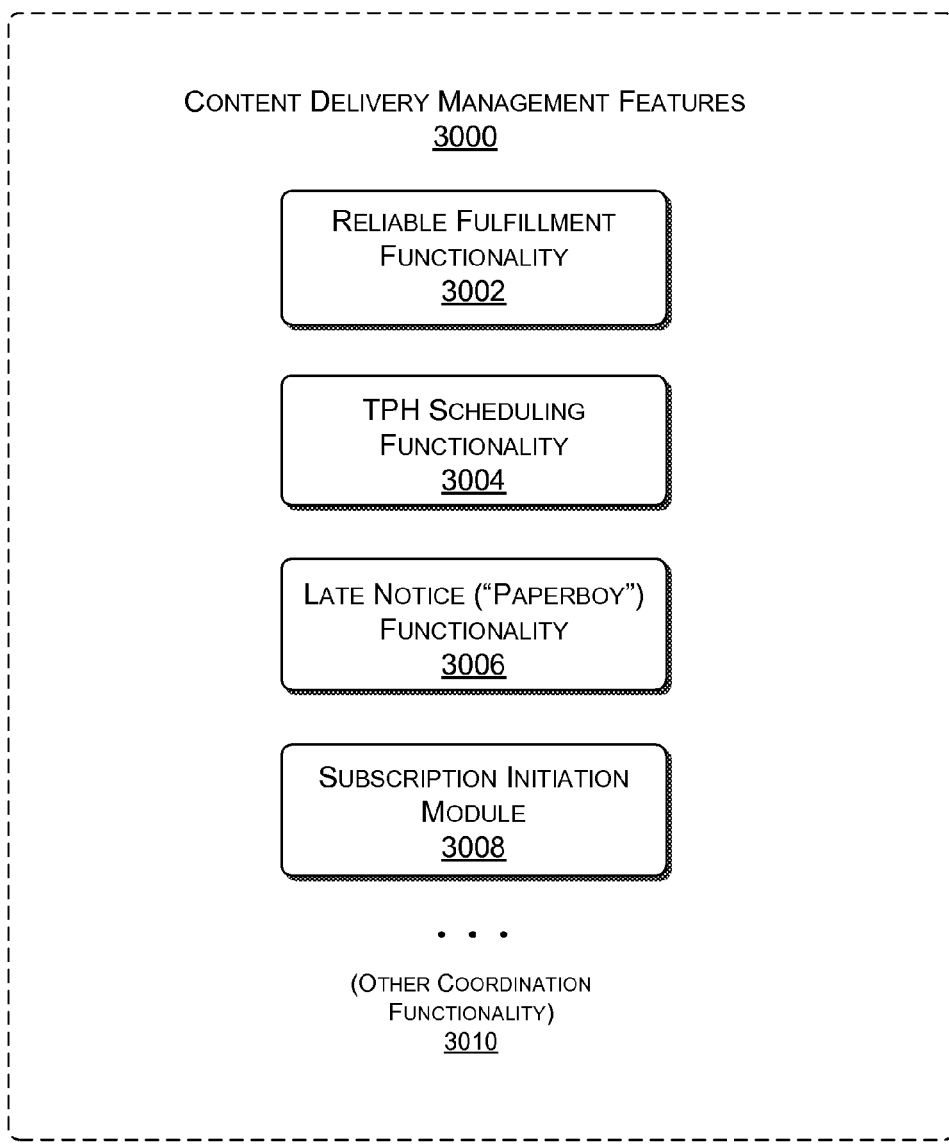
FIG. 30 shows various content delivery management features which may be used in the systems of FIGS. 2 and 3.

FIG. 30 shows a collection of content delivery management features 3000. A first feature corresponds to reliable fulfillment functionality 3002. The reliable fulfillment functionality 3002 operates by performing delivery-related processing in advance of the point in time at which an item is ready to be delivered to a user device. Such prefatory processing may comprise adding an entry to the device's to-do queue prior to the point in time at which the item is ready to be delivered.

A second feature corresponds to TPH scheduling functionality 3004. The TPH scheduling functionality 3004 generally attempts to schedule the transmission of TPH signals to reduce the power consumed by the user device 104. More specifically, it is relatively expensive (from the standpoint of the consumption of power) for a user device wake up and act on a TPH signal (e.g., by receiving entries from a to-do queue and downloading items, etc.). In one representative case, such an event consumes about 1 percent of the total capacity of the battery life. To address this situation, the TPH scheduling functionality 3004 may not send a TPH signal for every reportable addition made to the to-do queue, but rather, combine multiple reportable events together and send out a single TPH signal. The TPH scheduling functionality 3004 applies other considerations in determining when and how to send out TPH signals, as will be described in greater detail below. In one implementation, the TPH scheduling functionality 3004 may be implemented as a feature of the notification module 1808.

A third feature corresponds to late notice functionality 3006, also known as paperboy functionality. The late notice functionality 3006 determines that a publisher is late in providing a subscription-related item to the IPS 102. In response, the late notice functionality 3006 may identify all of the recipients of the item. The late notice functionality 3006 may prepare and send out personalized late notices to the recipients.

A fourth feature corresponds to subscription initiation functionality 3008. The subscription initiation functionality refrains from starting the subscription until the user first turns on the device and contacts the IPS 102. This provision may apply to both fee-based and free subscriptions.

The above-enumerated list of features is representative and is not exhaustive of the types of functions performed by the IPS 102. As indicated by the label "Other Coordination Functionality" 3010, the IPS 102 may include additional management features. The IPS 102 may also omit or disable one or more of the features shown in FIG. 30.

The following subsections describe each of the features in greater detail.

B.5.b. Illustrative Reliable Fulfillment Functionality

Figure 31:
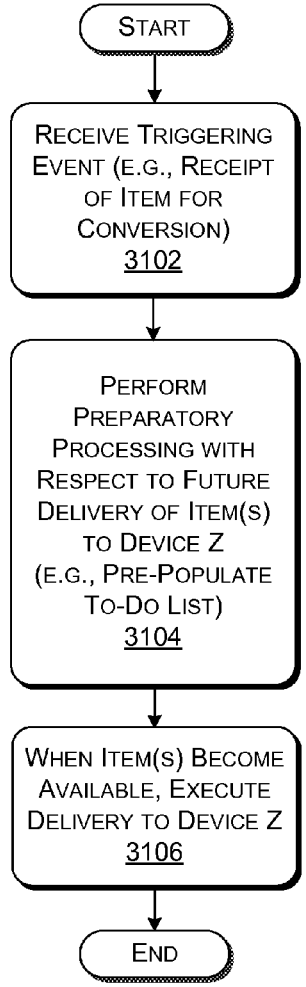
FIG. 31 is a flowchart which depicts an illustrative manner of operation of reliable fulfillment processing functionality identified in FIG. 30.
Figure 32:
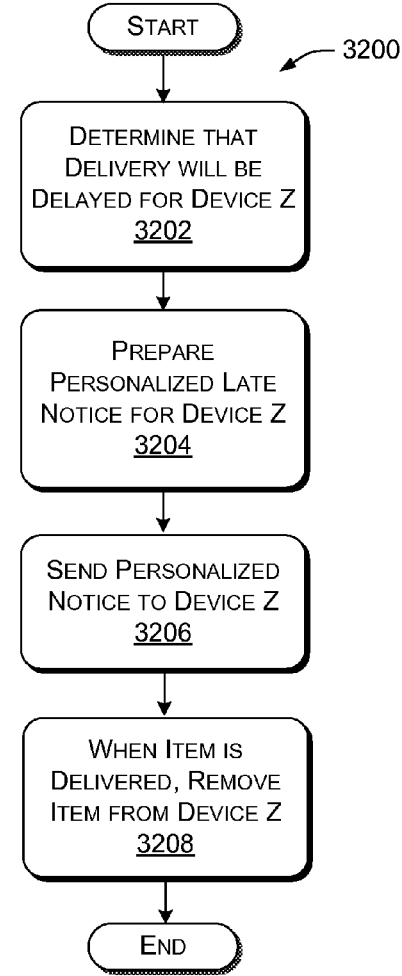
FIG. 32 is a flowchart which depicts an illustrative manner of operation of late notice functionality identified in FIG. 30.

FIG. 31 is a flowchart which shows a procedure 3100 for implementing the reliable fulfillment functionality 3002, introduced above.

In block 3102, the reliable fulfillment functionality 3002 receives a triggering event which commences the reliable fulfillment processing. The event may correspond to the receipt of a subscription-related item, and so on.

In block 3104, the reliable fulfillment functionality 3002 performs prefatory processing in preparation for sending out a TPH signal to one or more devices which are registered to receive the item. In one case, the reliable fulfillment functionality 3002 may store an entry in the to-do queue associated with a device which is scheduled to receive the item. At the time that the reliable fulfillment functionality 3002 adds the entry to the to-do queue, the content reception module 302 may be converting the item, so that, at this time, the item is not yet ready to be forwarded to the user device. To prevent the to-do list server module 314 from prematurely sending out a TPH signal upon adding an entry to a queue, the entry may be tagged with a flag which identifies it as not ready to be sent. This mechanism may also optionally effectively conceal the entry from the list of entries that the device sees when it requests entries as part of the download process (e.g., in block 2204 of FIG. 22).

In block 3106, the reliable fulfillment functionality 3002 allows the TPH signal to be sent to the recipient device when the item is ready to be sent. In the case of the above-described subscription-related item, the reliable fulfillment functionality 3002 determines when the content reception system 302 is finished converting the content and storing it in the content store 308. At this time, the reliable fulfillment functionality 3002 may change the status of the entry in the to-do queue to indicate that a TPH signal may be sent to the user device.

The reliable fulfillment functionality 3002 may perform other types of prefatory actions. In general, the prefatory actions expedite the delivery of items, as these operations may be performed in parallel with other operations and/or when the parts of the IPS 102 are otherwise idle or not fully engaged.

B.5.c. Illustrative Late Notice Functionality

FIG. 31 is a flowchart which shows a procedure 3200 for implementing the late notice functionality 3006, introduced above. The procedure 3200 is described with respect to a particular subscription-related item, but the procedure 3200 may be repeated in aggregate for a collection of subscription-related items and/or other types of items.

In block 3202, the late notice functionality 3006 determines that a publisher or other source is late in providing a subscription-related item to the IPS 102. Or the late notice functionality 3006 may determine that there is some other source of delay with respect to an item. The late notice functionality 3006 may make this determination based on information regarding when an item is normally received. Such information may be expressed by manually-entered timing information. If the late notice functionality 3006 determines that a predetermined amount of time has elapsed beyond the expected receipt of the item, then it may identify the item as being late. The late notice functionality 3006 may glean information regarding the expected receipt of an item from various sources, such as from the administrators of the IPS 102, from the publisher itself, and so on. Alternatively, or in addition, the late notice functionality 3006 may compile empirical norms which reflect the typical timing at which the item is received and processed. In making lateness determinations, the late notice functionality 3006 may take into consideration the time zones in which user devices receive content. For example, a first late threshold may apply to a user who is operating his user device on the East Coast of the United States, while a second late threshold may apply to a user who is operating his device on the West Coast. The difference in thresholds may account for the fact that there may be less time to react to a delayed delivery on the East coast compared to the West coast. More specifically, assume that a newspaper normally arrives at 4:00 AM, East Coast time. A delay in delivery is more of a concern for East Coast users than West Coast users because the East Coast users will be waking before the West Coast users and expecting to receive their newspapers with breakfast.

In block 3204, assuming that it is determined that an item is late, the late notice functionality 3006 may send out a late notice to each user who is scheduled to receive this item. The late notice functionality 3006 may consult the subscription module 310 to determine the set of users who are scheduled to receive the item. The late notice functionality may optionally personalize the late notices provided to users, such as by inserting the users' names into placeholder fields in a generic late notice message. The late notice message may also be customized to identify the name of the late publication, the date of the late issue, and so on.

In block 3206, the late notice functionality 3006 sends out the late notices to appropriate users. The late notice functionality 3006 may take into consideration the respective time zones of subscribers by sending out late notices at appropriate times.

In one case, the late notice functionality 3006 may send the late notices as documents, e.g., like any other type of items described above. The late notice functionality 3006 may deliver the late notices by adding GET-type entries in appropriate to-do queues. In another implementation, the late notice functionality 3006 may send special commands in the to-do queues. These commands prompt the user devices, upon receipt of the commands, to display an appropriate pop-up message or the like, informing the users that the items will be delivered late. The late delivery module 3006 may optionally send a staggered series of late messages upon continued failure to deliver the item, with each message including an appropriate escalation of apologies, remedies, and the like.

In block 3208, when (and if) the late issue is delivered, the late notice functionality 3006 may remove the late notice item from the user devices (e.g., by sending a DEL-type command to the user devices via corresponding to-do queues). This provision gives the IPS 102 an opportunity to avoid confusion for a user who opens her device to see both a delivered item and a notification that the item is late.

B.5.d. Illustrative Telephone Home (TPH) Functionality

FIG. 33 is a flowchart which shows a procedure 3300 for implementing the TPH scheduling functionality 3004, introduced above. Recall that one illustrative goal of the TPH scheduling functionality 3004 is to schedule TPH signals to reduce the number of times that a user device needs to power on, receive the TPH signals, and download entries and items. The TPH scheduling functionality 3004 achieves this result, in part, by aggregating multiple TPH signals into a single TPH signal based on various rules, and/or by adjusting the timing when TPH signals are sent out. The procedure 3300 will be described with respect to an illustrative to-do queue associated with a particular user device, although the operations set forth here may be performed for a plurality of to-do queues and associated user devices. In one implementation, the TPH scheduling functionality 3004 may be implemented as a feature of the notification module 1808.

In block 3302, it is assumed that a user's to-do queue contains at least one entry. If so, in block 3302, the TPH scheduling functionality 3004 determines whether it is appropriate to send a TPH signal to the user device, or to defer such a message until some time later. The to-do list server module 314 may refrain from sending a TPH signal for an entry in a to-do queue by flagging this entry with a non-send status. The status may be changed when the to-do list server module 304 wishes to send out the TPH signal.

In making its decision, the TPH scheduling functionality 3004 may rely on any one of the following considerations or any combination of the following considerations. Many of the considerations include aspects which intersect with other considerations.

- The TPH scheduling functionality 3004 may consider one or more time-related factors in deciding when to send a TPH signal, such as time-of-day information. For instance, the TPH scheduling functionality 3004 may be more willing to send a TPH signal during the daytime hours rather than at night if it is likely that the user is already using the device 104 during the day; in this case, sending the TPH signal may not cause the device to power up, since the device may already be powered up. On the other hand, the TPH scheduling functionality may be more willing to send a TPH signal during the night rather than the day if there is a significant cost savings to conducting wireless communication at night, rather than during the day. In another application of time-related considerations, the TPH scheduling functionality 3004 may be configured to send a single TPH signal every t interval of time, such as every half hour, every hour, and so on (providing that at least one TPH-sending event has been registered in the interval t).

- The TPH scheduling functionality 3004 may consider the type of item as significant in determining when to send a TPH item. For instance, a user who expressly purchases an eBook is likely to be relatively interested in receiving this item soon after his or her purchase, since the user made an express request for the item, and furthermore, this express action is a recent event. On the other hand, a recipient of a journal or blog may be less concerned with receiving an issue immediately after it becomes available, as there is less compelling evidence that the user remains actively interested in this material. As such, the TPH scheduling functionality 302 may send a TPH item for the eBook soon after the user makes a purchase. But the TPH scheduling functionality 3004 may delay sending the TPH signal upon the automated reception of a subscription-related item. More generally stated, the TPH scheduling functionality 3004 may assign different priorities to item types. The TPH scheduling functionality 3004 may then consider the priority of the items in a to-do queue as one factor in determining how quickly to send out a TPH signal. To cite another example, upgrade functionality at the IPS 102 may add an entry to a device's to-do queue that instructs the device to download an instruction-bearing update. This entry may be earmarked as a very high priority item, demanding that a TPH signal be sent immediately.

- The TPH scheduling functionality 3004 may also consider the length of time that an entry has been stored in a to-do queue in determining when to send a TPH signal. The TPH scheduling functionality 3004 may not wish to delay sending out a TPH signal for too great an amount of time.

- The TPH scheduling functionality 3004 may also consider the prior behavior exhibited by the user in determining whether to download a TPH signal. More specifically, in one case, the TPH scheduling functionality 3304 may consider the aggregate behavior of many users, based on the presumption that this behavior may likewise apply to a particular user. In another case, the TPH scheduling functionality may alternatively, or in addition, consider the unique behavior of a particular user. To cite one example, a particular user may have unique patterns of behavior, such that the user operates her user device at one time of day but not another. The TPH scheduling functionality 3004 may also identify patterns in the types of actions that the user typically performs in the course of a day. Based on these considerations, the TPH scheduling functionality 3004 may send a TPH signal during a time at which the user is expected to be already using the device, and thus operating the device in a powered-up state. According to another example, users generally, considered in aggregate, may wish to receive certain types of content at certain times of day. For instance, users may wish to read newspapers before leaving for work. In this case, the TPH scheduling functionality 3004 may attempt to send THPs prior to 5:00 AM, but the TPH scheduling functionality 3004 need not otherwise send TPH signals throughout the night while the users are presumed to be sleeping.

The TPH scheduling functionality 3004 may also collect information regarding a user's current use of the device 104. For instance, the TPH scheduling functionality 3004 may determine the user has plugged the user device 106 into a permanent power source (such as an AC power outlet or the like). The TPH scheduling functionality 3004 is more apt to send a TPH signal to the user device if it may be determined that a user has plugged the device 104 into a non-exhaustible source of power. The TPH scheduling functionality 3004 may also receive information which reveals the battery level of the user device 104. The TPH scheduling functionality 3004 may be more reluctant to send a TPH signal if the battery state of the device is low.

The TPH scheduling functionality 3004 may also consider the amount of entries stored in the to-do queue. The TPH scheduling functionality 3004 may be more apt to send a TPH signal if the user's to-do queue is becoming full with unreported entries. The TPH scheduling functionality 3004 may also consider a recent rate of TPH-sending behavior.

The TPH scheduling functionality 3004 may also consider the express preferences of a user, e.g., as entered by a user via a setting-type page or the like.

The TPH scheduling functionality 3004 may also identify, for a subscription-related item, whether the user has just purchased the item. A user who has just purchased an item may be more eager to receive an issue of this item, as opposed to a user who has been regularly receiving issues for an extended period of time.

The TPH scheduling functionality 3004 may also consider the size of the item to be downloaded in determining the timing at which to send a TPH signal. For example, the TPH scheduling functionality 3004 may opt to send a TPH signal for a particularly large item at night, such as to incur smaller over-the-air download-related fees.

Still other considerations may have a bearing on the TPH scheduling decision made by the TPH scheduling functionality 3004. As a related point, note that the user device 104 may be configured such that it independently contacts the to-do server module 314 in response to various events (e.g., without being prompted to do so by a TPH signal), such as when the device powers up for any reason, and so forth. The user device may then download any entries in its queue that may be pending at that time.

In block 3304, the TPH scheduling functionality 3004 weights one or more of the above-identified factors in making a final decision whether or not to send a TPH signal. Different environments may apply different weights to these considerations, influencing which consideration may take precedence over other considerations. In one case, each user may also define the weights that apply to the sending of TPH signals, thereby controlling the relative importance of the various factors identified above.

In block 3306, the TPH scheduling functionality 3004 sends out a TPH signal, prompting the user device to retrieve the entries and download the corresponding items associated with the entries.

B. 5.e. Illustrative Subscription Initiation Functionality

FIG. 34 is a flowchart which shows a procedure 3400 for implementing the subscription initiation functionality 3008, introduced above.

In block 3402, the subscription initiation functionality 3008 determines that the user has purchased a new subscription.

In block 3404, the subscription initiation functionality 3008 delays charging the user for issues or editions of the subscription until the user actually begins downloading subscription-related items, or in response to some other consumption trigger. This measure is, in part, a courtesy to the user.

B.6. Illustrative Home Presentation Module

Figure 35:
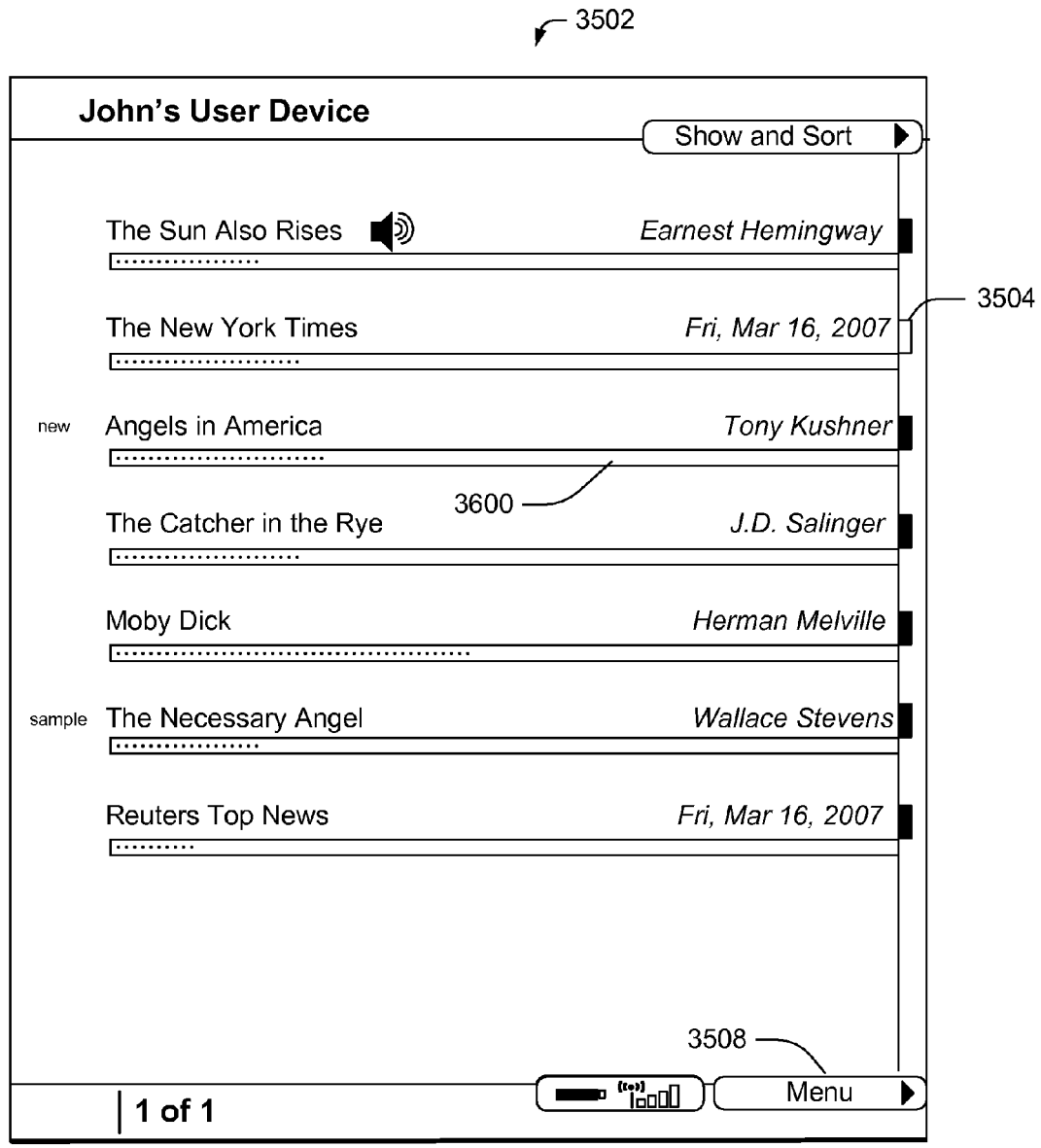
FIG. 35 is an illustrative home page produced by a home presentation module shown in FIG. 4.

The home presentation module 408 introduced in the context of FIG. 4 provides a home page through which a user may begin interacting with the user device 104. The home presentation module 408 may present a variety of information on the home page. FIG. 35 provides one illustrative implementation of a home page 3502.

The home page 3502 of FIG. 35 shows a list of various items that a user may consume using the reading device, including eBooks, audio books, personal items, subscription-related items, and so forth. Each entry in the home page 3502 includes the salient information regarding the item, such as the title of the item, the author of an eBook-type item, and so forth. Each entry includes a selector (along the right edge of the page 3502) that serves as a guide for selecting the corresponding item, thereby opening the item for viewing. A special grouping type selector 3504 indicates that the item corresponds to a subscription. By clicking on this item, the user may view a list of available issues within the subscription. Further, each entry in the home page includes a progress indicator, such as progress indicator 3506. The number of dots in the progress indicator 3506 identifies how far the user has advanced in reading the item, relative to a total length of the indicator.

The home page 3502 also includes a "Show and Sort" selection item. By clicking on this entry, the user may receive a Show and Sort menu (not shown). This menu allows the user to select a filtering criterion (or criteria) that is (or are) used to select items for presentation in the home page 3502. The user may also select a sorting criterion (or criteria) that is (or are) used to govern the order in which items are displayed on the home page 3502.

The home page 3502 also includes a menu selector 3502. Selecting the menu selector 3502 prompts the user device 104 to present the menu 3602 shown in FIG. 36. The menu 3602 allows the user to navigate to various functions performed by the user device and perform specialized tasks. One such function that may be selected via the menu 3602 is a setting option 3604.

Figure 36:
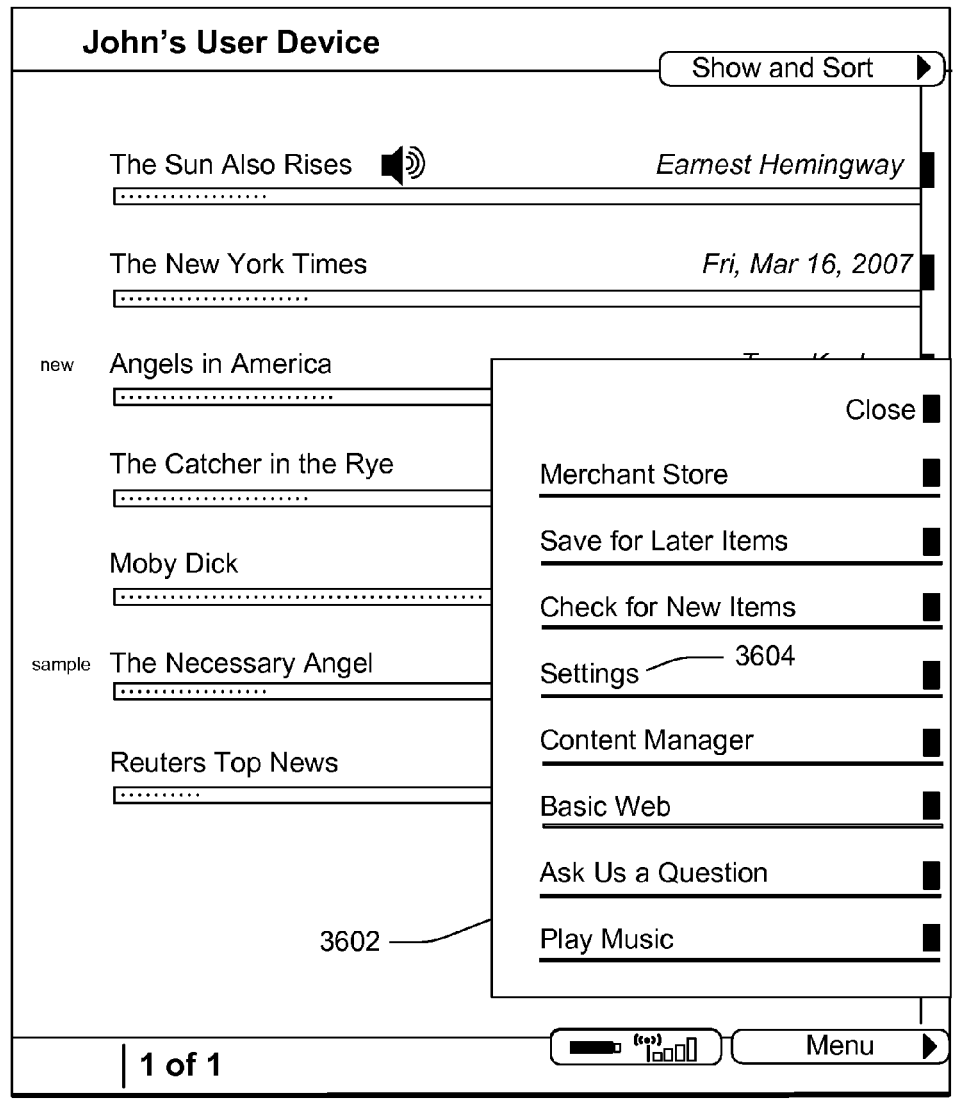
FIG. 36 is an illustrative menu provided in the context of the home page shown in FIG. 35.
Figure 37:
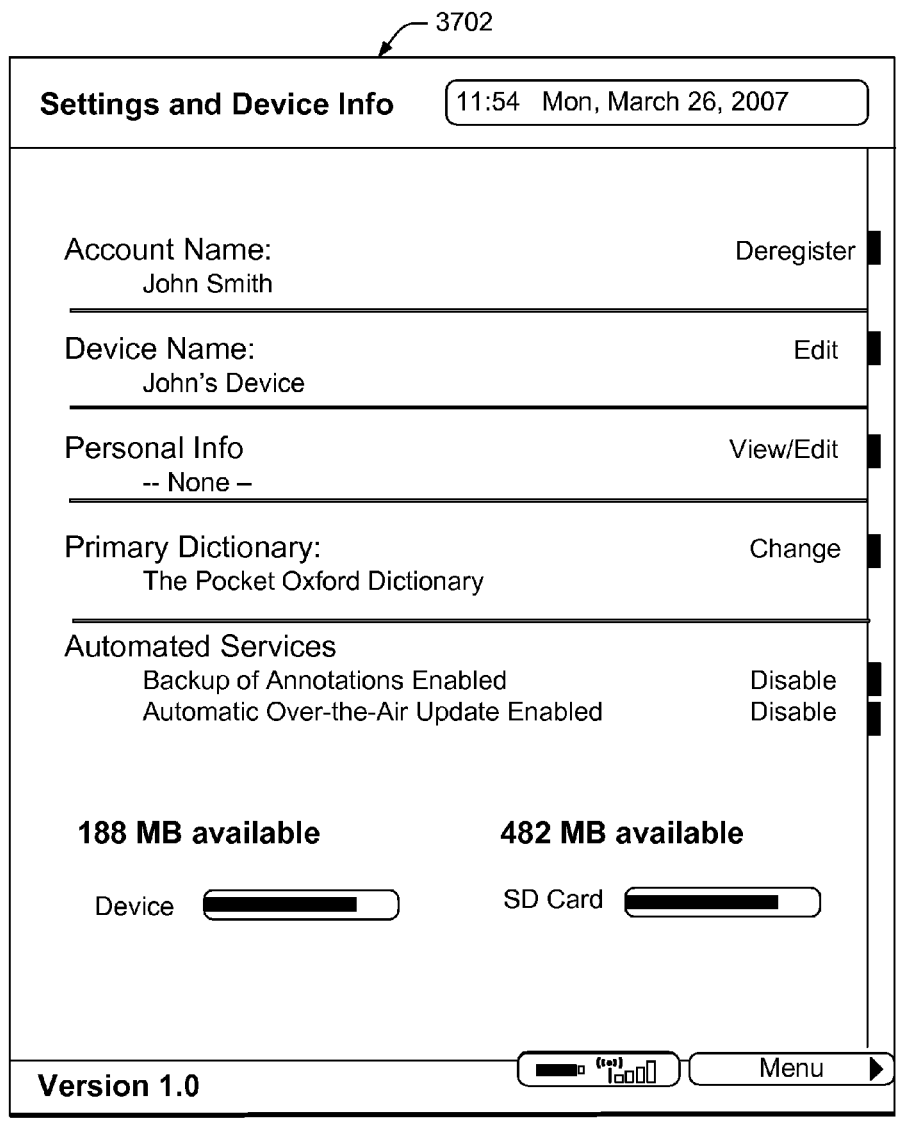
FIG. 37 is an illustrative set-up page accessed via the home page shown in FIG. 35.

By activating the setting option 3604 shown in FIG. 36, the user device 104 directs the user to a settings page 3702, shown in FIG. 37. The settings page allows the user to change various administrative settings associated with the device (such as account name, device name, etc.), as well as change various settings that govern the manner of operation of the device. The settings page 3702 also reveals the amount of storage available to store additional items.

B.7. Illustrative Merchant Store Module

B.7.a. Overview of the Merchant Store Module

Figure 38:
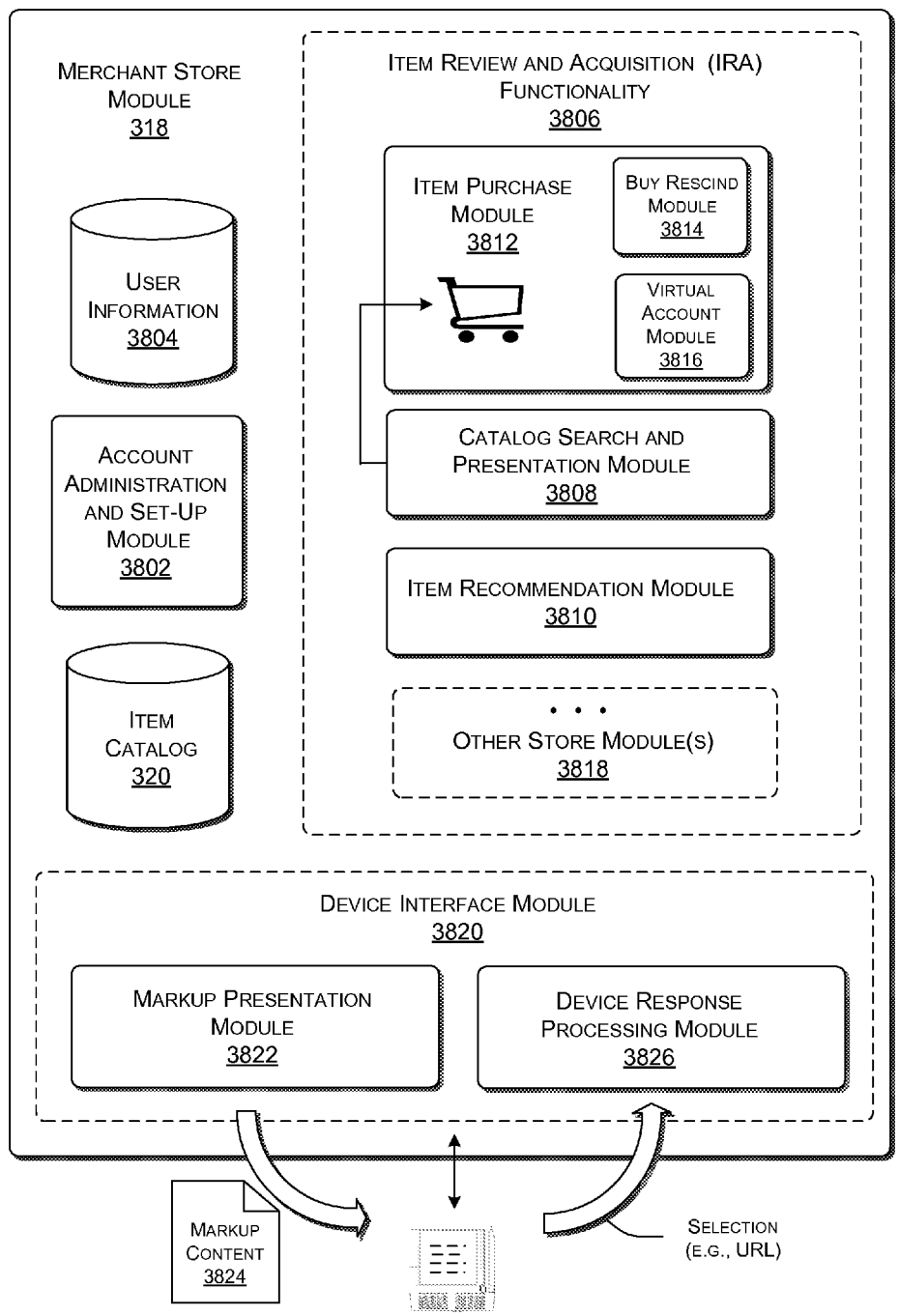
FIG. 38 shows an illustrative merchant store module for use in the IPS of FIG. 3.

FIG. 38 shows the merchant store module 318, introduced in the context of FIG. 3. By way of overview, the merchant store module 318 allows the user to search for items, purchase (or otherwise acquire) selected items, and so forth. The user interacts with the merchant store module 318 via a store interaction module 344 provided by the user device 104. The user may also interact with the merchant store module 318 via one or more alternative mechanisms, such as by using a personal computer which accesses the merchant store module 318 via a non-wireless communication mechanism (e.g., telephone or cable modem, DSL mechanism, etc.). The merchant store module 318 includes an account administration and set-up module 3802. This module 3802 allows the user to set up a user account and perform other administrative functions.

The merchant store module 318 also includes or has access to user information 3804. The user information 3804 may provide demographic information regarding the users. The user information 3804 may also provide information regarding the prior purchases and other types of selections made by the users.

The merchant store module 318 may include an item catalog 320. The item catalog 320 may include descriptions of various items that may be selected using the merchant store module 318. A description of an item in the item catalog 320 may take the form of an item detail page.

The merchant store module 318 may include Item Review and Acquisition (IRA) functionality 3806. The IRA functionality 3806, in turn, may include a catalog search and presentation module 3808; this module 3808 allows the user to review items in the item catalog 320 by entering search terms, viewing browse categories, and so on. The IRA functionality 3806 also includes an item recommendation module 3810. The IRA functionality 3806 presents one or more recommended items to the user, e.g., based on the user's prior interests (e.g., as reflected in the user information store 3804), or based on generally popular items, and so on.

The IRA functionality 3806 also may include an item purchase module 3810. The item purchase module 3812 allows the user to place items in a shopping chart and purchase (or otherwise acquire) the items. The item purchase module 3810, in turn, may include a buy rescind module 3814. The buy rescind module allows the user to rescind an item purchase in the manner described more fully below. The item purchase module 3810 may also include a virtual account module 3816. As will be described in greater detail below (in Section D), the virtual account module 3816 allows the user to make item purchases after the user has purchased (or otherwise arranged to receive) a user device, but at this point in time, the user has not yet been assigned a particular user device.

The IRA functionality 3806 may include yet additional modules, as indicated by the label which reads, "Other Store Modules" 3818. Other implementations of the merchant store module 318 may omit one or more modules shown in FIG. 38.

The merchant store module 318 may include a device interface module 3820. The device interface module 3820 generally includes functionality which allows the server-side merchant store 318 to interact with the device-side store interaction module 344. The device interface module includes a markup presentation module 3822. The markup presentation module 3822 provides a series of pages (e.g., such as representative page 3824) to the user device. The pages may be formulated in any markup language or any other format. The device presentation interface module 3820 may also include a device response processing module 3826. The device response processing module 3826 receives responses from the users who interact with the pages provided by the markup presentation module 3822. For example, the users may select links in pages provided by the markup presentation module 3822. The user's selections are conveyed back to device response processing module 3826 using the HTTP protocol or some other protocol or combination of protocols.

Figure 39:
FIG. 39 shows an illustrative home page produced by the merchant store module of FIG. 38.
Figure 40:
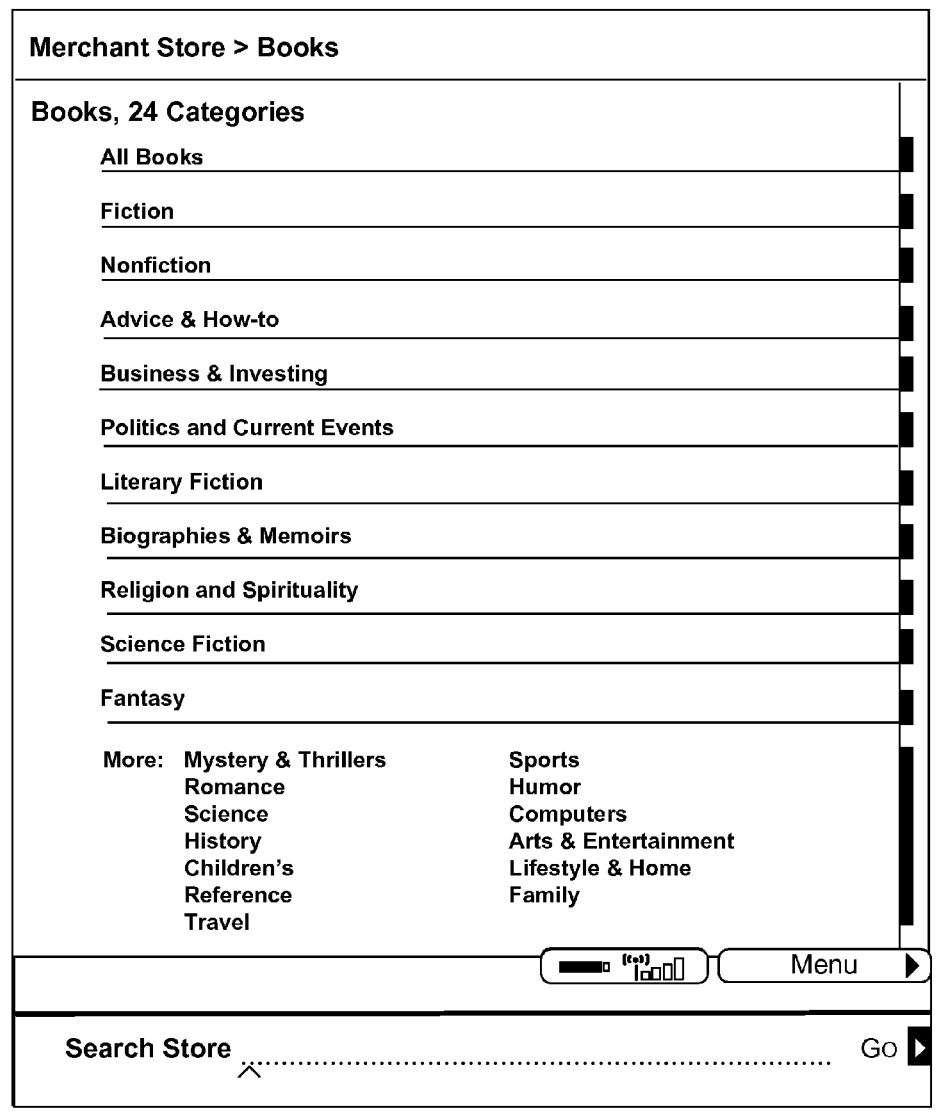
FIG. 40 shows an illustrative browsing page produced by the merchant store module of FIG. 38.
Figure 41:
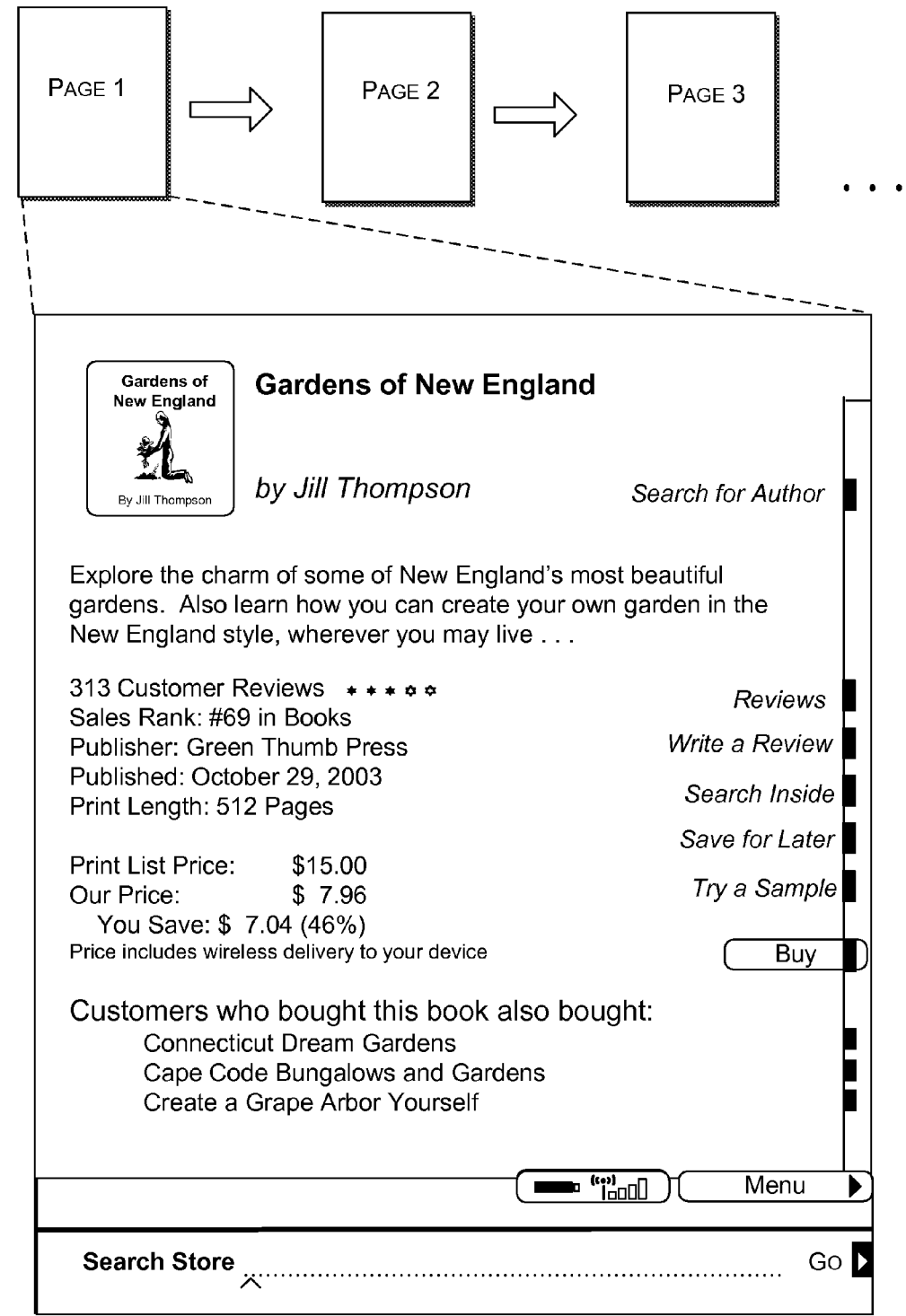
FIG. 41 shows an illustrative item detail page produced by the merchant store module of FIG. 38.

FIGS. 39-41 show a representative collection of pages produced by the markup presentation module 3822. FIG. 39 shows an introductory page 3902, which the markup presentation module 3820 may display to the user when the user first accesses the merchant store module 318. The introductory page 3902 provides a portal which invites the user to explore various browse categories, review recommended items, enter a search, and so on. FIG. 40 shows a browse page 4002. The browse page 4002 allows the user to browse for items using various subject-matter categories. FIG. 41 shows an item detail presentation 4102, which provides information regarding a single eBook item that the user may purchase through the item purchase module 3812. In the case in which the item detail information cannot fit onto one page, the markup presentation module 3820 may display this information in a series of pages, as indicated in FIG. 40.

B. 7.b. Illustrative Approach to Rescinding a Purchase

Figure 42:
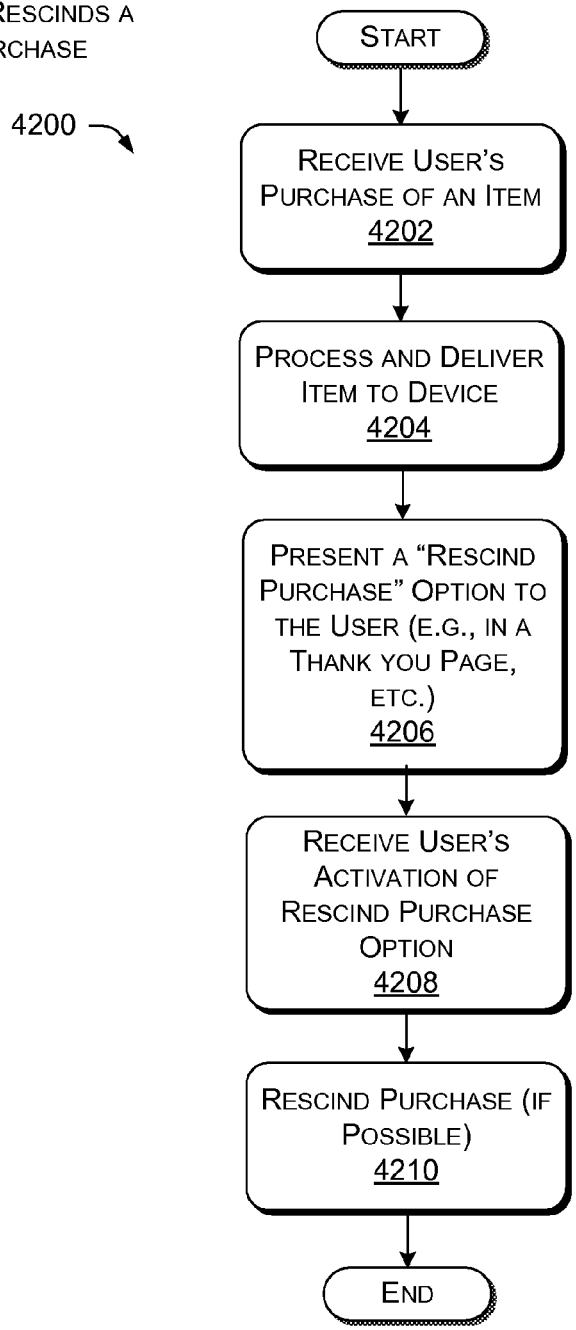
FIG. 42 is a flowchart which depicts an illustrative way of rescinding a purchase made with the merchant store module of FIG. 38.

FIG. 42 shows a flowchart which depicts an illustrative procedure 4200 for rescinding a purchase using the buy rescind module 3814 of FIG. 38.

In block 4202, the item purchase module 3812 receives the user's purchase of an item. The user may make the purchase by making a selection which initiates a fulfillment operation.

In block 4204, the IPS 102 processes and potentially delivers the purchased item to the user's device in the manner described above.

In block 4206, the buy rescind module 3814 presents an option to the user which invites the user to rescind her purchase made in block 4302. In one case, the buy rescind module 3814 may present this option in a "thank you" page or the like, which is provided to the user following the purchase of the item. At this stage, as indicated by the prior block 4204, the item purchase module 3812 is in the course of fulfilling the user's purchase of the item.

In block 4208, it is assumed that the user does in fact activate the buy rescind option.

In block 4210 the buy rescind module 3814 rescinds the user's purchase of the item, if possible.

B.8. Illustrative Content Manager Module and Media Library Module

Figure 44:
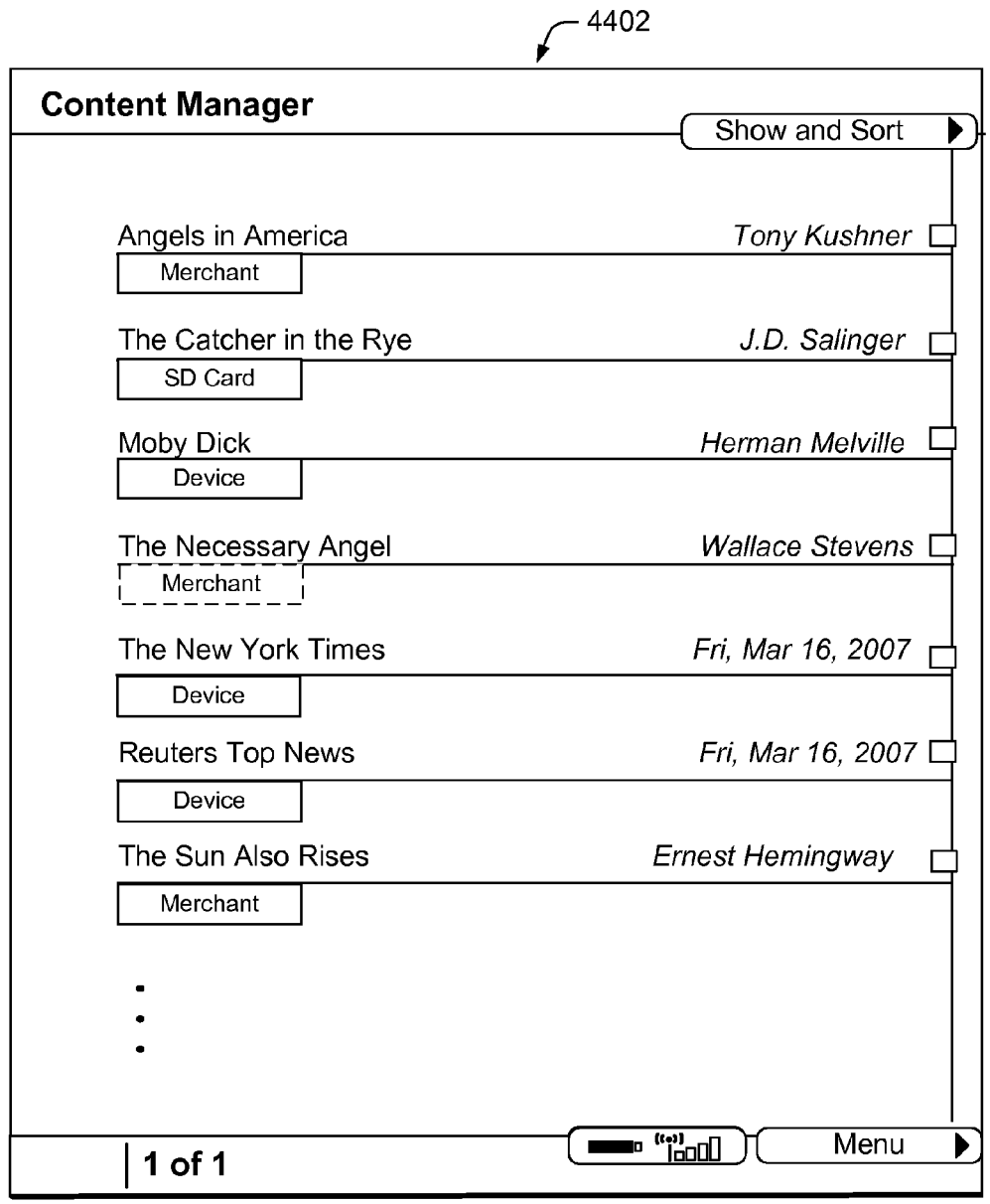
FIG. 44 is an illustrative content manager page produced by the content manager module shown in FIG. 43.

The device-side content manager module 342 provides a tool that allows the user to review and manage items that are available for consumption by the user device 104. FIG. 44 shows additional detail regarding the content manager 342. FIG. 44 also illustrates the manner in which the content manager 342 may interact with other modules, such as the server-side personal media library module 324 and the subscription module 310.

The content manager module 342 includes a presentation module 4302. The presentation module 4302 shows various items available for the user to consume using the user device 104. The items may originate from various sources. A first source corresponds to the user device's internal device memory 336. A second source corresponds to a portable memory module 4304 that may be coupled to the user device 104, such as a flash card or the like. A third source corresponds to items identified in the user's server-side personal media library module 324. More specifically, the content manager module 342 may receive information from the media library module 324 regarding on-demand ("a la carte") selections, such as eBook items, specifically-selected newspaper and magazine issues, and so on. A fourth source corresponds to items identified in the subscription module 310. More specifically, the content manager module 342 may provide information regarding the user's subscriptions and the latest issues associated with those subscriptions. In regards to subscriptions, in one illustrative case, the content manager module 342 may store the last n days for each of the user's subscriptions.

In one illustrative implementation, the content manager module 342 has access to device-side metadata that identifies the items stored on the personal media library module 324 and/or the subscription module 310. This avoids the need for the user to make on-demand queries to these server-side modules to determine their contents.

According to another feature, the presentation module 4302 includes a filtering module 4306. The filtering module 4306 allows the user to select a criterion (or criteria) for use in determining what types of items are displayed by the presentation module 4302. For instance, the user may opt to restrict the presentation to only items stored in the device-side internal memory 336, and so on.

The content manager module 342 also includes an update processing module 4308. The purpose of the update processing module 4308 is to update the device-side metadata that describes the contents of the personal media library module 324. The update module 4308 may be invoked at various times when the user device and IPS 102 interact with each other for any reason. For example, the update module 4308 may be invoked as part of the collection of operations that are triggered by the receipt of a TPH signal.

Referring now to the personal media library module 324, this module 324 stores items that the user has previously purchased in a la carte fashion. More specifically, the personal media item library 324 may store pointers 4308 which reference the items in the merchant content store 308 that the user has purchased. In the manner described above, the user may receive a previously-purchased item via the content delivery module 316, which, in turn, contacts may the personal media library module 324 to verify that the user is indeed authorized to receive the requested item. The user may decide to download an item again for any reason, such as in the case in which the content was inadvertently deleted from the user's device local store(s).

The user may download subscription-related items in a similar manner. Namely, the content delivery module 316 accesses the subscription module 324 to determine whether the user is authorized to download an issue or the like. Permission information provided by the subscription module 324 is performed on the level of subscriptions, rather than individual issues within a subscription.

Figure 43:
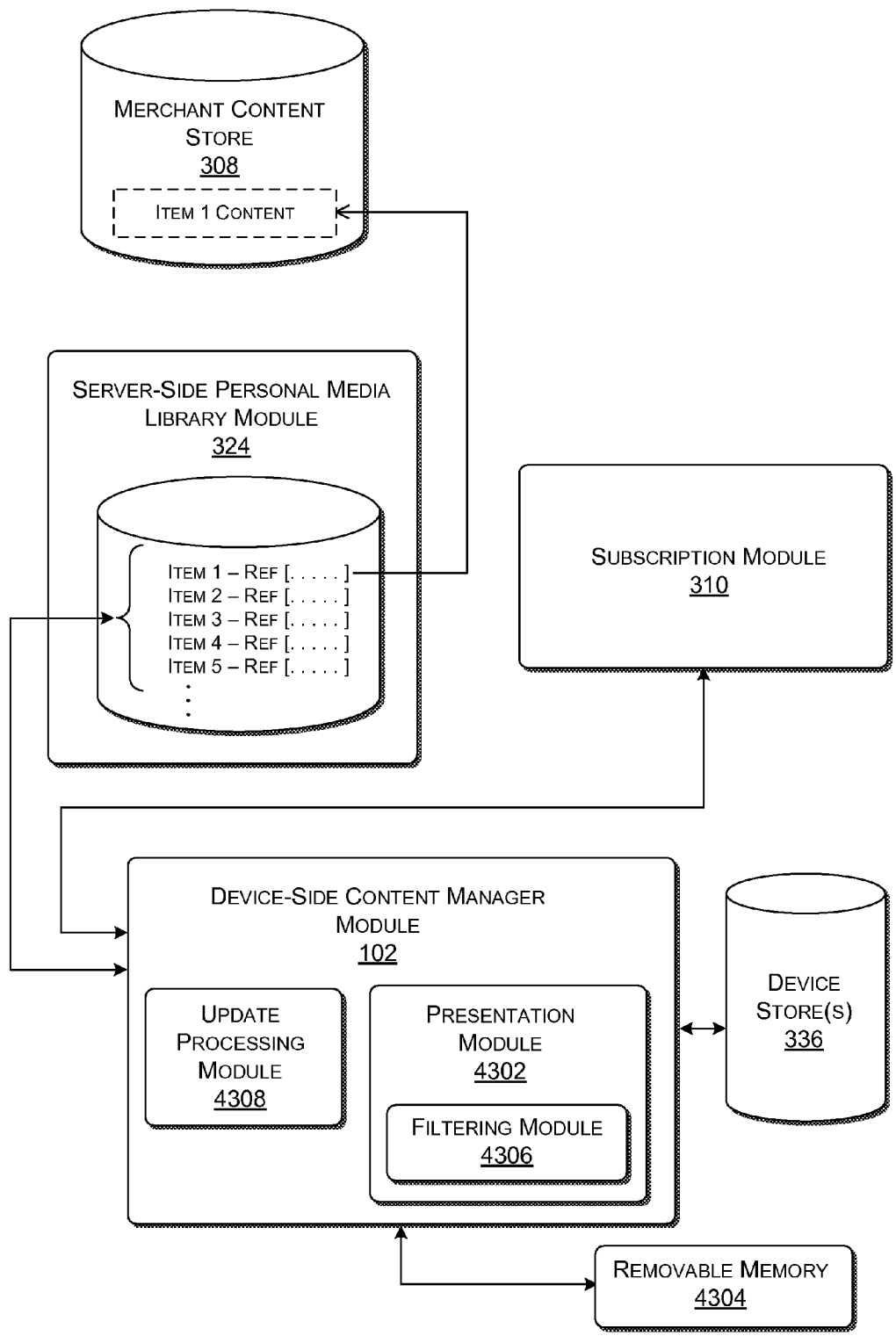
FIG. 43 shows an illustrative server-side media library module and a device-side content manager module for use in the IPS and user device, respectively, of FIG. 3.

FIG. 44 shows a content manager page 4402 provided by the presentation module 4302 of the content manager page 4402. This page 4402 shows various items that are available for the user to consume using the user device 104. The page 4402 also provides tags which indicate the source of the items, such as "Merchant" to indicate that the item is available via the personal media library module 324, "Device," to indicate that the item is stored in the device-side memory 336, and "SD Card" to indicate that the item is stored on a removable memory module, and so on. Although not shown in FIG. 43, the content manager page 4402 may provide indicators which reveal whether an item is in the process of being downloaded to the user device 104, and/or the item is undergoing other processing, etc.

Figure 45:
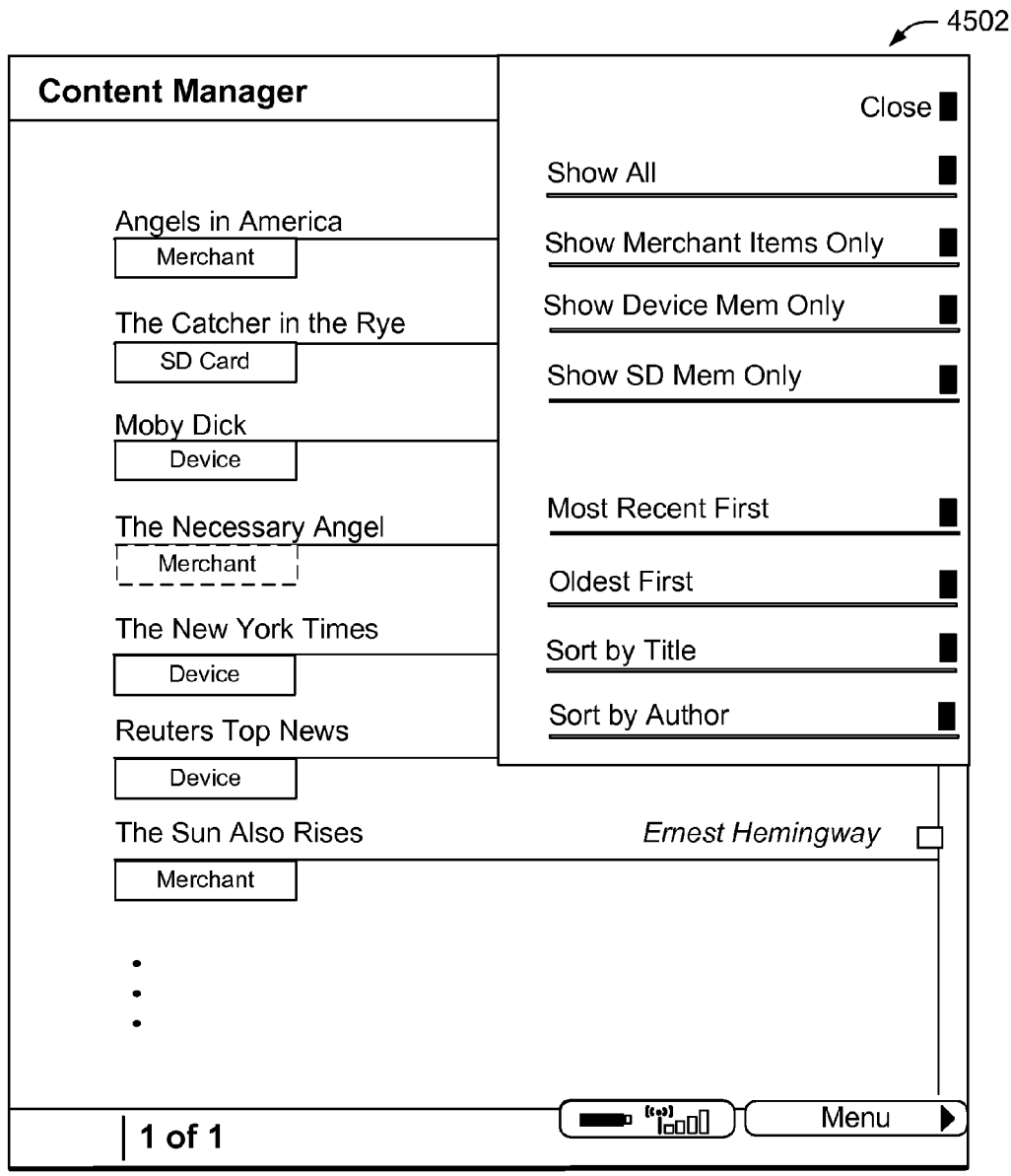
FIG. 45 shows an illustrative menu provided in the context of the content manager page shown in FIG. 44.

FIG. 45 shows another content manager page that includes a filtering menu 4502. The filtering menu 4502 is used by the filtering module 4304 to control what types of items are displayed (corresponding to selected sources, etc.), and in what order the items are displayed.

Figure 46:
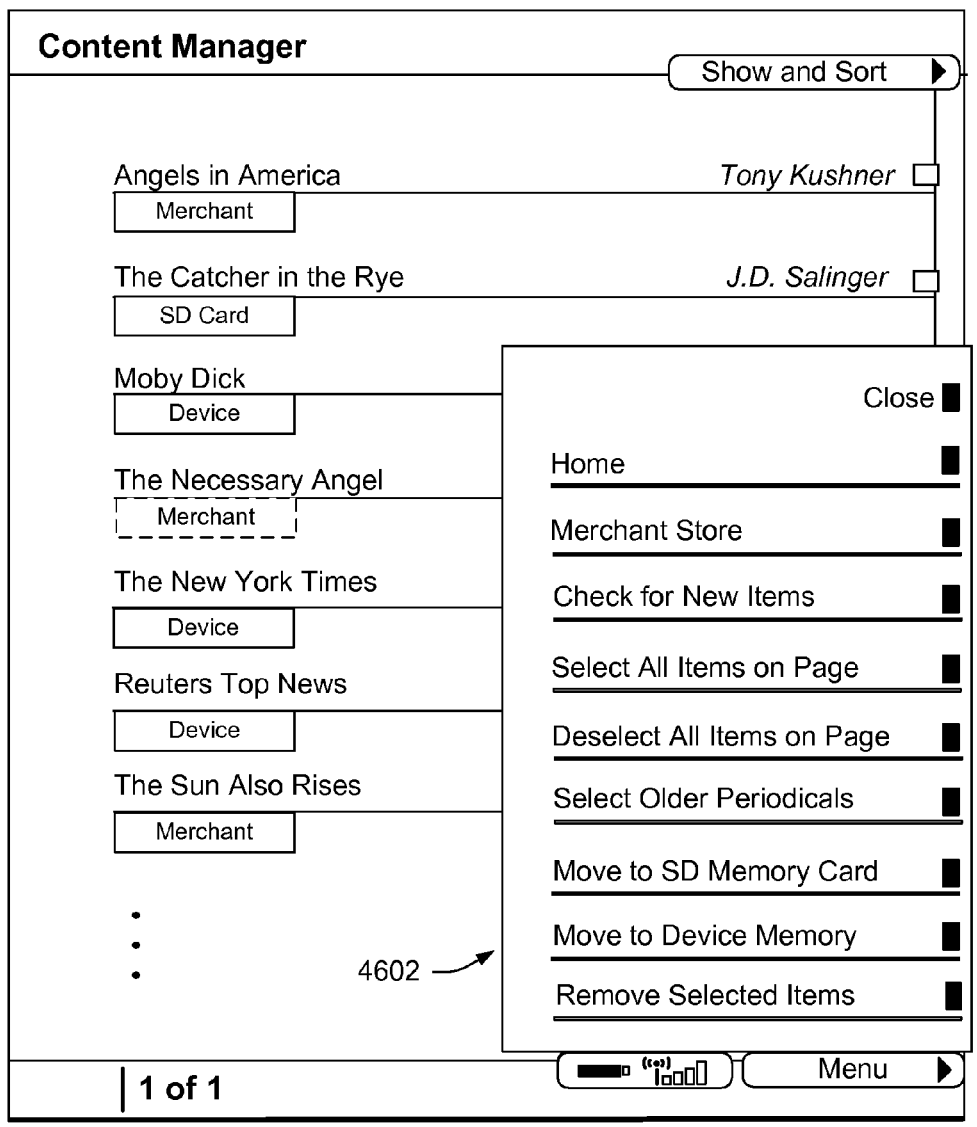
FIG. 46 shows another illustrative menu provided in the context of the content manager page shown in FIG. 44.

FIG. 46 shows another content manager page that shows another menu 4602. Among other functions, this menu 4602 allows the user to move items from one source to another source, remove items, and so on.

Figure 47:
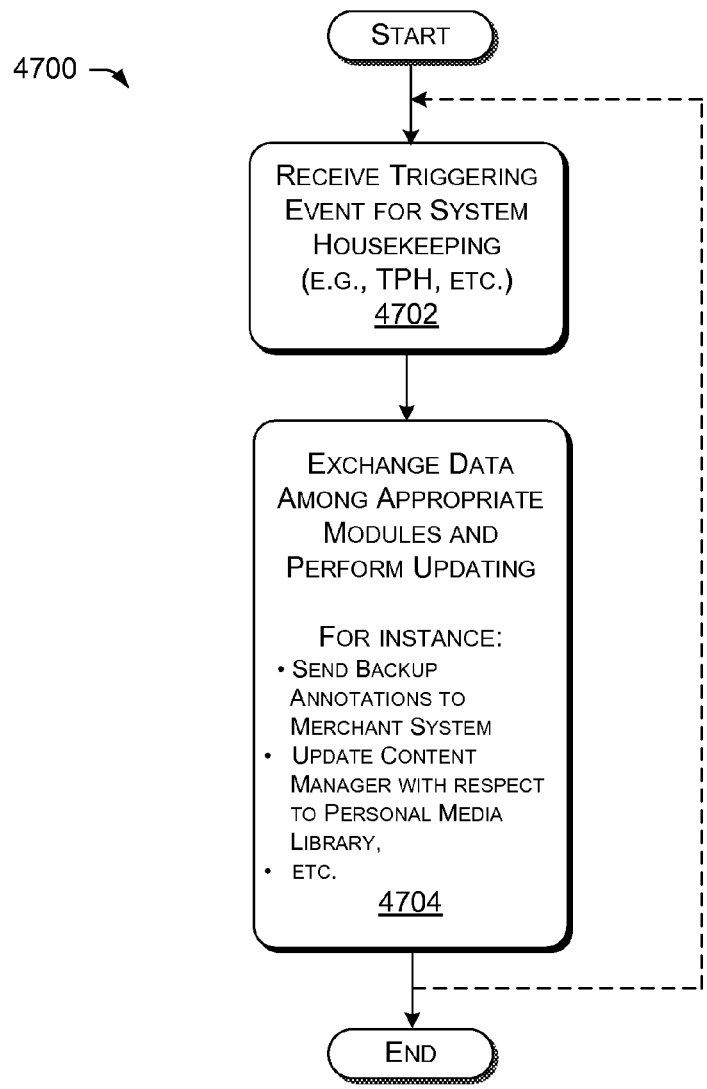
FIG. 47 is a flowchart which depicts an illustrative way of synchronizing information between the IPS and the user device of FIG. 3.

FIG. 47 shows a procedure 4700 which illustrates how the user device 104 and the IPS 102 share information.

In block 4702, one or more modules in the system 300 receive a triggering event. The triggering event signals that it is time for various housekeeping operations, such as the sharing of information between the user device 104 and the IPS 102. One representative triggering event may correspond to the sending of a TPH signal from the IPS 102 to the user device 104, which initiates a host of operations, including an information synchronization operation. Another triggering event may correspond to the powering up of the user device 104 or other change in state of the user device 104, and so forth.

In block 4702, one or more appropriate modules in the system 300 share information which one or more other modules for the purpose of synchronization. To name one example, block 4702 may entail the user device 104 sending its annotations that a user has created for a particular item to the IPS 102, for storage in a backup annotation store 1116. Further, block 4702 may entail the personal media library module 324 sending metadata down to the content manager module 342, where such metadata reflects the items that are referenced by the personal media library module 324. Still other information-sharing operations may be performed upon various triggering events.

In addition to the above periodic synchronization operations, the IPS 102 can interact with the user device 104 to restore the contents of the user device 104 when the stored content of the user device 104 is no longer accessible, e.g., because the user has invoked a hard reset command, etc.

Figure 48:
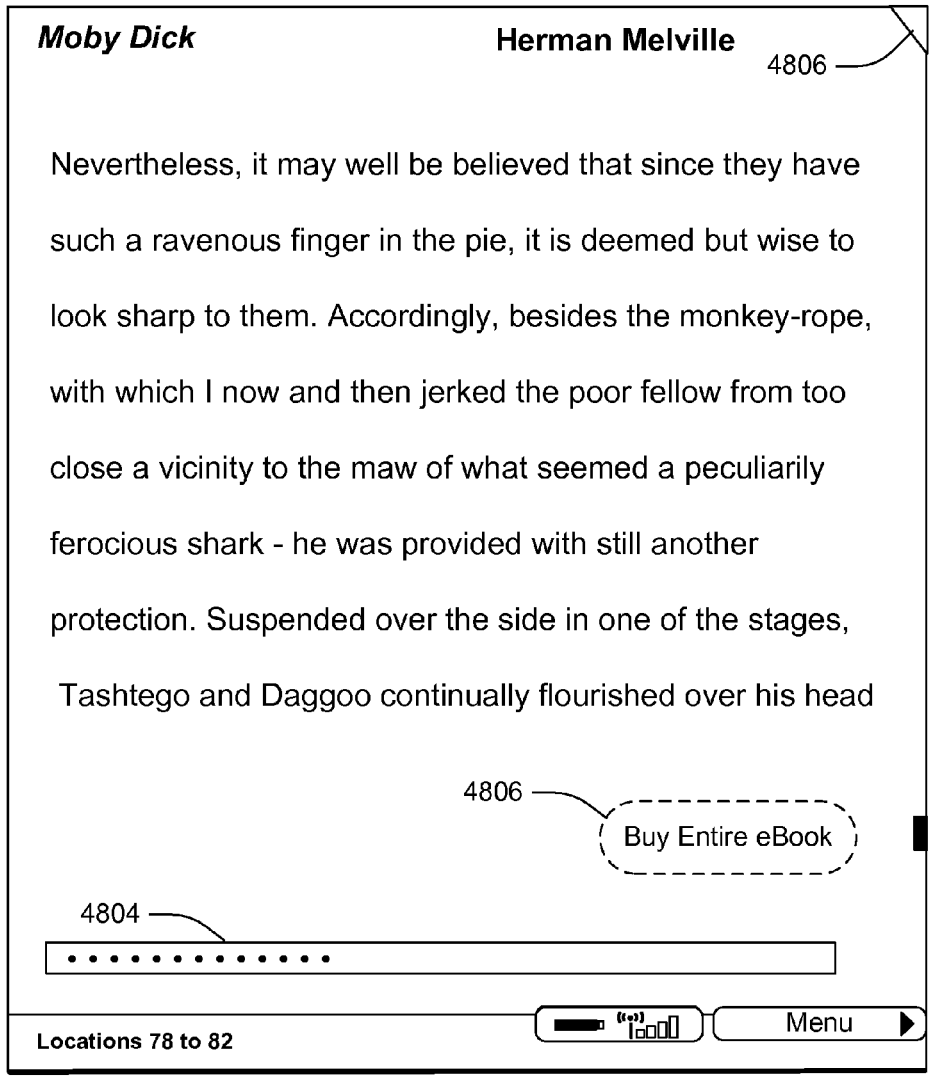
FIG. 48 is an illustrative item-display page produced by the reader module shown in FIGS. 2 and 3.

B.9. Illustrative Reader Module, Annotation Functionality, and Audio Player Module Recall that the reader module 340, introduced in the context of FIG. 3, provides an interface that allows a user to read an eBook. FIG. 48 shows one page 4802 of text content produced by the reader module 340, corresponding to the novel *Moby Dick*, by Herman Melville. The user may change the size of the font through an appropriate menu (not shown). The user may view his or her progress through the book via a progress display 4804. The number of dots in the progress display, relative to the total length of the display, reflects how far the user has advanced into the book.

Any page of readable content may include one or more embedded links that may be activated. Note, for instance, button 4806 in page 4802. In this case, the reading material being displayed by the reader module 340 corresponds to a sample of a more complete item, such as a chapter of a book. The page 4802 includes a button 4806 that invites the user to select the full version of the item. In another implementation, the button 4806 may invite the user to purchase another portion of the item (such as another chapter in a book, another issue in a magazine series, and so forth). In another case, a link may identify an item that is related to the content being presently displayed based on one or more matching considerations; for example, item recommendation module 3810 of FIG. 38 may identify a related item based on various matching considerations. Clicking on the button 4806 directs the merchant store module 318 to purchase (or otherwise acquire) and initiate delivery of an identified item, e.g., in the illustrated case, a full version of content being read by the user in page 4802.

Figure 49:
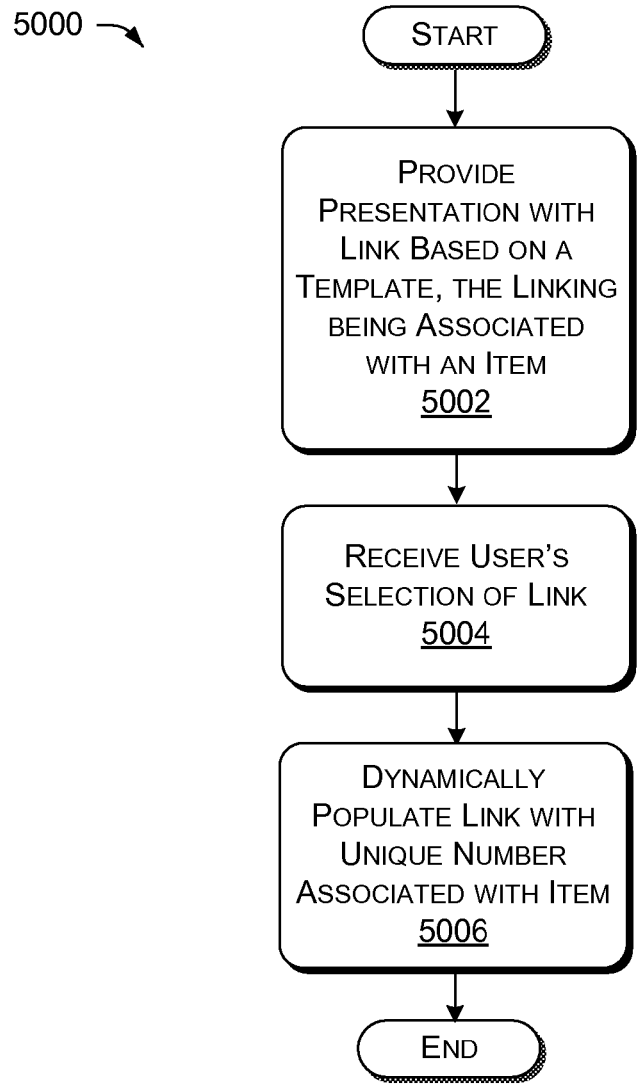
FIG. 49 is a flowchart which depicts an illustrative way of dynamically populating a link in a page.

FIG. 49 shows a flowchart which depicts an illustrative procedure 4900 for dynamically supplying item identification information when a user activates a link in a page.

In block 4902, the user device 104 provides a presentation that includes a link, such as page 4802 that includes button 4806. The user device 104 may use a template to display the page. The template may include provisions for presenting the link, but does not associate the link with any kind of code which uniquely identifies a particular item. In other words, the page includes a placeholder field in place of the actual code.

More specifically, recall that, for certain types of items, the content reception system 302 stores the items in the content store 308 without formally integrating identification information with these items. When the content delivery module 316 delivers such an item to the user, it may inject the identification information into the header of the item (using the metadata injection module 2316). But, at this stage, the link inside the item still is not populated with identification information.

In block 4904, the user device 104 receives the user's selection of the link.

In block 4906, the user device 104 or some other entity may dynamically populate the link information so that it includes a unique identification information (e.g., a unique number) associated with the link. Consider the specific case in which, as indicated above, the page 4802 displays a sample of an item, and the button 4806 allows the user to access the full version of the item. When the user clicks on the button 4806, the device 104 may populate the link associated with the button 4806 with identification information associated with the full version of the item. The identification information is provided to the user device by the content delivery module 316, along with the sample item; for instance, the identification information may be conveyed in the header of the sample item. The populated link may then be invoked to perform an action, such as by accessing the merchant store module 318 to purchase a full version of the item, which initiates delivery of this item to the user.

Figure 50:
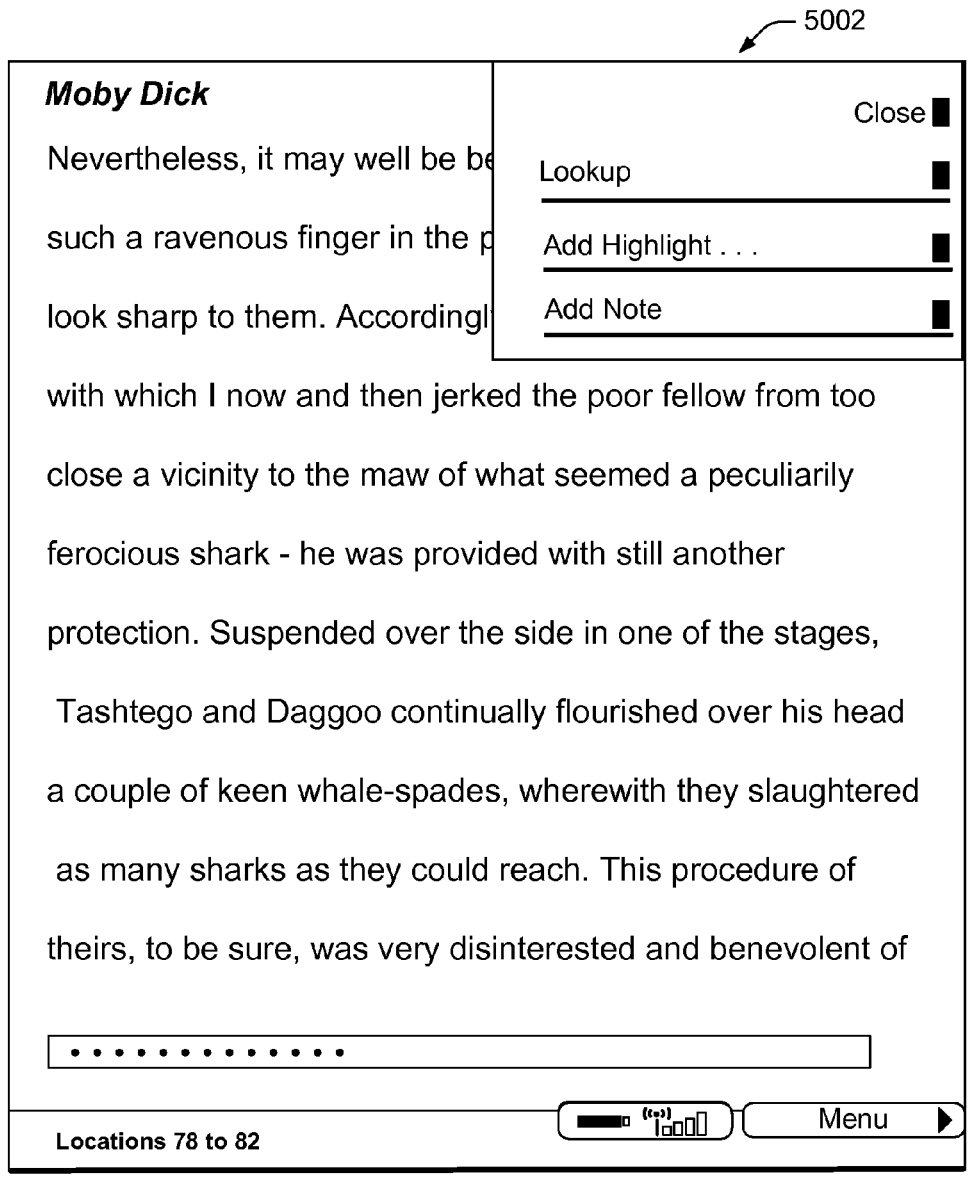
FIG. 50 shows an annotation-related menu presented in the context of the item-display page of FIG. 48.

FIG. 50 shows an annotation menu 5002 that the user may invoke in the course of reading an eBook. The user may invoke the menu 5002 to highlight a passage in the text, add a note associated with the text, and so on. The user may perform these operations using the cursor-moving mechanism 506 and/or using some other input mechanism(s). For instance, the user may demarcate a potion of a text to highlight by moving the cursor to corresponding beginning and ending locations in the supplemental display part 504 (e.g., by rotating a cursor wheel, etc.) and then selecting those locations (e.g., by pressing down on the cursor wheel, etc.).

Figure 51:
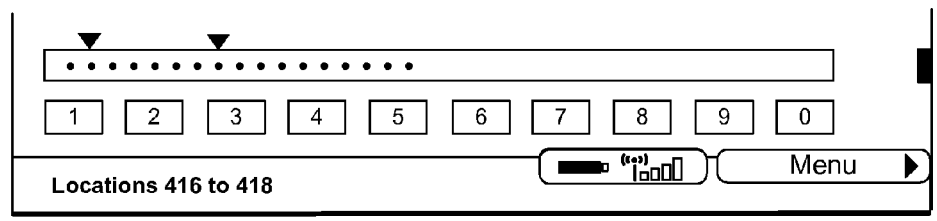
FIG. 51 is an illustrative progress bar provided in the context of the item-display page shown in FIG. 48.

Continuing with the theme of annotations, as shown in FIG. 48, the user may enter a bookmark by clicking next to a mark icon 4806 in the corner of the page 4802. Further, FIG. 51 shows a way to identify locations in an eBook which have been marked by the user. Namely, FIG. 51 shows a progress display. The small black triangles illustrate the location of user-created bookmarks within the text.

Figure 52:
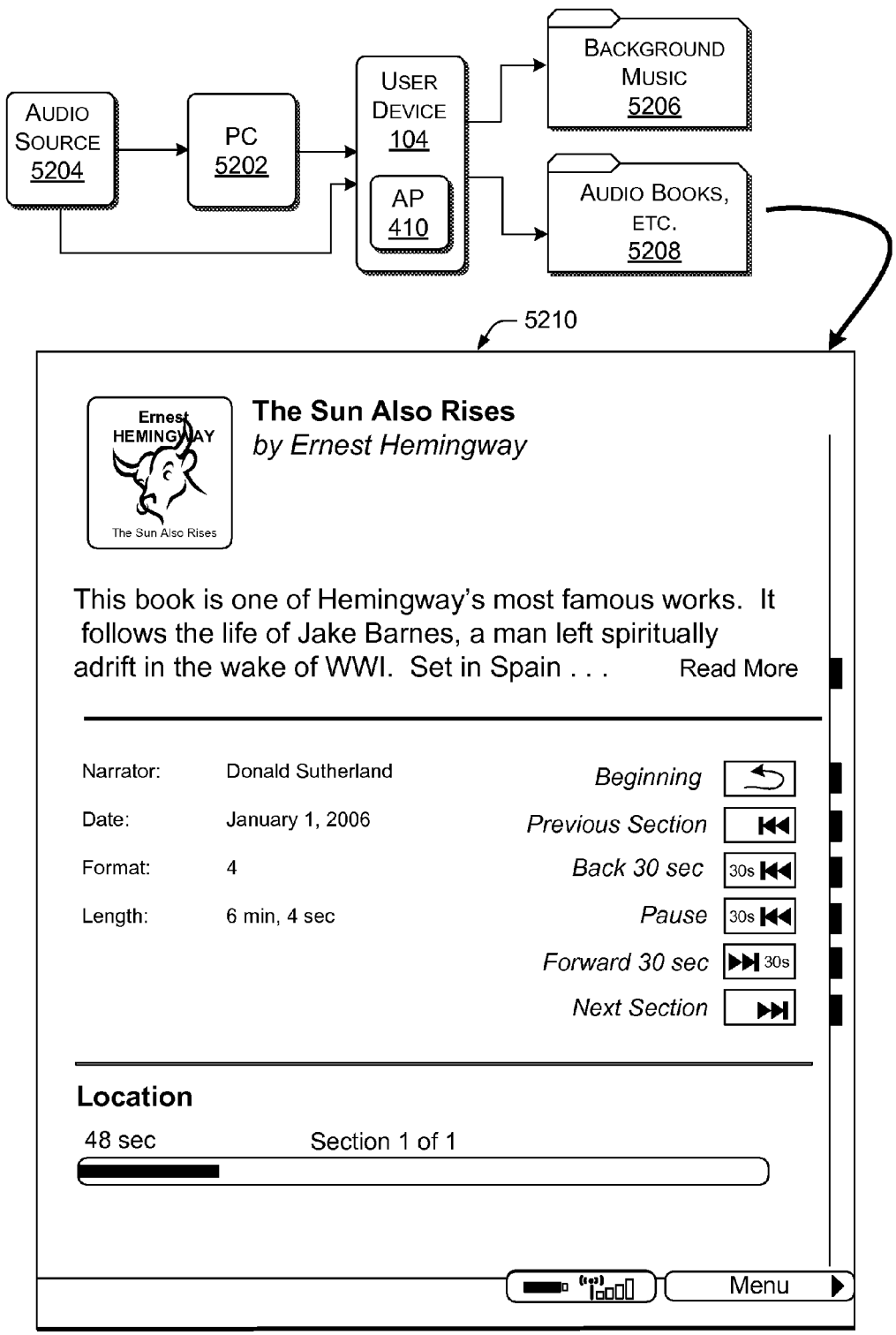
FIG. 52 shows audio delivery, management, and playback functionality in a user device as illustrated in FIGS. 3 and 4.

FIG. 52 shows various features associated with the audio player module 410 (introduced in FIG. 4) and the environment in which the audio player module 410 may operate. There are at least two mechanisms that the user device 104 may use to receive audio items. In a first mechanism, the user may use a personal computer 5202 or other type of data processing device to download an audio item from a source 5204 of audio items. In the first access mechanism, the personal computer 5202 may access the audio source 5204 via a non-wireless connection, such as a conventional telephone or cable modem, a DSL connection, a T1 connection, and so forth. Upon receipt, the user may then transfer the audio item to the user device 104 via a USB connection, portable memory module, or other transfer mechanism. In a second mechanism, the same communication infrastructure 106 that is shown in FIG. 2 may be used to receive an audio item from the audio source 5204 and then transfer this audio item to the user device 104. In other words, the communication infrastructure 106 transfers audio items in the same manner as eBook items and the like, where the audio source 5204 functions as one of the content sources 304 shown in FIG. 3. As explained, the communication infrastructure 106 may rely, at least in part, on wireless communication.

The audio source 5204 may represent a commercial supplier of audio items or other type of organization that supplies audio items on a fee-basis or on a non-fee-basis (e.g., including libraries, governmental organizations, etc.). In this context, the audio source 5204 may be accessible to the personal computer 5202 or other device as a WAN-accessible resource (e.g., as an Internet-accessible site or the like). The audio source 5204 may also represent a user or a community of users that supply audio items for dissemination to other users.

Upon receipt, the audio player module 410 may store the audio item in a background music file 5206 and/or an audio book file 5208. The audio player module 410 may be configured to play the audio items in the background music file 5206 as background music. For instance, the audio player module 410 may play an audio item in the background music file 5206 when the user is reading a newspaper, searching the web, and so on. In one case, audio player module 410 may play the audio items in the background music file 5206 in a random order. The audio player module 410 may provide controls that allow the user to access the background music file 5206, pause the playing of background music, skip to a next audio item in the random playlist, and so on.

The audio player module 410 may be configured to allow a user to interact with and consume audio items stored the audio books file 5208 in generally the same manner as textual content. For example, page 5210 shows one user interface page that allows a user to control the audio playback of an audio book. The audio player module 410 allows the user to move within the content of an audio item using various forward commands, back commands, etc. Further, the audio player module 410 stores the point in the audio item at which the user stopped listening; upon returning to the item at a later time, the audio player module 410 begins playing from this point onward. Other modules of the user device 410 may manage the audio item in the same banner as an eBook item. For example, the content manager module 342 may display metadata regarding an audio item in its list of available items (e.g., see the "Sun Also Rises" entry in FIG. 44).

B.10. Illustrative Web Browsing Functionality

Figure 53:
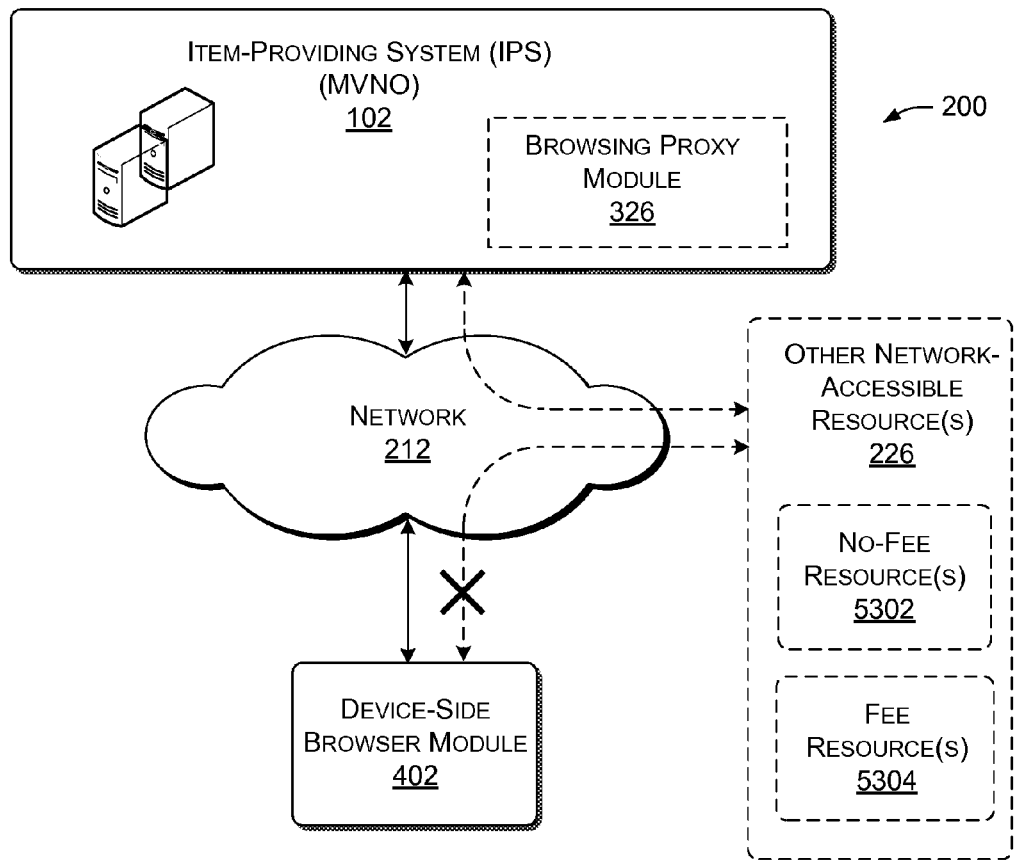
FIG. 53 is a modified depiction of the system of FIG. 2, emphasizing the use of an illustrative browsing proxy module.

FIG. 53 presents a simplified depiction of the system 200 of FIG. 2. In this simplified depiction, the device-side browser module 402 interacts with the item-providing system (IPS)

102 via a network 212, such as the Internet. The IPS 102 includes a browsing proxy module 326. The browser module 402 is first directed to the browsing proxy module 326 when it attempts to access one of the network-accessible resources 226. In this illustrative and representative manner, the device browser module is precluded from directly accessing the network-accessible resources (as indicated by the X mark shown in FIG. 53). It should be noted that the browser module 402 is only one way that the user device communicates with the IPS 102. The use of the browsing proxy module 326 does not affect other communication routes, such as the transfer protocol between the item delivery system 312 and the to-do list processing module, as well as the interaction between the merchant store module 318 and the device-side store interaction module 344.

The IPS 102 may establish different business rules to govern the user's access to "external" network-accessible resources. In one case, the IPS may discriminate between a first class of non-fee resources 5302 for which it does not charge a fee (or charges a relatively smaller fee), and a second class of fee resources 5304 for which it charges a fee (or charges a relatively larger fee).

Figure 54:
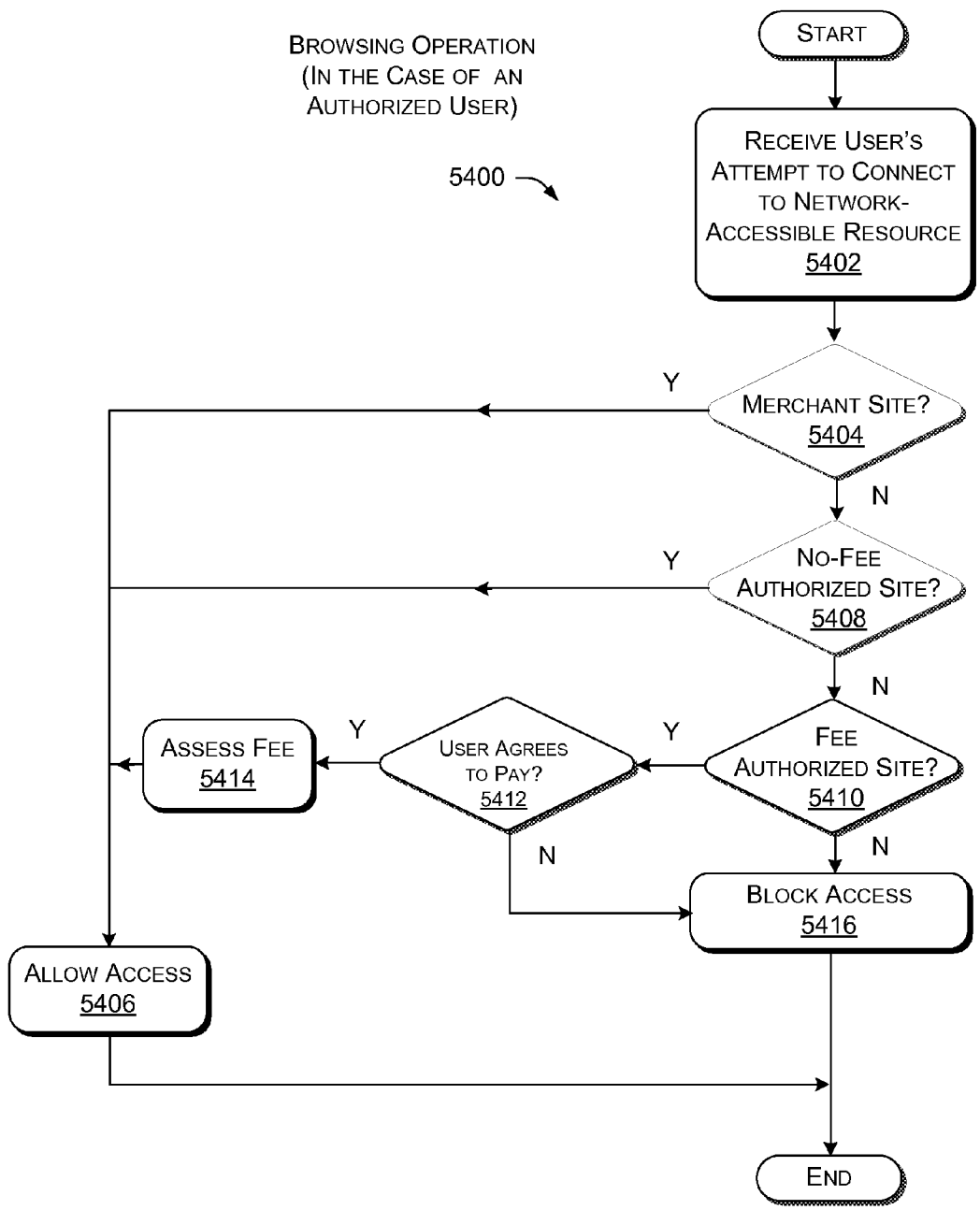
FIG. 54 is a flowchart which depicts an illustrative manner of operation of the browsing proxy module of FIG. 53.

FIG. 54 shows a procedure 5400 which represents one illustrative way of governing access to network-accessible resources using the browsing proxy module 326.

In block 5402, the browsing proxy module 326 receives a user's request to connect to a network-accessible resource, such as a website or the like.

In block 5404, the browsing proxy module 326 determines whether the site that the user wishes to connect to corresponds to the services provided by the IPS 102 itself. If this is the case, then, in block 5406, the browsing proxy module 326 grants the user access to the requested resources.

If block 5404 is answered in the negative (meaning that the user is not attempt to gain access to the IPS 102 itself), the flow advances to block 5408, where the browsing proxy module 326 determines whether the user is attempting to gain access to one or more of the designed non-fee (or reduced fee) resources 5302. If this is the case, then, in block 5406, the browsing proxy module 326 grants the user access the requested resources (in block 5406).

If block 5408 is answered in the negative (meaning that the user is not attempt to gain access to the IPS 102 or a free resource 5302), the flow advances to block 5410, where the browsing proxy module 326 determines whether the user is attempting to gain access to one or more of the designated fee resources 5304. If this is the case, then, in block 5412, the browsing proxy module 326 next determines whether the user has paid or has agreed to pay the required fee. If this block 5412 is answered in the affirmative, the browsing proxy module 326 assesses appropriate fees (in block 5414) and then grants the user access the requested resources (in block 5406). In one case, the system 300 may be set up so that the user may pay a fee for each item that the user wishes to access, e.g., on a per-access basis. In another case, the system 300 may be set up so that the user may pay a fee to access any number of items for a predetermined amount of time (such as a day, week, etc.). In any case, the user may be given the option of automatically accepting access-related fees when the user makes an access attempt, e.g., without querying the user each time he or she wishes to access an item.

If none of the conditions set forth above is satisfied, then, in block 5416, the browsing proxy module 326 denies the user access to the requested resource.

Figure 55:
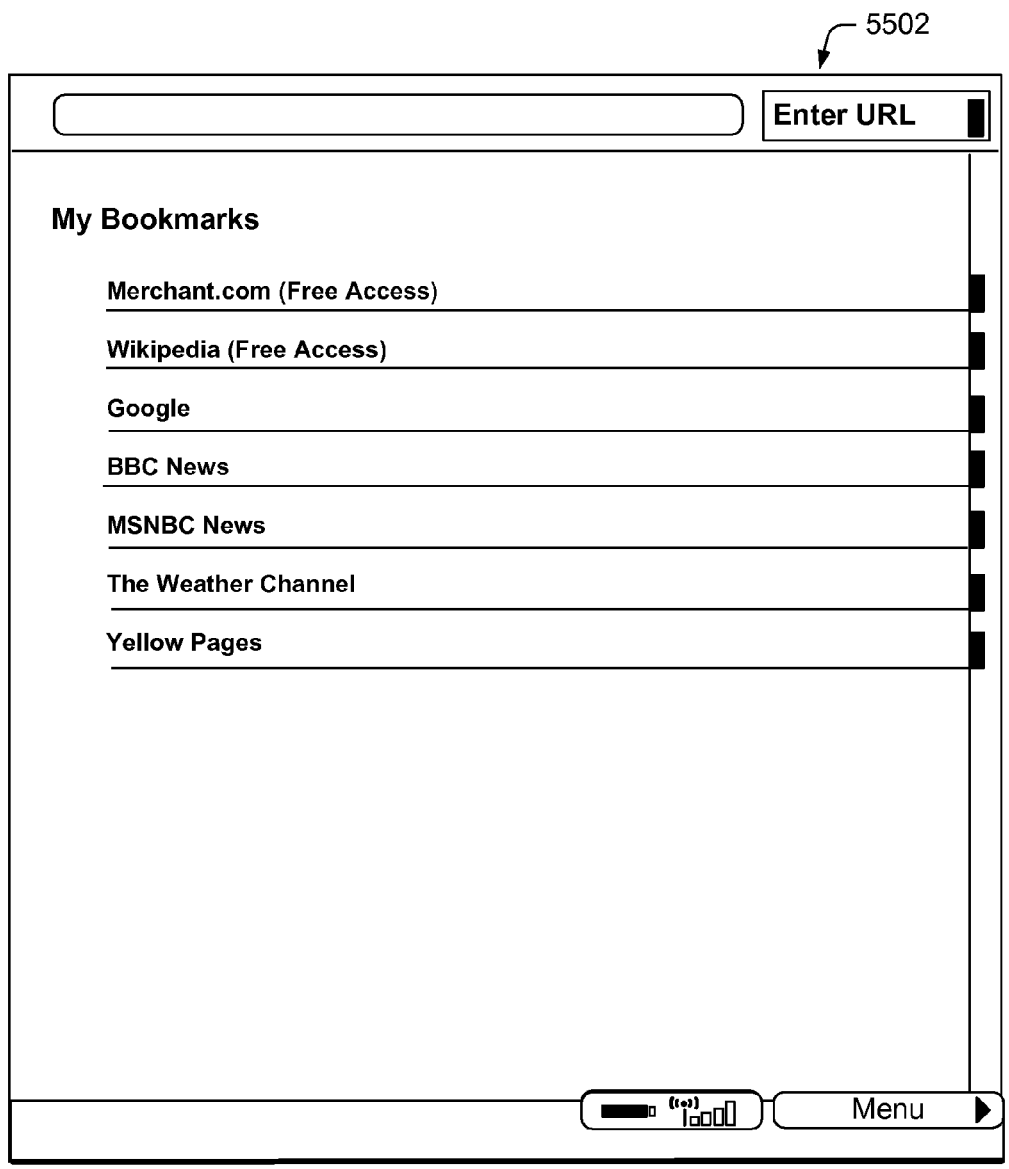
FIG. 55 is an illustrative home page produced by a browser module shown in FIG. 4.

FIG. 55 illustrates a bookmark page 5502 (also known as a favorites page) that may be provided by the device browser module 402. The page 5502 includes a list of links. The user may click on any link to connect to a corresponding network accessible resource.

Figure 56:
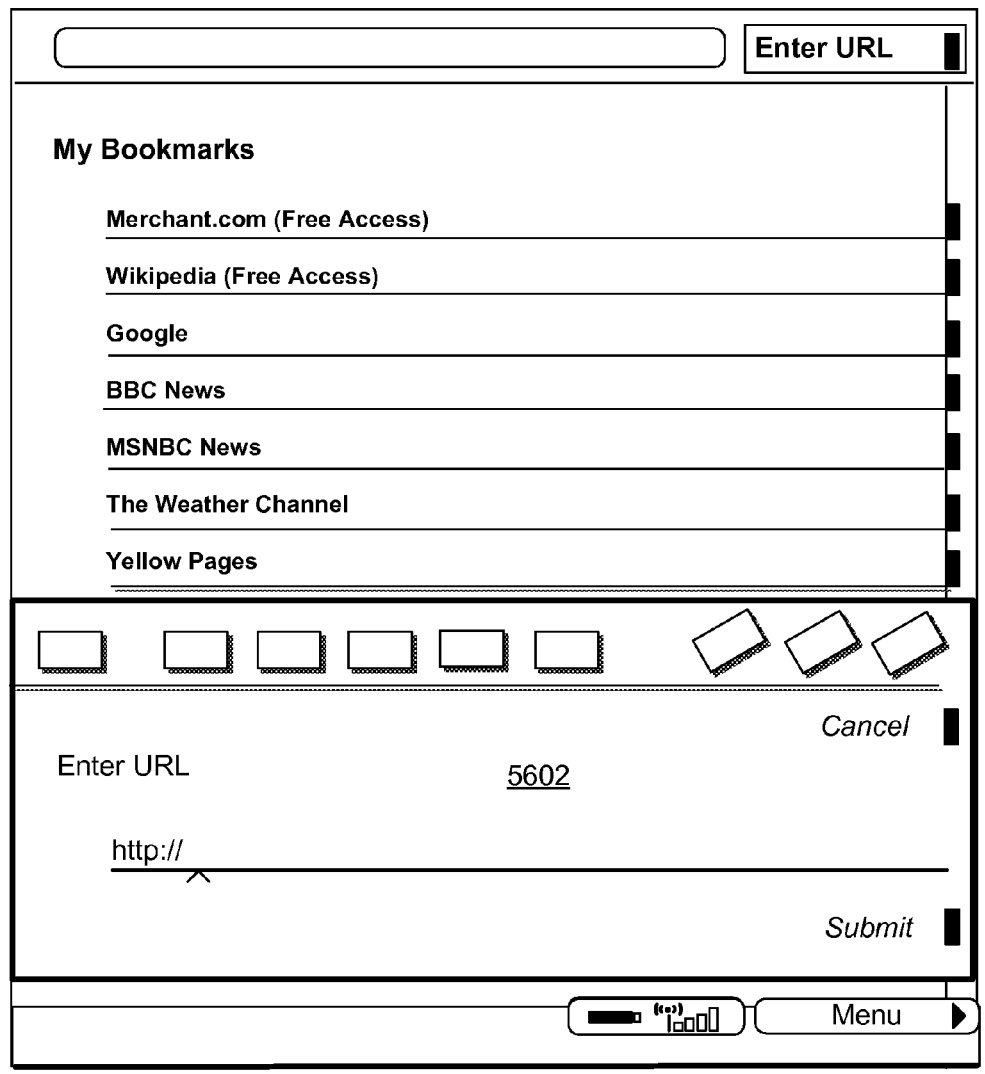
FIG. 56 shows an illustrative user interface panel for use in inputting an address using the browser module of FIG. 4.

FIG. 56 shows a menu 5602 that the device browser module 402 may use to enter network addresses, such as URLs, using the user device 104.

C. Illustrative Administrative-Related Functionality

C.1. Overview of Functionality

This section provides information regarding various administrative or backend tasks that may be performed using the system set forth in Sections A and B. One administrative function pertains to monitoring the performance of various aspects of the system. Another administrative function pertains to testing the operation of the system. Another administrative function pertains to diagnosing problems or other issues that may be present in the system. Another administrative function pertains to upgrading the instruction-bearing content (e.g., software) used by the user device 104. The above-described functions may intersect. For example, the testing and diagnosing functions may rely on the performance-monitoring function. The upgrade-related function may rely on the testing and diagnosing functions to determine whether an instruction upgrade is appropriate.

Figure 57:
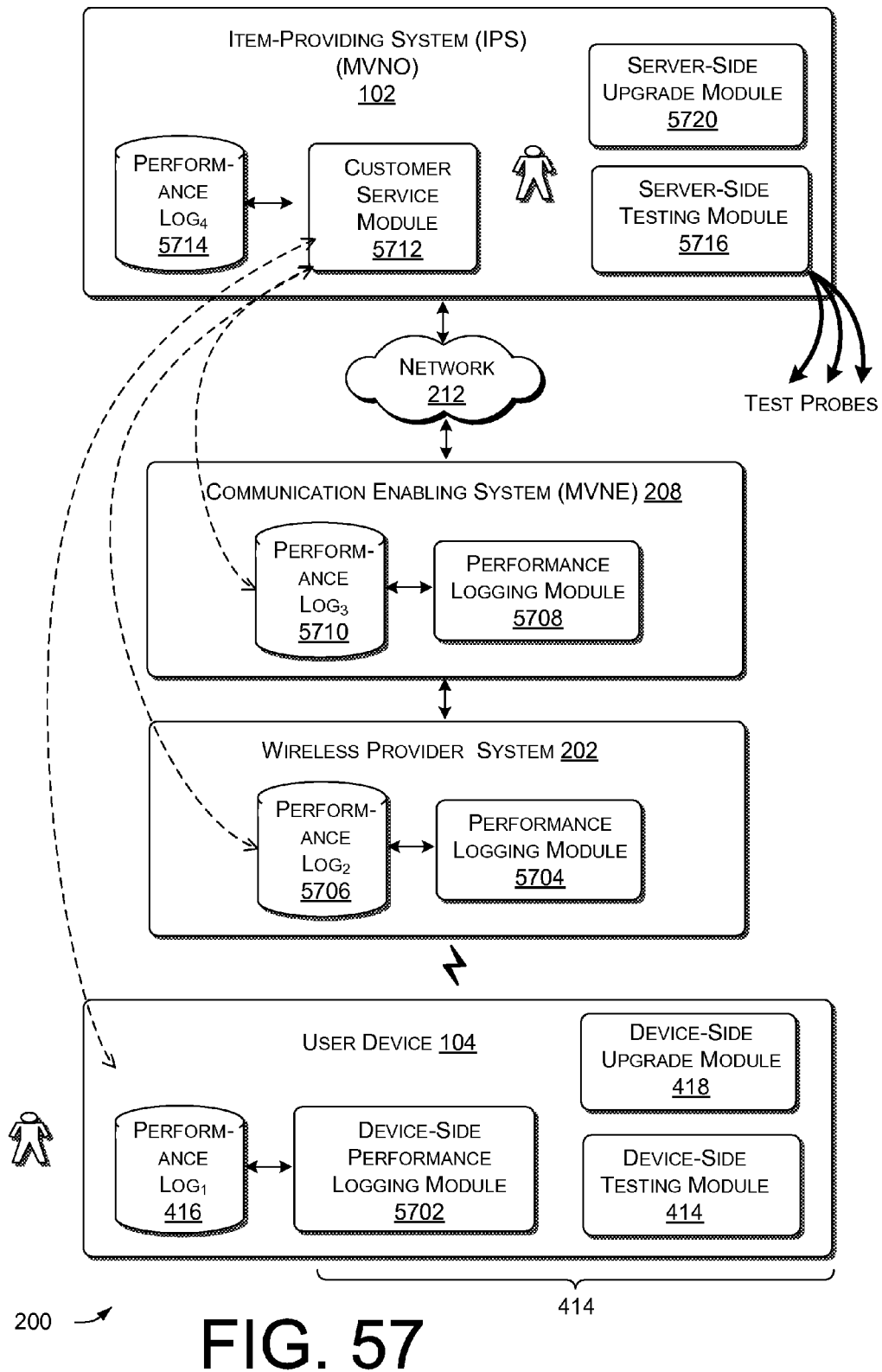
FIG. 57 is a modified depiction of the system of FIG. 2, emphasizing various administrative functions performed by the system.

FIG. 57 provides a simplified depiction of the system 200 introduced in FIG. 2. This system 200 is used as a vehicle to explain the various administrative functions described above. However, the administrative functions described here may also be implemented using other types of systems.

The system 200 allows an item-providing system (IPS) 202 to interact with a user device 104 via communication infrastructure. The communication infrastructure includes a wireless provider system 202 and a communication-enabling system 208. The communication-enabling system 208 interacts with the IPS 102 via a network 212, such as a wide area network (WAN), and, more particularly, the Internet.

The system 200 implements the various administrative functions described above at various levels, as will be described below.

C.2. Illustrative Performance Monitoring, Testing, and Diagnosing Functionality

FIG. 57 illustrates that various parts of the system 200 may monitor the performance of the system 200, from respective "vantage points." For instance, the user device may include a device-side performance logging module 5702 for recording various events associated with the performance of the system 200, with respect to performance issues that are visible to the user device 104. The device-side performance logging module 5702 may store performance information in a performance log 416 (introduced in the context of FIG. 4).

The wireless provider system 202 may likewise include a performance logging module 5704 for recording various events associated with the performance of the system 200, with respect to performance issues that are visible to the wireless provider system 202. The performance logging module 5704 may store performance information in a performance log 5706.

The communication-enabling system 208 may likewise include a performance logging module 5708 for recording various events associated with the performance of the system 200, with respect to performance issues that are visible to the communication-enabling system 208. The performance logging module 5708 may store performance information in a performance log 5710.

The IPS 102 may include a customer service module 5712 for performing various functions. As a first function, the IPS 102 may also independently record various events and store such events in an IPS-side performance log 5714. Further, the customer service module 5712 may obtain any of the performance information collected by the user device 104, the wireless provider system 202, and/or the communication-enabling system 208. In one particular case, the customer service module 5712 automatically collects performance information from different parts of the system 200. In another case, the customer server module 5712 may make on-demand targeted inquires into different aspects of the system 200, querying the performance information collected by the user device 104, wireless provider system 202, and/or the communication enabling system 208. For instance, a user may call a customer service representative to identify a problem with receiving a download in a particular region of a country. The customer service representative may examine the performance information provided by any part of the system to help uncover the source of the problem.

In addition, an administrator at the IPS 102 may proactively test various parts of the system 200. For instance, the IPS 102 may include a server-side testing module 5716. The server-side testing module 5716 may be used to periodically send test signals to a set of test user devices, requesting the test user device to respond. Or the testing module 5716 may send the testing signals to the test user devices in an on-demand manner. A test user device may include a complementary test module 5718 for receiving and responding to such a test signal. (Note that, collectively, the device-side performance logging module 5702 and the device-side testing module 5718 correspond to the monitoring and testing functionality 414 introduced in FIG. 4.) The server-side testing module 5716 may monitor the response(s) it receives from each test user device, including whether a response was received at all, and/or various performance metrics associated with response, and so forth. The server-side testing module 5716 and/or a human administrator may review the results to help diagnose performance issues within the system 200.

Figure 58:
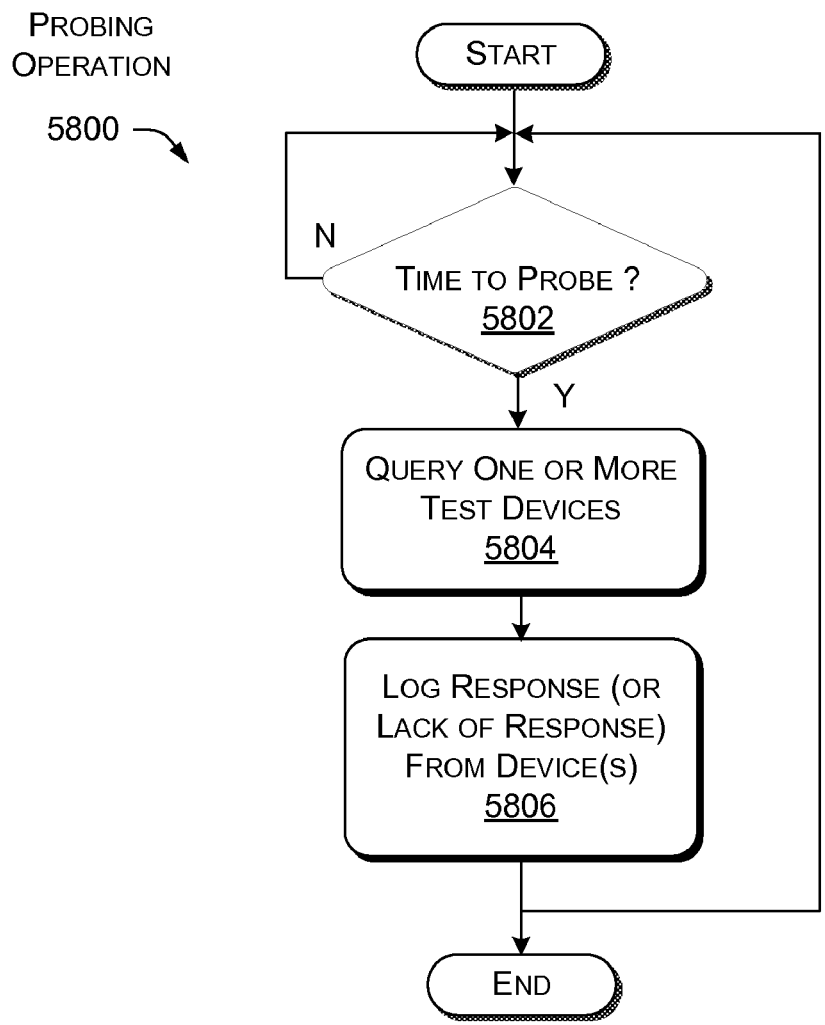
FIG. 58 is a flowchart which depicts one illustrative manner of operation of testing functionality of FIG. 57, in which the IPS periodically sends test probes to one or more representative user devices.

FIG. 58 shows a procedure 5802 which formalizes the operation of the testing modules (5716, 414) in flowchart form.

In block 5802, the server-side test module 5716 may determine whether it is time to test the system 200.

In block 5804, if it is time to test, the server-side testing module 5804 may send test probes to one or more test devices.

In block 5806, the server-side testing module 5806 may identify whether it has received a response from the test user devices, and if so, the nature of the response.

C.3. Illustrative Upgrade-Related Functionality

Returning to FIG. 57, this figure illustrates that the IPS 102 includes a server-side upgrade module 5720. The user device 104 includes a complementary device-side upgrade module 418 (which was introduced in the context of FIG. 4). By way of overview, in one case, server-side upgrade module 5720 may be manually operated to push an upgrade or other information down to the user device 104, whereupon the device-side upgrade module 418 loads the identified upgrade or other information in an appropriate manner. In a second case, the server-side upgrade module 5720 may automatically receive version information from the user device (supplied by the device-side upgrade module 418). The server-side upgrade module 5720 may compare the received version information with the current version of the software. The server-side upgrade module 5720 may then initiate any upgrades that may be appropriate, e.g., by downloading a patch or a full version of the desired instruction-bearing item to bring the user device up-to-date.

FIG. 59 shows a procedure 5900 which depicts a manual mode of providing updates to the user device 104.

In block 5902, an administrator associated with the IPS 102 identifies an upgrade to be made to the user device 104.

In block 5904, the server-side upgrade module 5720 may send the upgrade down to the user device, whereupon the device-side upgrade module 418 incorporates the upgrade into its body of instructions. The updating operation is transparent in the sense that the end-user is optionally not asked to participate in the updating operation, and may not be aware of the updating operation.

FIG. 60 shows a procedure 6000 which depicts an automated mode of providing updates to the user device 104.

In block 6002, the server-side upgrade module 5720 may receive information regarding a current version of instructions that is being used by a user device.

In operation 6604, the server-side upgrade module 5720 may compare the device's version with the current versions of the instructions.

In operation 6606, the server-side upgrade module 5720 may automatically prepare an upgrade for use by the user device, e.g., by computing a delta file that expresses the difference between the current version of the instructions and the device's version of the instructions. The upgrade module 5720 may transfer the upgrade to the user device 104 either as a patch or as a full file. The device-side upgrade module 418 receives the upgrade and takes action to incorporate the upgrade. Again, the updating operation is transparent in the sense that the end-user is not asked to participate in the updating operation, and may not be aware of the updating operation.

FIG. 61 shows an exemplary communication package used by the system 200 to transfer updates of any type to the user device 104. The package includes a header 6102 and a body 6104. The header 6102 may include fields that convey version information, attribute information, checksum information, and so forth. The body 6104 may include a manifest, and/or instruction-bearing content (script content, program content, etc.), and/or media content, and/or other type of content. The body may be expressed as a tar file or by using some other format or combination of formats. The information expressed by the package may be scrambled together with random information to help prevent non-authorized individuals from accessing the information.

The package serves as a general-purpose container for communicating any type of information to the user device 104 to elicit any type of behavior from the user device 104. In one case, an administrator may use the package shown in FIG. 61 to download an instruction-bearing item to a user device 104. The device 104 responds by loading this item into its memory; the device 104 thereafter operates based on the program instructions provided in the item.

In another case, the administrator may use the package shown in FIG. 61 to download other types of content to the user device 104, such as any kind of message content that is displayed by the user device 104. For instance, the downloaded content may pertain to a message that the user device 104 is instructed to display in a power-off mode (e.g., in the case that the user device uses non-volatile display technology that may present information on a display in a power-off mode of operation). To provide this message, the package may include a bit map which provides the desired message and optionally script content which directs the user device 104 how to display the message. Other applications are possible.

D. Illustrative Provisioning Functionality

D.1. Overview of Provisioning Functionality

Figure 62:
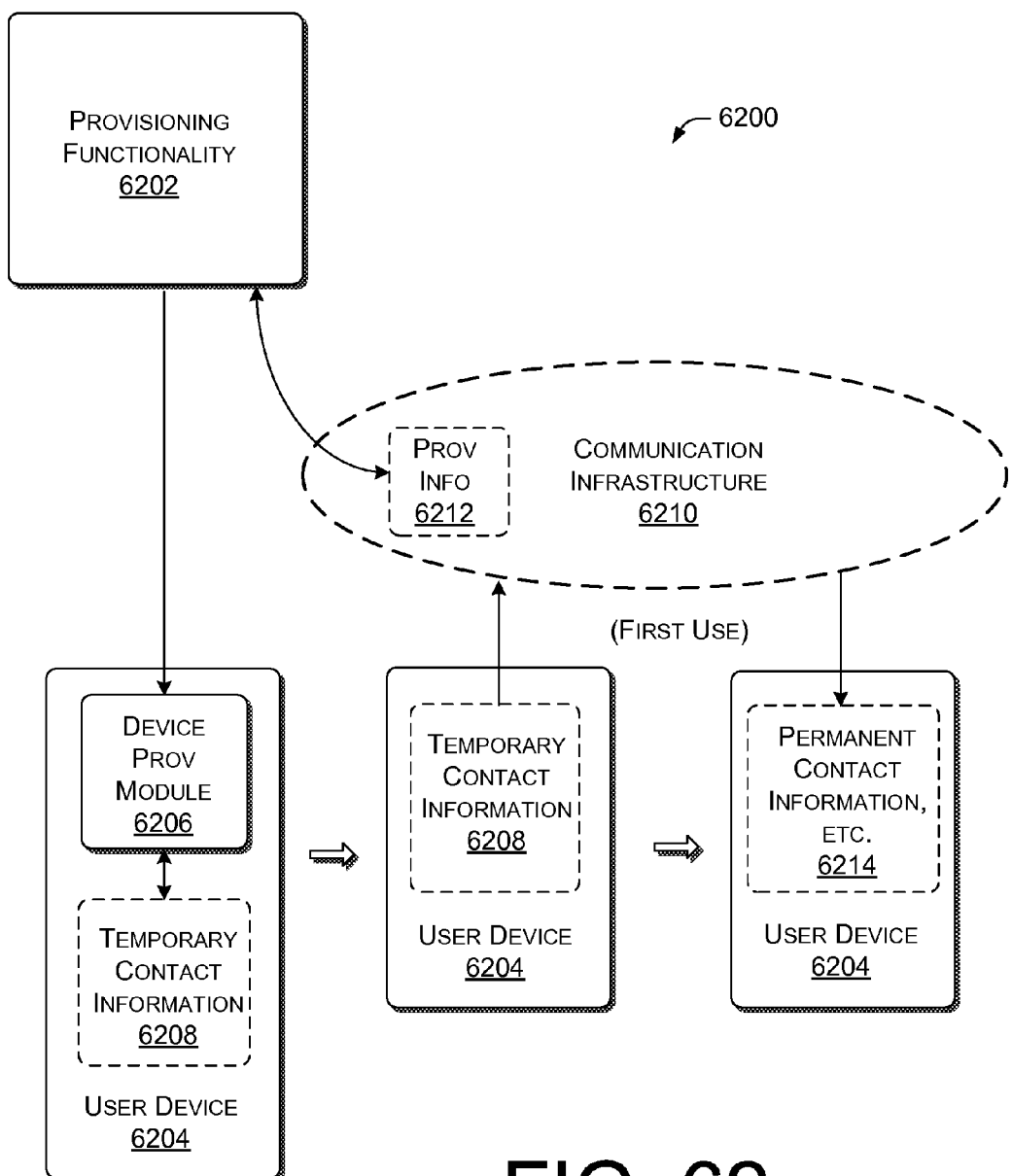
FIG. 62 is a modified depiction of the system of FIG. 2, emphasizing the use of illustrative provisioning functionality.

FIG. 62 shows a system 6200 for provisioning new user devices. More specifically, the system 6200 includes provisioning functionality 6202 that interacts with a newly manufactured user device 6204 (or component thereof), e.g., at a factory or like environment. The new user device 6204 may include a provisioning module 6206. The device-side provisioning module 6206 receives temporary contact information 6208 from the provisioning functionality 6202, which may include one or more identification numbers. The provisioning functionality 6202 may also interact with communication infrastructure 6210 to provide the communication infrastructure 6210 with provisioning information 6212. The provisioning information 6212 relates to the temporary contact information 6208 stored by the user device 6204.

As illustrated in FIG. 62, the user device 6206 may use the temporary contact information 6208 to establish a first access to the communication infrastructure 6210. The communication infrastructure 6210 may then forward more permanent contact information 6214 to the user device 6204. The user device 6204 may thereafter uses the more permanent contact information 6214 to access the IPS 102 and other network-accessible resources. The provisioning approach allows the user to use the user device 6204 without performing complex and burdensome configuration operations.

Addition details regarding one illustrative manner of provisioning user devices is described in U.S. Ser. No. 11/277, 876, filed on Mar. 29, 2006, entitled "Over-the-air Device Provisioning and Activation," naming the inventors of Subram Narasimhan, et al.

D.2. Illustrative Virtual Account Processing

Figure 63:
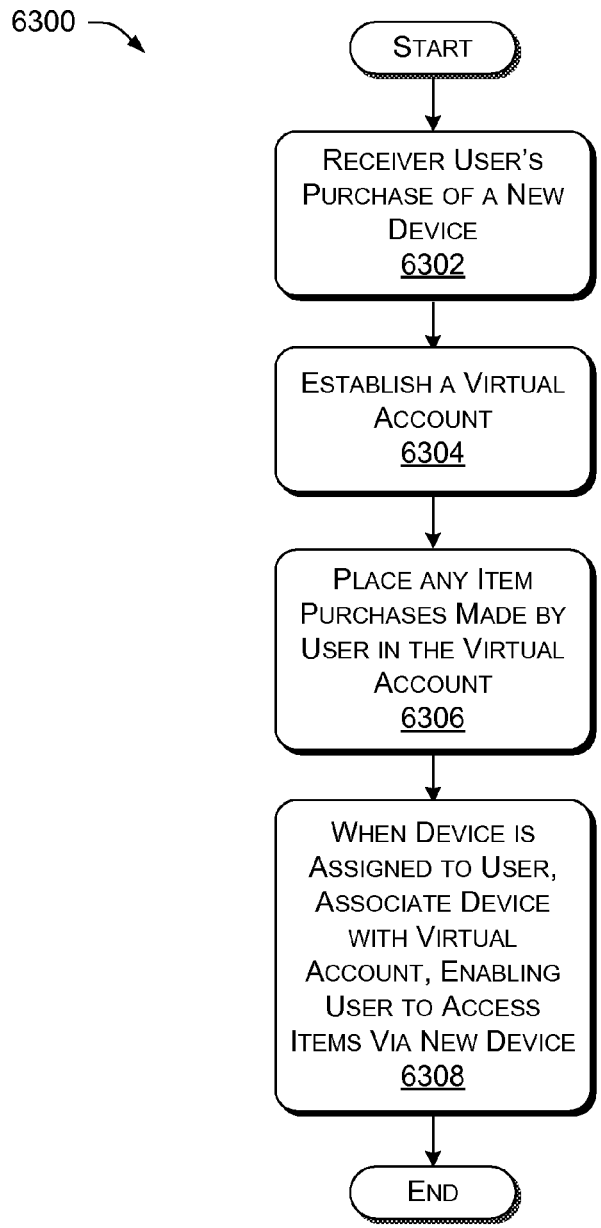
FIG. 63 is a flowchart which depicts one illustrative manner of associating item purchases to a virtual account after the purchase of a new device, but before the purchasing-user is associated with a specific user device.

FIG. 63 illustrates a procedure 6300 for allowing a user to purchase items (or more generally, acquire items) immediately after the user purchases a user device 104. This procedure 6300 may be performed at least in part by the virtual account module 3816 of FIG. 38.

In block 6302, a purchasing system receives the user's purchase of a new user device.

In block 6304, the purchasing system or some other module may establish a virtual account for the user. The virtual account is established before a user device is even assigned to the user.

In block 6306, the purchasing system receives one or more item purchases made the user. The purchasing system associates these purchases with the virtual account created in block 6304.

In block 6308, when a user device is assigned to the user, the purchasing system or some other module may associate the virtual account with the assigned user device. This linking operation allows the user to use his or her new user device to receive and consume the items that were applied to the virtual account.

D.3. Illustrative Initial Testing

Figure 64:
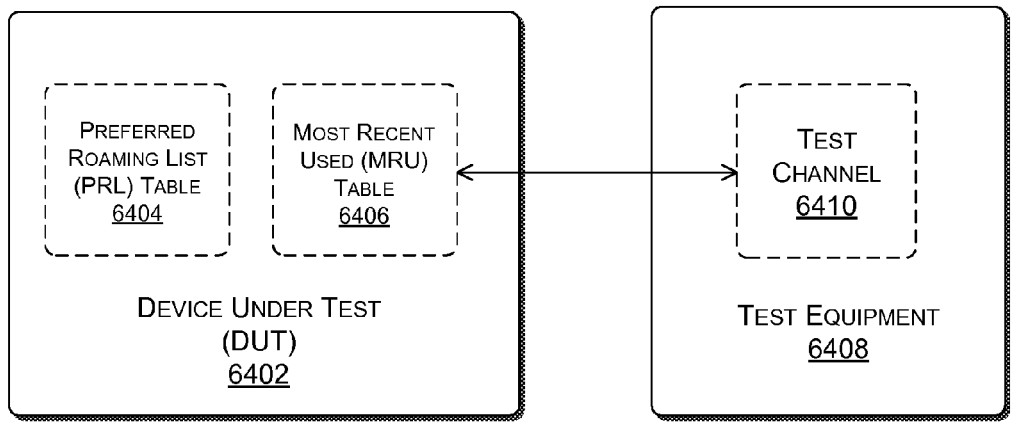
FIG. 64 shows an illustrative arrangement including test equipment and a representative device under test (DUT).

FIG. 64 shows an approach to testing a new user device 6402, referred to, in this context, as a device under test (DUT). For instance, the approach may be used to test the device in a factory or in some other stage of production.

By way of introduction, the user device 6402 may include a preferred roaming list (PRL) 6404 and a most recent used (MRU) table 6406. The PRL 6404 includes a list of target frequencies that that the user device may investigate in order to establish communication with a communication station or the like. The MRU table 6406 identifies the frequency that the user device 104 most recently used to gain access to a communication station.

FIG. 64 also shows test equipment 6408. The test equipment 6408 is used, in part, to test the ability of the user device 6402 to establish communication with a communication station. The test equipment 6408 may use a test channel 6410 to establish communication with the user device 6402 for the purpose of performing a test.

To expedite the testing, the approach illustrated in FIG. 64 programs the MRU table of the user device 6406 so that it stores information that identifies the test channel 6410 of the test equipment 6408. This allows the user device 6402 to quickly establish contact with the test equipment 6408, that is, by avoiding the need for the user device 6402 to hunt for a frequency with which to communicate with the test equipment 6408.

As a further feature, the testing approach does not require storing a test PRL in the PRL table, and then, after the test, replacing the test PRL 6404 with an actual PRL 6404 to be used in the field. That is, in the present approach, the PRL 6404 may maintain an actual PRL information throughout the testing operation.

Figure 65:
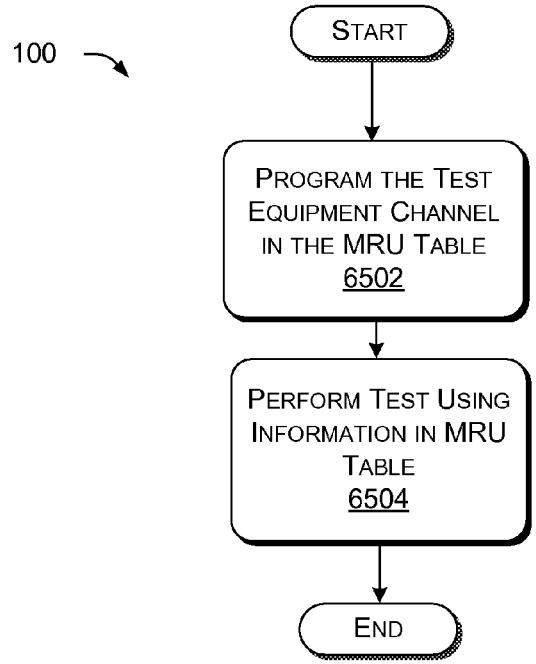
FIG. 65 is a flowchart which depicts one illustrative manner of operation of the arrangement of FIG. 64.

FIG. 65 shows a procedure 6500 for implementing the above-described testing approach.

In block 6502, the MRU table 6406 stores information which identifies the test channel 6410 of the test equipment 6408. In block 6504, the user device 6402 and the test equipment 6408 perform the test. In conducting the test, the user device 6402 does need to hunt for the channel of the test equipment 6408 because the appropriate access information is already stored it its MRU table 6406.

E. Illustrative Search and Indexing Techniques

E.1. Search Overview

This section describes various searching techniques which may be implemented on a computing device to search locally and/or remotely stored content. Search and indexing may be carried out on a local user device (e.g., electronic book reader device, PDA, PC, etc.), a remote computing device (e.g., item-providing system, server, etc.), or both. Search operations tend to be a relatively processor intensive operations. Often, before content is searched, the content is cataloged or indexed for ease of searching. Even so, search may still require considerable processing resources. Additionally, the process of indexing the content also requires processing resources. These processor loads translate into power consumption by the computing device.

Processor loads and power consumption become more of a consideration in the context of portable local user devices, such as e-book readers. Given the relatively large processing and power requirements, search on e-book readers has been largely nonexistent. To the extent that searching has been available on PDAs or other portable user devices, the portable user devices have tended to leverage the greater processing power of remote computing devices to perform search and indexing. However, if search is carried out by a remote computing device, search may not be available when the portable user device is out of communication with the remote computing device.

Illustrative search and indexing techniques are described below in the context of an illustrative e-book reader user device. However, the concepts described herein may be more generally applied to other types of local and/or remote computing devices, such as PCs (desktop or laptop), servers, PDAs, pocket PCs, smart phones, or the like.

E.2. Search Components of Illustrative User Device

Figure 66:
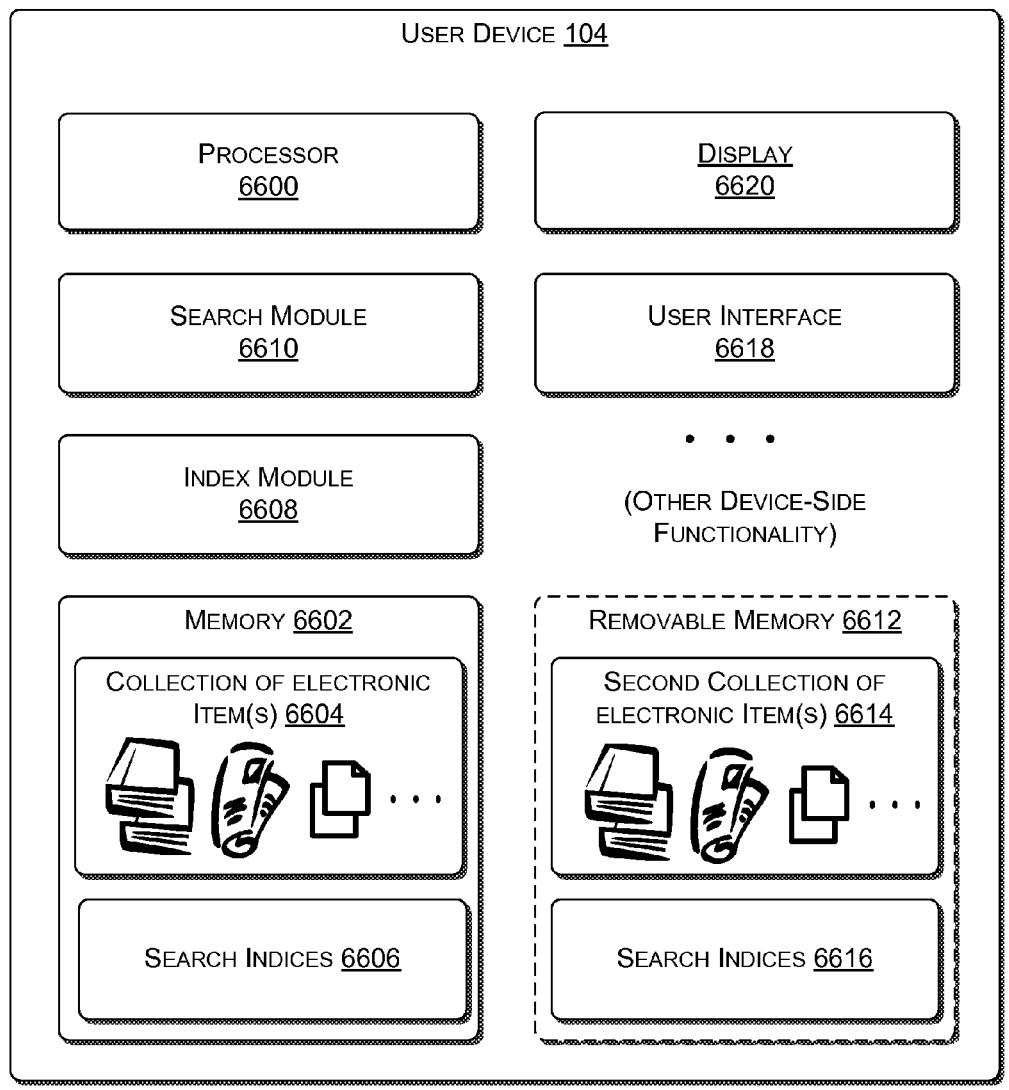
FIG. 66 is a schematic block diagram of a user device according to one illustrative implementation.

FIG. 66 is a schematic diagram of one illustrative user device 104 capable of implementing the search and indexing techniques described herein. The implementations described in this section represent some examples of the search and indexing functionality 404 shown in FIG. 4 and described generally in section A above. Generally, the user device 104 comprises a processor 6600, and memory 6602 storing a collection of electronic items 6604 and one or more search indices 6606. The search indices 6606 comprise an organized catalog or directory of terms found in the electronic items in the collection and may be used to search the collection of electronic items 6604. The search indices 6606 may have been received from a remote source or may be generated by an index module 6608 at the user device 104. The user device 104 also includes a search module 6610 configured to search the collection of electronic items 6604 using the search indices 6606. While the index module 6608 and the search module 6610 are illustrated as separate modules for conceptual understanding, in practice search and indexing functionalities may by implemented by a single search/index module and/or by any number and combination of individual modules.

In the illustrated implementation, the memory 6602 comprises internal memory of the user device 104. Additionally, the user device 104 in this implementation includes removable memory 6612 (e.g., memory card, disk, or the like) storing a second collection of electronic items 6614 and search indices 6616 for the second collection of electronic items. Generally, each memory includes one or more search indices corresponding to the electronic items stored thereon. Thus, removal of one memory does not affect the searchability of electronic items stored on another memory. However, in other implementations, user devices may include any number and combination of memory types, and search indices may be stored together with or separate from the corresponding electronic items.

The user device 104 also includes a user interface 6618, by which users can enter search queries, manipulate search results, browse electronic items, and otherwise interact with the user device 104. Upon entry of a search query, search results may be displayed on one or more displays 6620 of the user device 104, such as the dual display arrangement shown in FIG. 5. As discussed above, the user device 104 may also include various other functionality (e.g., to-do list processing module, reader module, content manager module, power management functionality, etc.). Some of the other functionality may interact with the search and/or indexing modules 6610 and 6608 to manage search results, show storage locations of electronic items (e.g., in internal memory, in removable memory, in remote storage), interact with a remote merchant store, or the like.

Figure 67:
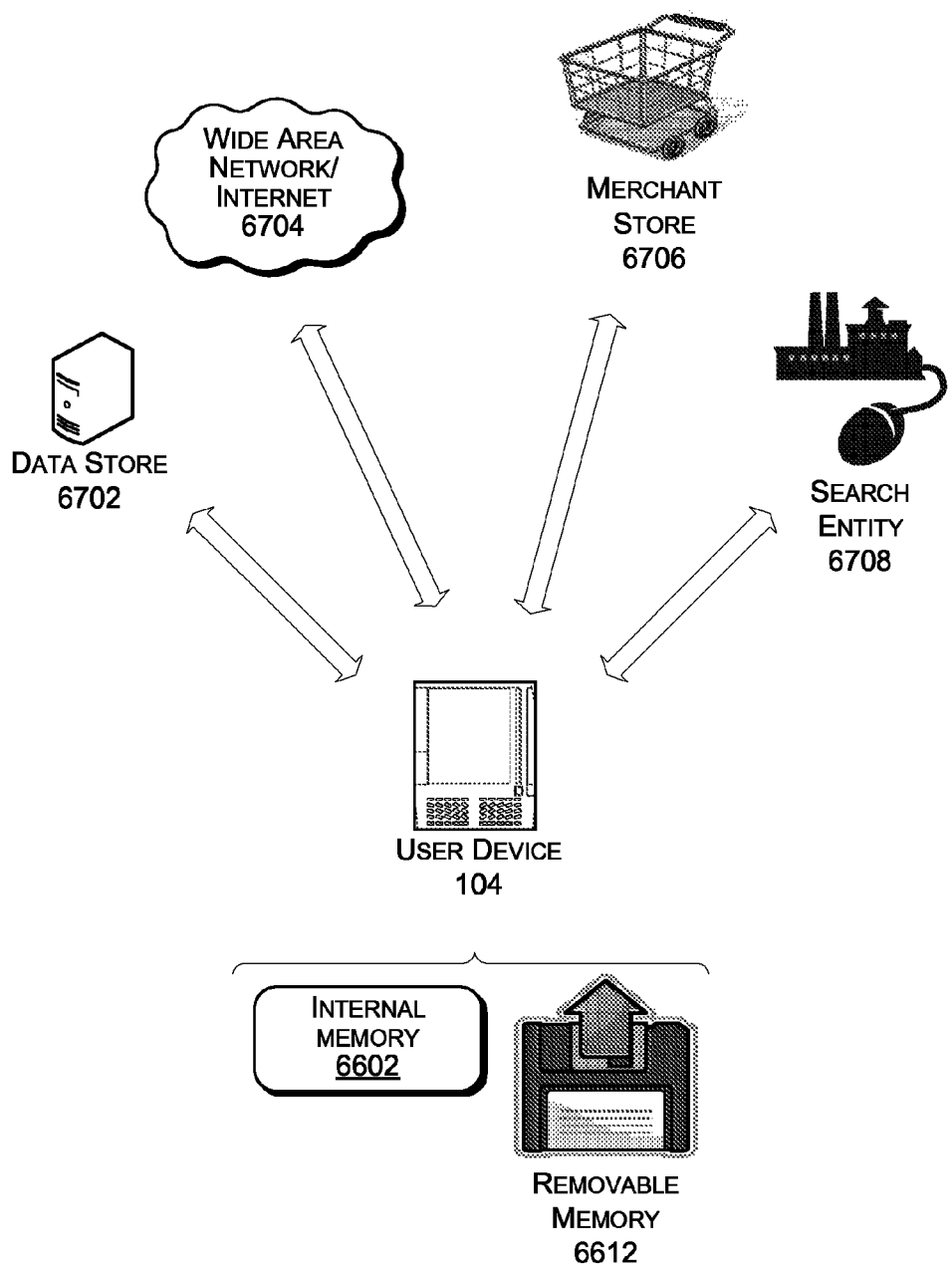
FIG. 67 is a schematic diagram illustrating several possible content sources that may be searchable by a user device.

FIG. 67 is a schematic diagram illustrating a system 6700 of various content sources that may be searchable from the user device 104. In addition to internal memory 6602 and removable memory 6612, the user device 104 may be able to search any number of other local and/or remote content sources. For example, in the illustrated implementation, the user device 104 is configured to communicate with and search a remote data store 6702, a wide area network such as the Internet 6704, a merchant store 6706, and a remote search entity 6608. Communication between the user device 104 and the various sources of content may be via wireless and/or wired communication channels as described in more detail in sections A-D above.

In one implementation, the remote data store 6702 and the merchant store 6706 may comprise a personal media library module and a merchant store module, respectively, such as those described with respect to FIG. 3 in section A above. Search of the Internet 6704 may be accomplished using a conventional Internet search engine, a specialized server-side search engine, and/or a device-side search engine. The search entity 6708 may be any entity capable of searching a source of information and returning results to the user device 104. In one implementation, the search entity 6708 comprises an entity that relies at least in part on humans to compile search results and provide answers to search queries. Various examples of such search entities include Yahoo!® Answers available from Yahoo Inc. located in Sunnyvale, Calif., Wondir, Inc. located in Bethesda, Md., or NowNow® available from NowNow.com located in Seattle, Wash.

E.3. Illustrative Search Methods

Figure 68:
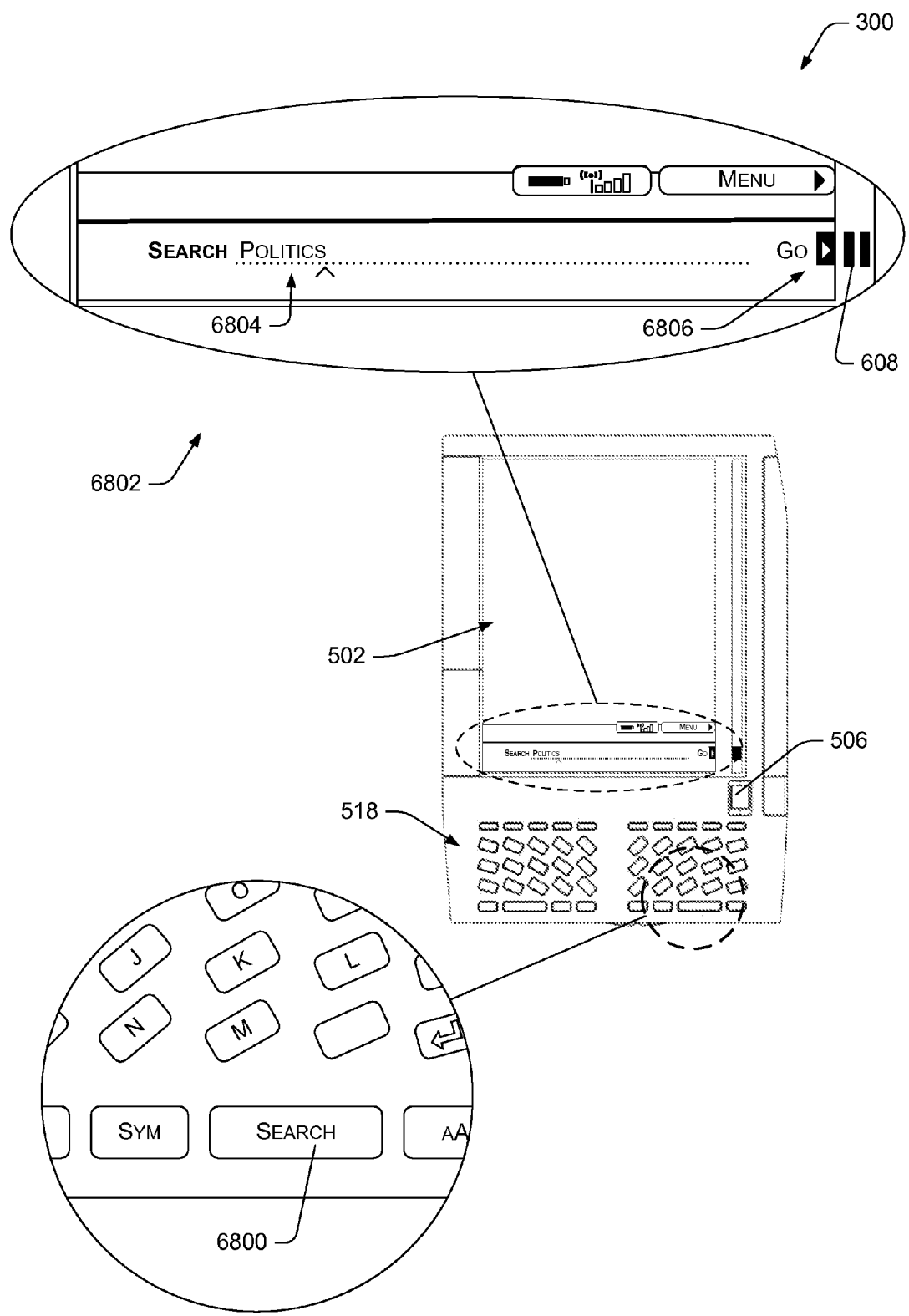
FIG. 68 is a detail view of a search interface of a user device according to one illustrative implementation.

FIG. 68 is a detail view showing how search queries may be entered using the user interface of the user device 104. As discussed with respect to FIG. 5 in section A above, the user device 104 may have a keypad 518. As shown in the lower detail view in FIG. 68, the keypad may include a search key 6800. Pressing the search key 6800 will bring up a search menu 6802, as shown in the upper detail view in FIG. 68. The search menu 6802 includes a query filed 6804 and a "go" field 6806. A user may enter a search query having any number of one or more search terms in the query field 6804 of the search menu 6802 by typing the query using the keypad 518, selecting text from the reader screen 502 using the thumbwheel 506 or any other input of the user interface 6618. During entry, the search query term(s) appear in the query field 6804. The user may begin the search by selecting the "go" field 6806 using the cursor 608.

Figure 69:
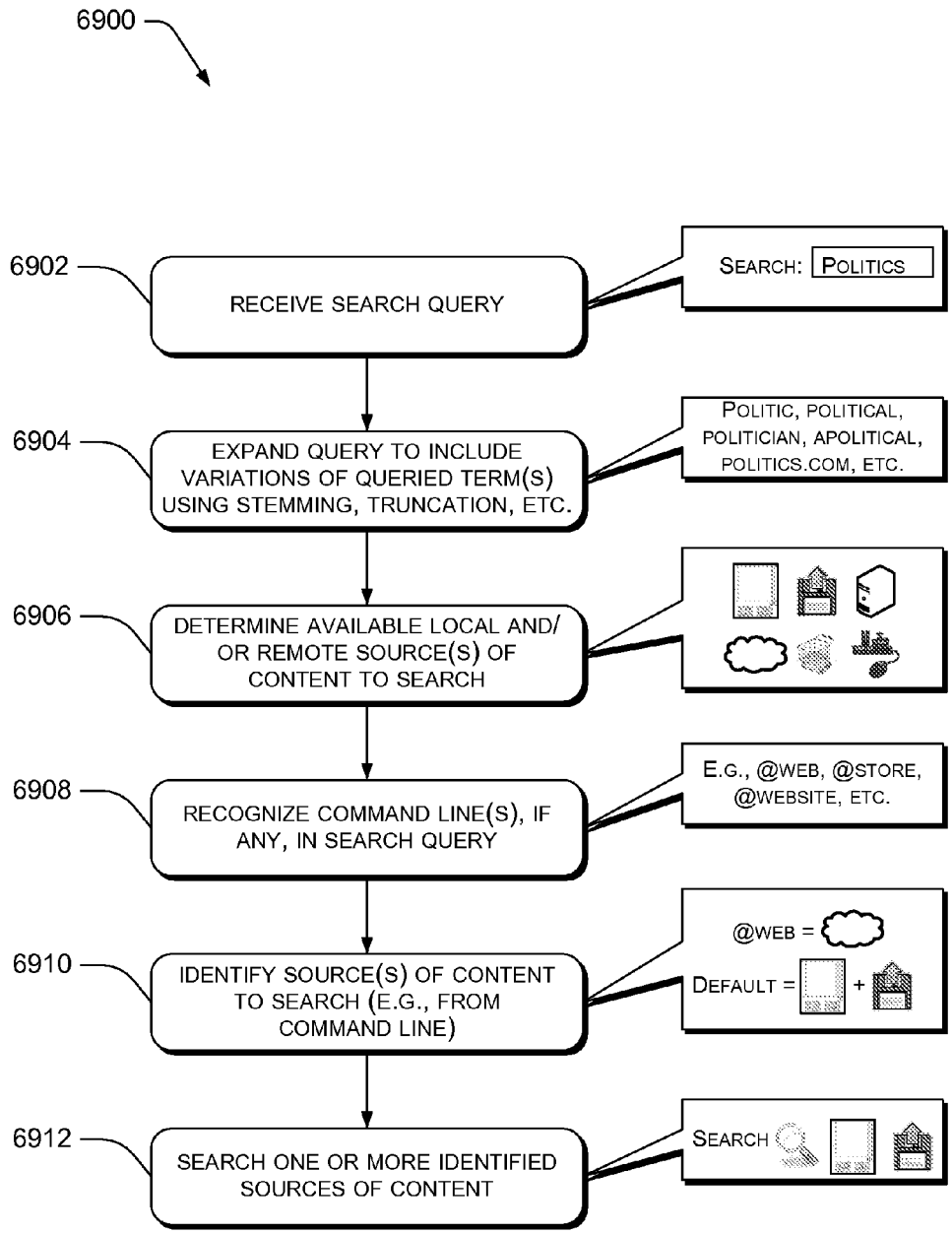
FIG. 69 is an annotated flowchart of one illustrative search method that may be performed on a user device.

FIG. 69 is a flowchart demonstrating an illustrative full text search method 6900 that may be implemented by a user device, such as, for example, an e-book reader. The method 6900 is described in the context of user device 104 for illustration, but could be implemented using any other type of user device. At 6902 the user device 104 receives a search query input via the search menu 6802, for example. In the illustrated example, only one search term "politics" is entered. If multiple search query terms are entered, in some implementations, the search module 6610 may treat the terms as being separated by an implicit "near" operation. However, in other implementations, any other implicit or explicit operators (e.g., Boolean operators, near operators, or the like) may be used.

The search query may be expanded at 6904 to include variations of the queried terms using stemming, truncation, or any other suitable search conventions. For example, stemming may include recognizing any one or more of the following variations of the query terms: plural forms of singular query terms, singular forms of plural query terms, other verb tenses of the query terms, common misspellings of the query terms, foreign language translations of the query terms, possessive forms of the query terms, domain names including the query terms, among other variations. Truncation refers to the ability to search for terms with varying prefixes or suffixes. Details of truncation and various other search conventions will be apparent to those skilled in the art.

At 6906, the user device 104 determines sources of content that are available to it. In this case, the available sources of content include internal memory 6602, removable memory 6612, a remote data store 6702, the Internet 6704, a merchant store 6706, and a remote search entity 6708.

In some instances, the search query may include a command line or other designator, indicating one or more sources of content to search. If present, the command line may be designated by any suitable character, symbol, button, or other designator. In one example, the "@" symbol may be used to begin a command line identifying one or more sources of content to be searched. In that example, the command line "@web" indicates that the search should be performed on the web. However, any other suitable designator may be used to offset a command line (e.g., #, $, %, ^, &, *, ", a checkbox, a separate scope field, a pull down menu, etc.). Command lines may designate one or more whole sources of content (e.g., the web, remote data store, internal memory, etc.) or some subset of a content source, such as a particular website, a type of content (e.g., books, music, periodicals, etc.), a collection of items (e.g., drama, Dad's stuff, etc.), or any other subset of content.

At 6908, the user device 104 may recognize any command line(s) that are present in the search query and, at 6910, identify one or more sources of content to search. If, as in the illustrated implementation, no command line is found in the search query, the search may default to one or more predetermined sources of content. In one implementation, the search may default to searching local content stored in internal and/or removable memory of the user device 104. Alternatively, the search could default to search all available sources of content, or any one or more of the other source of content available to the user device 104.

At 6912, the user device 104 commences searching the one or more identified sources of content for the queried terms. In the illustrated example, since no command line was entered, the user device 104 searches the default source(s) of media content (in this case, local memory of the device) for the term "politics."

Figure 70:
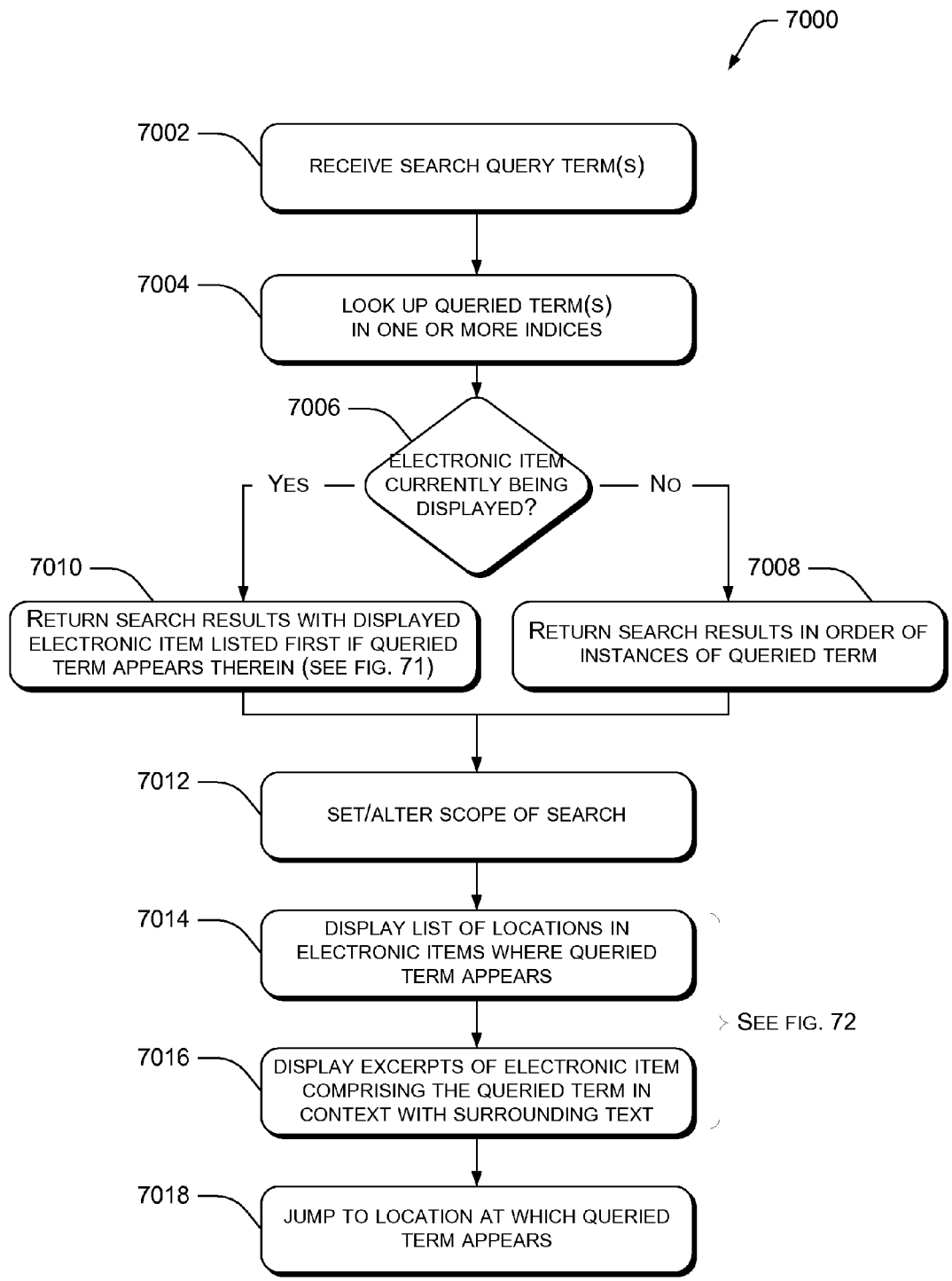
FIG. 70 is a flowchart of an illustrative search method that may be performed on a user device.

FIG. 70 is a flowchart illustrating additional details of one illustrative search method 7000, which is described in the context of user device 104 for convenience, but which may also apply to other user devices. Details of the search method 7000 are described with reference to illustrative search screens shown in FIGS. 71 and 72. Referring back to FIG. 70, at 7002, the user device 104 receives a search query including one or more queried terms and begins the search process. The search is performed by the search module 6610, which at 7004, looks up the queried term(s) in one or more search indices. Generally, the indices include one or more organized lists of terms used in electronic items that are accessible on the user device 104. The indices may include the full text of electronic items, titles, headers, tables of contents, and/or metadata. In one implementation, the indices may include searchable indices of the full text of some electronic items (e.g., electronic items stored locally) and searchable indices of limited portions (e.g., title, header, and metadata) of other electronic items (e.g., remotely stored electronic items). Several indexing schemes will be described in detail below.

In some implementations, the electronic items to be searched and/or the manner of displaying the search results may vary depending on what the user was doing when the search was requested. In the implementation shown, the user device 104 determines, at 7006, whether an electronic item is currently being displayed. If not (e.g., if the search is requested from a home screen, content manager screen, etc.), at 7008, the search module 6610 returns the search results in order of the number of instances that the queried term(s) appear in each electronic item. Thus, the electronic item with the most instances or hits of the queried term(s) will be listed first. If an electronic item is being displayed (e.g., the search is requested from a reading pane within an e-book or other electronic item), at 7010, the search module 6610 returns the search results with the presently displayed electronic item listed first if the queried term appears therein. In that case, the remaining results are listed in order of the number of instances of the queried terms. If the queried term does not appear in the electronic item currently being displayed, then the search results are displayed in the same manner as block 7008.

Figure 71:
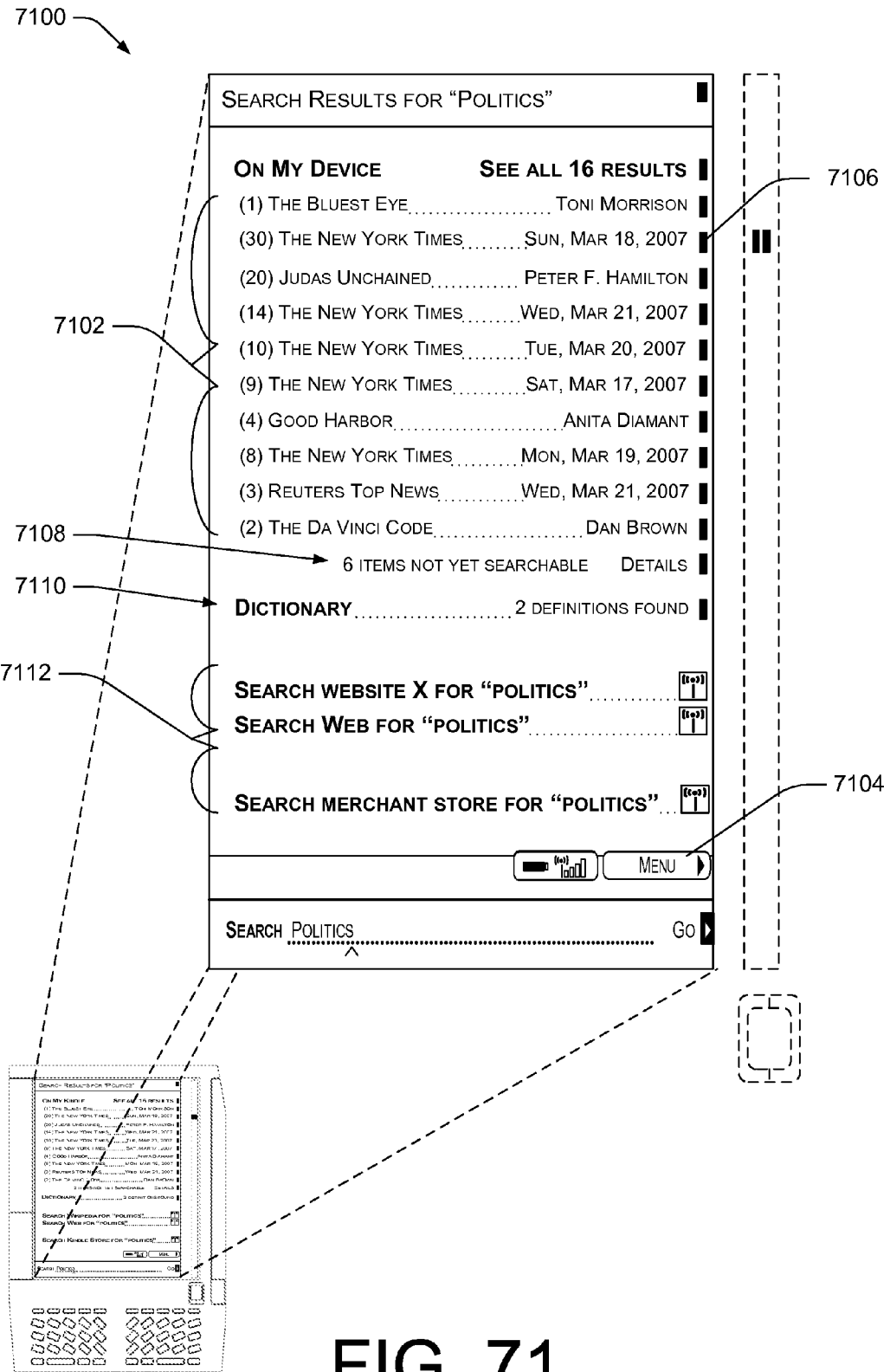
FIG. 71 is a schematic diagram of an illustrative interface that may be used to present search results on a user device.

FIG. 71 is an illustrative search results screen 7100 showing a list of electronic items displayed in a manner consistent with block 7010 in FIG. 70. In this example, since no command line was entered, the search defaulted to cover content stored in local memory of the user device 104. Thus, the search results screen 7100 displays a list 7102 of electronic items in local memory of the device that contain the queried search term(s). A number of times that the search term(s) appear is listed in parenthesis along a left side of each electronic item in the list 7102. In this example, the search was requested from within an electronic item entitled "The Bluest Eye." Accordingly, since it was being displayed when the search was requested and contains the query term "politics," the electronic item "The Bluest Eye" is listed first in the list 7102, followed by other electronic items having the queried term listed in order of the number of instances of the queried terms.

In other implementations, if a user is in the process of consuming an electronic item when the search is requested, the search may be limited to the text of the electronic items being consumed prior to the search. Conversely, if the user requests the search from outside an electronic item, the search may encompass text of all electronic items accessible to the user device 104, all electronic items in local memory of the user device 104, or a subset of the electronic items (e.g., a collection) in local memory of the user device 104.

Referring back to FIG. 70, the user may also be given the option, at 7012, to manually set or alter the scope of the search. In one implementation, the user may be able to scope the search by, for example, selecting the menu button 7104 on the search results screen 7100 in FIG. 71, and choosing to scope the search based on one or more displayed menu items (not shown). For example, the user may be given the option to limit the search by type of content (e.g., books, periodicals, music, etc.), by source of the content (e.g., internal memory, removable memory, remote data store, merchant store, etc.), and/or by any number of other scoping tools.

Selection of one of the electronic items from the list 7102 of electronic items in FIG. 71 may, at 7014, cause a list of locations where the queried term(s) appear in the selected electronic item to be displayed. In one implementation, the locations are invariant and are identified by invariant location reference identifiers. Invariant location reference identifiers, as their name suggests, make it possible to identify and communicate a specific location or segment of content in the electronic item, regardless of screen size, font type or size, resolution, or other display conditions of the computing device on which the electronic item is displayed. Generally, this is accomplished by assigning unique reference identifiers at locations throughout the content of the electronic item, or to individual segments of the electronic item. These reference identifiers are not dependent on display conditions of the computing device on which the electronic item is displayed. In that sense, the reference characters are invariant.

There are numerous ways of providing invariant location reference identifiers in, or in association with, content of an electronic item. In addition, there are a variety of ways in which electronic items may be partitioned and assigned invariant location reference identifiers. For example, each invariant location reference identifier may be assigned to an individual character or word, a group of words, a sentence, a paragraph, a band of text of predetermined size, a unit of data, or some other division of the electronic item. Additional details of invariant location reference identification schemes can be found in U.S. patent application Ser. No. 11/693,677, filed Mar. 29, 2007, and entitled "Invariant Referencing in Digital Works."

At 7016, excerpts of the electronic item comprising the queried term(s) in context with surrounding text may be displayed along with or instead of the locations where the queried term(s) appear in the selected electronic item. For example, if a user selects the selectable block 7106 in FIG. 71 adjacent to the Mar. 18, 2007 edition of the New York Times, an instance screen may be displayed showing the instances of the term "politics" in that edition of the New York Times.

FIG. 72 is an illustrative example of an instance screen 7200 that may be displayed in response to user selection of the selectable block 7106 in FIG. 71. As shown in FIG. 72, excerpts 7202 of text surrounding the first six instances of the term "politics" are displayed, along with a location 7204 of the excerpt in the electronic item. The queried term "politics" itself may be emphasized (e.g., bolded, italicized, underlined, highlighted, etc.) within each excerpt 7202. Additional instance excerpts may be viewed by navigating to a next page of instances using the menu button. Selection of one of the excerpts 7202 may cause the user device 104 to jump (7018) to the selected location in the electronic item and open a reading pane so that the user can begin reading the electronic item from the excerpted location.

Referring back to FIG. 71, in addition to the list 7102 of electronic items containing the queried term(s), the search results screen 7100 may also include an entry 7108 for any electronic items that have yet to be indexed and are, therefore, not yet searchable. The search results screen 7100 also displays a dictionary link 7110 to view a definition of the query term(s) in one or more dictionaries stored in local memory of the user device. In this case, the search results screen 7100 indicates that two dictionary definitions are available and may be viewed by selecting the selectable block next to the dictionary link 7110. The search results screen may also include a list of other sources of content 7112 that may be searched. In this case, the search results screen 7100 gives the user the option to search the web, a specific website, or the merchant store for the queried term. Of course, the search results screen 7100 is but one possible way of displaying search results. Numerous other ways of presenting search results to a user will be apparent to one of skill in the art.

As mentioned above, the search results screen includes an entry 7106, indicating how many electronic items are not yet searchable. A user may wish to know which electronic items are not yet searchable and when they can be expected to be indexed. Selection of the entry 7108 of not yet searchable items will bring up an indexing status screen 7300, such as that shown in FIG. 73. The indexing status screen 7300 may include a queue 7302 of electronic items that have been received, but that are not yet indexed. The queue 7302 may be organized in order of receipt by the user device 104, alphabetical order, or any other suitable order. The queue 7302 may include an indexing status indicator 7304 for each electronic item (e.g., "indexing" or "not yet indexed"). While not shown, any electronic item shown as "indexing" may also include a progress bar or other indicator of how much of the item has been indexed and/or remains to be indexed (e.g., 60% indexed, 40% remaining, 500 bytes remaining, 2 minutes remaining, etc.).

Generally, the electronic items will be indexed in the priority order listed in the queue. However, a user may request to change the indexing priority order to have a later electronic item in the list indexed first by simply selecting the selector block next to the electronic item in the list. Once selected, the indexing status indicator 7304 of the electronic item will change from "not yet indexed" to "indexing" and the selector block adjacent the electronic item will disappear. In other implementations, the electronic items in the queue 7302 may be assigned an indexing priority by the user. For example, the user may be given the opportunity to assign an indexing priority to each electronic item in the list (e.g., by assigning a numerical or other ranking to the electronic items in the list).

E.4. Illustrative Indexing Techniques

Indexing refers to a process of organizing and cataloging terms used in one or more electronic items so that the electronic items can be readily searched for one or more query terms. Indexing for full text search may be performed in a number different ways. In one approach, a single master index may be used to catalog terms used in all electronic items stored in memory, along with the location of each respective term. In another approach, each electronic item includes an item index of terms and the location of each term in that particular electronic item. In yet another approach, both master and item indices are used. In this "hybrid" approach, the master index includes a list of terms used in all electronic items stored in memory, and each term in the master index is accompanied by a pointer to an entry in an item index for each electronic item. By using the hybrid approach, if the master index is corrupted or lost, it may be reconstructed from the individual item indices. Also, if an item index is corrupted or lost, the individual electronic item can be re-indexed, without the need to regenerate the master index. However, every indexing technique has certain advantages and, in various implementations, any of the foregoing or other indexing techniques may be used to index content for search by a user device.

Figure 74:
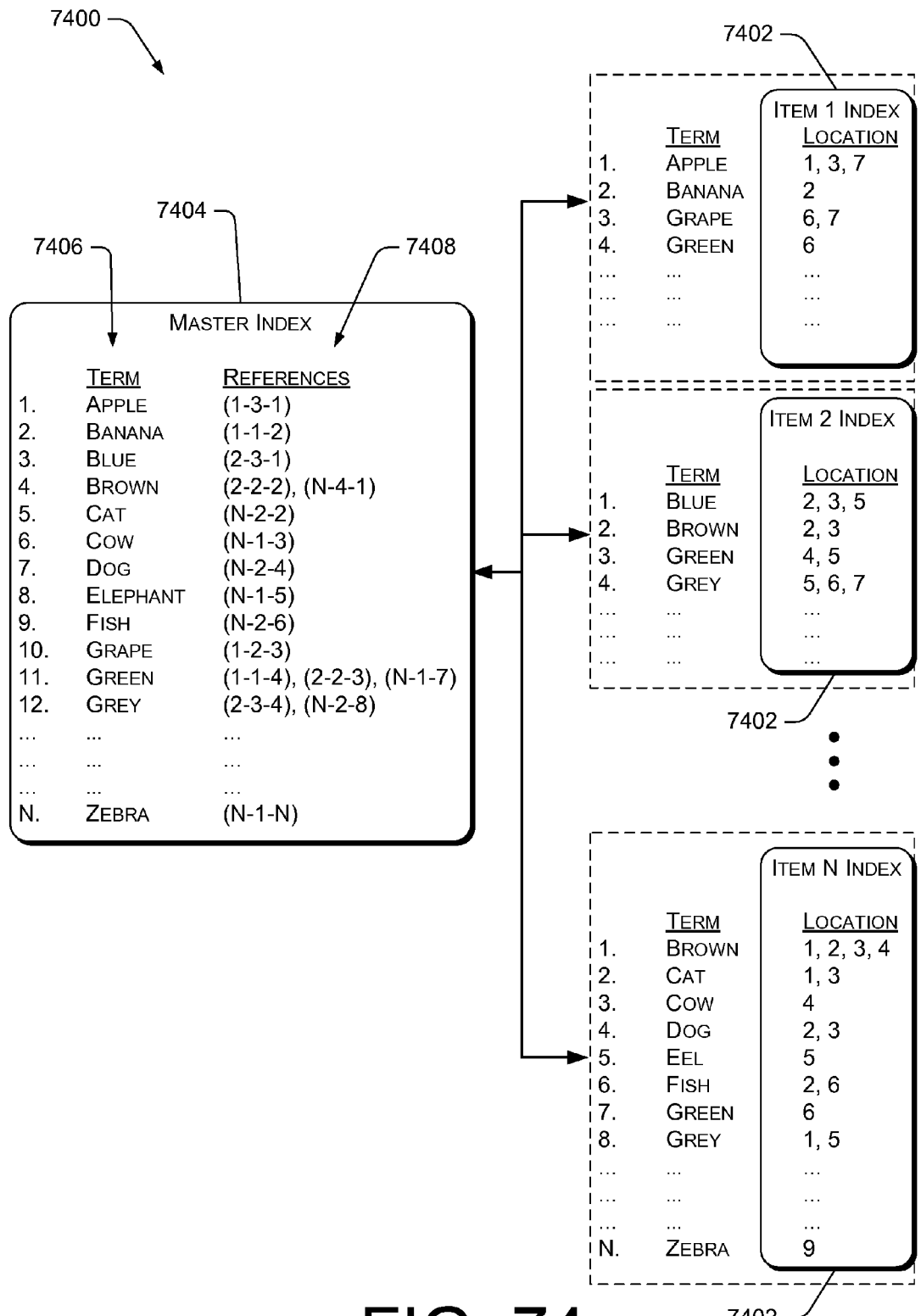
FIG. 74 is a schematic block diagram illustrating an indexing scheme according to one illustrative implementation.

FIG. 74 is a schematic view illustrating a hybrid indexing process 7400 in more detail. In this example, the user device 104 has a collection of electronic items stored in memory, including Item 1 (a child's e-book of fruit), Item 2 (a child's e-book of colors), and Item N (a child's e-book of animals). Each item has a corresponding item index 7402 stored in memory, which comprises a list of locations at which terms in the electronic item appear. The item indices 7402 generally consist of the locations of terms in the electronic item. The item indices 7402 may be organized based on frequency of occurrence of the terms, order in which the terms appear in the electronic item, alphabetical order, or any other suitable order. The item indices 7402 may, but generally do not, include a list of the actual terms to which the locations correspond. For example, Item 1 has an item index 7402 including the locations in electronic item 1 of the terms Apple, Banana, Grape, and Green, among others. In the illustrated example, the term Apple appears three places in Item 1: location 1, location 3, and location 7. Banana appears at location 2, Grape appears at locations 6 and 7, and Green appears at location 7.

Similarly, Item 2 has an item index 7402 including the locations in electronic item 2 of the terms Blue, Brown, Green, and Grey, among others. Item 3 has an item index 7402 including the locations in electronic item 3 of the terms Brown, Cat, Cow, Dog, Eel, Fish, Green, Grey, and Zebra, among others. A master index 7404 is also stored in memory of the user device 104. Typically, a master index is provided for each memory accessible by the user device 104, and includes terms used in all the electronic items stored on the respective memory. The master index 7404 includes a list of terms 7406 used in any of the electronic items stored in the respective memory. For each term, the master index includes a reference 7408 to one or more item index entries. The references may include an identifier of the electronic item in which the term appears, a number of times the term appears in the electronic item (an occurrence count), and a location in the item index corresponding to the term (e.g., which entry in the item index). For example, the term "Apple" in the master index is accompanied by a reference "1-3-1," indicating that the term appears in the first electronic item, it appears three times in that item, and it is the first entry in the item index for that electronic item. As another example, the term "Brown" is accompanied by two references "2-2-2" and "N-4-1." The reference "2-2-2" indicates that the term "Brown" appears in the second electronic item, it appears twice in that item, and is it is the second entry in the item index for that electronic item. The reference "N-4-1" indicates that the term "Brown" also appears in the Nth electronic item, it appears four times in that item, and it is the first entry in the item index for that electronic item.

Figure 75:
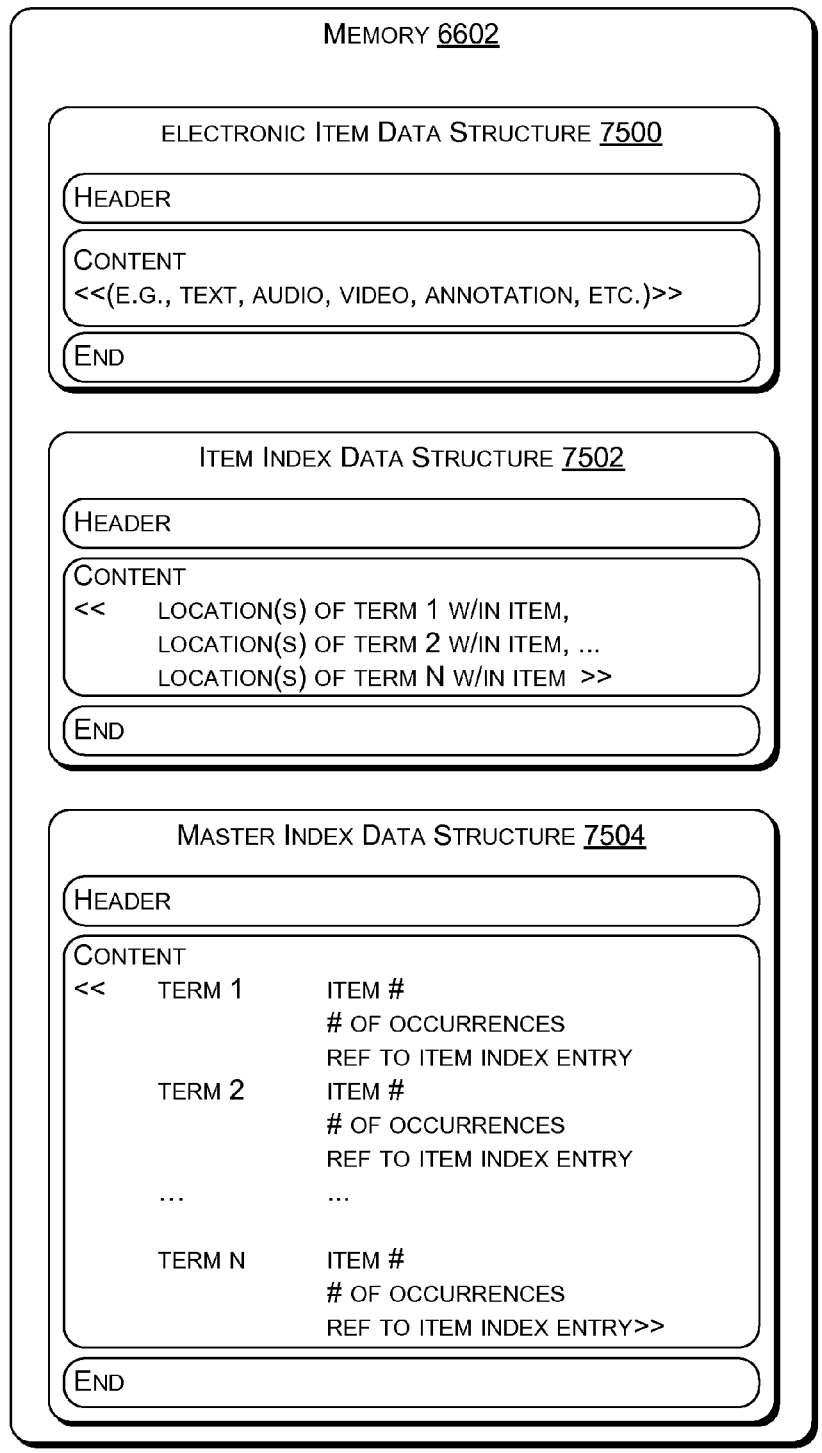
FIG. 75 is a block diagram illustrating data structures of an electronic item, an item index, and a master index stored in memory, according to one illustrative implementation.

FIG. 75 schematically illustrates one illustrative way in which electronic items, item indices, and a master index may be stored in memory, such as memory 6602 or 6612, for example. As shown, memory 6602 includes one or more electronic item data structures 7500, one or more item index data structures 7502, and one or more master index data structures 7504. Each of the data structures 7500, 7502, and 7504 may include a header field designating a beginning of the data structure, a content or body field containing the respective content or index, and an end field designating an end of the data structure, among others. Any of the data fields may contain metadata about the data structure, such as a name or title of the electronic item or index, creation date, author, byte count of the data structure, indexing order, or the like. The data structures 7500, 7502, and 7504 are illustrative and, in practice, the data structures may have any number of one or more data fields.

In this simple example, only one electronic item data structure 7500 and one item index data structure 7502 are shown in memory 6602. However, in practice any number of electronic item data structures and corresponding item index data structures may be stored in memory. Also, while generally only one master index data structure will be stored in memory, in some instances multiple master index data structures may be present (e.g., during merging as discussed in detail below).

E.5. Illustrative Methods of Obtaining Search Indices

As discussed above, search indices are used to facilitate search of electronic items. When the user device 104 receives an electronic item, the item may not be searchable until a search index for the item has been obtained. In one implementation, the user device 104 may obtain search indices by downloading the indices from a server or other remote data store, or by generating the indices at the device. In other implementations, indices may additionally or alternatively be obtained by generation at a personal computer of the user, or in any other suitable manner.

Figure 76:
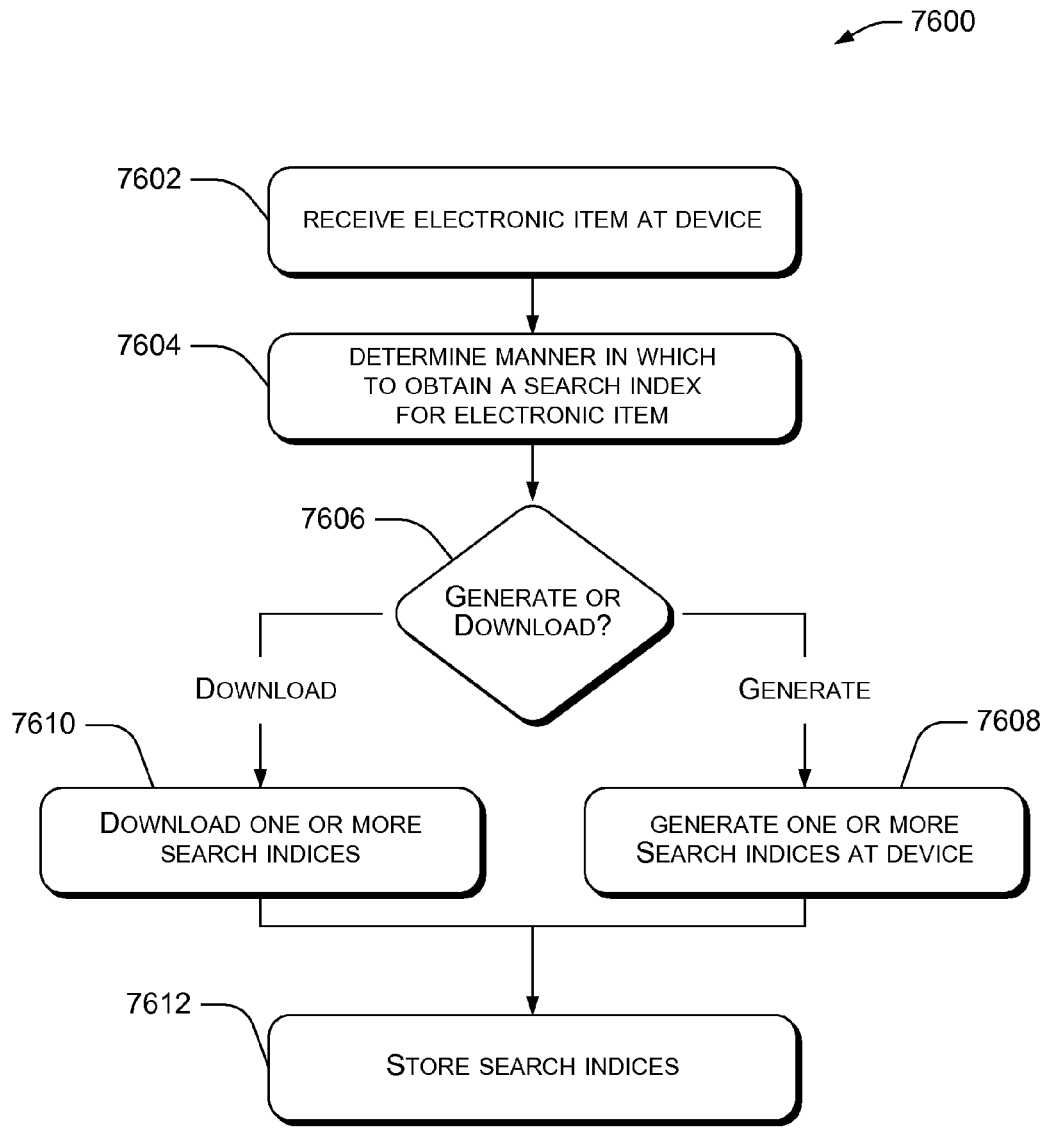
FIG. 76 is a flowchart of an illustrative method of determining how to obtain search indices for an electronic item, according to one illustrative implementation.

FIG. 76 is a flowchart of an illustrative method 7600 of obtaining search indices for electronic items, which is described in the context of user device 104 for convenience, but which may also apply to other user devices. The method 7600 begins at 7602 with receipt of an electronic item at the user device 104. At 7604, the user device 104 determines a manner in which to obtain a search index for the electronic item. At 7606, a decision is made whether to download or generate the search index. The decision whether to download or generate the search index may be based on a number of different factors, such as the size of the index and/or the resource costs of downloading vs. generating the index, for example.

Figure 73:
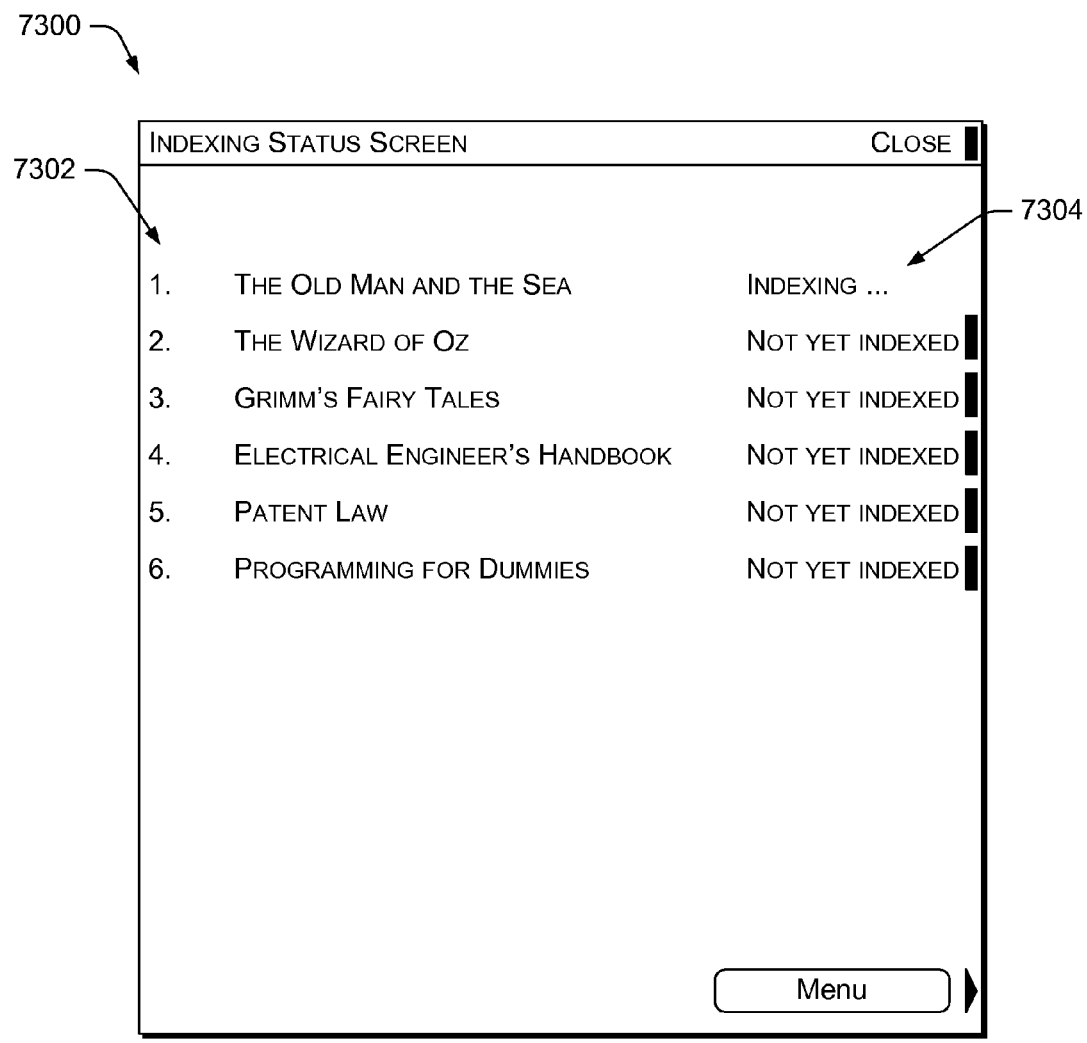
FIG. 73 is a schematic diagram of an illustrative interface that may be used to present a status of indexing on a user device.

If the decision is made to generate the search index, at 7608, the index module 6608 of the user device 104 adds the electronic item to the queue of items to be indexed by the device (e.g., the list shown in FIG. 73). The index will then be generated in the priority order of the queue or an order specified by the user. If the decision is made to download the search index, at 7610, the user device 104 downloads the search index (e.g., using the to-do list processing module 334). Once the index is obtained either by generation or downloading, at 7612, the index is stored in memory of the user device 104 for search by the search module 6610.

Figure 77:
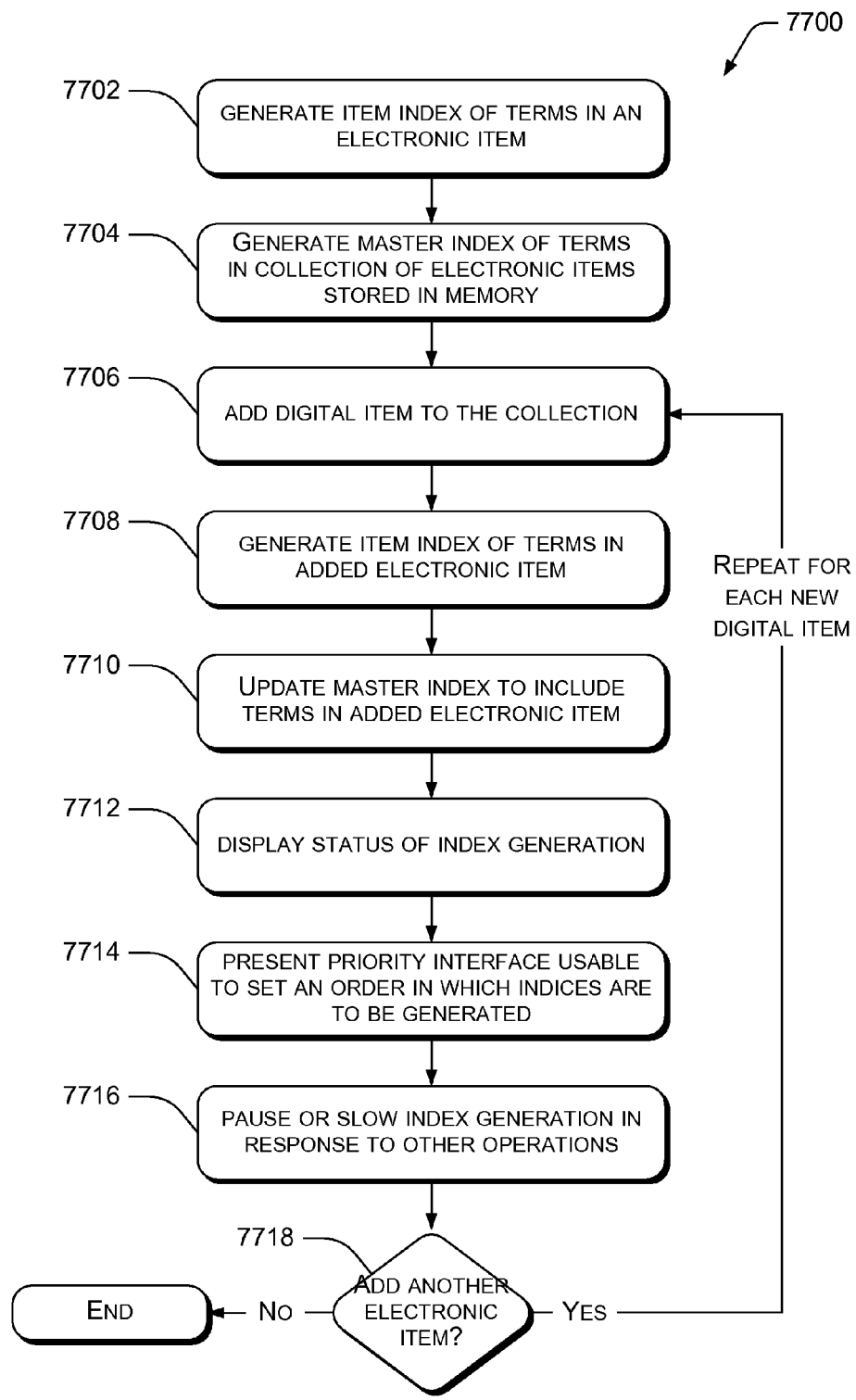
FIG. 77 is a flowchart of an illustrative method of generating search indices for an electronic item at a user device, according to one illustrative implementation.

FIG. 77 is a flowchart illustrating details of one illustrative method 7700 of generating search indices for an electronic item (one possible implementation of act 7608 in FIG. 76). The method 7700 is implemented using the hybrid indexing approach outlined above; however, other indexing approaches may alternatively be used. Accordingly, at 7702, a searchable item index of terms is generated, which includes an organized list of locations of the terms appearing in the electronic item. As mentioned above, the item index may be organized in any suitable order, such as alphabetical order, the order of appearance in the electronic item, in order of the number of occurrences in the electronic item, or the like.

At 1204, a searchable master index of terms is generated containing a list of terms used in any electronic items in a collection of electronic items. For each term, the master index also includes a reference to each item index entry for the respective term. Thus, if a term appears in five electronic items, the master index may have five references to item index entries, one for each electronic item. The references to item index entries may include, among other things, an identifier of the electronic item in which the term appears, a number of times the term appears in the respective electronic item, and a position at which the term is indexed in an item index for the respective electronic item. The master index eventually may include terms from multiple electronic items stored in memory of the user device 104 or from a collection thereof. However, at this stage of the method 7700, since only one electronic item has been indexed, the master index may only include terms from the one indexed electronic item.

At 7706, an additional electronic item may be added to the collection of electronic items stored in memory of the user device 104. At 7708, a searchable item index of terms in the added electronic item is generated, and at 7710, the master index is updated to include the terms from the added electronic item. In this way, as additional electronic items are added, the terms used in each are added to the master index so that they become text searchable on the user device 104.

At some point during the index generation process, at 7712, a status of the index generation may be displayed to the user. The status may be displayed by an index status screen, such as screen 7300, or by any other suitable display method. In other examples, an indexing status may be displayed on the content manager screen, a home screen, or in any other convenient manner. At 7714, a priority interface may be presented to the user, by which the user can set or modify an order in which indices are to be generated. The priority interface may be combined with the index status display or may be a separate interface. Display of the index status and/or the priority interface may occur at any time in method 7700, not necessarily in the order shown in FIG. 77. Also, the index status and/or priority interface may be displayed automatically upon the happening of some event (e.g., receipt of a new electronic item), and/or upon request of the user.

Searching and indexing tend to be relatively processor intensive operations. Thus, depending on the speed and processing resources of the processor 6600, indexing may interfere with and/or delay other processes executing on the processor 6600. To avoid any interference or delay, in some implementations, at 7706, indexing may be paused or slowed while other operations are performed by the processor. Whether indexing will be paused or slowed, depends on the relative importance of the other operations to be performed by the processor 6600. That is, indexing may only be paused or slowed if the other processor operations are of higher priority than the indexing operation. Generally, operations requested by the user or by a remote computing device (e.g., item-providing system 102) will be of higher priority than indexing. However, priority of various operations may be set in any desired order.

Several illustrative examples when indexing may be paused include during interaction or purchase of an item from the merchant store, during download of an item from the content delivery module or the personal media library, while browsing the Internet, while refreshing a display, or the like. In some instances, the other operation to be performed may not require the full processing resources of the processor and/or may only require processing intermittently. In those cases, indexing may only be slowed, rather than paused. Several illustrative examples when indexing may be slowed include while playing audio items using the audio player module 410 and while browsing the Internet. Of course, in various other implementations, indexing may be paused or slowed in response to these and/or any other operation that requires processing. Pausing and/or slowing may occur at any time in method 7700, not necessarily in the order shown in FIG. 77.

At 7718, if another electronic item has been received to be added to the collection, the method repeats acts 7706-7716 for each additional electronic item. If no additional items are presently being added, the method 7700 ends until a new electronic item is received.

Instead of generating the search index for a new electronic item, the user device may determine (at act 7606 in FIG. 76) to download the search index from a remote computing device, such as item-providing system 102. Download of search indices is described below with respect to FIGS. 78-82.

Figure 78:
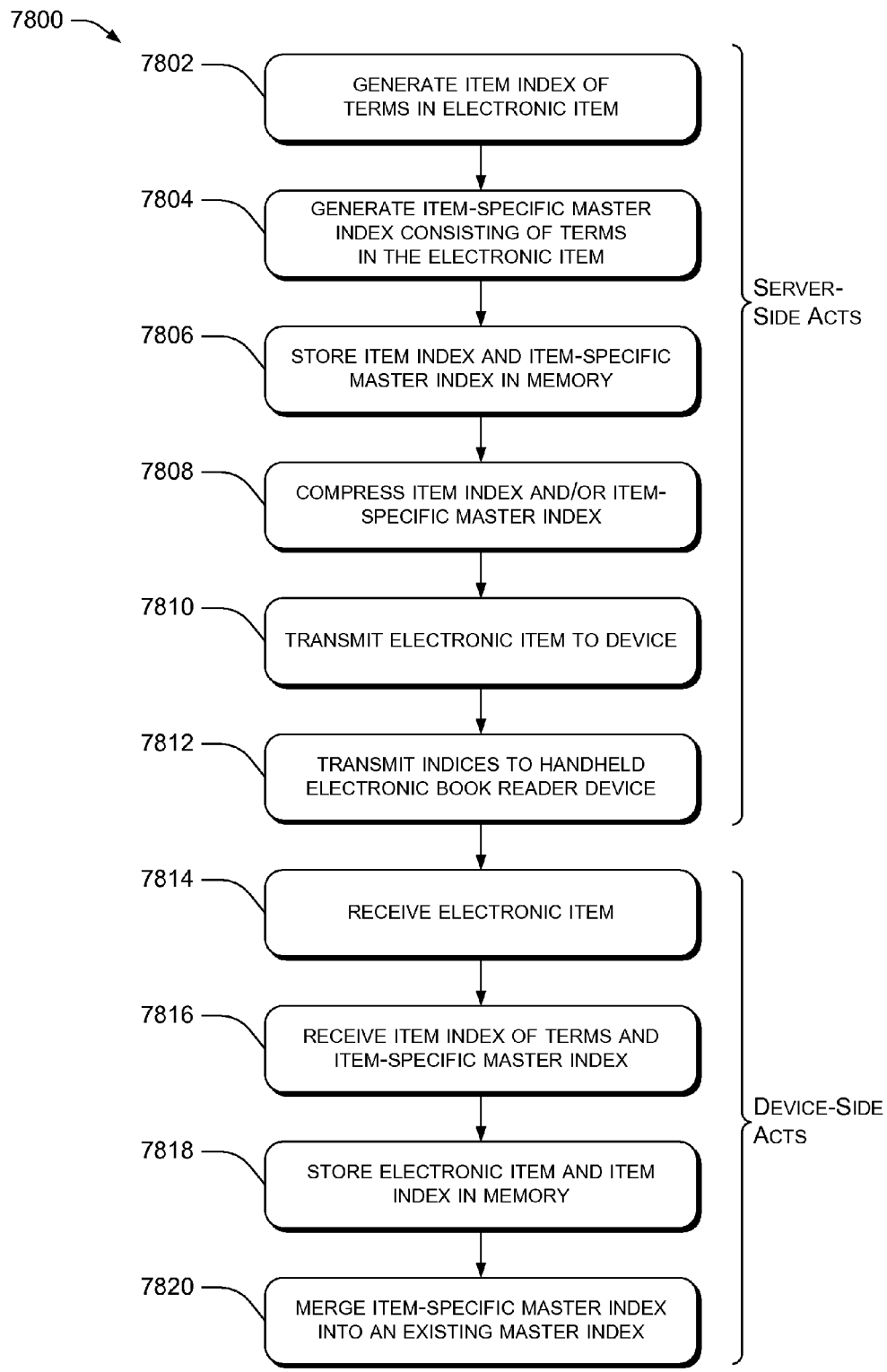
FIG. 78 is a flowchart of an illustrative method of downloading search indices from an item-providing system to a user device, according to one illustrative implementation.

FIG. 78 is a flowchart illustrating details of one illustrative method 7800 of downloading search indices for an electronic item (i.e., one possible implementation of act 7610 in FIG. 76). Some of the acts of method 7800 are described as being performed by the user device ("device-side acts"), while others are described as being performed by a remote computing device ("server-side acts"), such as the item-providing system 102. Generally, the remote computing device may be faster, have greater processing power, and/or have fewer power constraints than the user device 104. Thus, in some instances it may be beneficial to have the indices generated by the remote computing device and then transmitted to the user device 104.

The method 7800 may be performed anytime before or after transmission of an electronic item from the remote computing device to the user device 104. At 7802, the remote computing device generates a searchable item index of terms in the electronic item and, at 7804, generates a searchable item-specific master index of terms in the electronic item. The item-specific master index may in some instances consist only of terms used in the electronic item. In other instances (e.g., if multiple electronic items were or will be transmitted near in time to one another), the item-specific master index may include terms used in the multiple electronic items (e.g., those that were or will be transmitted near in time).

At 7806, the item and item-specific master indices are stored in memory of the remote computing device for possible transmission to one or more user devices 104. The indices may, at 7808, be compressed using one or more known compression techniques. If not already sent, at 7810, an electronic item may be sent to a user device 104. Contemporaneously with, or subsequent to, transmission of the electronic item, at 7812, the search indices may be sent to the user device 104. Transmission of the search indices may be dependent on a variety of different factors or business rules which are described in detail below. Alternatively, search indices may be sent automatically with or following the electronic item to which they correspond.

At 7814, the user device receives the electronic item sent by the remote computing device and, at 7816, may receive the search indices. At 7818, the electronic item is stored in memory of the user device 104, as is the corresponding item index, if one has been received. At 7820, the user device 104 merges the item-specific master index with an existing master index, such that the existing master index is updated to include terms from the received electronic item.

Figure 79:
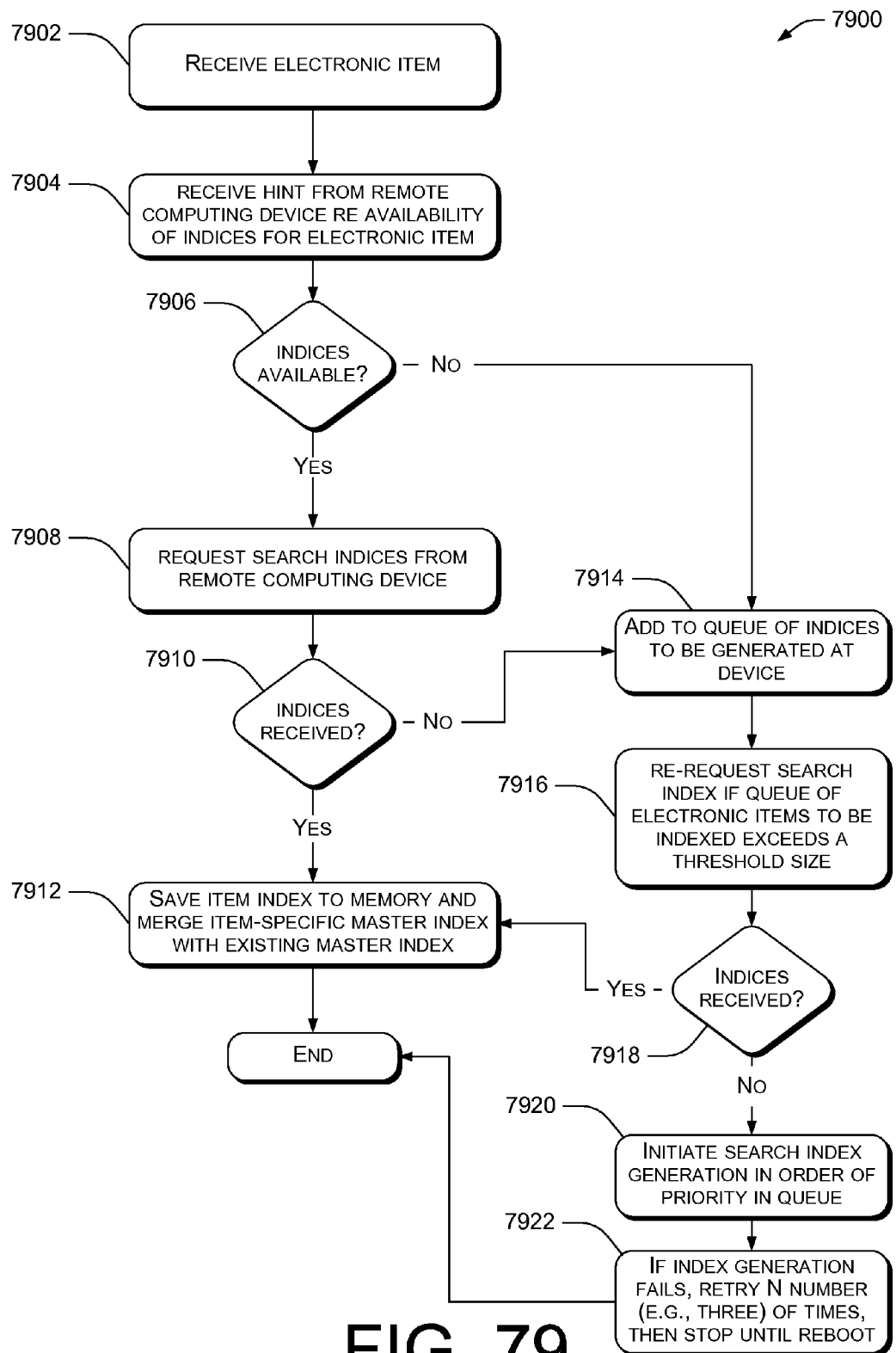
FIG. 79 is a flowchart of an illustrative method of determining whether to generate search indices or download the indices from a remote item-providing system, according to one illustrative implementation.

FIG. 79 is a flowchart illustrating details of an illustrative method 7900 that may be implemented by a user device, such as user device 104, to determine whether to download a search index for an electronic item. The method 7900 may be implemented at, for example, act 7606 in method 7600 and/or between acts 7814 and 7816 in method 7800. The method 7900 begins at 7902 with receipt of an electronic item from a remote computing device. At 7904, the user device 104 receives a hint from the remote computing device, indicating whether or not search indices are available for the electronic item. In practice, the hint may be sent separately from the electronic item or along with the electronic item (e.g., as a flag in a header field of the electronic item).

Based at least in part on the hint, at 7906, the user device 104 determines if search indices are available for download. If, at 7906, the user device 104 determines that search indices are available for download, at 7908, the user device 104 requests the search indices from the remote computing device. Sometime after requesting the search indices, at 7910, the user device 104 checks to see if the requested indices have been received and, if so, saves the item index to memory and merges the item-specific master index with an existing master index.

If, at 7906, the user device 104 determines that search indices are not available, the electronic item is added to the queue of items to be indexed at the user device 104. In some instances, if the indexing module 6608 of the user device 104 gets behind (e.g., the queue of items to be indexed exceeds a predetermined threshold), the user device 104 may re-request to download the searchable indices. In some implementations, the user device may only re-request the indices if the hint indicated that search indices were available for the electronic item. At 7918, the user device checks to see if the search indices have been received and, if so, saves the item index to memory and merges the item-specific master index with an existing master index.

If, at 7918, the device determines that the indices have not been received, the user device proceeds, at 7920, to initiate search index generation generally as described with reference to FIG. 77. At 7922, if index generation fails, the index module 6608 will retry to index the electronic item a predetermined number of times (e.g., three). If the index operation fails the predetermined number of times, the index module 6608 may stop trying to index the electronic item and the process may end until the next time the user device 104 is rebooted. This limit on the number of indexing tries prevents unnecessary processor cycles and, therefore, conserves battery power if an electronic item is corrupted or is otherwise un-indexable.

Figure 80:
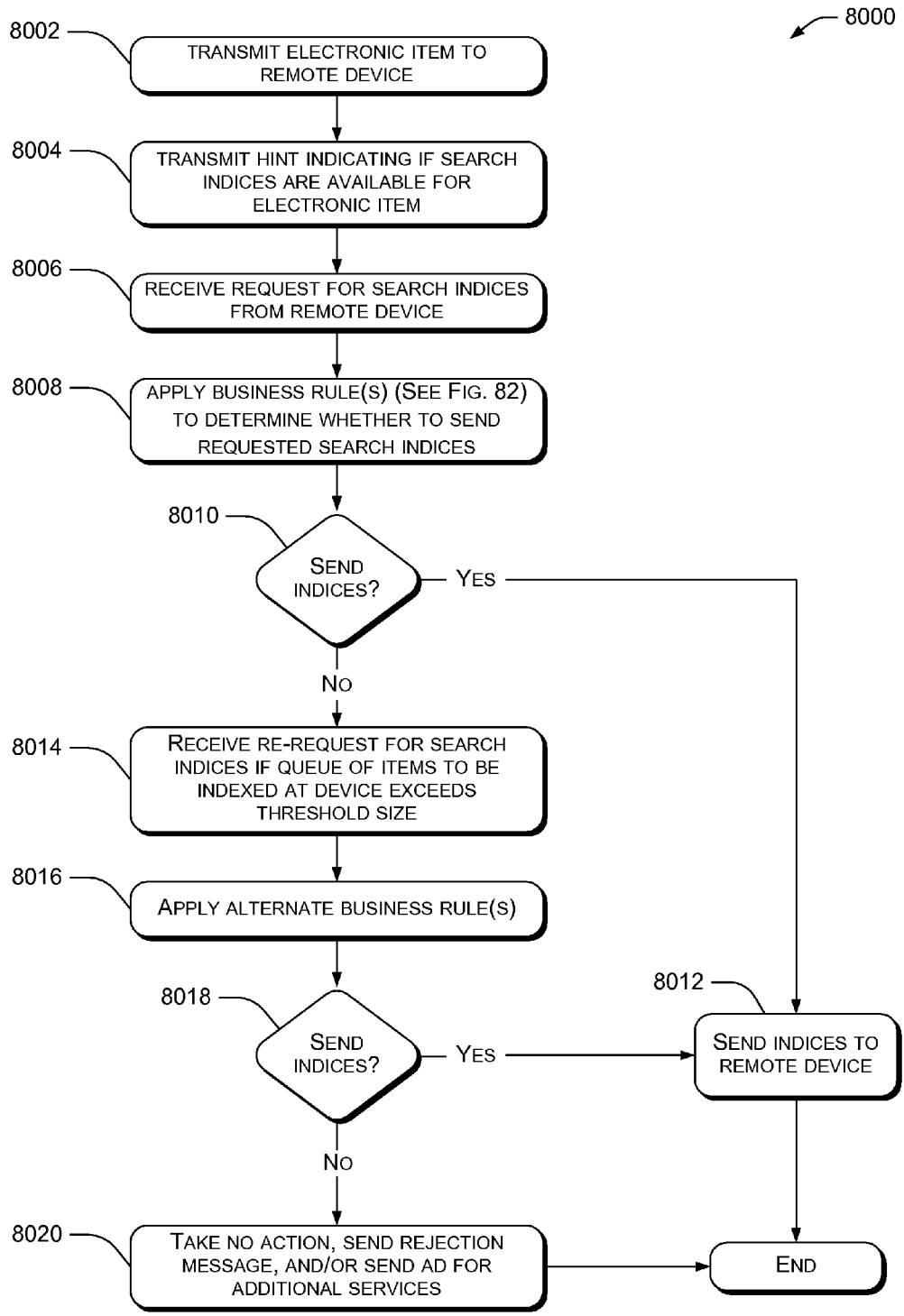
FIG. 80 is a flowchart of an illustrative method of determining whether to transmit search indices to a user device, according to one illustrative implementation.

FIG. 80 is a flowchart showing details of an illustrative method 8000 that may be implemented by a computing device, such as item-providing system 102, to determine whether to transmit search indices to a remote user device 104. Method 8000 may be performed in parallel with as the corollary to the device-side method shown in FIG. 79. At 8002, the item-providing system 102 transmits an electronic item to the user device 104 and, at 8004, transmits a hint indicating if search indices are available for the electronic item. If the hint indicated that search indices were available for the electronic item, at 8006, the item-providing system 102 may receive a request from the user device 104 for the search indices corresponding to the electronic item.

Upon receipt of a request for the search indices, the item-providing system 102 applies one or more business rules, at 8008, to determine whether to send the requested search indices. The business rules specify one or more factors to determine whether to send the requested indices. By way of example, and not limitation, the business rules may be based on factors such as:

- whether a user of the user device 104 is authorized to receive search indices (e.g., only send if the user has a premium account),
- whether compensation has been received for the search indices,
- what time of day the request for search indices was received (e.g., only send if requested during off-peak hours),
- a size of the search indices (e.g., only send indices above or below a predetermined size),
- a connection type (e.g., only send if user device is connected via WiFi, universal serial bus via computer, etc.), and/or
- a type of electronic item to which the search indices correspond (e.g., send indices for books, but not periodicals).

Any number of one or more business rules may be applied in any combination to determine whether to send requested indices. Upon application of the business rules, the item-providing system 102 determines, at 8010, whether the requested indices are to be sent. If yes, at 8012, the requested indices are sent to the user device 104 and the process ends unless/until another electronic item is transmitted to the user device. If, at 8010, the item-providing system 102 determines not to send the requested indices, the item-providing system 102 may do nothing. Alternatively, the item-providing system 102 may send a message indicating that the search indices will not be provided and/or sending an advertisement prompting the user to upgrade to premium service to receive search indices.

At 8014, the item-providing system 102 may receive a re-request for the search indices, indicating that a queue of items to be indexed by the user device 104 exceeds a predetermined threshold (i.e., the device is getting backlogged). The re-request may include a request for the item-providing system 102 to apply alternative business rules. Alternatively, the item-providing system 102 may recognize that this is a second or subsequent request for the search indices and may independently determine to apply alternative business rules. In any event, at 8016, the item-providing system 102 applies one or more alternative business rules to determine whether to send the search indices. The alternate business rules may be based on factors such as those listed above relative to the normal business rules, as well as others, such as whether a queue of electronic items to be indexed at the user device exceeds the predetermined threshold, for example.

If, at 8018, the item-providing system 102 determines that the re-requested indices should be sent, at 8012, the requested indices are sent to the user device 104 and the process ends unless/until another electronic item is transmitted to the user device. If, at 8018, the item-providing system 102 determines that the re-requested indices still should not be sent, at 8020, the item-providing system 102 may take no action, may send a rejection message, or may send an ad (e.g., to upgrade to a premium account).

Figure 81:
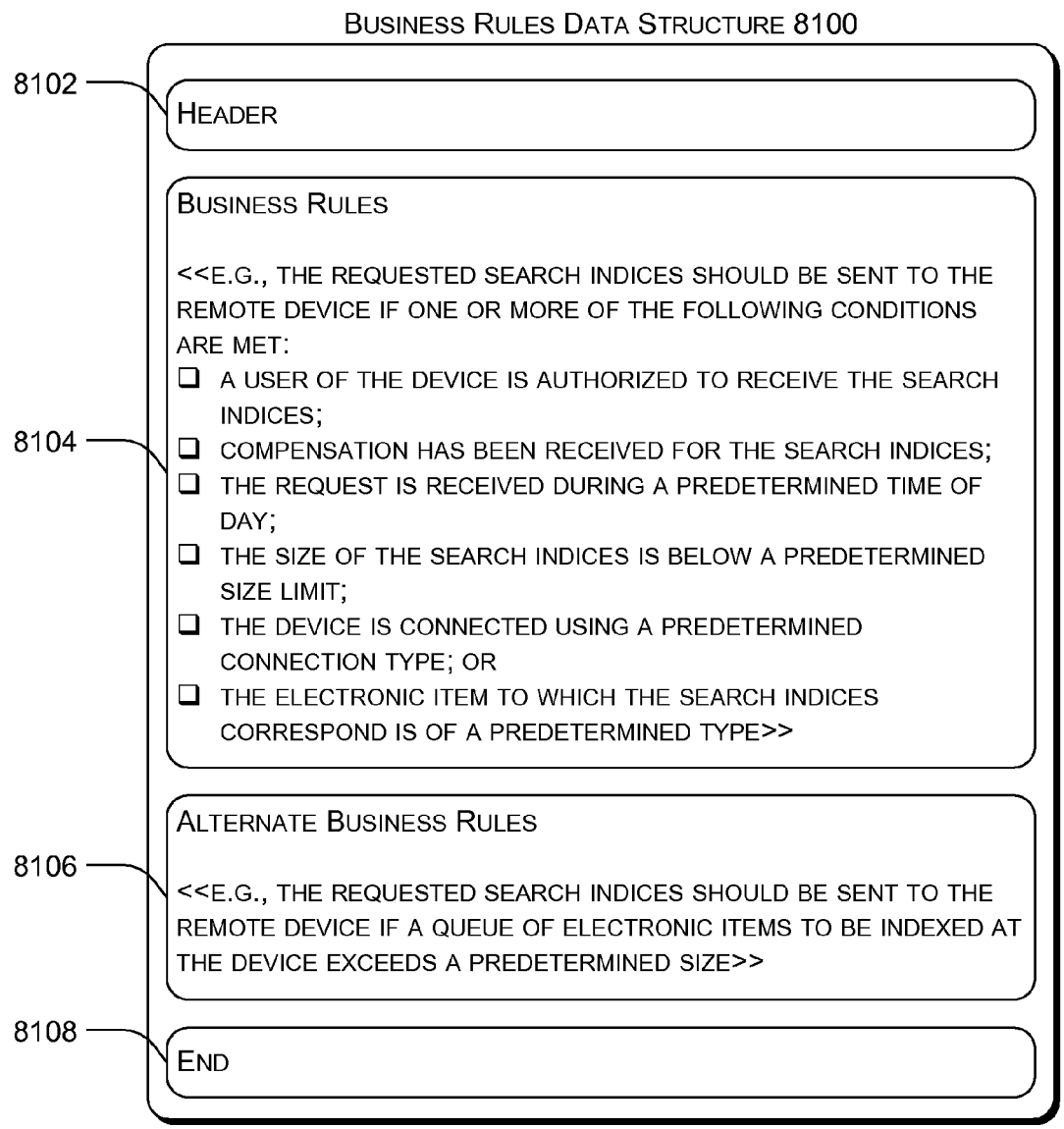
FIG. 81 is a block diagram illustrating data structures of business rules and alternate business rules stored in memory, according to one illustrative implementation.

FIG. 81 schematically illustrates a business rules data structure 8100 including business rules and alternative business rules, which may be stored in memory, such as memory of the item-providing system 102, for example. As shown, the business rules data structure 8100 includes a header field 8102 designating a beginning of the data structure, a business rules field 8104 containing one or more business rules, an alternative business rules field 8106 containing one or more alternate business rules, and an end field 8108 designating an end of the data structure, among others. Any of the data fields may contain metadata about the data structure, such as a name or title of the business rule set, a creation date of the business rules, when the business rules should be applied, or the like. The data fields are illustrative only and, in practice, the data structures may have any number of one or more data fields. For example, the business rules and the alternative business rules may be stored in separate data structures, which may be called separately as appropriate in a given circumstance.

Figure 82:
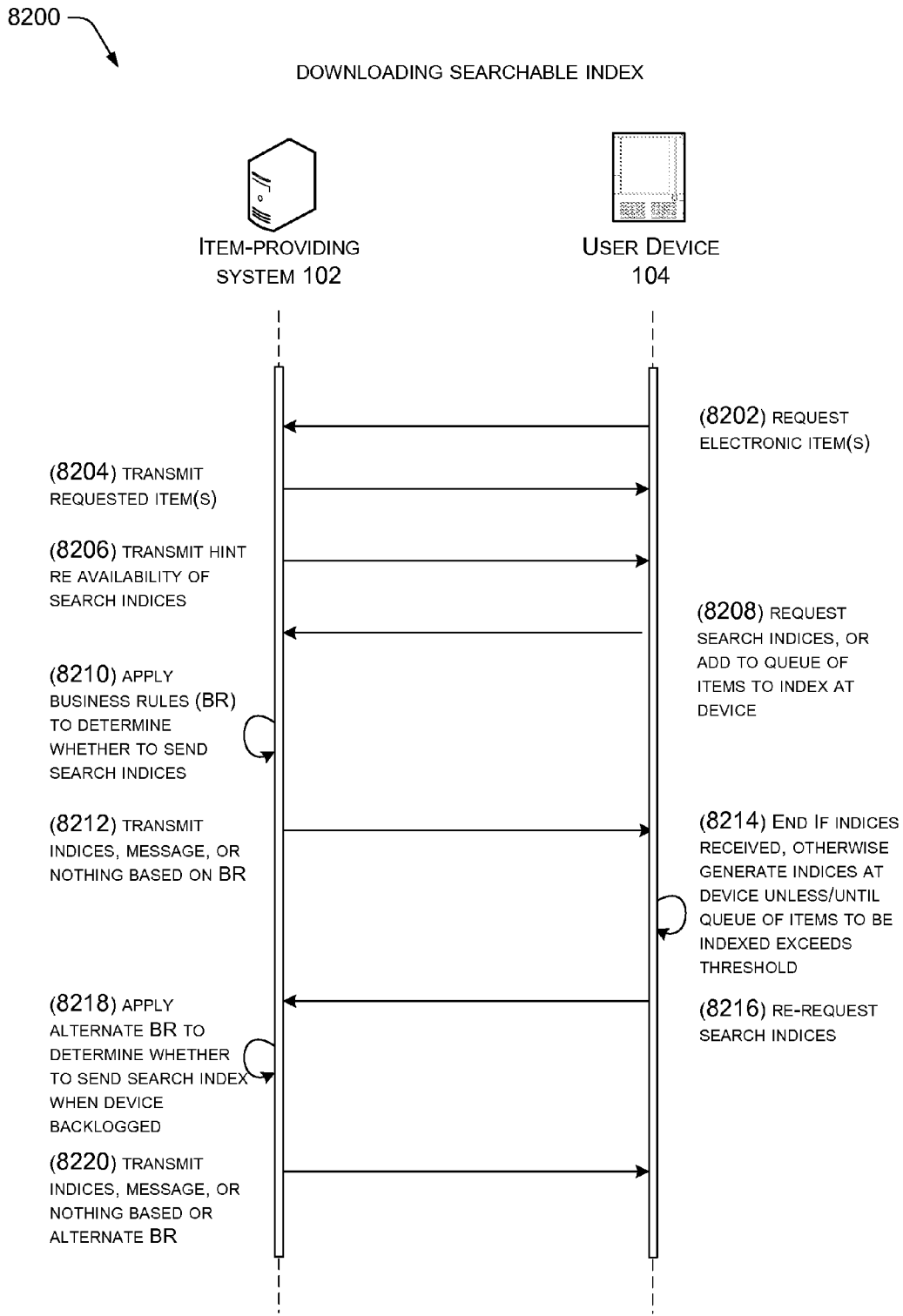
FIG. 82 is a signal flow diagram illustrating a signal flow between a user device and an item-providing system according to one illustrative implementation.

FIG. 82 is a signal flow diagram illustrating a flow of communications 8200 resulting from the device-side method 7900 and the server-side method 8000. The signal flow 8200 begins at 8202 with a request by the user device for one or more electronic items. The request is received at the item-providing system 102 and following any required payment and/or authorization, at 8204, the requested electronic item is sent to the user device 104. Concurrently with, or after, transmission of the electronic item(s), at 8206, a hint is sent from the item-providing system 102 to the user device 104, indicating the availability of one or more search indices for the electronic item. If the hint indicates that search indices are available for the electronic item, at 8208, the user device 104 requests the search indices. Otherwise, the user device adds the electronic item to a queue of items to be indexed at the user device and proceeds to 8214.

At 8210 the item-providing system 102 receives the request for the search index and applies business rules to determine whether to send the requested search indices. At 8212, the item-providing system 102 either sends the requested search indices, sends a message (e.g., rejecting the request, sending an ad, etc.), or does nothing. If the user device 104 receives the requested indices, the process ends at 8214, otherwise, the user device 104 generates indices at the device unless/until a queue of items to be indexed at the device exceeds a predetermined threshold. Upon exceeding the predetermined threshold, the user device may, at 8216, re-request that the search indices be sent. At 8218, the item-providing system 102 receives the re-request and applies alternate business rules to determine whether to send the search indices now that the user device 104 is backlogged. Based on the alternate business rules, the item-providing system 102 either sends the requested search indices, sends a message, or does nothing.

E.6. Illustrative Search Techniques

Like indexing, search is a relatively processor intensive operation. Accordingly, in the past portable devices have leveraged greater processing power of remote computing devices to perform Internet search and the like. However, performing search on a remote computing device means that search cannot be performed when the portable device is out of communication with the remote computing device. Accordingly, it may be desirable in some instances to perform search on the portable device. Performing search at the portable device, however, burdens the processor of the portable device and, as a result, uses more power.

Figure 83:
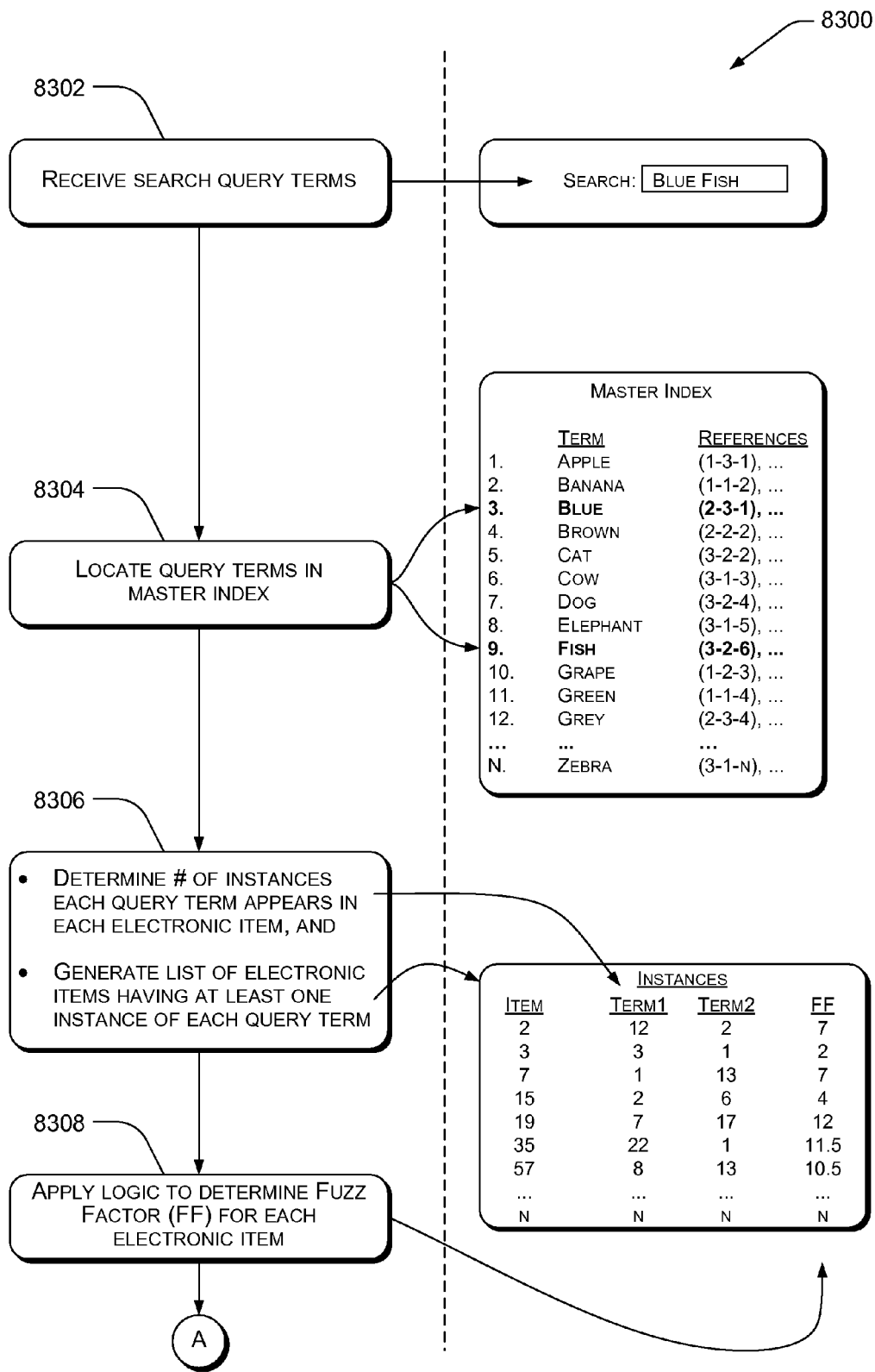
FIG. 83 is an annotated flowchart of an illustrative method of searching using a fuzzy sort approach, according to one illustrative implementation.

FIG. 83 is an annotated flowchart of one illustrative search method 8300 designed to minimize processing and hence battery consumption, which is described with reference to user device 104, but which is broadly applicable to other portable devices. The method 8300 begins, at 8302, with receipt of a number Q of search query terms (in this case the terms "Blue" and "Fish"). Because the terms are separated by a space and no logical operator, the search module 6610 of the user device 104 treats the search query as an implicit "near" operation. That is, the search looks for the two query terms located within a predetermined proximity to one another.

At 8304, the user device 104 locates the query term(s) in the master index (the located terms are shown in bold in the master index). At 8306, the user device 104 determines how many times each query term appears in each electronic item and generates a list of electronic items having at least one instance of each query term. The list of electronic items having at least one instance of each query term is shown to the right of block 8306.

At 8308, the user device 104 applies logic to determine a fuzz factor (71) for each electronic item. The fuzz factor is a number that can be derived using minimal processing, but which is indicative of the relative likelihood that each electronic item will have the query terms located within the predetermined proximity (i.e., near value or NV) of one another. Generally, the more instances of the query terms, the more likely that some of the query terms will be located within a near value of one another. In the illustrated implementation, the fuzz factor comprises an average of the number of instances of each query term (for item 2, the average of 12 and 2 is 7). However, in other implementations, other logic may be used to determine a suitable fuzz factor. For example, in another implementation, the fuzz factor may be equal to the minimum number of instances of all the query terms. Applying this alternative logic, the fuzz factor for item 2 would be 2 (the number of instances the second query term).

Figure 84:
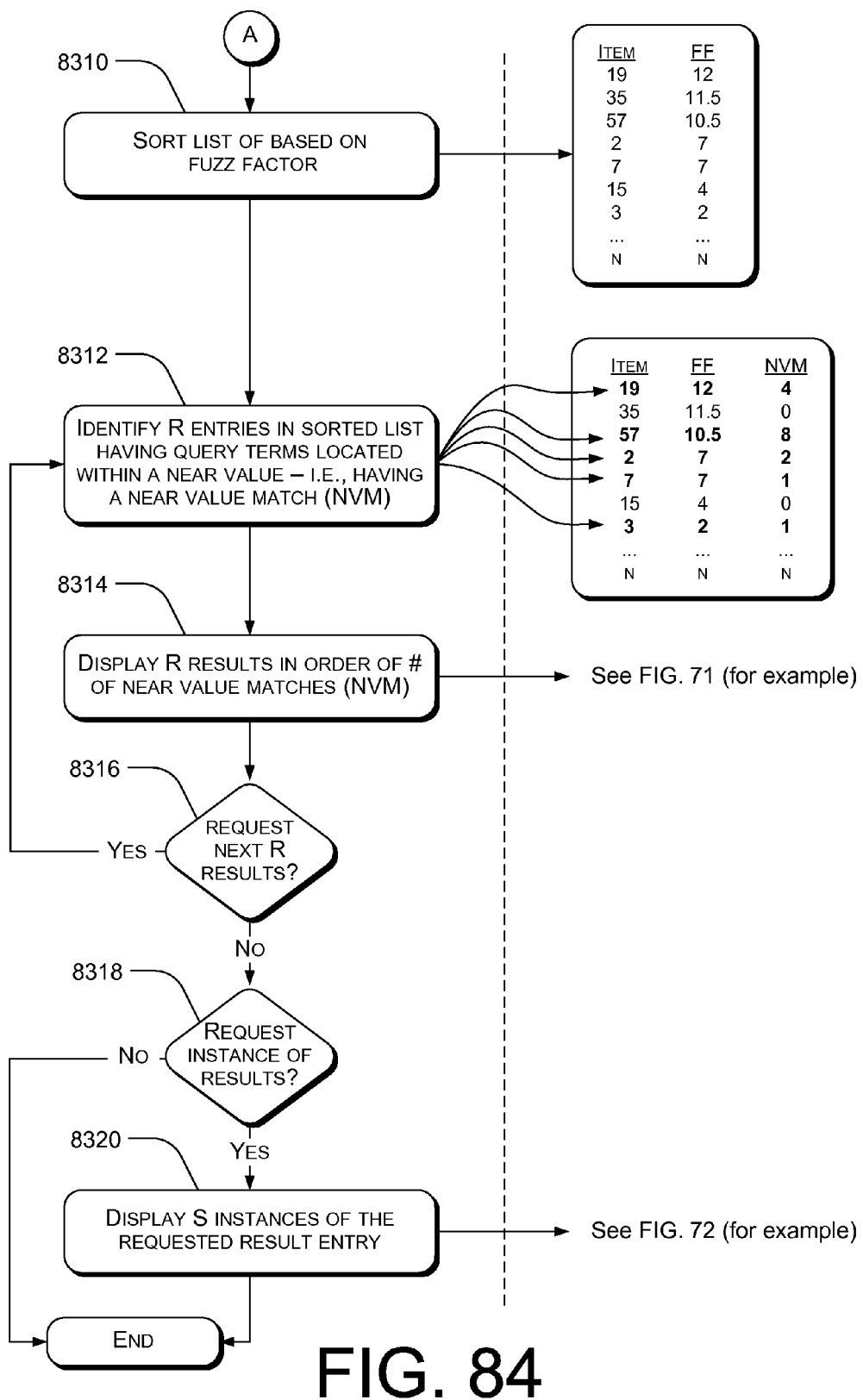
FIG. 84 is a continuation of the flowchart of FIG. 83.

The annotated flowchart of method 8300 continues at FIG. 84. At 8310, the list of electronic items with at least one instance of each query term is sorted based on the fuzz factor. From the sorted list, at 8312, the user device identifies a predetermined number of R entries having query terms located within a predetermined distance (i.e., near value) from one another. Distance may be calculated in terms of units, such as character count, word count, byte offset, or any other measure of distance. Entries for electronic items having terms located less than a near value apart are said to have a near value match (NVM). Five of the entries (shown in bold) in the list to the right of block 8312 have a NVM. The near value may be a fixed number (e.g., 1, 2, 3, or more units apart) or a variable. For example, near value may increase with length of the electronic item, number of search query terms entered (e.g., if three search terms are queried, they may be further apart than if only two search terms are queried), average word size of the electronic item, and/or and or any other factor affecting the proximity of search query terms to one another.

At 8314, the predetermined number R of items having near value matches are then displayed to the user in a manner similar to that shown in FIG. 71. Electronic items having the most near value matches will be listed first, unless the search was initiated from within an electronic item having a near value match, in which case the open electronic item will be listed first.

If the user requests, at 8316, to view the next R results, the method returns to block 8312 to identify a next R entries having one or more near value matches. Otherwise, the method proceeds to 8318, where the user device 104 determines if the user has requested to view instances of one of the search results. If not, the method ends until another search is performed or the scope of the search is changed. If, at 8318, the user does request to view instances of a search result entry, at 8320, the user device displays a first S instances of the requested search result entry in a manner similar to that shown in FIG. 72.

Figure 85:
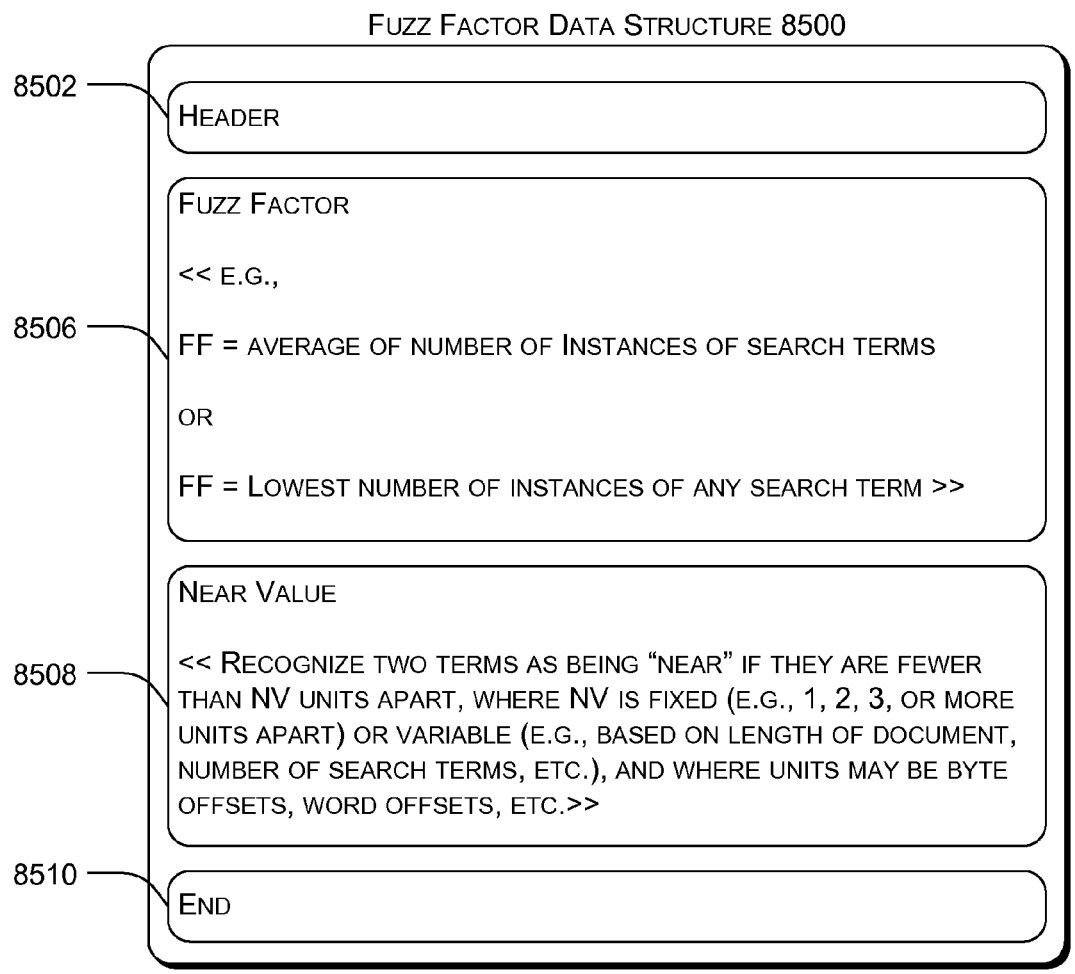
FIG. 85 is a block diagram illustrating data structures of logic for determining a fuzz factor and a near value, according to one illustrative implementation.

FIG. 85 schematically illustrates a fuzz factor data structure 8500 including logic for determining a fuzz factor and logic for determining a near value, which may be stored in memory, such as memory of the user device 104, for example. As shown, the fuzz factor data structure 8500 includes a header field 8502 designating a beginning of the data structure, a fuzz factor data field 8504 containing logic for computing fuzz factors for each electronic item, an near value field 8506 containing logic for determining a near value, and an end field 8508 designating an end of the data structure, among others. Any of the data fields may contain metadata about the data structure, such as a name or title of the fuzz factor or near value, a creation date of the data structure, an indication of when and/or how the fuzz factors or near values should be applied, or the like. The data fields are illustrative only and, in practice, the data structures may have any number of one or more data fields. For example, the fuzz factor field and near value field may be stored in separate data structures, which may be called separately as appropriate in a given circumstance.

E.7. Illustrative Hashing Techniques

When a user device, such as user device 104 undergoes an event outside its control ("a wholesale event"), the user device 104 may not know whether electronic items stored thereon have changed. By way of example and not limitation, wholesale events may include connecting or disconnecting a universal serial bus plug or other data connection, powering on or off the device, connecting or disconnecting a removable memory, the device waking from a sleep state, downloading an electronic item to the device, or any other event in which the user device 104 is not in control.

In the event that electronic items have been added, removed, or altered, one or more indices may need to be updated. For example, if items have been added or modified, those items may need to be indexed or re-indexed. If items have been removed, the indices may need to be removed or updated to remove terms. Likewise, search results may need to be updated to reflect the addition or deletion of items.

One way to determine if electronic items on the user device have changed is to simply compare indices stored in memory of the device with a current directory of items on the device. However, as discussed above, processing resources on a portable device are at a premium. Thus, it is desirable to avoid any unnecessary processing operations if possible, particularly operations that are processor intensive. Comparison of the indices stored in memory of the device with the current directory of items on the device can be a processor intensive operation and in many cases is unnecessary, since the content on the user device will not have changed during the wholesale event.

Figure 86:
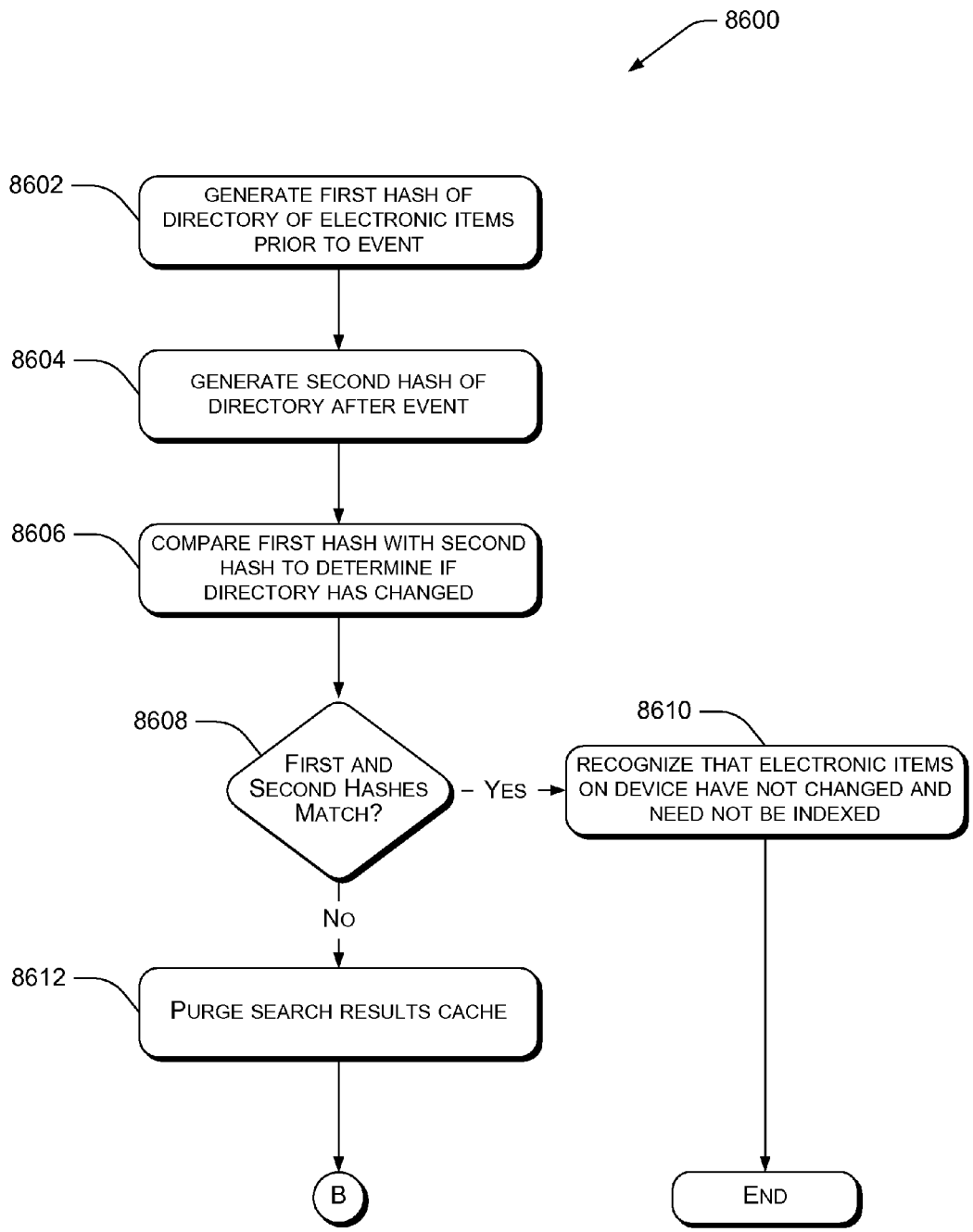
FIG. 86 is a flowchart of an illustrative method of determining whether content of a user device has changed during an event, according to one illustrative implementation.

FIG. 86 is a flowchart (continued in FIG. 87) of one illustrative method 8600 of determining whether content on a device has changed during an event, which is described with reference to user device 104, but which is broadly applicable to other portable devices. Generally, the method 8600 is implemented by applying a hash function to a directory of electronic items stored on the user device to generate a relatively small hash of the directory before and after an event. The hashes serve as fingerprints of the directory that may be compared to accurately determine if electronic items stored on the user device 104 changed during the event. More specifically, method 8600 comprises, at 8602, applying a hash function to generate a first hash of a directory of electronic items on a device prior to an event, such as a wholesale event. In one implementation, the hash function comprises a Message-Digest algorithm 4 (MD4) hash function, a Message-Digest algorithm 5 (MD5) hash function, or a Secure Hash algorithm 1 (SHA-1) hash function. However, in other implementations, any other hash function may be used that provides a relatively small fingerprint that will reflect small changes in the hashed directory. Different hash functions may be used depending on various design considerations for a given application, such as error tolerance, speed, size, etc. At 8604, the hash function is applied again to generate a second hash of the directory of electronic items after the event. The first and second has are compared, at 8606, to determine if the directory has changed. If, at 8608, the hashes are found to match, the method recognizes, at 8610, that electronic items on the user device 104 have not changed during the event. Thus, indexing is not performed unnecessarily and the process ends, conserving battery life of the user device 104.

If, at 8608, the hashes do not match, the method proceeds to 8612 to delete any search results stored in cache. This is because if the hashes do not match, that means that the cached search results may no longer accurately reflect the electronic items stored in memory of the device. For example, if an e-book was deleted during the event, any cached search results including the deleted e-book would be inaccurate. In contrast, if an electronic item was added during an event, the cached search results will not include any instances of the queried term in the added electronic item.

Figure 87:
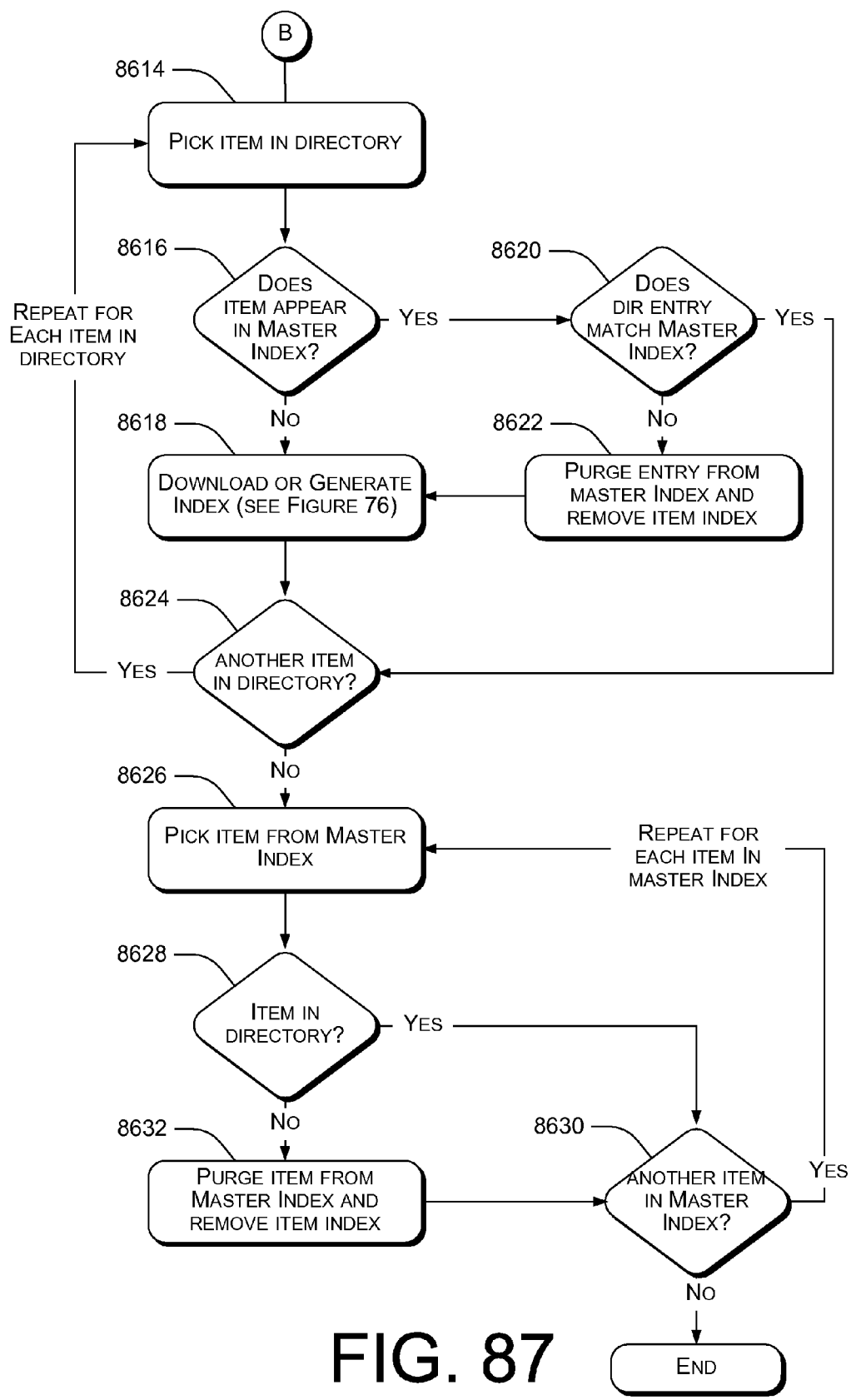
FIG. 87 is a continuation of the flowchart of FIG. 86.
Figure 88:
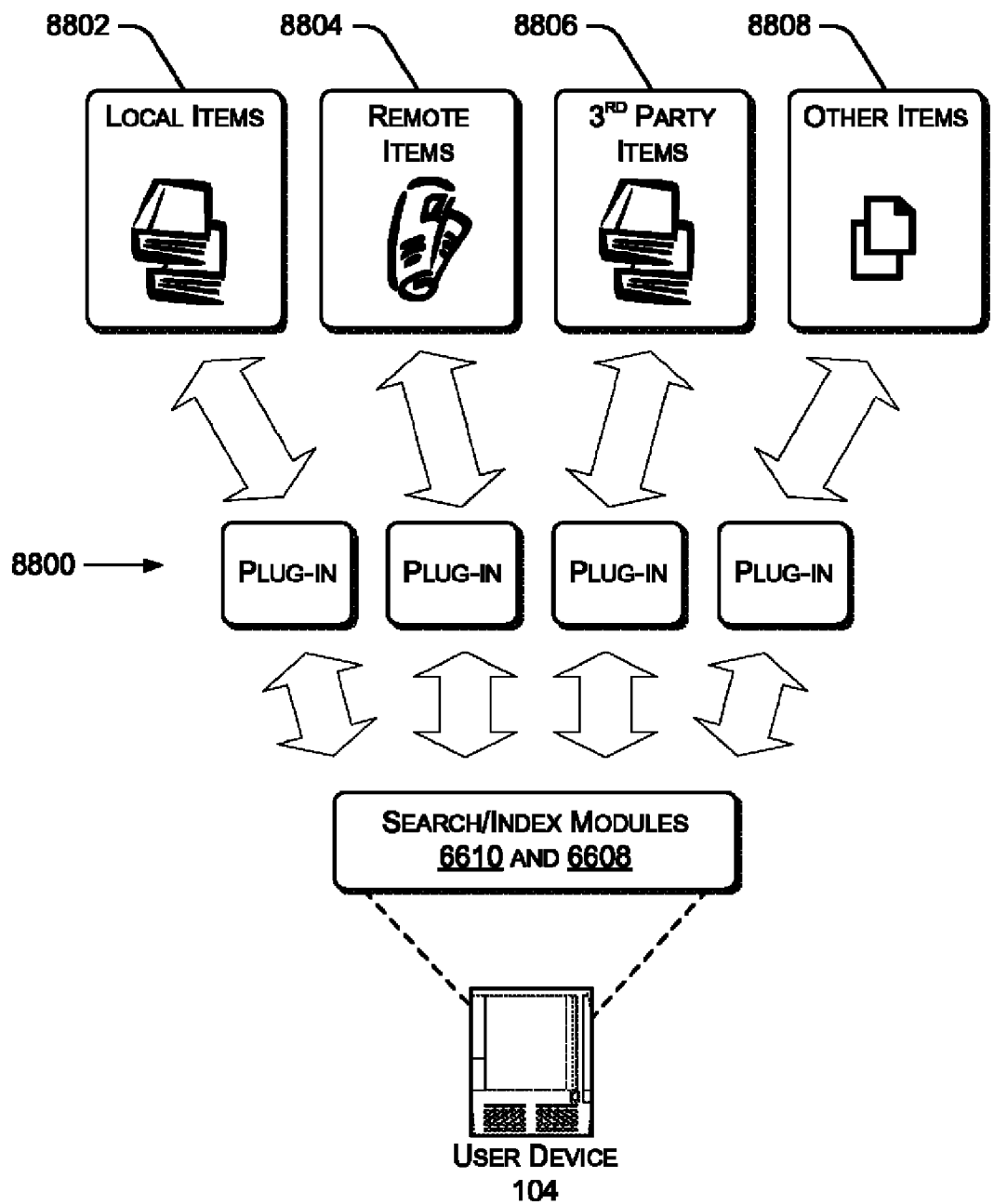
FIG. 88 is a schematic block diagram illustrating the use of plug-ins to index and search electronic items.

The flowchart of method 8600 continues in FIG. 87. At 8614, an electronic item in the directory is selected and, at 8616, the user device 104 determines whether the selected item appears in the master index. The item may be selected in order of the directory entries, in alphabetical order, in order of most recent modification, or in any other desired order. If, at 8616, the item is not found in the master index, the user device determines that the item has been added and, at 8618, obtains searchable indices (e.g., by downloading or generating—see FIG. 76).

If the item does appear in the master index, at 8620, the user device 104 compares characteristics (e.g., size and modification time) of a directory entry for the electronic item with a master index entry for the electronic item to see if the entries match. If, at 8620, the user device determines that the directory and master index entries do not match, at 8622, the user device 104 purges entries for the item from the master index and removes the item index for the item and proceeds to 8618 to re-download or generate search indices for the item. If, at 8620, the user device determines that the directory and master index entries do match, at 8624, the user device 104 checks to see if there are any other items in the directory and, if so, returns to block 8614 for each item in the directory.

After initiating download or generation of search indices at 8618, the user device also checks to see if there are any other items in the directory and, if so, returns to block 8614 for each item in the directory.

Once all the items in the directory have been compared and the user device 104 determines, at 8624, that no more items remain in the directory to be checked, the method 8600 proceeds to then pick items entries from the master index and check to see if they are present in the directory. Specifically, at 8626, the user device 104 selects an item from the master index and, at 8628, checks to see if the selected item appears in the directory. If the selected item is found, at 8628, to be in the directory, the user device 104 checks, at 8630, to see if there are other items remaining in the master index and, if so, repeats acts 8626 and 8628 for each item in the master index.

If, at 8628, the item is not found in the directory, at 8632, entries for the item are purged from the master index, the item index is removed, and the method proceeds to block 8630 to check to see if there are any more entries in the master index.

E.8. Illustrative Extensible Search/Indexing Techniques

Content that is created by the item-providing system 102 may be readily indexed and searched by the user device 104 using one or more of the techniques described above. However, applications and other electronic items provided by third parties may not be readily searchable unless the user device 104 has a way of determining where and how terms are used in the third party items. One way to allow the user device 104 to index third party items is through the use of one or more plug-ins. Plug-ins may also be used in connection with applications and electronic items provide by or through the item-providing system 102. Generally, plug-ins are applications that call one or more predetermined application programming interfaces (APIs) of a main application. In this case, APIs provide a standard interface, allowing third parties to create plug-ins that interact with the programs and modules of the user device 104.

FIG. 23 is a schematic diagram generally illustrating the use of plug-ins, which are applicable to user device 104, as well as any other suitable user device. Generally, one or more APIs may be provided to software developers as part of a software development kit (SDK). With these APIs the developers can write plug-ins 8800, programs or other electronic items that are capable of interacting with programs and modules stored on the user device 104. The plug-ins 8800 may be used to index and/or search various different types of electronic items, such as locally stored electronic items 8802, remotely stored electronic items 8804, local or remote third party electronic items 8806, and/or other types of electronic data items, such as web data, stock tickers, weather modules, and the like.

The plug-ins 8800 may use one or more APIs to register themselves with the user device 104 and/or to exchange data with the user device 104. The search and index modules 6610 and 6608 of the user device 104 can also call one or more APIs to request index information from the plug-ins. In this way, the search and index modules 6610 and 6608 can receive information necessary to index and search the electronic items 8802-8808, such as terms that are used in the items and locations of those terms in the electronic items.

In one implementation, when the user device 104 receives an electronic item, the index module 6608 calls an API to expose terms contained in the electronic item and a location of each term within the electronic item. Once the terms are exposed, the index module 6608 indexes the electronic item by generating a searchable item index of terms in the electronic item, and updating a searchable master index of terms in a collection of available electronic items to include the terms exposed using the API.

Alternatively, the indexing may be carried out by a computing device such as item-providing system 102. In that case, once the terms are exposed, the item-providing system 102 may generate an item index of terms in the electronic item, and an item-specific master index of terms in the electronic item. The item index and item-specific master index may then be transmitted to a user device, such as user device 104.

A variety of APIs may be provided, which can be called by one or more modules of the user device 104, the plug-ins 8800, and/or one or more electronic items 8802-8808 themselves. For example, an indexing API may be provided that is callable by the index module 6608, via a processor, to expose terms contained in electronic items and a location of each term within the electronic items. A search API may be provided that is callable by the search module, via a processor, to expose terms contained in the electronic item, in response to entry of a location within the electronic item. A navigation API may be provided that is callable by the processor to cause an electronic book reader to jump to a location corresponding to an entered location within the electronic item.

E.9. Other Illustrative Search Techniques

In addition to searching electronic items stored locally and searching the Internet directly, it may be desirable in some instances to use one or more search entities to assist with a search. Some searches may be more easily handled by specific types of search entities. For example, image searches and searches posed in the form of questions may not be satisfactorily performed based on a search query using a computer-implemented search engine or search module.

Figure 89:
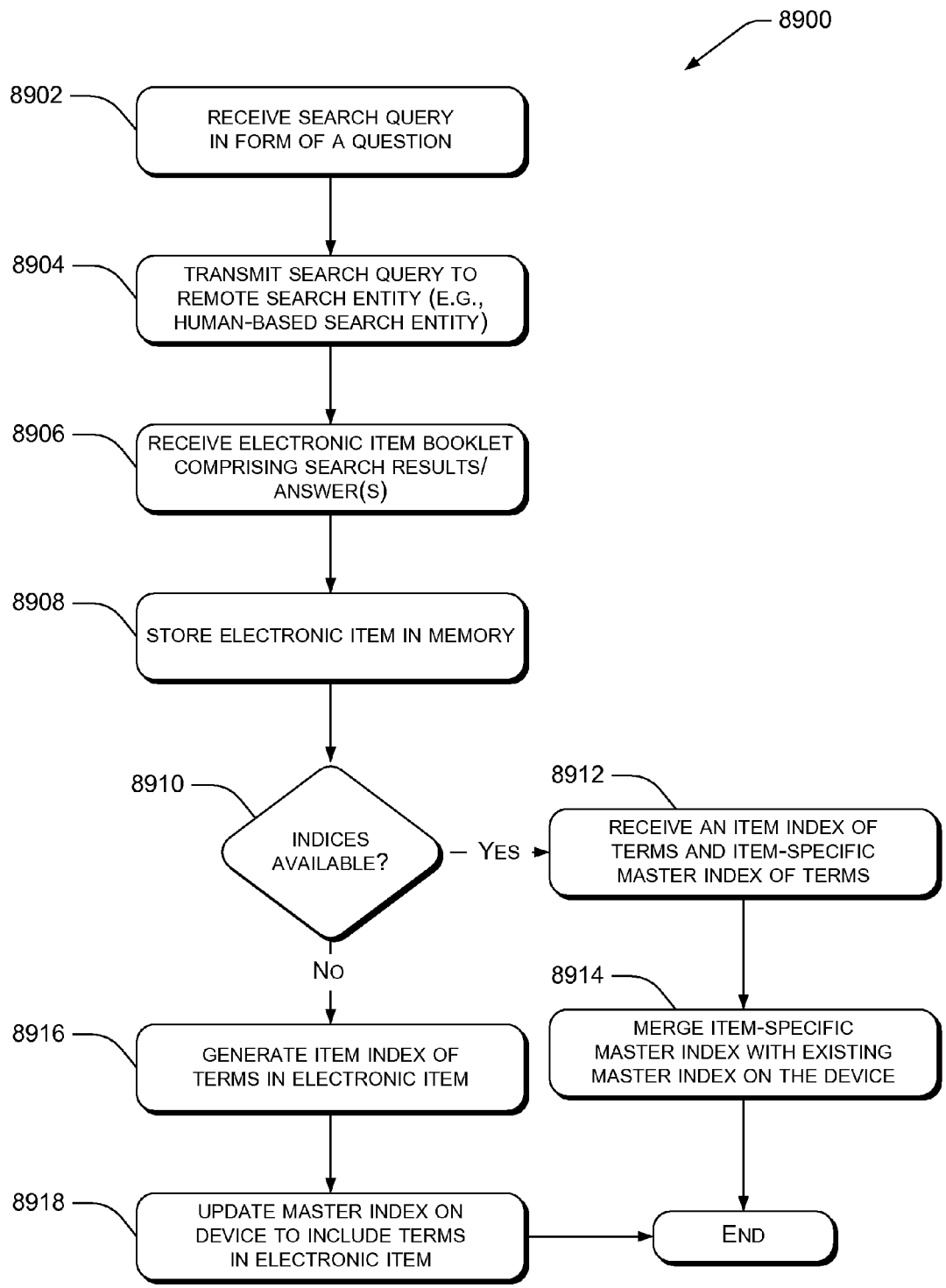
FIG. 89 is a flowchart of an illustrative method of searching on a user device using a remote search entity, according to one illustrative implementation.
Figure 90:
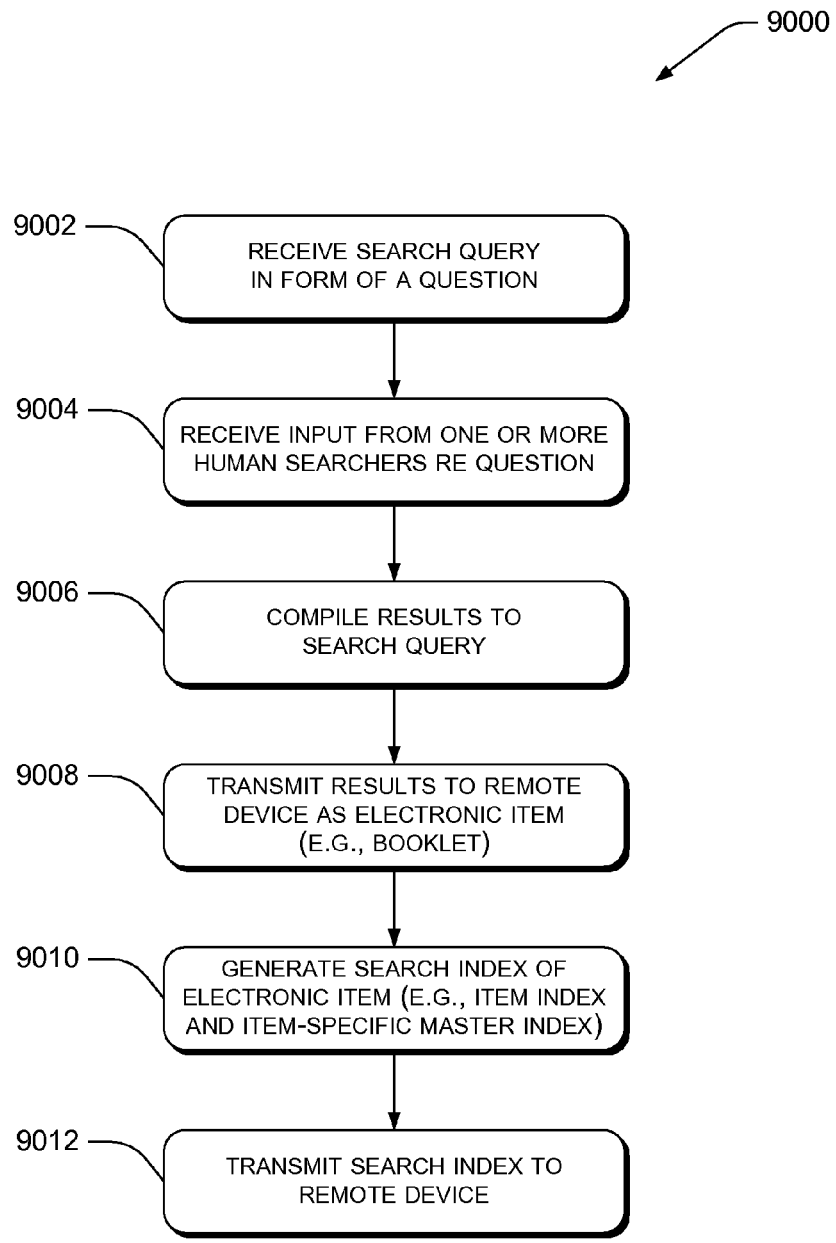
FIG. 90 is a flowchart of an illustrative method of providing search results to a user device from a remote search entity, according to one illustrative implementation.

FIGS. 89 and 90 are flowcharts of an illustrative search method using a remote search entity, which is described with reference to user device 104, but which is broadly applicable to other portable devices. FIG. 89 illustrates device-side aspects of the method, while FIG. 90 illustrates server-side aspects.

As shown in FIG. 89, the device-side method 8900 begins, at 8902, with receipt of a query in the form of a question. At 8904, the search query is transmitted to a remote search entity, such as a human-based search entity that relies on human input to generate search results. As mentioned above, examples of human-based search entities include Yahoo!® Answers available from Yahoo Inc. located in Sunnyvale, Calif., Wondir, Inc. located in Bethesda, Md., or NowNow® available from NowNow.com located in Seattle, Wash.

At 8904, the user device 104 receives an electronic item, in the form of a booklet, comprising search results. The booklet may contain one or more answers to the question posed in the search query. At 8906, the booklet is stored in memory of the user device. At 8910, the user device 104 determines whether search indices are available from the remote search entity. In one implementation, this determination may be made in a manner similar to the determination described in FIG. 79. If indices are available, at 8912, the user device receives an item index of terms in the booklet and an item-specific master index of terms in the booklet. At 8914, the item index is stored in memory, the item-specific master index is merged with an existing master index on the user device 104, and the process ends.

If, at 8910, indices are not available, the user device proceeds, at 8916, to generate an item index of terms in the booklet and, at 8918, to update an existing master index to include terms from the booklet. In this manner, the booklet is made text searchable by the user device.

As shown in FIG. 90, the device-side method 9000 begins, at 9002, with receipt of a query from a user device in the form of a question. At 9004, the remote search entity receives input from one or more human searchers regarding the question. The query may be disseminated to the human searchers via a website, email, or any other suitable distribution mechanism. The human searchers may conduct their own searches of the Internet, books, or any other sources and then provide their answers to the question. The human searchers' answers are then compiled, at 9006, and transmitted to the remote user device 104, at 9008, in the form of an electronic item, such as a booklet. The booklet may contain multiple answers to the question posed in the search query. In some implementations, the method 9000 may end here. However, in other implementations, the remote search entity may also, at 9010, generate search indices (e.g., item index and item-specific master index) and, at 9012, transmit the search indices to the remote user device 104. In one implementation, the search indices may be generated and transmitted in manners similar to those described with respect to FIGS. 78 and 80.

While various illustrative device and system implementations have been described, the components, modules, and features of these implementations may be rearranged, modified, and/or may be omitted entirely, depending on the circumstances.

Also, while various illustrative methods have been described, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the processor of the user device. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, PROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor of the user device. Combinations of any of the above should also be included within the scope of computer-readable media.

F. Illustrative Power Management Techniques

F.1. Overview of Illustrative Power Management

Disclosed herein are techniques for compensating for error in electronic components. The concepts described in this section represent some examples of the power management functionality 412 shown in FIG. 4 and described generally in section A above. In one described implementation, a known signal is provided to a resistor. The signal is amplified using an operational amplifier (op amp) and measured. The measured signal is compared to the signal provided as input to the resistor to obtain a value for the error in the system. This error is applied to an unknown signal provided to the resistor so that the signal value is more accurately characterized when amplified. The error may be applied to the unknown signal using software, hardware, or a combination thereof to compensate for the error in the components, such as the op amp.

According to another implementation, a voltage signal is smoothed as a function of time in order to more accurately gauge battery life.

According to another implementation, a power state module changes the power state of the device in response to a trigger event. The trigger event may be received using a voice mode and may indicate that a data module is available for transfer. For example, the device may receive an indicator, such as a ring, that indicates the new data content is available. The device switches to a data mode to download the content. The process may be manual, i.e., requiring interaction of a user, automated, or semi-automated, e.g., requiring user authorization, but otherwise automated. The device may be returned to a standby mode upon receipt of the data. Using the voice mode to sense when new data is available reduces power consumption and allows the device to receive the data module when device is in a low power or stand-by mode.

The techniques described herein may be implemented in a number of ways. One example environment and context is provided below with reference to the included figures and on going discussion.

F.2. Illustrative System for Error Value Compensation

Current measurement is typically done by measuring voltage across a resistor. The resistance value is known to within a few percent error. However, the resistance value, and therefore the error, is usually amplified in order to have a value that is useful given the large dynamic range of current that constitute the operating range. At very low currents, the voltage across that resistor is very low, which makes the error, or offset voltage, of the operational amplifier extremely significant.

Operational amplifiers are available that have offset compensation integrated with the hardware. However, such hardware is complex, expensive and typically requires mechanical maintenance for proper operation.

Figure 91:
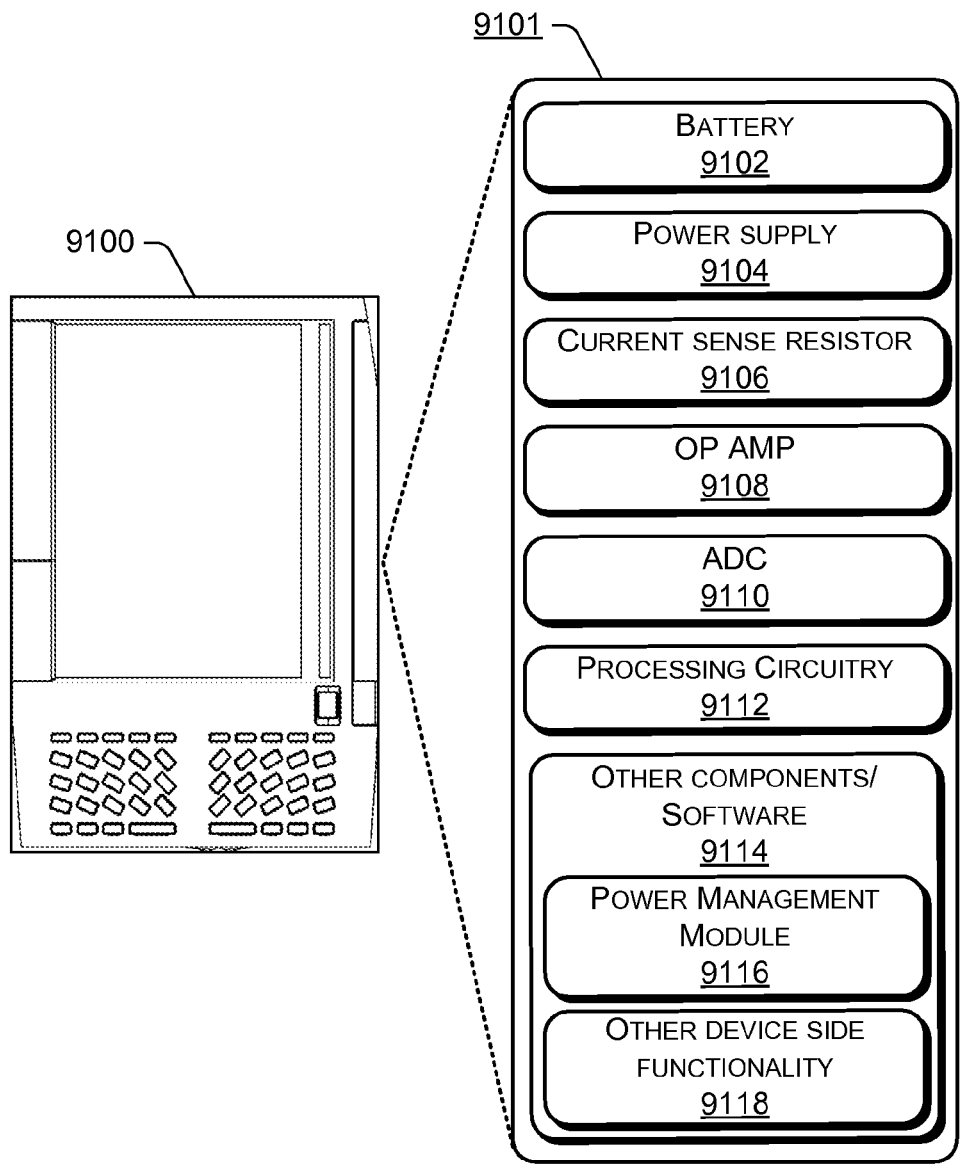
FIG. 91 shows an electronic device and some of the power handling components that may be incorporated with the electronic device.

FIG. 91 shows a portable device 9100 that, from a power management system and measurement standpoint, has a system of power components 9101 that are capable of providing power to the various components and systems within the device 9100, such as the display screen, software, and so forth. One of the power components 9101 is a battery 9102 supplying power relative to power supply 104. The battery 9102 may be a nickel cadmium, lithium ion, or other power supply mechanism. The power supply 104 may be any load or component or other power-providing or power-consuming mechanism. The current of the battery 9102 may be measured by measuring the voltage drop across a current sense resistor 9106 and amplifying the resulting signal using an operational amplifier (op amp) 9108 as will be described in further detail below. The op amp 9108 outputs a signal relating to the measured current of the battery 9102 to an analog to digital converter (ADC) 9110, which converts the analog signal into digital form for use by the processing circuitry 9112. The digital signal may be stored in a memory on the device 9100 or may be sent or otherwise made available to processing circuitry 9112. The processing circuitry 9112 may contain logic that processes this information and may present this information to a user or may utilize the information using other power management components and/or software 9114. Power management components and/or software 9114 may include a power management module 9116 to decide where to send power within the device, how much power is needed and/or available, how power is distributed, and so forth and may also include other device side functionality 9118.

Figure 92:
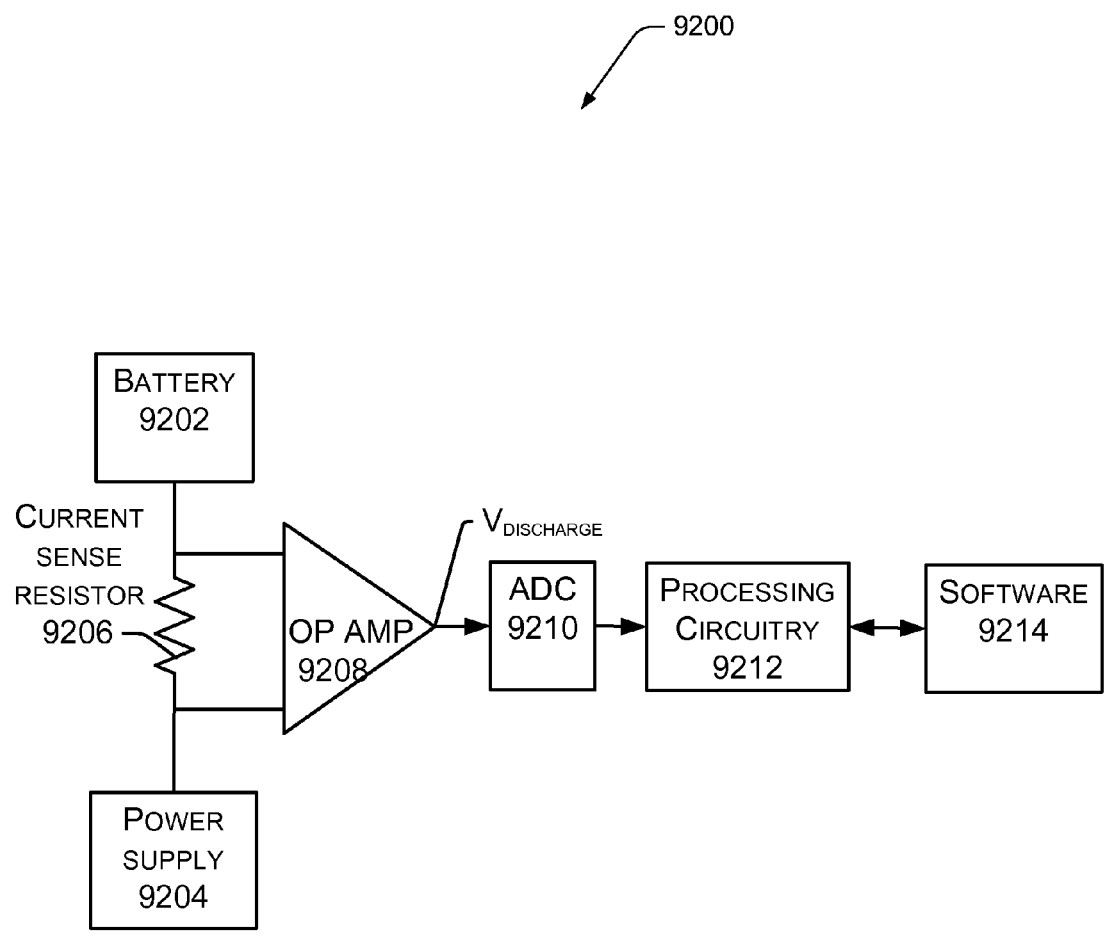
FIG. 92 shows a current sensing system that compensates for error in the battery voltage level as perceived by the processing circuitry.

FIG. 92 illustrates one implementation of a system for compensating for component error. The system 9200 comprises a battery component 9202 and a power supply component 9204. A current sense resistor 9206 may be inserted between the battery 9202 and the power supply component 9204. An operational amplifier (op amp) 9208 may be configured to measure the voltage drop across the resistor 9206 in order to determine current. The amplifier 9208 amplifies the signal representing the voltage drop across the resistor 9206. For example, op amp 9208 may provide a gain of approximately 50. This gain may be assumed based on the component information or may be determined as an actual based on measurements and calculations described below. The amplified signal is provided to the Analog-to-Digital Converter (ADC) 9210. The ADC 9210 may be connected to processing circuitry 9212, which may a processor integrated circuit (IC) or other processing mechanism and which may include or be associated with computer readable memory. The signal output by the ADC 9110 may be used to determine an error value, which may be stored in the computer readable memory or is otherwise accessible to processing circuitry 9212 and/or software 9214. Software 9214 may be implemented to receive and utilize the signal provided to the processing circuitry 9212.

Software 9214 utilizes the error value to calculate a more accurate current value for the battery voltage level and may be a standalone program or may be integrated with other software provided on the device. The error value may be based on the output signal of the ADC 9110 or preselected by a user. Software 9216 may be power management software that watches the battery current and/or voltage level to determine when to shut off particular components in the system.

F.3. Illustrative Error Value Determination and Utilization

Figure 93:
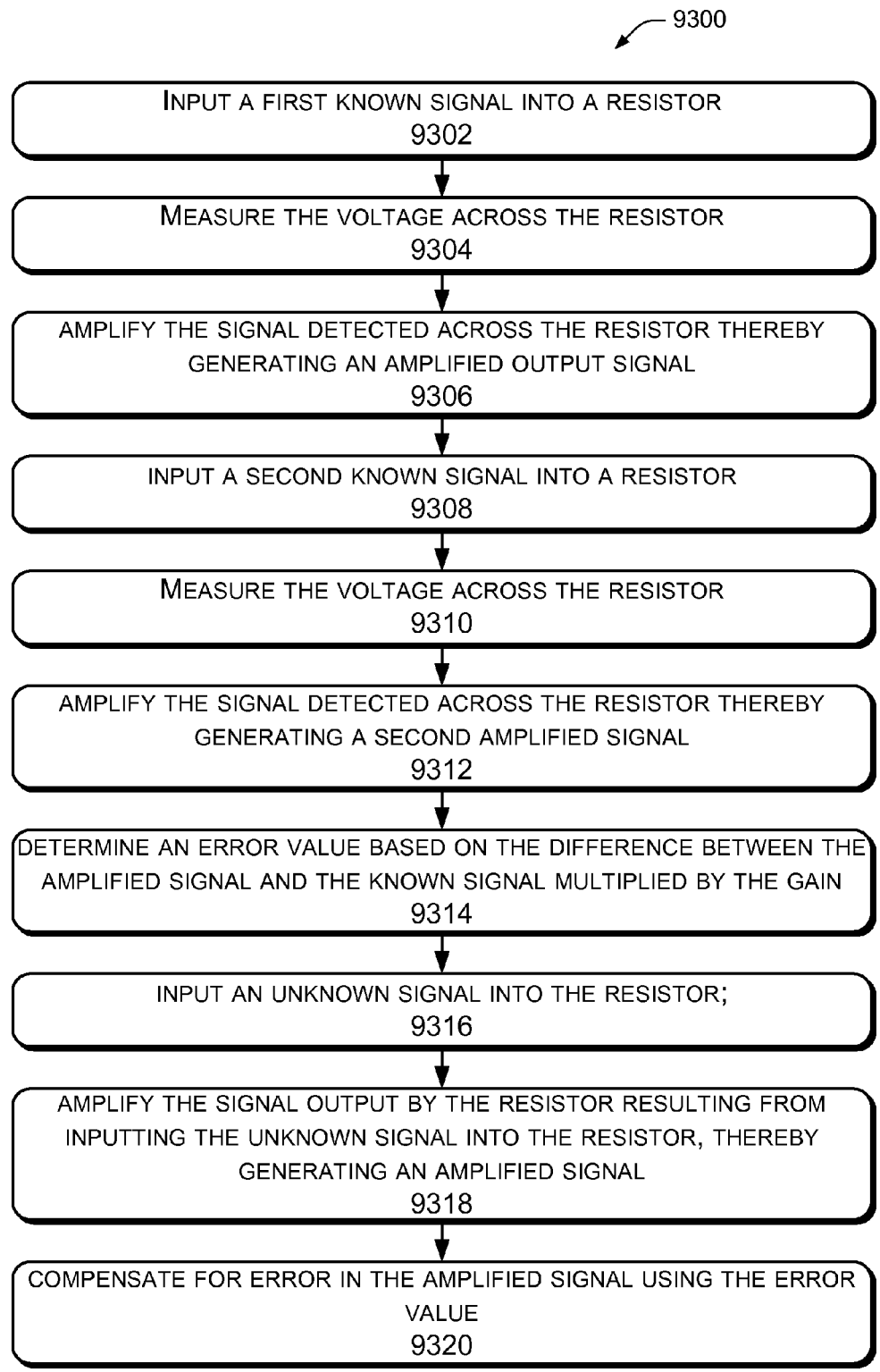
FIG. 93 shows a flow diagram of a process to compensate for error in the battery voltage level as perceived by the processing circuitry.

FIG. 93 shows one example implementation of a process 9300 for determining and utilizing an error value. The system in FIG. 92 may be used for reference in describing this process.

Specifics of illustrative methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

At 9302, a first known voltage and/or current signal is sent to a resistor. For example, a known power source, such as battery 9202 is sent to current sense resistor 9206.

At 9304, the voltage drop across a resistor, such as current sense resistor 9206, may be measured using a meter, which may be an external meter or may be integrated with the device. A known voltage reading may be, for example, 0.59 millivolts (my) across the resistor. This value will be the basis for the first input value into the op amp.

At 9306, the signal across the resistor is provided to an op amp, such as op amp 9208. The op amp output, $V_{discharge}$, is measured. The op amp 9208 may have an assumed gain of, for example, 50. In theory, $V_{discharge}$ (i.e., the output of op amp 9208) would simply be the input voltage of the op amp multiplied by the gain, in this case 0.59 mv×50 or 29.5 mv. In practice, however, $V_{discharge}$ may be much different. For example, the measured $V_{discharge}$ may be 72 mv. This discrepancy in values provides an error value of, for example, 42.5 (i.e., 72-29.5). However, this error value is only as accurate as the assumed gain value. If the assumed gain value is incorrect, the error value will also be incorrect. Therefore, a more accurate gain determination may be utilized for a more accurate error value as described below.

At 9308, a second known voltage and/or current signal is provided to the resistor to more accurately determine the error value.

At 9310, the voltage across the resistor is again measured. This value will be the basis for the second input value for the op amp.

At 9312, the signal across the resistor is provided to an op amp, such as op amp 9208 and measured as a second output value.

At 9314, the error value is determined. According to one implementation, the error is determined utilizing an assumed gain, multiplying that gain value by the first input value to get an expected value, and subtracting the expected value from the measured value to determine the error value. According to another implementation, the first and second input values are compared to determine the difference in input value ($A_{in}$), i.e., $A_{in} = |(\text{first input value} - \text{second input value})|$ The first and second output values are compared to determine the difference in output value ($A_{out}$), i.e., $A_{out} = |(\text{first output value} - \text{second output value})|$ $A_{out}$ is divided by $A_{in}$ to obtain the actual gain of the op amp. This actual gain is multiplied by, for example, the first known input value to determine the expected value. The expected value is subtracted from the first measured output to determine the error value.

As an example of one manner of calculating error, consider the following example. A first known input value of 3.5 is provided to an op amp to produce an output of 200. A second known input value of 0.78 is provided to the op amp, which produces an output of 56. The input values could be voltages or currents. For example, The input values, i.e., 3.5 and 0.78, may be derived by taking the measured current ($I_{battery}$) and dividing it by 50, where 50 is selected on the basis that the current sense resister is 1/50 ohm ($\Omega$), i.e., 20 m$\omega$. $A_{in}$ is 3.5−0.78=2.72 and $A_{out}$ is 200−56=144. Dividing the $A_{out}$ by the $A_{in}$ we get 52.94. This is the slope of a line representing the gain of the op amp circuit. Multiplying the gain by the input value and subtracting the result from the output value will give you the offset, or error value, e.g., 56−0.78×52.94=14.7068.

Yet another alternative for determining offset utilizes the output of an ADC connected in series to the op amp, such as ADC 9210 connected to op amp 9208. The output of the op amp can be treated similar to $V_{discharge}$, except that an adjustment factor is added to the measured output of the ADC. The value of 4 may be selected as the adjustment factor due to the fact that such a value is one half the value of the least significant bit (LSB).

Once the error value obtained it is stored and/or utilized to correct for future $V_{discharge}$ values when an unknown voltage, such as $V_{BATT}$, is provided to the resistor. For example, the error value may be added or subtracted from the $V_{measured}$, shown in FIG. 94 to obtain a more accurate $V_{compensated}$ value. Compensating for $V_{measured}$ in this manner corrects for the offset error that occurs in components such as the op amp 208 during normal operation.

At 9316, an unknown voltage signal is applied to the resistor. This may occur during the normal operation of the device as the battery discharges, thereby providing power to various components of the device.

At 9318, the signal is amplified by the op amp. This amplification creates a better quality signal for conversion in an ADC, such as ADC 9210. However, as mentioned above, the op amp has an associated offset value that creates an error in the signal.

At 9320, the value of amplified signal is adjusted using the error value. This adjustment may be performed using power management software other computer program. Thus, the error value assists in compensating for the offset in the op amp affecting the operating voltage values that are experienced over time.

Using an error value and software to calculate the offset of an op amp or other power component is a more current-conservative technique for correcting for component error than incorporating op amps having an offset adjustment into the circuit design. Op amps that have an offset adjustment typically draw more current than op amp 208, which does not have offset adjustment. Moreover, the error value may be fixed for a given components or for a given configuration. Therefore determining the error value need only be performed once in the life of the device or may be determined from time to time, as needed. The process of determining the error value may be an aspect of a factory initialization. It may also be performed under certain boot conditions and so forth.

F.4. Illustrative System for Battery Life Determination

The compensated current values that are determined based on the error value described above may be used to better gauge the battery life. As more particularly described below, approximating the voltage over time measurement to reduce the effect of spikes allows the battery life to be more accurately estimated and thus optimizes system performance.

Figure 94:
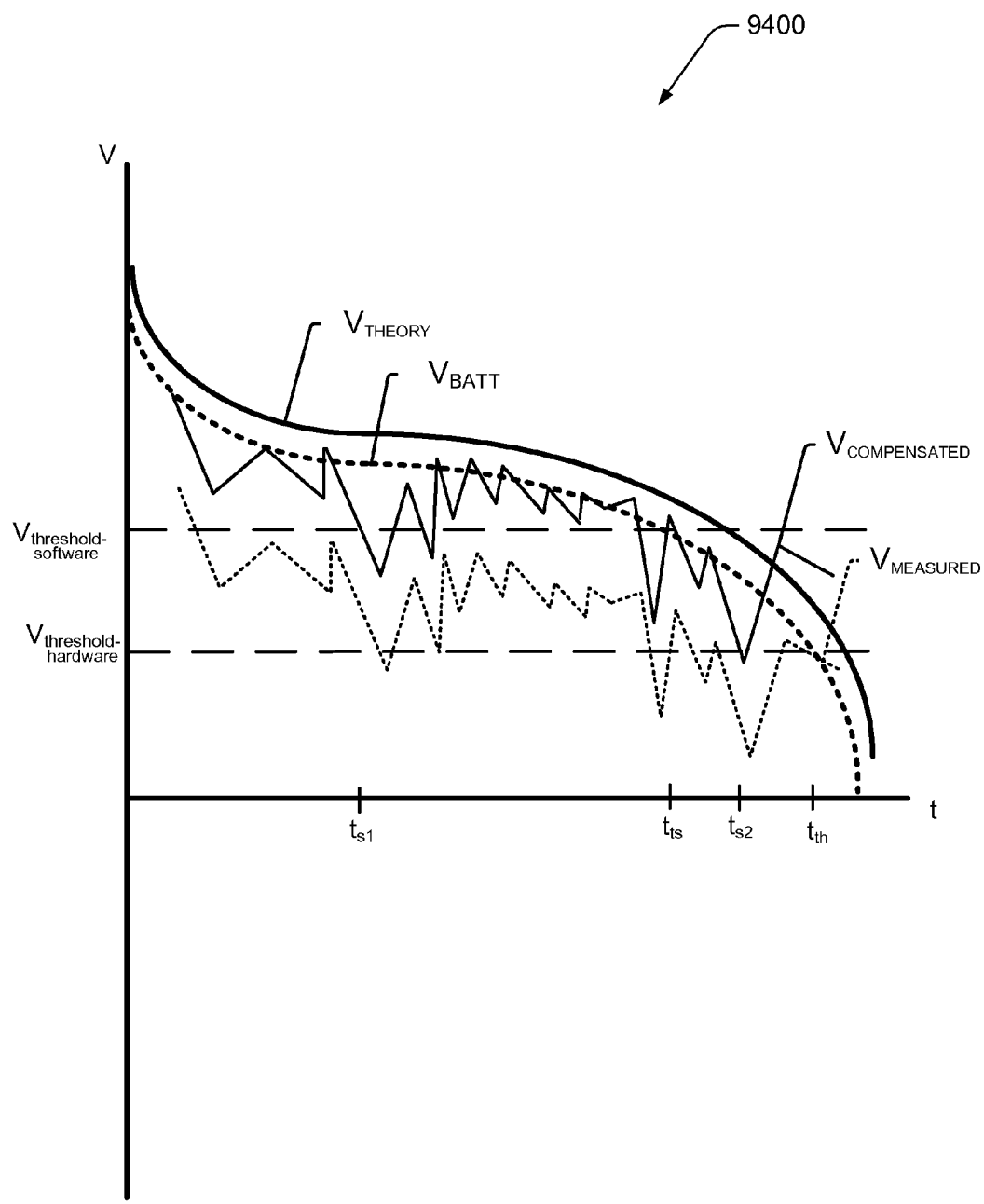
FIG. 94 shows theoretical and actual voltage curves for a battery in an electronic device.

FIG. 94 shows a measured voltage, $V_{measured}$, for a particular system as compared to a theoretical voltage curve, $V_{theory}$. $V_{theory}$ is the idealized curve of the life of a battery with a small load, e.g. 300 ma. However, when current is drawn from the battery, a series resistance is associated with the battery voltage, $V_{BATT}$, which lowers the curve as represented by $V_{BATT}$ in the figure. Thus, the curve for $V_{BATT}$ is typically lower than that for $V_{theory}$. Additionally, the voltage observed (i.e., $V_{measured}$) may appear jagged due to the device entering different power states which cause voltage droops or drains over given periods of time. The compensated voltage, $V_{compensated}$, may be adjusted from $V_{measured}$ based on the error value as described above.

The abrupt power spikes caused by, for example, components being turned on and off may be perceived by one or more monitoring mechanisms with the device to signify the need to disable certain components to conserve power. In simplest terms, the system 100 may have certain watermarks, or thresholds, that determine how the device will manage or distribute power. For example, if $V_{compensated}$ falls below $V_{threshold-software}$, certain software programs may be shut down to conserve power. If $V_{compensated}$ falls below $V_{threshold-hardware}$, certain hardware components may be disabled in order to conserve power. The power spikes may temporarily drive the voltage value below one or both of these thresholds. These thresholds are intended as indicators of the $V_{BATT}$ curve is approaching a point $t_{ts}$ or $t_{th}$ and, therefore, that the battery is approaching a low or fully discharged value. However, the power spikes may temporarily drop power below the $V_{threshold-software}$ and $V_{threshold-hardware}$ at times $t_{s1}$ and $t_{s2}$, respectively. Thus, software and/or hardware associated with the power management module smoothes the $V_{compensated}$ curve to avoid the spikes affecting the power mode of the device. Additionally or alternatively the values for $V_{threshold-hardware}$ and/or $V_{threshold-hardware}$ may be adjusted to ensure that any spikes causes cause by components turning on or off will not exceed the adjusted $_{threshold-hardware}$ and/or $V_{threshold-hardware}$ values.

Figure 95:
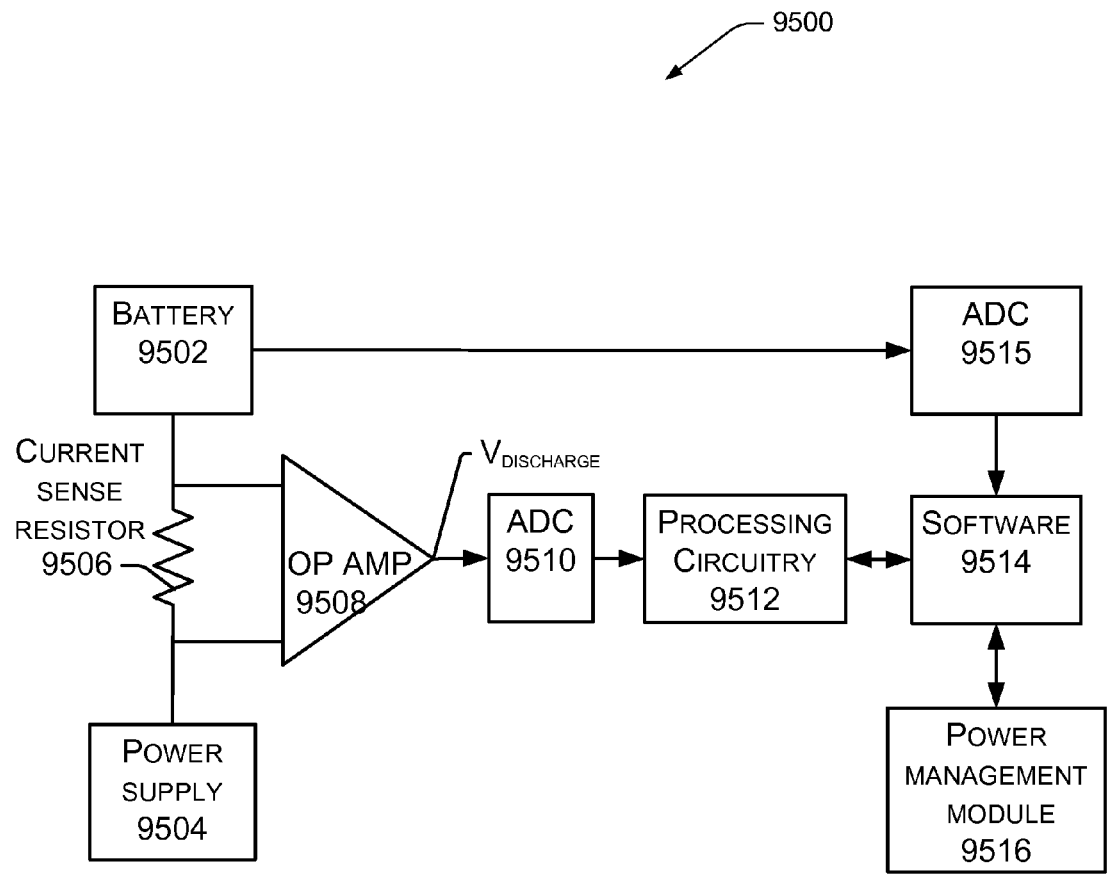
FIG. 95 shows a system for measuring battery voltage and more accurately predicting battery life.

FIG. 95 shows a system to more accurately determine battery life by smoothing the voltage-time curve as perceived by software associated with an electronic device. Thus, temporary voltage spikes may be prevented from affecting the reading of the voltage level remaining and battery life remaining Components in FIG. 95 that are similar to components in 92 have similar reference numerals (e.g., battery 9202 corresponds to 9502).

FIG. 95 is similar to FIG. 92, except the battery voltage $V_{BATT}$ is sent to an ADC 9515 to convert the analog signal to digital form. The digital signal representing $V_{BATT}$ is provided to the software 9514. This software may be integrated with or independent of the error value software 9514 or other software programs. The software may also be associated with and may implement a power management module 9516. The power management module 9516 may smooth the curve $V_{compensated}$ shown in FIG. 94, to more closely represent the curve $V_{BATT}$ or $V_{THEORY}$. One manner of smoothing or adjusting the curve is to calculate a $V_{BATT\ REAL}$ using measured values. The measured values may be utilized in the following equation:

$$V_{BATT\ REAL} = V_{BATT\ MEASURED} + (I_{compensated} \times R_{series\ resistance})$$

Where $V_{BATT\ MEASURED}$ is the actual value obtained when measurement of $V_{BATT}$ is taken. $I_{compensated}$ is calculated using the error value described above. $R_{series}$ is an estimated value based on the board resistance, the resistance of wiring, and so forth. This value may be calculated and utilized by the software 9514.

F.5. Illustrative Techniques for Accurately Determining Battery Life

Figure 96:
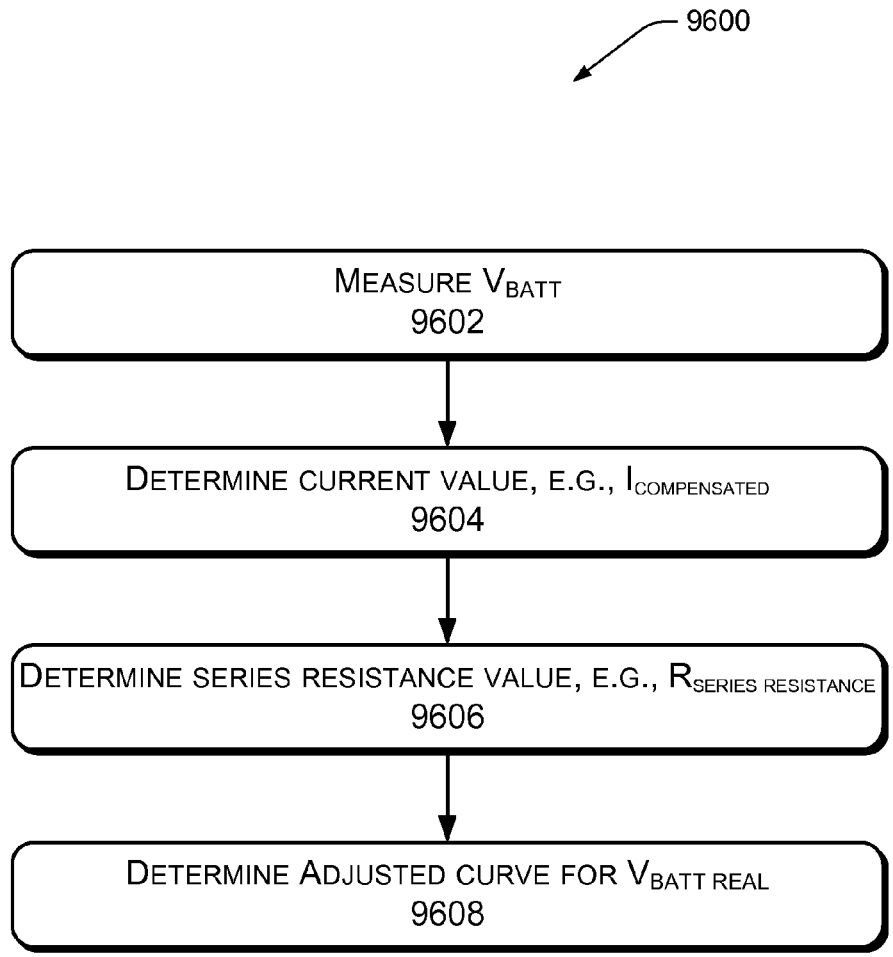
FIG. 96 shows a flow diagram of a process to measure battery voltage and more accurately predict battery life.

FIG. 96 shows one example implementation of a process 300 for more accurately determining battery life. The system in FIG. 95 may be used for reference in describing this process.

Specifics of illustrative methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

At 9602, battery voltage of an electronic device is measured. The measurement may be performed with integrated or external components.

At 9604, the current drawn by components of the device is obtained. This current value may reflect the error value adjustment to correct for offset in op amp 9508.

At 9606, the series resistance value is determined. This may be a value based on characteristics of the board resistance, the wiring, and other resistance that is inherent with electrical circuitry.

At 9608, a battery voltage is obtained that more accurately represents the remaining power (i.e., "life") remaining in the battery 9502. This may be accomplished by performing the following equation.

$$V_{BATT\ REAL} = V_{BATT\ MEASURED} + (I_{compensated} \times R_{series})$$

$V_{BATT\ MEASURED}$ is the actual value obtained when measurement of $V_{BATT}$ is taken. $I_{compensated}$ is calculated using the error value described above. $R_{series}$ is an estimated value based on the board resistance, the resistance of wiring, and so forth. This value may be calculated and utilized by the software 9514.

F.6. Illustrative Power Stage Switching Systems

Although the power state systems and devices are described below, this implementation is meant to serve as a non-limiting example.

Figure 97:
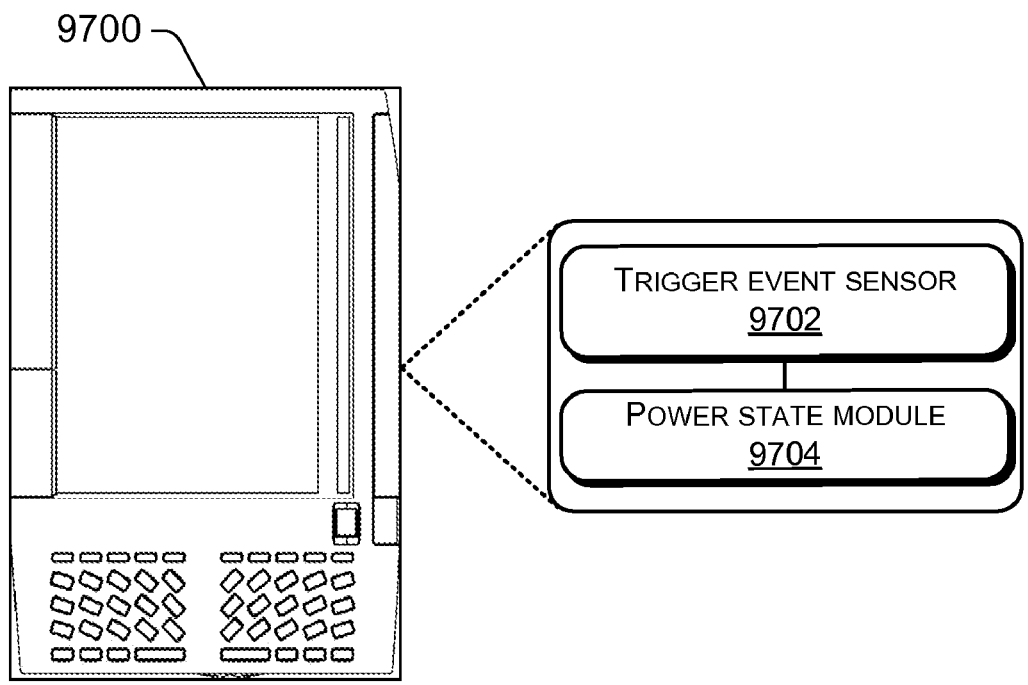
FIG. 97 shows a system for sensing a trigger event and for changing power states in response to the trigger event measuring battery voltage and more accurately predicting battery life.

FIG. 97 shows a system for switching between power states that are implemented on an electronic device 9700. The device 9700 has a trigger event sensor 9702 and a power state module 9704. Other components, particularly other power management components, may also be included but are not illustrated for the sake of simplicity and convenience.

The trigger event sensor 9702 may be a wan switch to sense the availability of a network or for sensing data being sent to the portable device via the wan. The trigger event sensor 9702 is operable to sense an event that requires the power state of the device 9700 to be changed. According to one example, the trigger event sensor 9702 senses when a data module is available to send to the portable device and the power state module 9704 changes the power state of the device from a first power state to a second power state to receive the data module. The trigger event may be sent to the device 9700 through a voice mode of a data connection or network.

The power state module 9704 may be a processor or other integrated circuit or electronic device that is operable to transfer a data module using a data transfer mode and to receive event signals using a voice mode. The processor 9704 is operable to receive the signals from the trigger event sensor 9702, to change the power states of device 9700, and to receive data from a remote source with or without user interaction and/or notification.

According to one example, the first power state is a standby mode state, which may have voice mode capability, and the second power state is a data transfer state. The standby mode state may allow the device 9700 to receive the event trigger signal, such as a "ping" or "ring," across a voice mode, such a cellular or wireless network. The event trigger signal causes the device to "wake up" from the standby mode. The event signal may indicate to the device 9700 that data content or digital items are available for download or push. In response, the power state module 9704 may place the device into a second state to enable the download or push to occur. This may be a wide area network wan enabled mode. The processor may provide a notification to the user that data content or other digital items have been received. The processor then returns the device to the standby mode state after the data content or digital items have is received. The process of switching states may be controlled by software, hardware, or a combination thereof.

Various trigger events may alter the power state of the device 9702. For example, if a trigger event is received indicating that data is available for transfer and a trigger event is received that the battery level for device 702 is near or below a threshold value, the processor may ignore the data transfer trigger event. Additionally or alternatively, the processor may record receipt of the data transfer trigger event and may notify the user that the trigger event was received, but that due to power levels being near or below threshold values that the data transfer was not initiated.

The trigger event may also be indicator that indicates that a wired or wireless network is available. Such a trigger event could be received by the processor, which may in turn enable a wired or wireless networking session.

F.7. Illustrative process of switching power stages

Figure 98:
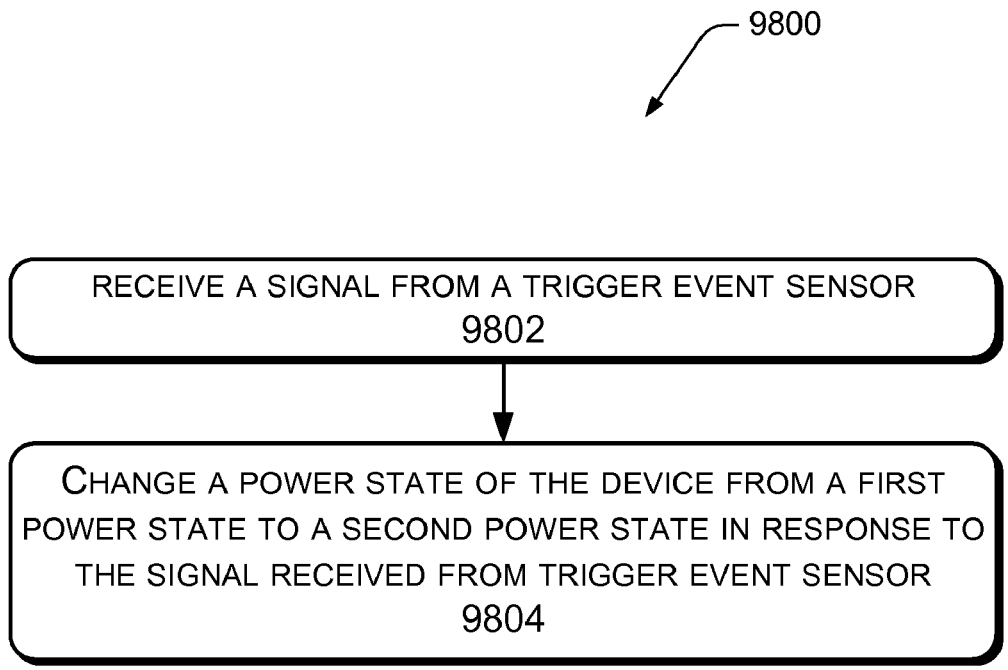
FIG. 98 shows a flow diagram of a process to measure battery voltage and more accurately predict battery life.

FIG. 98 shows one example implementation of a process 9800 for changing power states on an electronic device, such as device 9702.

Specifics of illustrative methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

At 9802, a signal is received by an electronic device. The signal may be sent via a wired or wireless network to which the device is connected. The signal may represent a trigger event, as described above.

At 9804, a power state of the device may be changed from a first power state to a second power state in response to the trigger event. As described above, one of the first and second power states is a wide area network (wan) enabled state and the other of the power states is a non-wan enabled states. For example, the trigger event may indicate that a data module is ready for transfer and may be received by the device using a data transfer mode when the device is in a wan enabled mode. In response to the trigger event, the device may be placed in a second, wan enabled, mode that enables the data transfer. The device thereby conserves power by only changing power states in response to the trigger event. The device does not need to regularly check for available data modules, but instead monitors for indications that data modules is ready using a low power voice mode.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented at least partially by a handheld electronic book reader device, the method comprising:
   under control of one or more systems of the handheld electronic book reader device configured with executable instructions,
      receiving query terms input to the handheld electronic book reader device by a user;
      compiling a list of electronic items stored in memory of the handheld electronic book reader device that contain at least one instance of each query term;
      sorting the list of electronic items based on a number of instances of the query terms in each electronic item, wherein sorting the list comprises:
         determining, for each electronic item in the list, a fuzz factor which is indicative of a likelihood that each electronic item has the query terms located within a predetermined proximity of each other; and
         organizing the list based on the fuzz factor, wherein the fuzz factor comprises a number that is derived using less processing than determining that at least one instance of the query terms are located within the predetermined proximity of each other;
      determining an electronic item from the sorted list that has at least one instance of the query terms located within the predetermined proximity of each other in the electronic item; and
      displaying, on a display of the handheld electronic book reader device, results including the electronic item and other electronic items from the sorted list determined to have at least one instance of the query terms located within the predetermined proximity of each other.

2. The method of claim 1, wherein the fuzz factor=(IT1+IT2+ . . . +ITQ)/Q, where IT1 is a number of instances of a first query term, IT2 is a number of instances of a second query term, ITQ is a number of instances of a $Q^{th}$ query term and, Q is the number of query terms received.

3. The method of claim 1, wherein the fuzz factor comprises a minimum number of occurrences of the query terms.

4. The method of claim 1, wherein the displaying comprises displaying a set of results including a predetermined number of electronic items having at least one instance of the query terms located within the predetermined proximity of each other, and wherein the determining is iteratively performed on the electronic items in order of the sorted list until the predetermined number of electronic items having at least one instance of the query terms located within the predetermined proximity of each other is reached.

5. The method of claim 4, further comprising:
   receiving a request to view a next set of search results;
   beginning with a next electronic item in the sorted list and continuing in order of the sorted list, iteratively determining electronic items having at least one instance of the query terms located within the predetermined proximity of each other until the predetermined number of electronic items for the next set of search results is reached; and
   displaying the next set of results on the display of the handheld electronic book reader device.

6. The method of claim 1, wherein the list is compiled based on a master index of terms in electronic items stored in memory.

7. The method of claim 1, wherein the predetermined proximity is fixed.

8. The method of claim 1, wherein the predetermined proximity comprises a byte offset between query terms.

9. The method of claim 1, wherein the electronic items comprise electronic books.

10. The method of claim 1, wherein displaying results comprises displaying electronic items in order of a number of near value matches in the electronic items, each near value match comprising an instance of query terms being located within the predetermined proximity of each other in an electronic item.

11. The method of claim 1, wherein the predetermined proximity is, for each electronic item, based at least in part on a length of the respective electronic item.

12. The method of claim 1, wherein the predetermined proximity is, for each electronic item, based at least in part on a quantity of query terms input to the handheld electronic book reader device.

13. The method of claim 1, wherein the predetermined proximity is, for each electronic item, based at least in part on average word size of the respective electronic item.

14. A handheld electronic book reader device comprising:
   a processor; and
   memory storing instructions executable on the processor to:
      receive query terms input to the handheld electronic book reader device by a user;
      compile a list of electronic items stored in memory of the handheld electronic book reader device that contain at least one instance of each query term;
      sort the list of electronic items based on a number of instances of the query terms in each electronic item by:
         determining, for each electronic item in the list, a fuzz factor which is indicative of a likelihood that each electronic item has the query terms located within a predetermined proximity of each other; and
         organizing the list based on the fuzz factor, wherein the fuzz factor comprises a number that is derived using less processing than determining that at least one instance of the query terms are located within the predetermined proximity of each other;
      determine an electronic item from the sorted list that has at least one instance of the query terms located within the predetermined proximity of each other in the electronic item; and
      display, on a display of the handheld electronic book reader device, results including the electronic item and other electronic items from the sorted list determined to have at least one instance of the query terms located within the predetermined proximity of each other.

15. One or more non-transitory computer-readable media comprising computer-executable instructions that, when executed, configure a processor of a device to perform acts comprising:
   receiving query terms input to the device by a user;
   compiling a list of electronic items stored in memory of the device that contain at least one instance of each query term;
   sorting the list of electronic items based on a number of instances of the query terms in each electronic item, wherein sorting the list comprises:
      determining a fuzz factor for each electronic item in the list, and organizing the list based on the fuzz factor wherein the fuzz factor comprises a number that is derived using less processing than determining that at least one instance of the query terms are located within a predetermined proximity of each other and which is indicative of a likelihood that each electronic item has the query terms located within the predetermined proximity of each other;
   determining electronic items from the sorted list having at least one instance of the query terms located within the predetermined proximity of each other in an electronic item, wherein the predetermined proximity varies based on one or more of the following:
   size of each respective electronic item, a quantity of query terms input to the device, or average word size of the electronic item; and
   displaying, on a display of the device, results including electronic items from the sorted list determined to have at least one instance of the query terms located within the predetermined proximity of each other.

16. The one or more non-transitory computer-readable media of claim 15, wherein the fuzz factor=(IT1+IT2+ ... +ITQ)/Q, where IT1 is a number of instances of a first query term, IT2 is a number of instances of a second query term, ITQ is a number of instances of a $Q^{th}$ query term and, Q is the number of query terms received.

17. The one or more non-transitory computer-readable media of claim 15, wherein the fuzz factor comprises a minimum number of occurrences of the query terms.

18. The one or more non-transitory computer-readable media of claim 15, wherein the displaying comprises displaying a set of results including a predetermined number of electronic items having at least one instance of the query terms located within the predetermined proximity of each other, and wherein the determining is iteratively performed on the electronic items in order of the sorted list until the predetermined number of electronic items having at least one instance of the query terms located within the predetermined proximity of each other is reached.

19. The one or more non-transitory computer-readable media of claim 18, further comprising computer-executable instructions for:
   receiving a request to view a next set of search results;
   beginning with a next electronic item in the sorted list and continuing in order of the sorted list, iteratively determining electronic items having at least one instance of the query terms located within the predetermined proximity of each other until the predetermined number of electronic items for the next set of search results is reached; and
   displaying the next set of results on the display of the device.

20. The one or more non-transitory computer-readable media of claim 15, wherein the list is compiled based on a master index of terms in electronic items stored in memory.

21. The one or more non-transitory computer-readable media of claim 15, wherein the predetermined proximity comprises a byte offset between query terms.

22. One or more non-transitory computer-readable media comprising computer-executable instructions that, when executed, configure a processor of a handheld electronic book reader device to perform acts comprising:
   receiving query terms input to the handheld electronic book reader device by a user;
   compiling a list of electronic items stored in memory of the handheld electronic book reader device that contain at least one instance of each query term;
   sorting the list of electronic items based on a number of instances of the query terms in each electronic item, wherein sorting the list comprises:
      determining, for each electronic item in the list, a fuzz factor which is indicative of a likelihood that each electronic item has the query terms located within a predetermined proximity of each other; and
      organizing the list based on the fuzz factor, wherein the fuzz factor is based at least in part on a number of instances of a first query term and a number of instances of a second query term and wherein calculating the fuzz factor uses less processing than determining that at least one instance of the query terms are located within the predetermined proximity of each other;
   determining an electronic item from the sorted list that has at least one instance of the query terms located within the predetermined proximity of each other in the electronic item, wherein the predetermined proximity is variable based on one or more of the following: size of each respective electronic item, a quantity of query terms input to the handheld electronic book reader device, or average word size of the electronic item; and
   providing for display, on a display of the handheld electronic book reader device, results including the electronic item and other electronic items from the sorted list determined to have at least one instance of the query terms located within the predetermined proximity of each other.

* * * * *